United States Patent [19]

Richardson

[11] Patent Number: 4,595,820
[45] Date of Patent: Jun. 17, 1986

[54] APPARATUS AND METHODS FOR CONTROLLING A WELDING PROCESS

[75] Inventor: Richard W. Richardson, Columbus, Ohio

[73] Assignee: The Ohio State University

[21] Appl. No.: 603,296

[22] Filed: Apr. 23, 1984

Related U.S. Application Data

[63] Continuation-in-part of Ser. No. 456,278, Jan. 6, 1983, abandoned, and Ser. No. 436,026, Oct. 22, 1982, Pat. No. 4,532,408.

[51] Int. Cl.4 ................................................. B23K 9/09
[52] U.S. Cl. ......................... 219/137 PS; 219/130.01; 219/130.21; 219/130.51
[58] Field of Search ..................... 219/137 PS, 130.01, 219/130.21, 130.51

[56] References Cited

U.S. PATENT DOCUMENTS 3,212,695 10/1965 MacGregor .
3,855,446 12/1974 Kotova et al. .
3,864,542 2/1975 Fletcher et al. .
4,093,844 6/1978 Fellure et al. .
4,144,992 3/1979 Omae et al. .
4,169,224 9/1979 Puschner .
4,183,055 1/1980 Burkhardt, Jr. et al. .
4,225,771 9/1980 Justice et al. .
4,280,137 7/1981 Ashida et al. .
4,305,096 12/1981 Yokoshima et al. .
4,336,440 6/1982 Cook et al. .
4,359,624 11/1982 Wascat .
4,409,650 10/1983 Noguchi .
4,410,786 10/1983 Cloos .
4,417,127 11/1983 Nachev et al. .

OTHER PUBLICATIONS

Rao, "Development of Weld Pool Imaging Techniques for the Adaptive Control of Gas Tungsten Arc Welding", Thesis submitted 9/81, at Ohio State University, pp. 1–5 and 24–31.
Mashbuchi, et al, "Improvement of Reliability of Welding by In-Process Sensing and Control", Trends in Welding Research in The United States, pp. 682–687, 11/1981.

Primary Examiner—Clifford C. Shaw
Attorney, Agent, or Firm—Sidney W. Millard

[57] ABSTRACT

Video data generated at a high rate by a camera observing a welding operation is selectively stored in a videocomputer interface to permit later computer analysis of the data. Special multiple memory techniques can be employed when the rate of which the data is generated is too fast for storage in a single memory in the interface. The width of the weld pool is detected by finding local minima of light intensity associated with these edges. The mass of the weld pool and the weld penetration can be measured and controlled by causing oscillations in the weld pool and measuring the natural frequency of such oscillations. The weld line can be tracked either by bouncing a beam of light off the welding electrode so as to form an illuminated area and detecting the resulting irregularity where the illuminated area crosses the weld line, or by detecting the deformation in the surface of the weld pool as the pool flows into the gap between the metal portions being joined. Prior to welding, the weld line can be detected by establishing a low power welding arc insufficient to create a molten weld pool but generating enough light to produce an irregularity in the reflected light at the location of the weld line.

15 Claims, 78 Drawing Figures

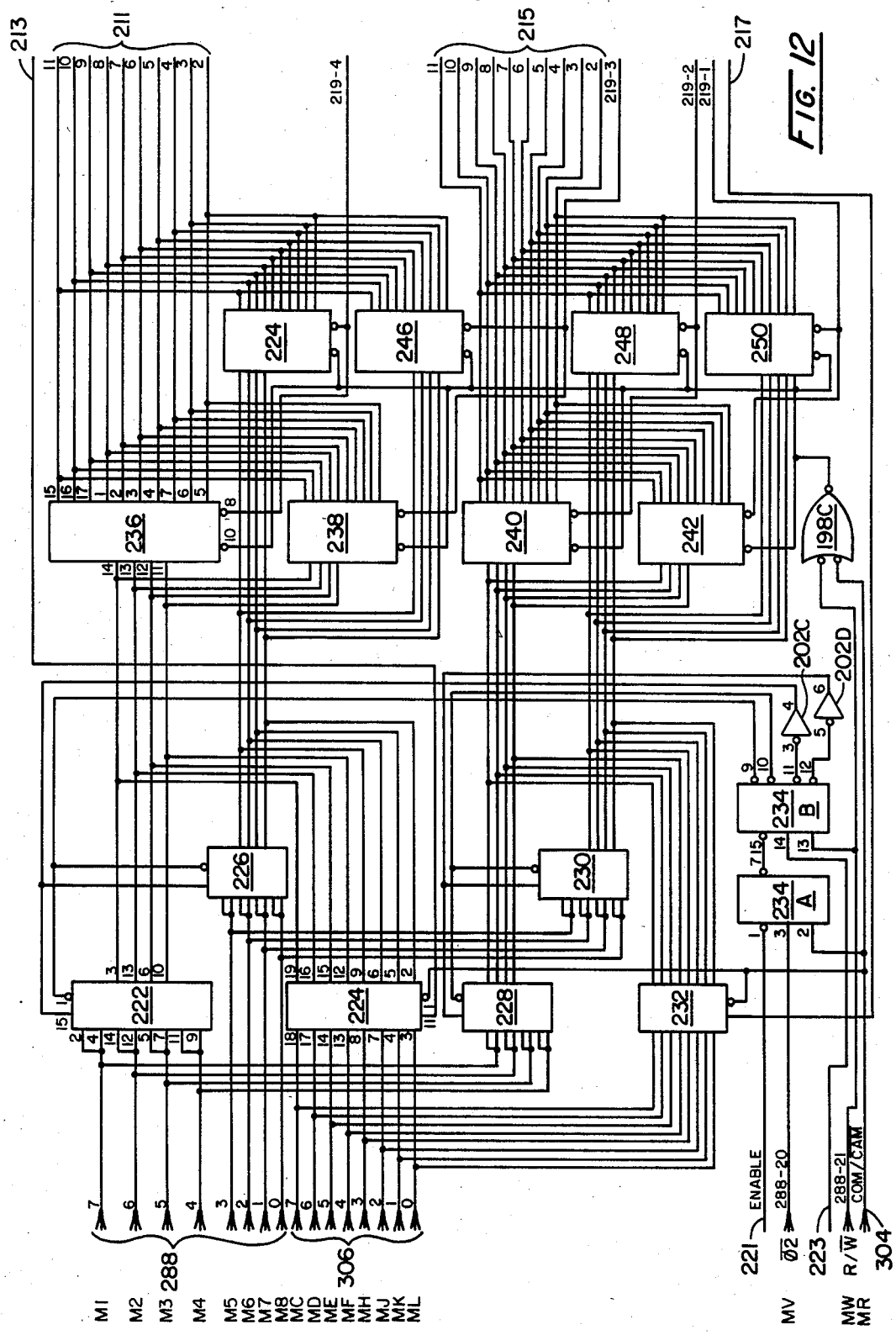

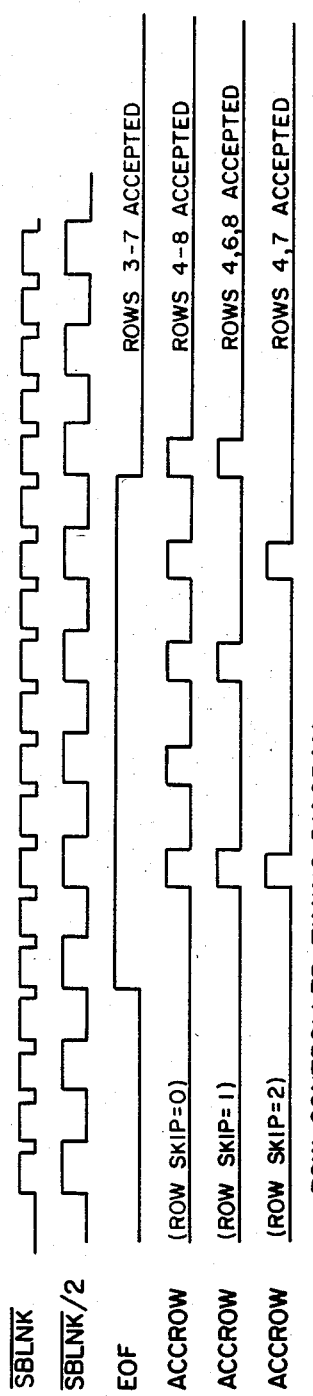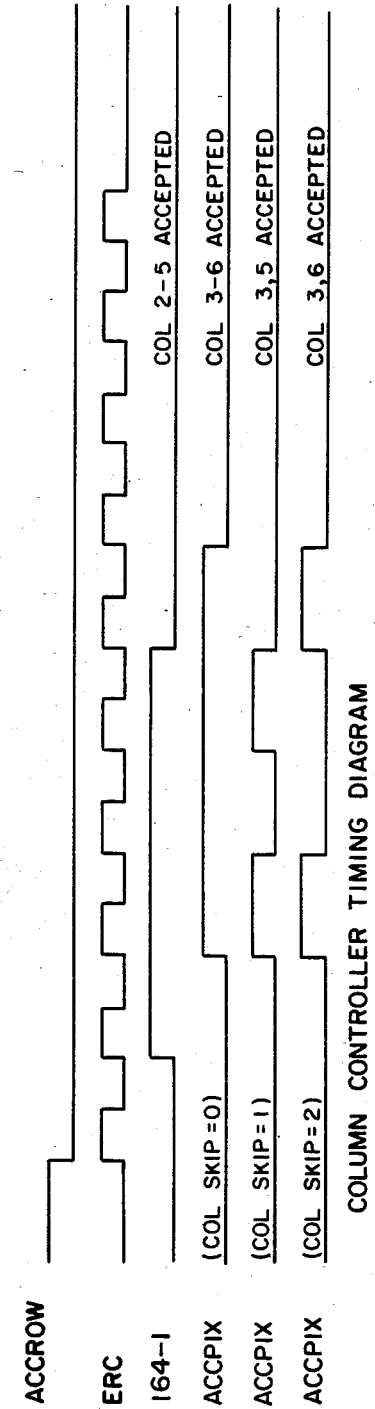
FIG. 14A

MEMORY TIMING DIAGRAM

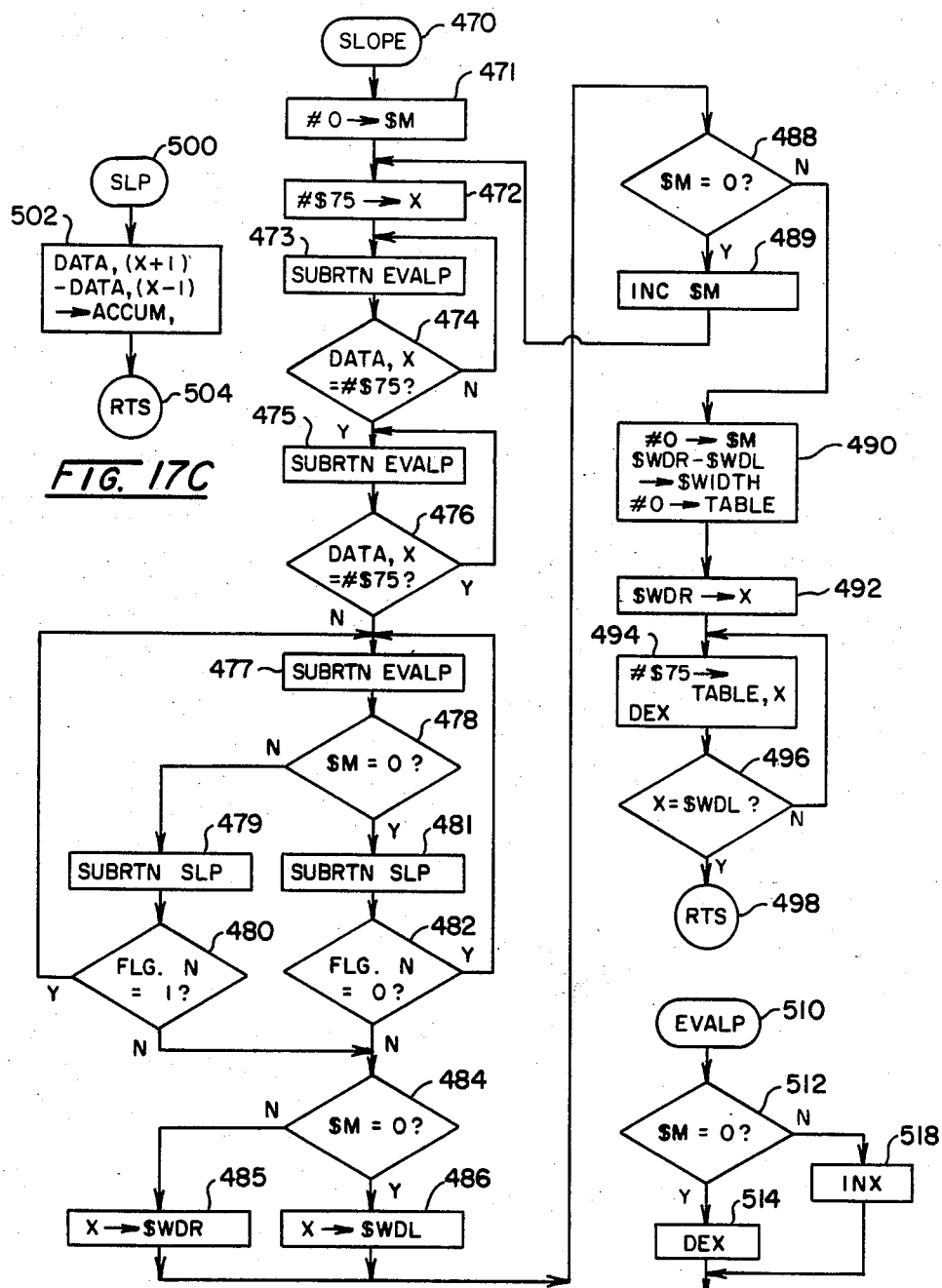

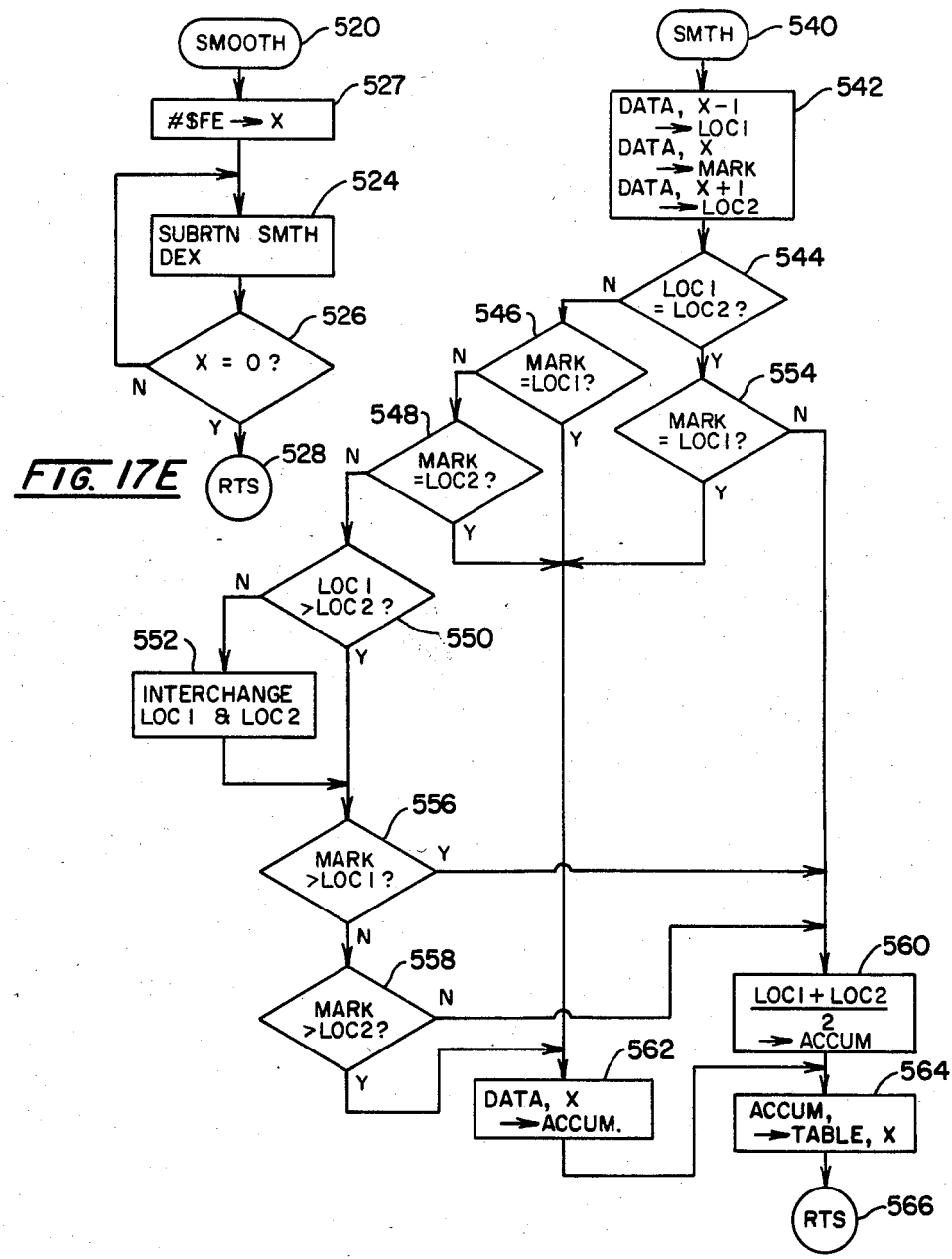

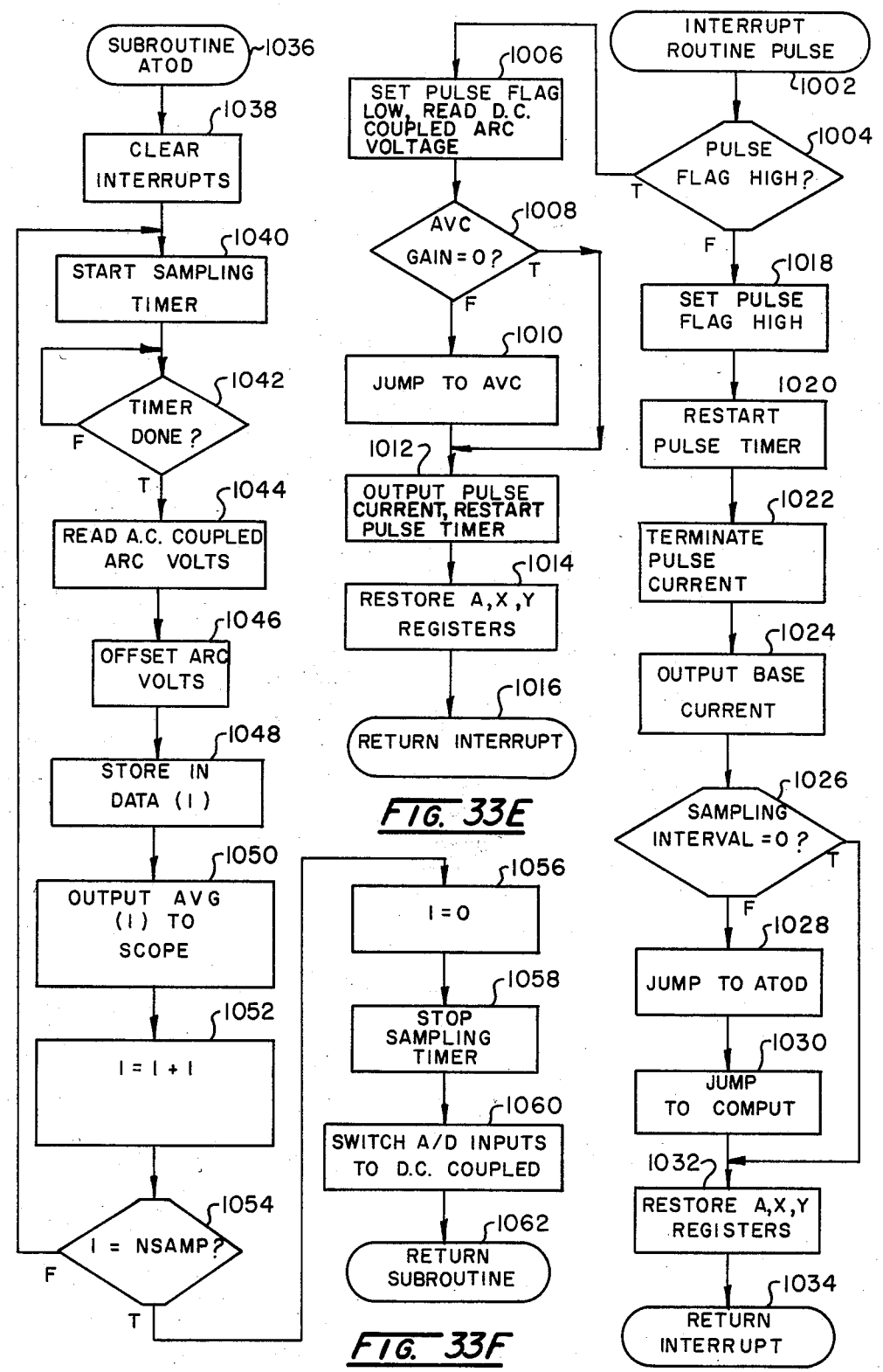

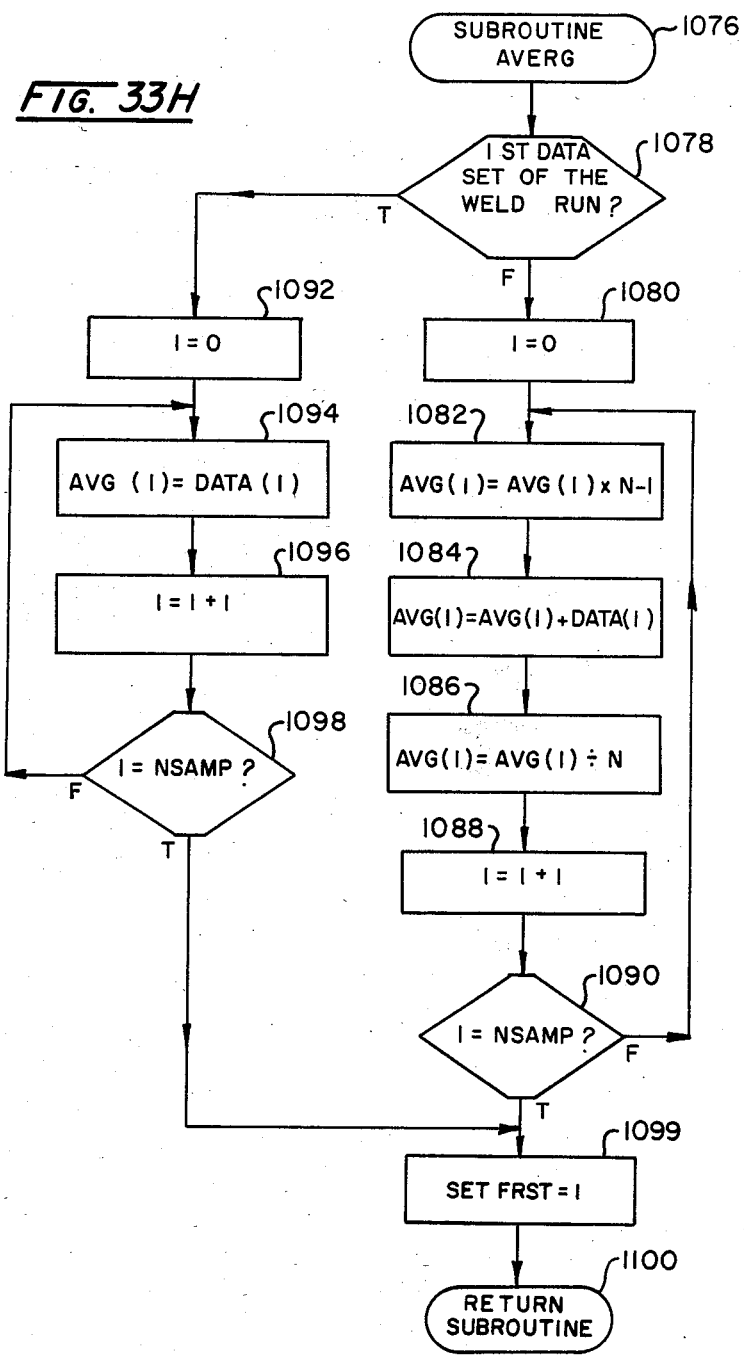

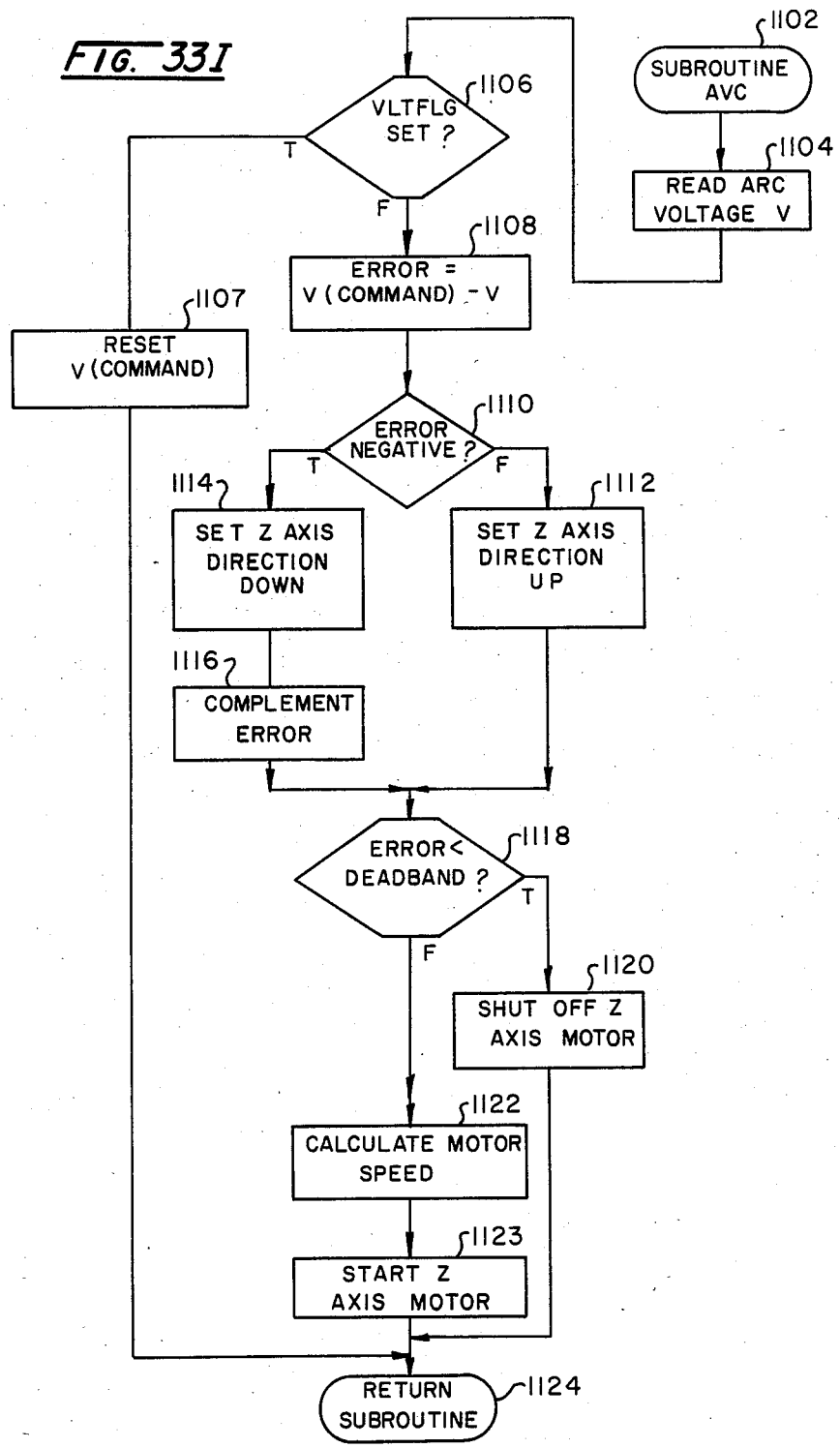

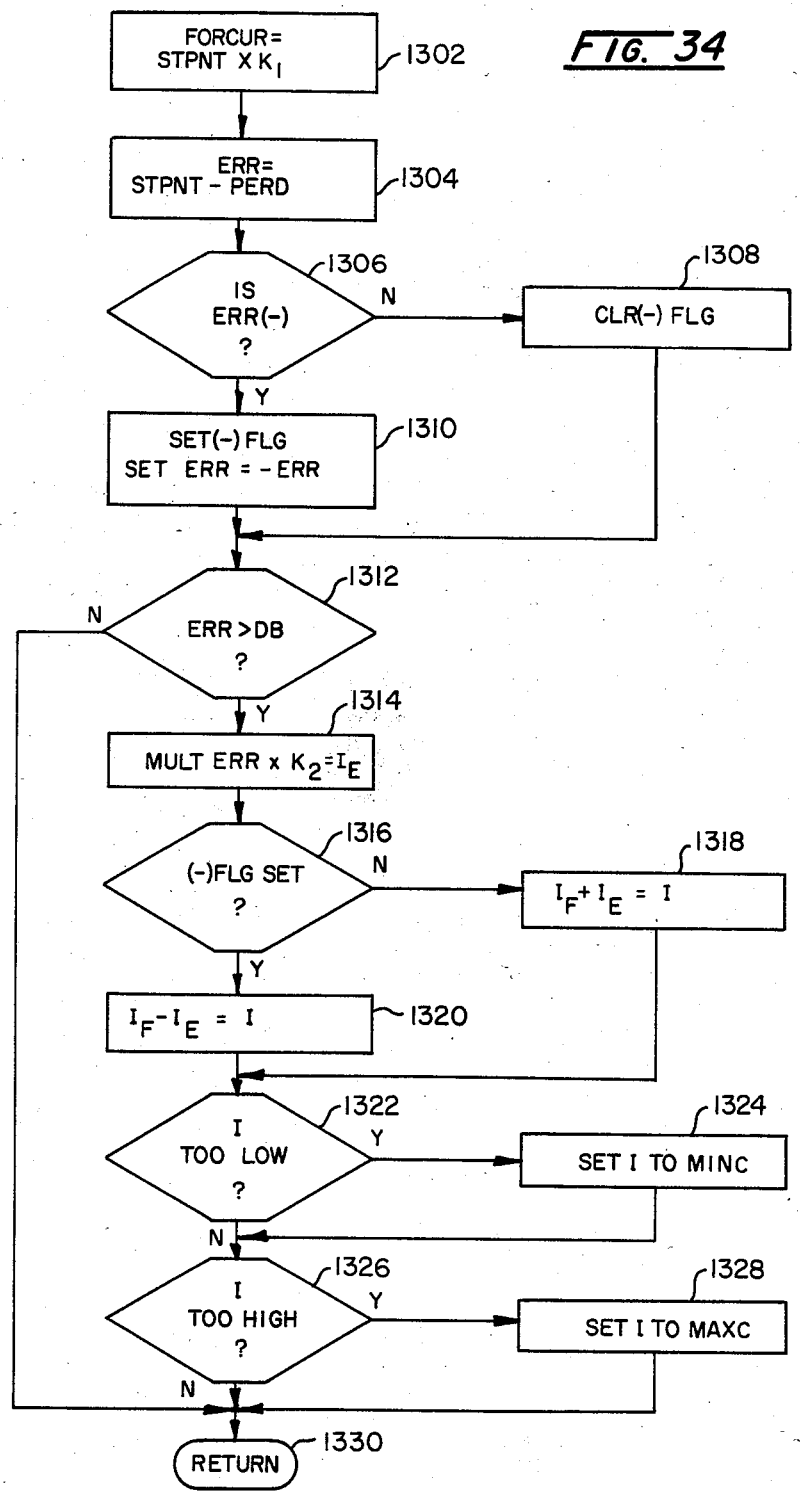

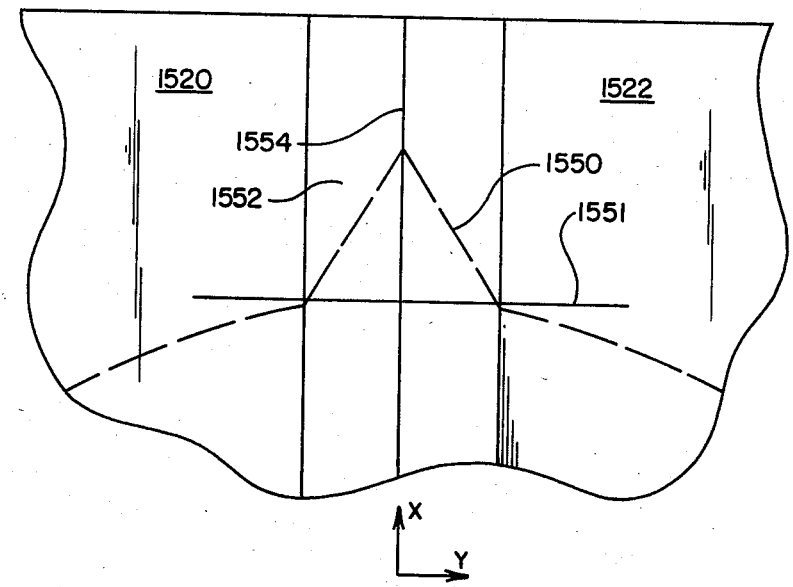
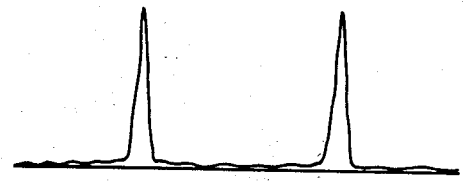
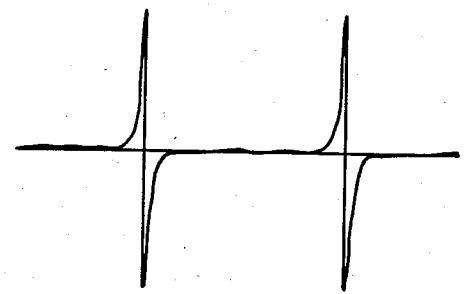
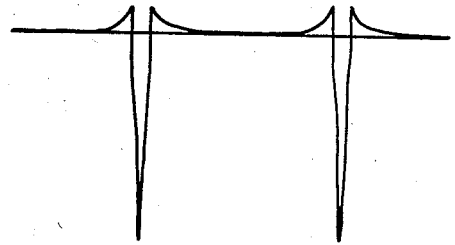
FIG. 38

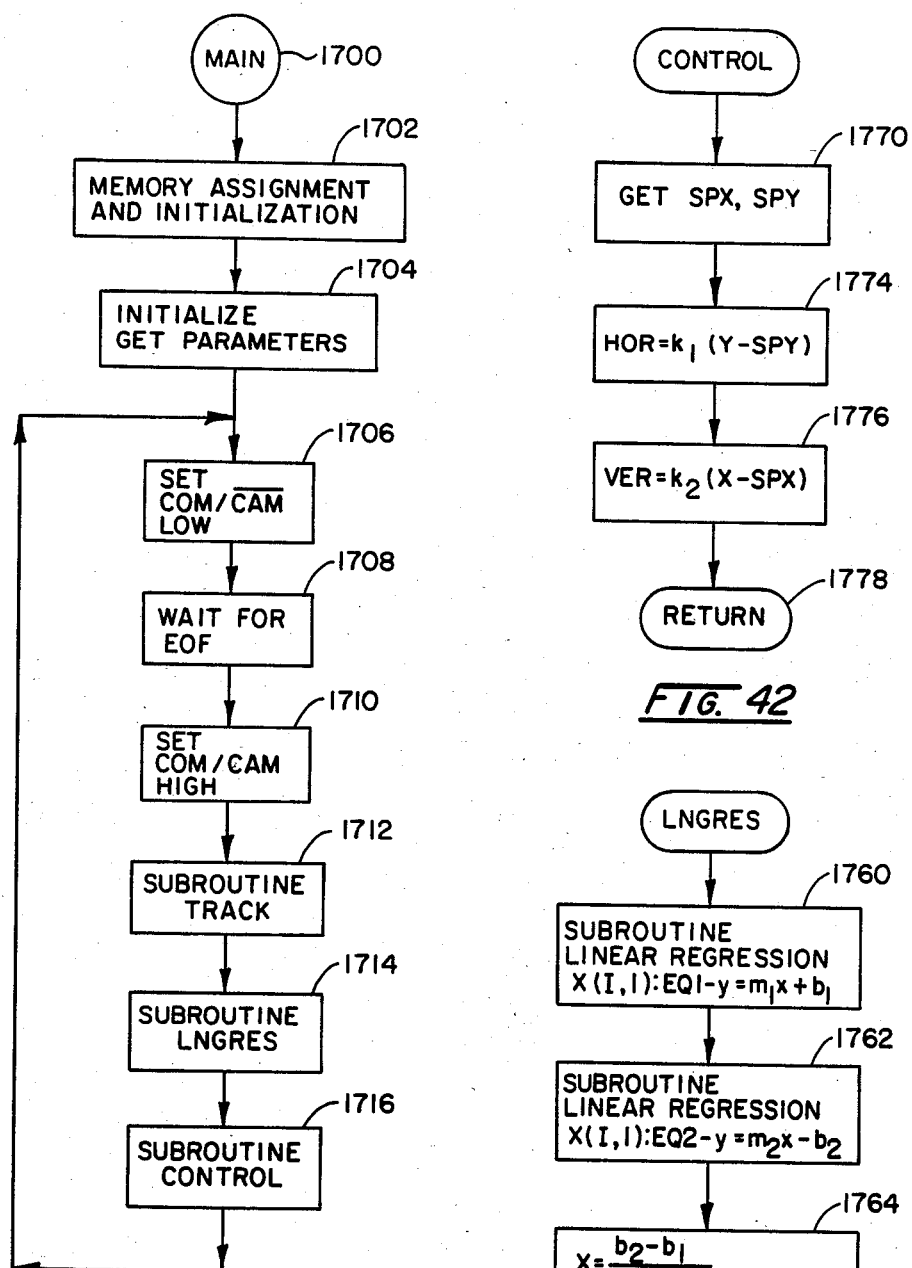
FIG. 39
FIG. 41
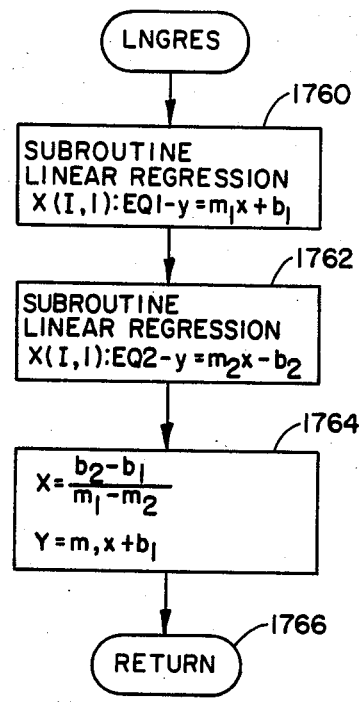
FIG. 42

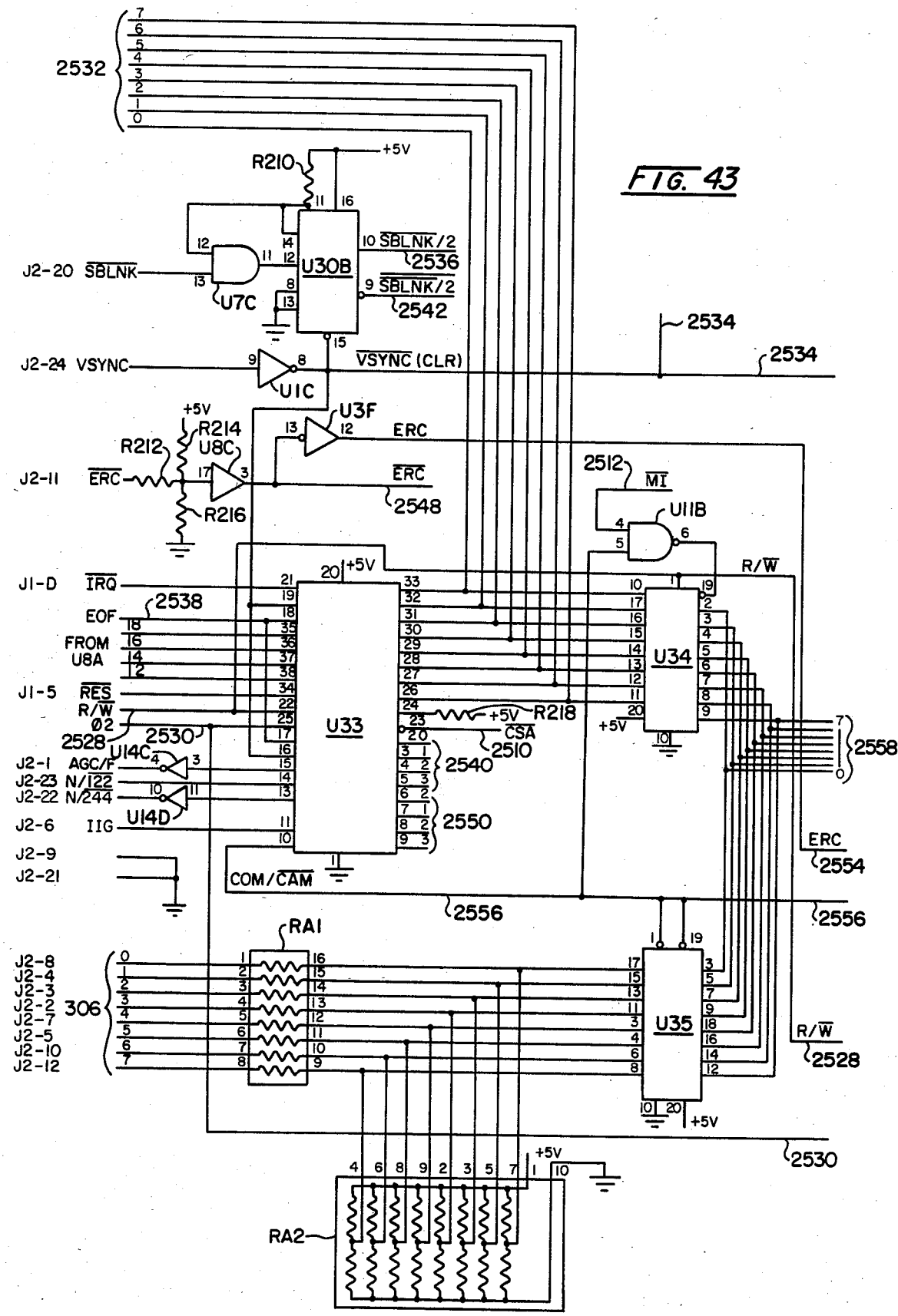

APPARATUS AND METHODS FOR CONTROLLING A WELDING PROCESS

This invention was made with Government support under Grant No. ISI-8018104 awarded by the National Science Foundation. The Government has certain rights in this invention.

This is a continuation-in-part of co-pending applications for U.S. Letters Patent, Ser. No. 436,026 filed Oct. 22, 1982 entitled Apparatus for Viewing Molten Pools in Arc Welding now U.S. Pat. No. 4,532,408 and Ser. No. 456,278 filed Jan. 6, 1983, entitled Apparatus and Method for Controlling an Arc Welding Process now abandoned.

BACKGROUND OF THE INVENTION

The invention relates to an apparatus and method for controlling a welding process. More specifically, the invention relates to apparatus and methods for viewing a welding operation, determining the width of a weld pool, for controlling an arc welding process (including control of weld penetration) and for locating a weld line. The invention also relates to certain data handling techniques which are useful in the instant welding control process but which may also be useful in other applications.

The term "weld line" is used herein to mean the line between the adjacent edges of two metal portions in a weld joint preparation. Thus, the weld line is the line which the welding apparatus should follow during the welding operation. Those skilled in the art will appreciate that, in some types of weld joint preparations, there will be a gap of finite width between the metal portions being welded and thus the weld line will in fact be a narrow strip rather than a line in the strict mathematical sense of that term. The term "weld joint preparation" is used herein to denote the two metal portions lying adjacent one another in a position ready for welding.

The process of arc welding is one of the most widely used manufacturing processes in the world. Great efforts have been made in recent years to automate the welding process in order to allow the use of robot welders which are capable of producing very uniform, high quality welds. Such automation has the potential both to increase productivity by increasing the speed and accuracy of the welding process in routine welding applications, and to increase the quality of the welds thus produced, thereby allowing automated welding to be utilized in high quality control industries such as the nuclear power and pressure vessel manufacturing industries.

In order to develop automatic control of the arc welding process, numerous attempts have been made to determine which are the relevant parameters in the welding process. It has truly been said that only the welding operator truly knows the quality of the weld and what is happening in the welding process because only he has hitherto been able to see precisely the quality of the weld and the physical parameters of weld pool size and arc length. Also, only the operator has been in a position to accurately track weld lines which are often irregular in shape.

In recent years, use of television based direct monitoring has increased. All prior art television monitoring methods have positioned the camera so as to provide an oblique view of the weld similar to that seen by an operator. Unfortunately, such an oblique view inherently includes the electric arc, which is very bright and thus tends to "wash out" the entire television picture unless appropriate filters are utilized. Therefore, these prior art methods have required filtering the light reaching the camera so that only light within a narrow band, or of several discrete wavelengths, reaches the camera, rather than allowing the camera to receive light of the broad range of wavelengths emitted by the arc.

Additional problems in obliquely viewing the weld area with a television monitoring camera are that unforeseen obstructions of the view seen by the camera can arise in real life welding situations can arise. Such obstructions can be caused by the weld line geometry and by constraints on the placement of the camera. Also, distortion of the image of the weld pool is caused by the oblique viewing position due to parallax effects.

Prior art weld pool monitoring techniques such as those already discussed have been used for a variety of purposes. One such purpose is the monitoring of weld pool width. Prior methods of analysis of video data received from viewing the weld pool area with a television camera have made the assumption that the bright areas represent the weld pool and that once the light intensity has decreased to a certain value, then the edge of the weld pool has been reached. Such methods then employ a "go/no-go" type of binary logic system to establish the weld pool width. Unfortunately, there are oscillations in the weld pool caused by fluctuations in the welding current, and also caused by the motion of the electrode along the weld line. Such oscillatory motions cause the area of brightness to appear larger than it actually is. Attempts to mitigate the data error caused by the oscillatory motions have been effected simply by correcting the data rather than actual measurement and evaluation of the true weld pool edges.

A further purpose to be served by the weld pool monitoring techniques already discussed is to control penetration of the weld i.e. the depth of the melted zone of the weld. It is known that there is a relationship between the width of the weld pool and the penetration achieved by the welding process and thus it has been thought desirable to be able to measure and control weld pool width to effect correspondingly precise control of the penetration being achieved. In order to provide a weld of adequate strength, weld penetration must be an appropriate percentage of metal thickness to produce proper adhesion of the two metal portions forming the weld joint preparation when the molten metal of the weld pool has resolidified. Full penetration welds are welds in which the penetration extends all the way through the metal portions. More commonly, only partial weld penetration is necessary. However, hitherto the only methods of measuring partial weld penetration have been intelligent guesswork by an experienced operator or destructive testing techniques following welding. Such destructive testing techniques involve making a sample weld, cutting a cross-section therethrough and actually measuring the weld penetration. Although recently attempts have been made to use non-destructive testing techniques, such as ultrasonic and radiographic analysis, to measure weld penetration, most methods of non-destructive testing yield inconclusive results when applied to a partial penetration weld, and thus such non-destructive testing techniques are usually only used for analysis of full penetration welds. Because of the difficulty of estimating the penetration of partial penetration welds, engineers have mandated full penetration welds when they are concerned about the structural integrity of the final welded product, even though, if proper control of weld penetration could be achieved, only partial penetration welds of specified penetration could be used, thereby increasing the speed and efficiency of the welding process while still allowing close design control. There is thus a need for a method of measuring weld penetration during welding.

A further problem with prior art methods for controlling welding processes is that, if they incorporate computerized analysis of video data, they tend to make excessive demands upon the capacity and/or speed of memory devices used to handle the video data to be analyzed. Storage of every complete frame of video data received from a typical video camera presents extreme difficulty both as to the capacity and speed of the memory required. For example, storing a typical video frame, using an eight-bit graytone scale, requires approximately 4 million bits of information per frame, and such frames may be arriving at, typically, 25 Hz. One technique for reducing data storage requirements is only to store the idea of each frame which is of interest, but if this is to be done it is necessary to allow ready variation of the "window" selected for data storage if the analysis method is to be sufficiently flexible. Also, there is the problem that the rate at which video data from individual pixels of the image to be analyzed is received by memory may be quicker than the memory can handle such data, and to overcome this problem it is desirable to provide a method whereby a stream of data being fed to a memory at a higher rate can be split among a plurality of relatively slow memories each individually incapable of handling and storing the incoming stream of data.

Finally, in an automated welding process it is necessary to ensure that the welding apparatus accurately tracks the weld line. Attempts have been made to track weld lines by means of sensors which look at the line ahead of the welding torch. Such sensors attempt to locate the position of the weld line relative to the torch and adjust the movement of the welding torch so that it tracks the weld line. Such methods have utilized both direct contact type sensors which are "dragged" along the weld line ahead of the welding torch and non-contact sensors such as infra-red detectors.

In prior art systems for tracking weld lines, in order to avoid damage to the sensor and also to keep the sensor from being obscured by the light from the arc area, it has been necessary to sense the preparation some finite distance ahead of the weld torch. This immediately produces the requirement of having some delay in system response so that in fact the system responds to seam tracking changes at the time when the welding head is over the area of change, not just as they are sensed.

Prior art weld line tracking devices are of two types. The first type senses voltage and current variations in the arc when various surface features of the base metal being welded are encountered. One such system oscillates the arc back and forth across the weld line noting the voltage changes due to arc length, the arc length becoming longer as it crosses the weld line. Various schemes have been proposed to measure this voltage oscillation; both magnetic and mechanical motion devices have previously been utilized. The second type identifies the edges of the metal positions on either side of the weld line by analysis of light from the arc reflected off these edges. A feedback system is then provided to respond to the reflected light to produce the desired effect of following the weld line. Of course, since the light source is the arc itself, the welding process is already occurring at the weld line and the system simply keeps the welding torch over the weld line. Since this type of system tracks the weld line by viewing the line ahead of the welding torch, means must be provided to delay implementation of any necessary changes in movement of the welding torch until the torch reaches the appropriate part of the weld line. Also, any process control data produced by such apparatus are subject to error due to parallax from the oblique camera position, as already described, and the apparatus suffers from the problem that the far side of the weld pool is hidden by the arc itself.

Additionally, when prior art methods for tracking a weld line indicate a change in direction of the weld line, the entire welding assembly including the tracking device and torch must be reoriented so that the tracking device leads the welding torch at all times. Such a system inherently complicates the weld tracking control system since the torch must not only be translated to follow the weld line, but it must also be rotated so that the tracking device leads the torch head.

Therefore, there is a need for an improved weld line tracking apparatus and method that reduces the delay time between receiving a response and actually moving the torch head. Additionally there is a need for a system which will allow simple rectilinear translation of the torch head without the necessity of also rotating the torch head and tracking device.

This invention seeks to provide apparatus and methods for overcoming the aforementioned problems in controlling welding processes.

SUMMARY OF THE INVENTION

Accordingly, this invention provides a method for storing video data comprising placing in a video-computer interface location data defining the selected area of a video frame for which video data are to be stored; supplying video data to the video-computer interface; causing the video-computer interface to identify the beginning of a frame of the vide data; and storing the data from the selected area of the frame as it is supplied to the video-computer interface.

This invention also provides apparatus for storing video data comprising an input for the video data, location data receiving means receiving location data defining a selected area of the video frame for which the video data is to be stored, identification means for determining the beginning of a frame of the video data, and memory means for storing video data. This apparatus also includes switching means arranged to store in the memory means video data supplied to the input when the video data relate to pixels lying within the selected area but not to store in the memory means video data when this video data relates to pixels lying outside the selected area.

This invention also provides a memory assembly comprising first and second memory means, first and second latch means associated with the first and second memory means respectively, and a data input. The memory assembly also comprises control means for latching a first portion of data received at the input on the first latch means, latching a second and later portion of data received at the input on the second latch means, and transferring the first and second portions of data from the first and second latch means respectively to the first and second memory means respectively.

This invention also provides a method of storing, in a memory assembly comprising first and second memory means, a stream of data supplied to the assembly faster than the rate at which the data can be stored in either of the memories alone. In this method, a first portion of data is received and latched on a latching means, a second and subsequent second portion of data is received and stored in the second memory means, and the first portion of data is transferred from the latching means to the first memory means while the second portion of data is being received and stored.

This invention also provides a method for controlling an arc welding process in which a light-generating arc is established between a welding electrode (this electrode having an axis) and a weld joint preparation, thereby forming a molten weld pool on the weld joint preparation and causing light generated by the arc to be reflected from the weld pool and the solid metal surrounding the weld pool. Rays of this reflected light travelling substantially parallel to the axis of the electrode are collected in a video camera and the video output from this camera is fed to a vide monitor, thereby forming on this monitor an image of the weld pool in which the arc is obscured by the electrode. The welding process is then manually controlled using the image displayed on the video monitor. (This method may hereinafter be referred to as the "manual control method" of the invention.)

This invention also provides a method of measuring the width of a molten weld pool in an arc welding process in which a light-generating arc is established between a welding electrode (this electrode having an axis) and a weld joint preparation, thereby forming the molten weld pool on the weld joint preparation and causing light generated by the arc to be reflected from the weld pool and the solid metal surrounding the weld pool. Rays of this reflected light travelling substantially parallel to the axis of the electrode are collected and the light thus collected is analyzed to locate two local minima of light intensity indicating the edge of the weld pool, these two local minima being located on points on the periphery of the weld pool spaced from one another. The distance between the two local minima is determined, hence determining the weight of the weld pool. (This method may hereinafter be referred to as the "weld pool width measuring method" of the invention).

This invention also provides a process for controlling an arc welding process in which a weld is begun by providing electrical current to form an arc between a welding electrode and a base metal to form a weld pool of liquid metal on the base metal. The natural frequency of oscillation of the pool is measured and the mass of the pool computed from this frequency of oscillation. The position of the first edge of the weld pool is determined by analyzing light deflected from the surface of the pool and the adjacent base metal in a direction parallel to but non-coincident with the axis of the welding electrode for a first local light intensity minimum. The position of a second edge of the weld pool is determined in a similar manner and the distance between the first and second edges is used to determine the width of the pool. The electrical current supplied to the arc welding process is adjusted in response to the computed mass and width to maintain a constant pool mass and a constant width between the first and second pool edges.

This invention also provides a method for measuring the mass of a weld pool in an arc welding process in which an electrical current forms an arc from an electrode to the weld pool and an electrical voltage exists across the arc. In this method the electrical current through the arc is adjusted to a base level, pulsed to a level substantially different from this base level, and then returned to its base level, thereby inducing oscillations in the pool. The natural frequency of oscillation of the weld pool is measured after the current has been returned to its base level, and finally a value representative of the mass of weld pool is displayed in humanly perceptible form. (This method and that described in the preceding paragraph may hereinafter be referred to as the "weld pool oscillation methods" of the invention.)

This invention also provides a method for controlling the mass of a weld pool in an arc welding process in which an electrical current forms an arc from an electrode to the weld pool. In this method, oscillations are induced in the pool by applying a force to the pool and then removing the force so that the pool then continues to oscillate at substantially its natural frequency. The frequency of these oscillations is measured after the removal of the force, and compared with a parameter representing a desired value of this frequency. Thereafter, the electrical current passing through the arc is adjusted so that the measured frequencies will approach the desired value of this frequency. (This method may hereinafter by referred to as the "weld pool mass control method" of the invention).

This invention also provides an apparatus for use in measuring the frequency of oscillation of the weld pool in an arc welding process in which an electrical current forms an arc from an electrode to the weld pool. This apparatus comprises means for inducing oscillations in the weld pool including means for applying a force to and removing this force from the weld pool, so that the weld pool continues to oscillate at substantially its natural frequency following the removal of the force, and means for measuring the frequency of oscillation of the pool after the force has been removed. This apparatus also comprises means for adjusting the electrical current of the arc in response to the difference between the measured frequency of oscillation and a desired value of this frequency. (This apparatus may hereinafter be referred to as the "weld pool mass/frequency measuring apparatus" of the invention.)

This invention also provides a method of locating a weld line in which a beam of light is directed onto a welding electrode disposed adjacent the weld joint preparation. The beam is reflected from the electrode onto the weld joint preparation so as to form on the weld joint preparation an illuminated area traversing the weld line and having an irregularity when the illuminated area crosses the weld line. Location of the weld line there only involves determining the location of this irregularity. (This method of the invention may hereinafter for convenience be referred to as the "reflected beam method" of the invention.)

This invention also provides apparatus for detecting a weld line comprising an electrode having an axis, a tip and a sidewall, at least a portion of the sidewall being capable of reflecting light. The apparatus also includes a beam producing means for directing a beam of light onto the reflective portion of the side wall, this beam being directed at an acute angle to the axis of the electrode and toward the tip of the electrode so that the beam will be reflected from the sidewall and form an illuminated area on the surface of a workpiece lying adjacent the tip in a plane perpendicular to the axis.

(This apparatus may hereinafter be referred to as the "reflected beam apparatus" of the invention.)

This invention also provides a method for locating a weld line in which a welding electrode is disposed adjacent a weld joint preparation and an electrical arc is established between the electrode and the weld joint preparation. The electrical arc is not sufficient to form a molten pool on the weld joint preparation, but is sufficient to generate light which is reflected from the weld joint preparation. The light thus reflected displays an irregularity at the weld line. Part of the reflected light is received by a photodetector and the light thus received is analyzed to detect the irregularity, and thus the weld line. (This method may hereinafter be referred to as the "low power arc method" of the invention.)

This invention also provides apparatus for detecting a weld line, this apparatus comprising a welding electrode and a power supply for supplying electrical power to the electrode for maintaining an electric arc between the electrode and a weld joint preparation disposed adjacent thereto, this electrical arc not forming a molten pool on the weld joint preparation but emitting light. The apparatus also comprises a photodetector for receiving light emitted from the arc and reflected from the weld joint preparation and an analyzer for analyzing the light received by the photodetector and for detecting an irregularity in the light indicative of a weld line on the weld joint preparation. (This apparatus may hereinafter be referred to as the "low power arc apparatus" of the invention.)

This invention also provides a method for locating a weld line in which a pool of molten material is formed on a weld joint preparation, this pool traversing the weld line of the weld joint preparation. A leading portion of the pool (i.e. a portion of the pool lying adjacent a part of the weld line over which the welding apparatus has still to pass) is allowed to flow between the two metal portions comprising the weld joint preparation along the weld line, and this flow causes a concave distortion in the surface of the leading portion of the pool where this leading portion traverses the weld line. Light reflected from the leading portion of the pool is detected and analyzed to detect the concave distortion and hence the weld line. (This method may hereinafter be referred to as the "flowing pool method" of the invention.)

Finally, this invention provides apparatus for locating a weld line including means for forming a pool of molten material on the weld joint preparation, this pool traversing the weld line, a photodetector for detecting light reflected from a leading portion of the pool and an analyzer for analyzing the light detected by the photodetector so as to detect a concave distortion present in the leading portion of the pool where it crosses the weld line. (This apparatus may hereinafter be referred to as the "flowing pool apparatus" of the invention.)

BRIEF DESCRIPTION OF THE DRAWINGS

FIGS. 11 and 12 are circuit diagrams of the memory board shown in FIG. 5;

FIGS. 14A and 14B are timing diagrams showing the temporal correlation between various signals generated in the circuits shown in FIGS. 5-13;

FIG. 17B is a flow chart of the subroutine SLOPE shown in FIG. 17;

FIG. 17C is a flow chart of the subroutine SLP shown in FIG. 17B;

FIG. 17D is a flow chart of the subroutine EVALP shown in FIG. 17B;

FIG. 17E is a flow chart of the subroutine SMOOTH shown in in FIG. 17;

FIG. 17F is a flow chart of the subroutine SMTH shown in FIG. 17E;

FIG. 33E is a flow chart of the subroutine PULSE shown in FIG. 33C;

FIG. 33F is a flow chart of the subroutine ATOD called by the subroutine PUSLSE shown in FIG. 33C;

FIG. 33H is a flow chart of the subroutine AVERG used in the subroutine COMPUT shown in FIG. 33K;

FIG. 33I is a flow chart of the subroutine AVC called by the subroutine PULSE shown in FIG. 33E;

FIG. 34 is a flow chart showing the program used to carry out the logic shown in FIG. 29;

FIG. 38 is a graph showing a line through the irregularity in the illuminated area shown in FIG. 36, together with the light intensity along this line and the first and second derivatives of this intensity;

FIG. 39 is a flow chart of the main computer program used in the process control computer shown in FIG. 4 to control the operation of the reflected beam apparatus shown in FIG. 35 or 37;

FIG. 41 is a flow chart of the subroutine LNGRES shown in FIG. 39;

FIG. 42 is a flow chart of the subroutine CONTROL shown in FIG. 39;

FIGS. 45–51 are circuit diagrams of a second video-computer interface which can be used in place of the video-computer interface shown in FIGS. 4–13B.

DETAILED DESCRIPTION OF THE INVENTION

From the Summary of the Invention above, it will be apparent that all the methods and apparatus of the invention rely upon detection of light from the weld joint preparation, and/or weld pool. The term "light" is used herein to mean electromagnetic radiation of a wavelength which can be handled by optical devices such as lenses and cameras, and thus includes not only the spectrum visible to the human eye but also portions of the infrared and ultraviolet regions. However, the term does not include electromagnetic radiation, such as gamma rays, which cannot be handled by conventional optical devices. Terms such as "photodetector" used herein are to be construed accordingly.

The metal portions forming the weld joint preparation and lying on either side of the weld line in the instant methods may be portions of two separate pieces of metal, or they may be two portions of the same piece of metal which is desired to weld together. For example, the two metal portions might be opposite edges of a single sheet of metal which has to be welded together in order to form the sheet into a cylindrical or other prismatic housing. Also, in stating that two metal portions are present in the instant methods, I do not exclude the possibility that the two portions may already have been "tack" welded together in order to hold them in the correct relative positions for further welding.

The term "non-directional weld line tracking system" is used herein to denote a weld line tracking system which can accommodate changes in the direction of a weld line without requiring that a weld line sensor be rotated around a welding torch. The term does not necessarily imply that the system can accommodate a 360° rotation of the weld line, but does imply that substantial angular movement of the weld line from its original position can be accommodated without requiring the aforementioned rotation.

In all the methods and apparatus of the invention, when it is necessary to detect light from the weld joint preparation and/or weld pool, it is advantageous to view the weld joint preparation and weld pool, if possible, in a direction parallel to the axis of the welding electrode being used. (It should be noted that the reflected beam and low-power arc methods of the invention are inherently restricted to electric arc welding apparatus. However, the other methods of the invention are in principle applicable to any type of welding which involves a molten pool, not necessarily electric arc welding, but are primarily intended for use in electric arc welding.) By using light traveling substantially parallel to, but spaced from, the axis of the electrode, an image of the weld joint preparation and weld pool can be obtained in which the very bright arc is hidden by the electrode, which makes it easier to analyze the image seen.

AXIAL VIEWING SYSTEM

Optical Apparatus

Figure 1:
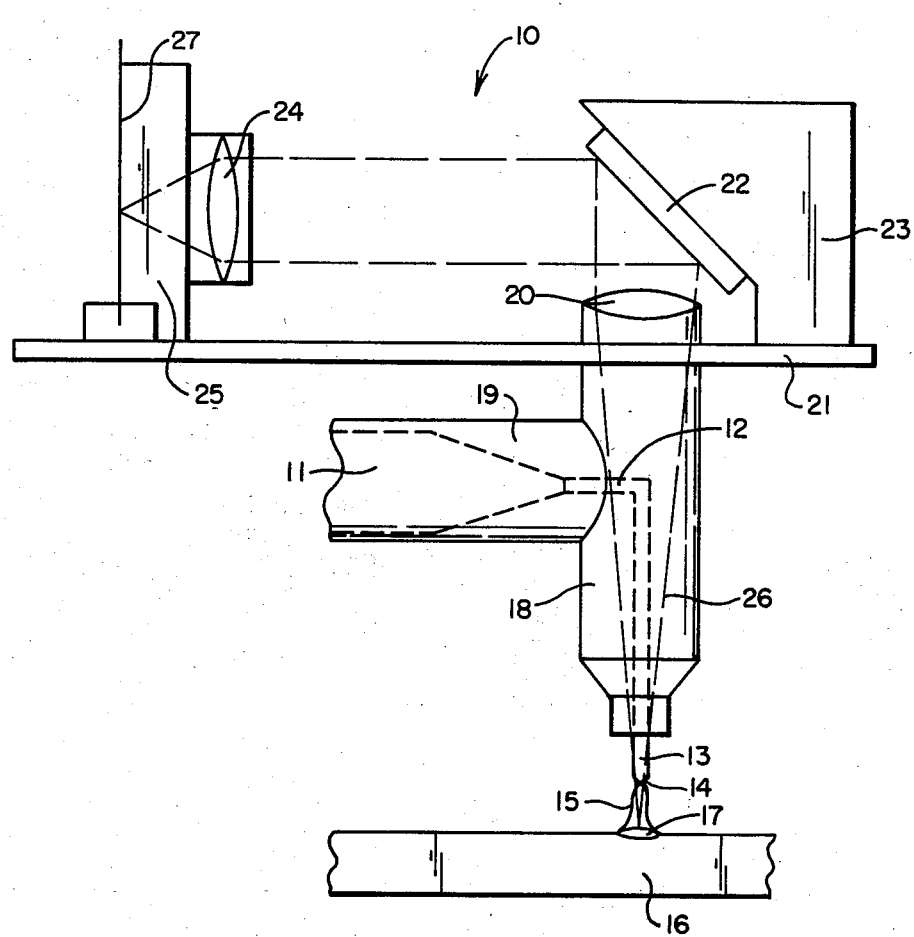
FIG. 1 is a schematic side elevation of a first axial viewing apparatus of the invention.

FIG. 1 is a schematic side elevation of a first axial viewing apparatus 10, which has the form of a gas tungsten arc welding (GTAW) welding torch. The apparatus 10 comprises an electrode holder 11 which supports a non-consumable tungsten electrode. This tungsten electrode has two sections at right angles to one another, namely a horizontal section 12 adjacent the electrode holder 10 and a vertical section 13 which depends vertically downwardly from the end of the horizontal section 12. FIG. 1 shows the apparatus 10 in use; from the tip 14 at the lower end of the vertical section 13 of the electrode, an electric arc 15 extends to a weld joint preparation 16. This arc generates a molten weld pool 17 which is viewed in a direction axially of the vertical section 13 of the electrode by the axial viewing method of the invention, as described below.

In order to permit inert gas purging of the weld torch so that argon or another inert purge gas can be maintained around the weld pool 17 (those skilled in the art will be aware of the advantages of such inert gas purging), a shielding gas retention tube 18 is provided surrounding the vertical section 13 of the electrode. The gas retention tube 18 has three sections, namely a narrow cylindrical section adjacent the tip 14 of the electrode, a frusto-conical section above the narrow cylindrical section, and an upper, wider cylindrical section which forms the main part of the gas retention tube 18. All three sections of the gas retention tube 18 are coaxial with the axis of the vertical section 13 of the electrode. In order to accommodate the horizontal section 12 of the electrode and the electrode holder 11, the gas retention tube 18 is provided with a side branch tube 19 coaxial with the axis of the horizontal section 12 of the electrode. The interior of the branch tube 19 communicates with the interior of the upper cylindrical section of the tube 18 via an aperture cut through the wall of this upper cylindrical section.

The upper end of the tube 18 is closed by a convex lens 20. The tube 18 extends upwardly through a support member 21 so that the lens 20 lies above the support member 21. A mirror 22 is mounted on the support member 21 by means of a mirror mount 23 so that the mirror 22 lies directly above the lens 20 and at an angle of 45° to the horizontal. At a point of the support member 21 spaced from the lens 20, a second convex lens 24 is mounted on the support member 21 by means of a lens mount 25.

During welding, light from the weld pool 17 passes upwardly through the hollow interior of the tube 18 to form a beam 26. The beam 26 is collimated by the lens 20 to form a vertical, parallel beam. This vertical beam is then reflected from the mirror 22 to form a horizontal beam which is focused by the lens 24 so as to form an image of the weld pool (and, in practice, the surrounding area) in an image plane 27. As those skilled in the art are aware, during electric arc welding high intensity light is generated by the electric arc, which is confined to the area between the tip of the electrode and the weld pool. Accordingly, in the apparatus shown in FIG. 1, the image produced in the image plane 27 does not include an image of the electric arc itself, since the tip 14 of the electrode blocks direct light from the electric arc from entering the beam 26. Thus, by viewing the weld pool using the beam 26, which comprises light traveling substantially parallel to, but spaced from, the axis of the vertical section 13 of the electrode, one can obtain an image of the weld pool without seeing the very intense direct light from the electric arc itself. The only light used to form the image in the image plane 27 is light from the electric arc reflected from the mirror-like surface of the weld pool, from the surrounding metal which has not melted, and from the resolidified area immediately behind and adjacent to the path of the welding torch. The light reflected from the unmelted metal and the resolidified weld metal is more diffuse than the bright reflection from the mirror-like surface of the weld pool.

Those skilled in the field of optics will appreciate that if desired the lens 20 could be eliminated and an image of the weld pool and surrounding areas formed solely by the lens 24. However, it is preferred that the lens 20 be included to collimate the light in the beam 26, since such collimation produces an image in the plane 27 which is both sharp and insensitive to the length of the optical path between the lens 20 and the lens 24 i.e. with the lens 20 in position, the lens 24 can be moved relative to the mirror 22 without altering the magnification of the image and without any need for refocusing. This ability to obtain constant magnification regardless of the precise location of the lens 24 is important since one of the uses made of this direct and undistorted view of the weld pool produced by the apparatus 10 is the measurement of weld pool width.

In the apparatus 10, the lens 24 is preferably a telephoto lens focused at infinity. Although the image produced in the image plane 27 can be viewed directly by eye (the use of safety glass to protect the eye from ultraviolet light present in the beam 26 is highly desirable), the apparatus 10 is primarily intended to be used with the image in the plane 27 being observed by a camera. This may be a film camera, but is preferably a television camera, preferably a solid state television camera.

Figure 2:
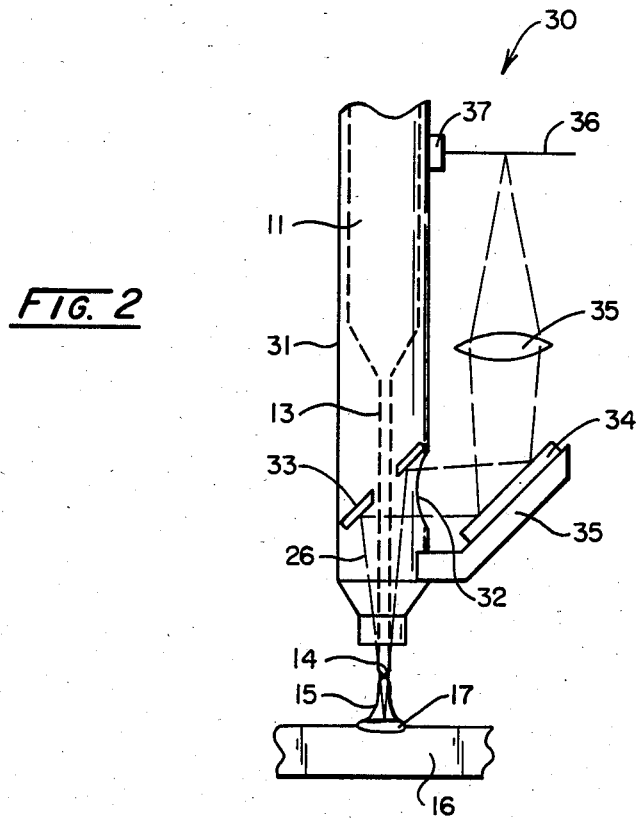
FIG. 2 is a schematic side elevation of a second axial viewing apparatus of the invention.

The second axial viewing apparatus of the invention (generally designated 30) shown in FIG. 2 has a non-consumable electrode and may be used, for example, in gas metal arc welding (GMAW). The apparatus 30 shown in FIG. 2 differs from the apparatus 10 shown in FIG. 1 in that the electrode holder 11 of the apparatus 30 has its axis vertical and in that the electrode 13 of the apparatus 30 is linear, extending vertically downwardly from the electrode holder 11 to the tip 14 of the electrode. The electrode 13 is surrounding by a shielding gas retention tube 31; because the electrode 13 is linear, this shielding gas retention tube, unlike the corresponding tube 18 shown in FIG. 1, needs no side branch. The tube 31 has substantially the same form as the tube 18 shown in FIG. 1, having a lowermost narrow cylindrical section adjacent the tip 14 of the electrode 13, a frusto-conical central section and an upper, wider cylindrical section which accommodates the upper part of electrode 13 and the electrode holder 11. An aperture 32 is formed in the wall of the upper cylindrical section of the tube 31 and a mirror 33 is disposed within the tube 31 adjacent this aperture 32, the mirror 33 being positioned at 45° to the horizontal. A central aperture in the mirror 33 allows the electrode 13 to pass therethrough. The mirror 34 is mounted on the upper cylindrical portion of the tube 31 by means of a mirror mount 35 so that the mirror 34 lies outside the tube 31 adjacent the aperture 32 and at 45° to the horizontal. A convex lens 35 is disposed in a horizontal plane above the mirror 34; the method of mounting this lens 35 is not shown in FIG. 2, but obviously if desired the lens may be mounted by means of a suitable lens mount directly on the tube 31.

When the apparatus shown in FIG. 2 is in operation, it operates in substantially the same manner as the apparatus shown in FIG. 1, with an electric arc 15 extending from the tip 14 of the electrode 13 to a weld pool 17 disposed on the upper surface of a weld joint preparation 16 lying beneath the electrode 13. As in the apparatus shown in FIG. 1, light reflected from the weld pool 17 and traveling substantially parallel to the axis of the electrode 13 passes upwardly along the interior of the tube 31 as a beam 26. However, in the apparatus shown in FIG. 2, this beam 26 is deflected by the mirror 33 and passes horizontally through the aperture 32. After passing through the aperture 32, the beam strikes the mirror 34, which deflects it into a vertical path so that it passes through the lens 35 and is brought to a focus in an image plane 36. For the reasons previously described with reference to FIG. 1, the image formed in the image plane 36 does not include an image of the electric arc itself, since the arc is obscured by the tip 14 of the electrode 13.

It should be noted that the apparatus 30 shown in FIG. 2 does not include any collimating lens equivalent to the lens 20 shown in FIG. 1 and therefore it is important that the length of the optical path from the weld pool 17 to the image plane 36 be precisely controlled in order that the magnification of the optical system will be known. It is intended that the apparatus 30 shown in FIG. 2 be used with a television camera or other camera or viewing device mounted on the tube 31 by means of a camera mount 37 so as to receive the image produced in the image plane 36. Obviously, a camera thus mounted directly upon the tube 31 will follow all movements of the welding torch.

Figure 3:
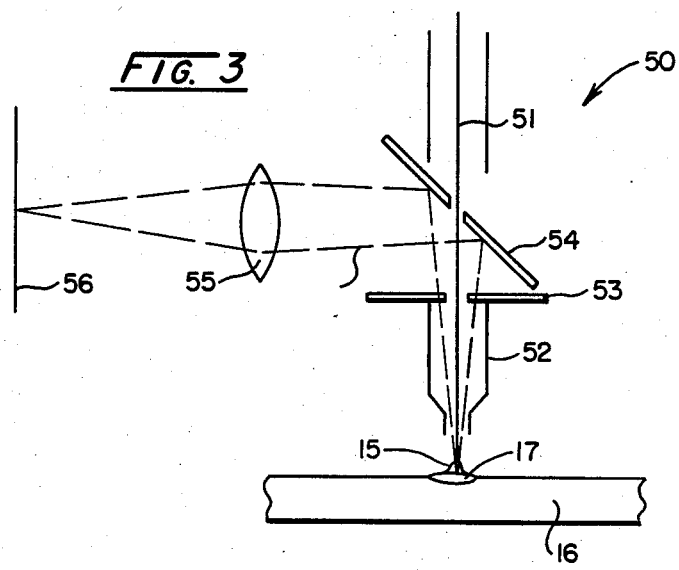
FIG. 3 is a schematic side elevation of a third axial viewing apparatus of the invention.

The third axial viewing apparatus of the invention, generally designated 50 and shown in a highly schematic matter in FIG. 3, may be used, for example, in a GMAW process and uses a consumable electrode in the form of a metal filler wire 51. As in the apparatus shown in FIGS. 1 and 2, an arc 15 is struck between the lower end of this wire 51 and produces a weld pool 17 on a weld joint preparation 16 disposed below the tip of the wire 51. Also, since the apparatus shown in FIG. 3 is again intended to be used with an inert purge gas, the lower part of the wire 51 is surrounded by a gas retention tube 52. The gas retention tube has a form similar to the corresponding tube 31 shown in FIG. 2 except that it lacks the aperture in the side wall. Instead, the upper end of the tube 52 is provided with a plexiglass cover 53 which has a small central aperture to allow the passage of the wire 51 therethrough. This cover 53 serves to limit leakage of inert purge gas from the top of the tube 52 and also provides a transparent window at the upper end of the tube 52. A mirror 54 is disposed above the cover 53 at an angle of 45° to a horizontal and a convex lens 55 is disclosed in a vertical plane some distance from the lens 54.

As in the two axial viewing apparatus previously described, light reflected from the weld pool 17 traveling substantially parallel to but spaced from the wire 51 passes upwardly along the tube 52 as a beam 26. This beam passes through the transparent cover 53 and the aperture therein, and is reflected by the mirror 54 to form a horizontal beam which passes through the lens 55 and is thus focused to form an image in an image plane 56. As in the apparatus 30 shown in FIG. 2, the apparatus shown in FIG. 3 does not possess any collimating lens corresponding to the lens 20 in FIG. 1 and thus the optical path from the weld pool 17 to the image plane 56 must be held constant. Although for the reasons already explained, the absence of a collimating lens does have disadvantages, the apparatus 50 is designed so that it is not necessary to drill a hole through any lens. Those skilled in the art will appreciate that if desired the apparatus shown in FIGS. 1–3 could be modified by including a lens within the gas retention tube 18, 31 or 52, this lens having an appropriate central aperture to allow the electrode to pass therethrough. Use of such apertured lenses would avoid the use of mirrors to deflect the beam of light used to form the image out of the path of the electrode and thus the use of mirrors to avoid such drilling of apertures through lenses is simply a matter of choice. Also, when, as in the apparatus shown in FIGS. 2 and 3, no collimating lens is present, adjustment of magnification can be effected during initial set-up of the system and, provided all parts of the system remain in the same relative locations, this magnification will not change.

As already mentioned, viewing the weld pool parallel to the axis of the electrode in accordance with the axial viewing method of the invention has the advantage that the very bright electric arc is obscured by the tip of the electrode so that the weld pool can be viewed without being obscured by this arc. In addition, this method enables the entire weld pool to be viewed without obstruction from any retaining apparatus used to support the electrode. Any support structures for the electrode which are located within the path of the light beam used to form the image will be located a substantial distance from the weld pool and will thus be out of focus and not capable of blocking the view of the pool. Moreover, in the apparatus shown in FIGS. 1–3 the viewing lenses are protected by the gas retention tube and by the purge gas itself from damage by the arc and any weld spattering that may occur, while the viewing system does not intrude into the vital space immediately around the tip of the electrode and the weld pool and thus does not limit access to this area where space is limited.

It will be apparent to those skilled in the art that if desired the axial viewing apparatus of the invention may be used with optical fiber methods to transmit the image to a remote location. Also, the axial viewing method of the invention may be used with welding processes that do not use any inert purge gas or gas retention tube.

Figure 4:
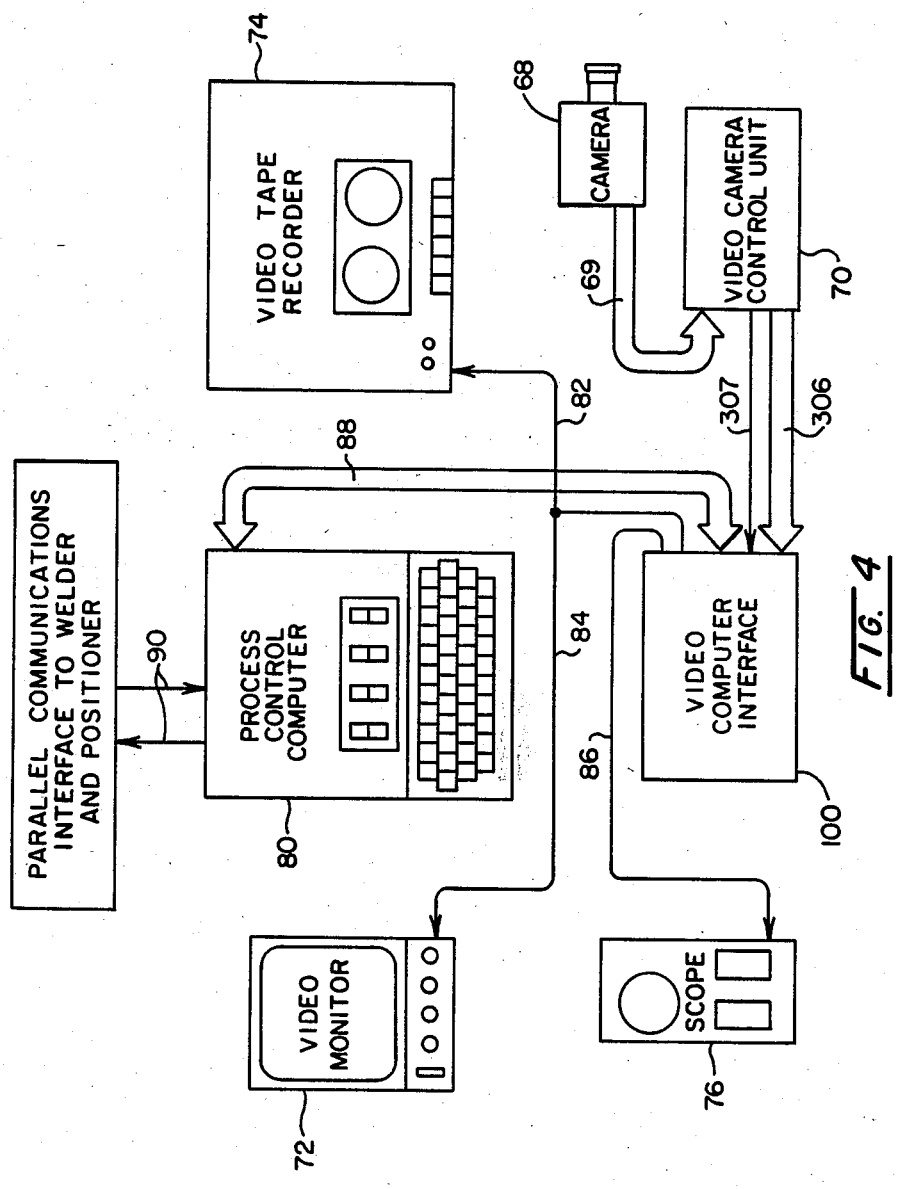
FIG. 4 is a block diagram of the photodetector and analyzer apparatus (including a first video-computer interface) which can be used in conjunction with the optical viewing apparatus shown in any of FIGS. 1-3 to carry out various methods of the invention.

FIG. 4 is a block diagram of the photodetector and analyzer apparatus which can be used in conjunction with any of the apparatus shown in FIGS. 1-3. The apparatus shown in FIG. 4 comprises a video (television) camera 68 which receives the image formed in the image plane 27, 36 or 56 in FIG. 1, 2 or 3 respectively. Although the camera 68 may be of any convenient type, it is preferably a General Electric TN2500 video camera. Modern solid state cameras, such as the General Electric TN2500, have a light sensitive surface formed from a matrix of discrete light sensitive elements or pixels. The spatial resolution of such cameras is determined by the number and distrubution of the pixels, which varies widely from camera to camera; a camera having a 32×32 matrix will give very coarse picture resolution, while the 244 vertical×248 horizontal array used in the General Electric TN2500 is typical of the finer resolution of state of the art cameras. Although the TN 2500 camera is capable of operating in several different modes, the circuitry and software described below are designed for use only with the camera in the 30 Hz, 244 line sequential mode.

As is well known to those skilled in the art, video cameras generate analog voltage signal representative of the image seen by the camera. At the beginning of each frame of this analog signal occurs a frame synchronization pulse normally referred to as the vertical synchronization signal (VSYNC). Similarly, at the beginning of each line the analog signal contains a synchronization pulse called the horizontal synchronization signal (SBLNK). The analog signal from the video camera represents the image seen by scanning lines successively in a raster pattern. The position of any line in this pattern may be determined from the time elapsed since the preceding vertical synchronization signal, while the horizontal position of any part of the signal can be determined from the time since the preceding horizontal synchronization signal.

The camera 68 transmits an analog signal representative of the image seen to a video camera control unit 70. This unit 70 is of a type which will be familiar to those skilled in the art and contains an analog/digital converter to generate digital signals representative of the analog signals, together with counters to generate line numbers from the synchronization pulses and digital signals representative of the position in the image represented by each digital video signal. Thus, the unit 70 generates digitized video signals accompanied by corresponding address locations related to the position on the screen of the pixel producing the corresponding digitized video signal. It should be noted, that if a conventional videocon or orthocon type of camera is used as the camera 68, the spatial resolution of the digital signal produced by the control unit 70 is determined by the rate at which the control unit 70 digitizes the analog video signal from the camera 68, whereas with the discrete pixel type of cameras, such as the preferred General Electric TN2500, the control unit 70 should be arranged so that a digital signal corresponding to each separate pixel of the camera is obtained. The control unit 70 sends digital and analog signals along buses 306 and 307 to a video-computer interface 100. This interface 100 is connected to a process control computer 80 by a two-way bus 88. The interface is also connected via a video line 86 (actually a pair of lines are used, as discussed in more detail below with reference to FIG. 5) to a double-trace oscilloscope 76, via a video line 82 to a video tape recorder 74 and via a video line 84 to a video monitor 72. The video monitor allows an observer to observe the image seen by the camera 68, while the video tape recorder 74 allows the image to be recorded for later analysis.

The process control computer is in two-way communication, via a pair of lines 90, with a parallel communications interface which controls the operation and positioning of the welding apparatus, and will be described in more detail below.

One major problem in handling the digital video data from the control unit 70 is the very high rate at which such data is generated. We have found that for accurate analysis it is necessary to use an eight-bit gray tone scale. Using such an eight-bit scale with a 244×248 array requires that over half a million data bits be handled for each frame of picture. The preferred TN2500 camera generates about 30 million data bits (approximately 4 million bytes) per second. To analyze such a stream of data continuously presents very great difficulties. Accordingly, to reduce the rate at which data must be analyzed, the video-computer interface 100 is arranged so that only certain parts of certain frames of the video signal from the control unit 70 are retained for analysis. For this purpose, the video-computer interface 100 contains a buffer memory which can temporarily store video data from the control unit 70 in order that such stored data can later be analyzed by the computer 80, thereby enabling the computer to effect this analysis asynchronously of the signal from the control unit 70. In addition, the buffer memory used only records the data from about 1/16 of the total pixels in any selected frame, but the video-computer interface is programmable so as to allow an operator to select a specific "window" in the image which is to be retained by the buffer memory, and also allows skipping of rows and columns of pixels within this window.

It should be noted that, in contrast to some prior art systems, which reduce the amount of data to be analyzed by converting the video signal to a binary image with white being assigned to brighness greater than a threshhold level and black being assigned to brightness lower than the threshhold level, the apparatus shown in FIG. 4 does allow for the handling of the video data on an eight-bit gray tone scale, thus allowing much more sophisticated analysis.

FIRST VIDEO-COMPUTER INTERFACE

Figure 5:
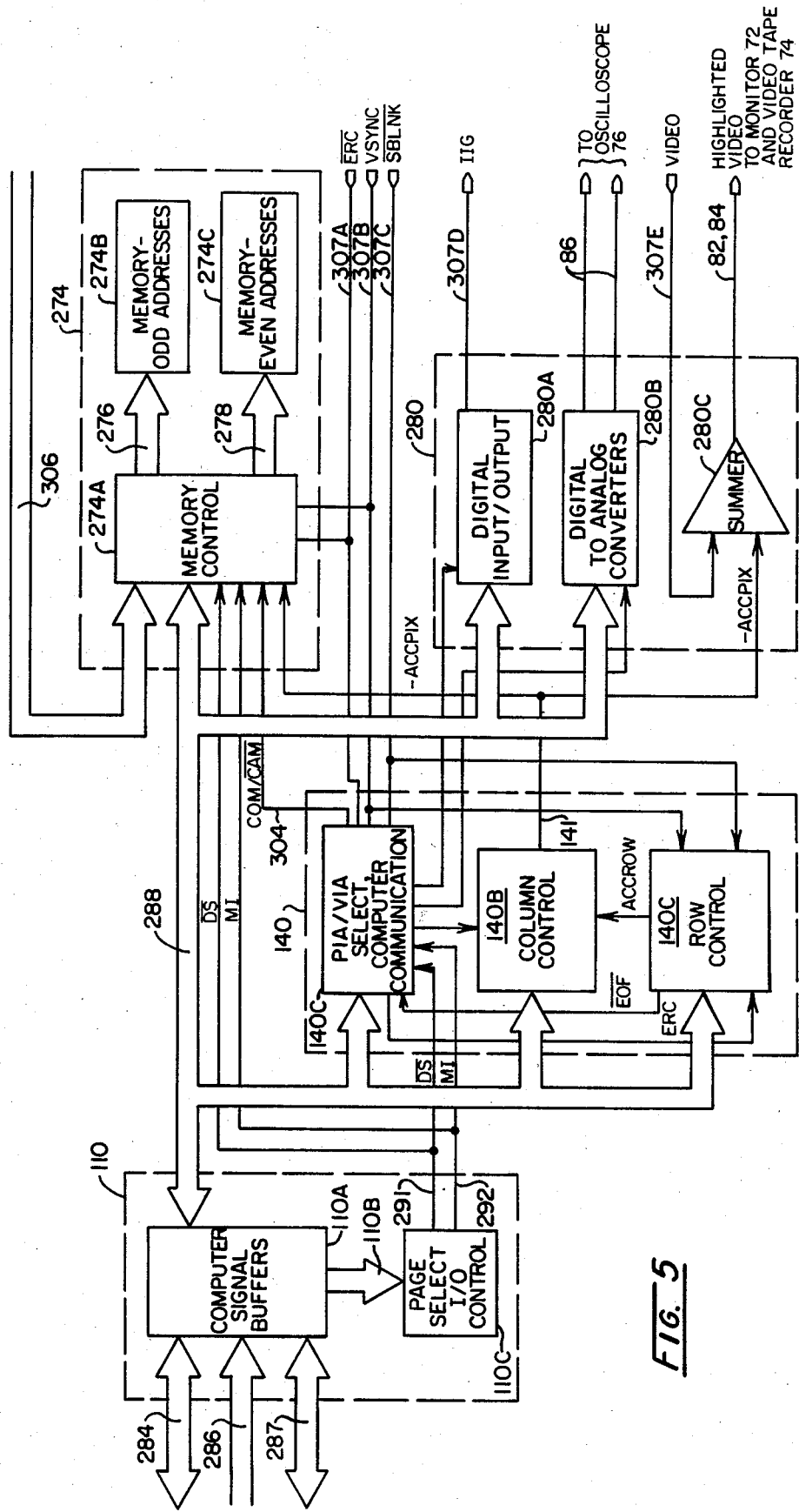
FIG. 5 is a block diagram showing the main components of the first video-computer interface shown in FIG. 4.

FIG. 5 shows the main components of the video-computer interface 100 shown in FIG. 4. The video-computer interface 100 comprises four separate boards, namely a buffer board 110, a controller board 140, an analog board 280 and a memory board 274; these boards are indicated by the broken boundaries in FIG. 5.

The buffer board 110 serves to interconnect the remaining three boards and also handles communication with the computer 80 (FIG. 4). (The presence of the computer 80 is not strictly necessary since the various inputs from this computer to the video-computer interface 100 could be manually generated or input. However, the use of the computer not only enables automatic analysis of the video data to be achieved but also allows more convenient changes in the parts of the video data to be retained in the buffer memory.)

As shown in FIG. 5, the buffer board 110 comprises a COMPUTER SIGNAL BUFFERS section 110A and a BLOCK SELECT INPUT/OUTPUT CONTROL section 110C linked by an internal bus 110B. The section 110A is connected to the computer 80 (FIG. 4) by a computer data bus 284, a computer address bus 286 and a further bus 287 which carries various miscellaneous signals between the buffer board and the computer 80. These three buses 284, 26 and 287 together comprise bus 88 shown in FIG. 4. The section 110A is linked to all the other three boards by a two-way bus 288 and is also, as already mentioned, linked to the section 110C via the internal bus 110B. The section 110C generates a device select signal, $\overline{DS}$ on a line 291, and a memory inhibit signal, MI on a line 292, both these signals being sent from the section 110C to both the controller board 140 and the memory board 274. The section 110C of the buffer board 110 also generates various other signals used by the other boards, as explained in more detail below, but these additional signals have been omitted from FIG. 5 for the sake of clarity.

The controller board comprises a PIA/VIA SELECT COMPUTER COMMUNICATION section 140A, a column control section 140B and a row control section 140C. All three sections of the controller board 140 are interconnected by internal connections which willl be discussed in more detail below. All three sections receive signals from the bus 288. The section 140A receives an element rate clock signal $\overline{ERC}$ from the video camera via a line 307A, which is one of the lines in the bus 307 shown in FIG. 4. Section 140A inverts this signal to produce a corresponding inverted signal ERC, which is then passed to the row control section 140C. Both the section 140A and the row control section 140C receive the vertical synchronization signal VSYNC from a line 307B, which is also part of the bus 307 shown in FIG. 4. Furthermore, both the section 140A and the row control section 140C receive the inverse horizontal synchronization signal $\overline{SBLNK}$ on a line 307C, a further line of the bus 307 shown in FIG. 4. The section 140A generates, inter alia, a computer/camera control signal COM/$\overline{CAM}$, which is placed on a line 304 in order to pass this signal to the memory board 274.

The row control section 140C generates an End-Of-Frame signal, EOF, which is passed to the section 140A, and an "accept row" signal ACCROW, which is passed to the column control section 140B. The column control section 140B receives the signal ACCROW from the row control section 140C and other signals (described in more detail below) from the section 140A, and outputs, on a line 141, an "accept pixel" signal, ACCPIX, which indicates that the pixel from which video data is being received on the bus 306 from the camera 68 via the video camera control unit 70 (FIG. 4) is one of the pixels selected by the operator for the retention of video data. The ACCPIX signal on line 141 is sent to both the memory board 274 and the analog board 280.

The memory board 274 comprises a memory control section 274A linked to a memory-odd addresses section 274B hereinafter sometimes for convenience abbreviated odd memory section 274B) and to a memory-even addresses section 274C via busses 276 and 278 respectively. The memory control section 274A receives digital video data from the bus 306, address and other data on the bus 288, the $\overline{DS}$ and MI signals from section 110C of the buffer board 110 via lines 291 and 292 respectively, the COM/$\overline{CAM}$ signal on line 304 from the section 140A of the controller board 140, the ACCPIX signal on line 141 and signals $\overline{ERC}$ and VYSNC from lines 307A and 307B. The memory control section 274A arranges for a pre-selected portion of the digital video data arriving on the bus 306 to be stored in the memory sections 274B and 274C; the use of two memory sections is necessary because the memories used are not sufficiently quick to store video data at the rate it is received on the bus 306 and thus the memory board 274 makes use of the special data handling techniques of the invention.

Finally, the analog board 280 comprises a digital input/output section 280A, a pair of digital-to-analog converters 280B and a summer section 280C. The section 280A receives signals from the bus 288 and from the section 140A. Its output comprises a signal $\overline{IIG}$ on a line 307D, which forms part of the bus 307 (FIG. 4). The $\overline{IIG}$ signal is an inject inhibit signal sent from the analog board to the camera 68 via the control unit 70 (FIG. 4) which causes integration of the image intensity by the camera over more than one frame, thereby producing a more intense image. Thus, the $\overline{IIG}$ signal is used to control the intensity of the image which is transmitted from the camera to the video-computer interface.

The digital-to-analog converters 280B receive signals from the bus 288 and from the section 140A and output, on the two lines 86 leading to the oscilloscope 76 (FIG. 4) analog signals representative of various data stored in the video-computer interface. The lines 86 carry signals to the twin inputs of the oscilloscope 76, which is of the double-trace type.

The summer section 280C of the analog board 280 receives an analog video signal along line 307E, which is a further line of the bus 307 (FIG. 4). The summer section also receives the ACCPIX signal on line 141 from the column control section 140B of the controller board 140 and outputs, via the lines 84 and 82 to the monitor 72 and the video tape recorder 74 respectively (FIG. 4), a highlighted video signal which indicates to the operator the "window" currently being used i.e. the pixels of the image seen by the camera 68 (FIG. 4) from which the video-computer interface is currently accepting video data.

Before the detailed circuitry of the video-computer interface shown in FIGS. 6-13B is described, it is convenient to summarize the signals which are generated by the video camera 68 (FIG. 4) and used by the video-computer interface 100. Further information concerning these signals and other matters relating to the camera 68 may be obtained from the manufacturer's literature relating to the General Electric TN2500 camera.

The vertical synchronization VSYNC provides a pulse that denotes the start of each frame of video data when the camera is operated in the interlaced mode or each frame in the camera is operated in its sequential mode. The synchronized blanking logic or horizontal synchronization signal, $\overline{SBLNK}$ indicates the start of each line of video data. A high level of this signal indicates the presence of digital video data, while a low level indicates the presence of a horizontal or vertical blanking signal, during which no digital video data is presented. $\overline{ERC}$ is an element rate clock signal, of frequency 4.5045 MHz, which undergoes one complete cycle for each pixel of video data transmitted by the camera.

The video computer interface shown in FIGS. 5-13B is designed to be used with the camera in the interlacing mode, in which each line of video data is duplicated to enhance picture density. For obvious reasons, it is not desirable to store every line of video data within the window since half of the resultant video data would be redundant. Accordingly, as will be described in more detail below, the controller board 140 is arranged to divide the frequency of the horizontal blanking signal by 2, thereby producing a half-speed horizontal synchronization signal $\overline{SBLNK2}$, which is thereafter used to ensure that only one of each identical pair of lines within the preselected window is stored, the redundant lines simply being discarded.

The circuits of the video-computer interface 100 shown in FIGS. 6-13B make extensive use of large scale integrated circuits, some of which contain several separate circuits. In many cases, the individual circuits on a single chip are used in widely separated parts of the circuitry. Hereinafter for convenience, each integrated circuit will be given a single number, and the separate circuits on the same chip will be indicated by letters following the chip number. Thus, for example, 128A and 128B represent separate circuits located on the same chip but used in two different parts of the circuitry. Also, in FIGS. 7-13B power connections to the various integrated circuits are omitted in most cases since details of the necessary power connections are readily available in the standard literature.

Figure 6:
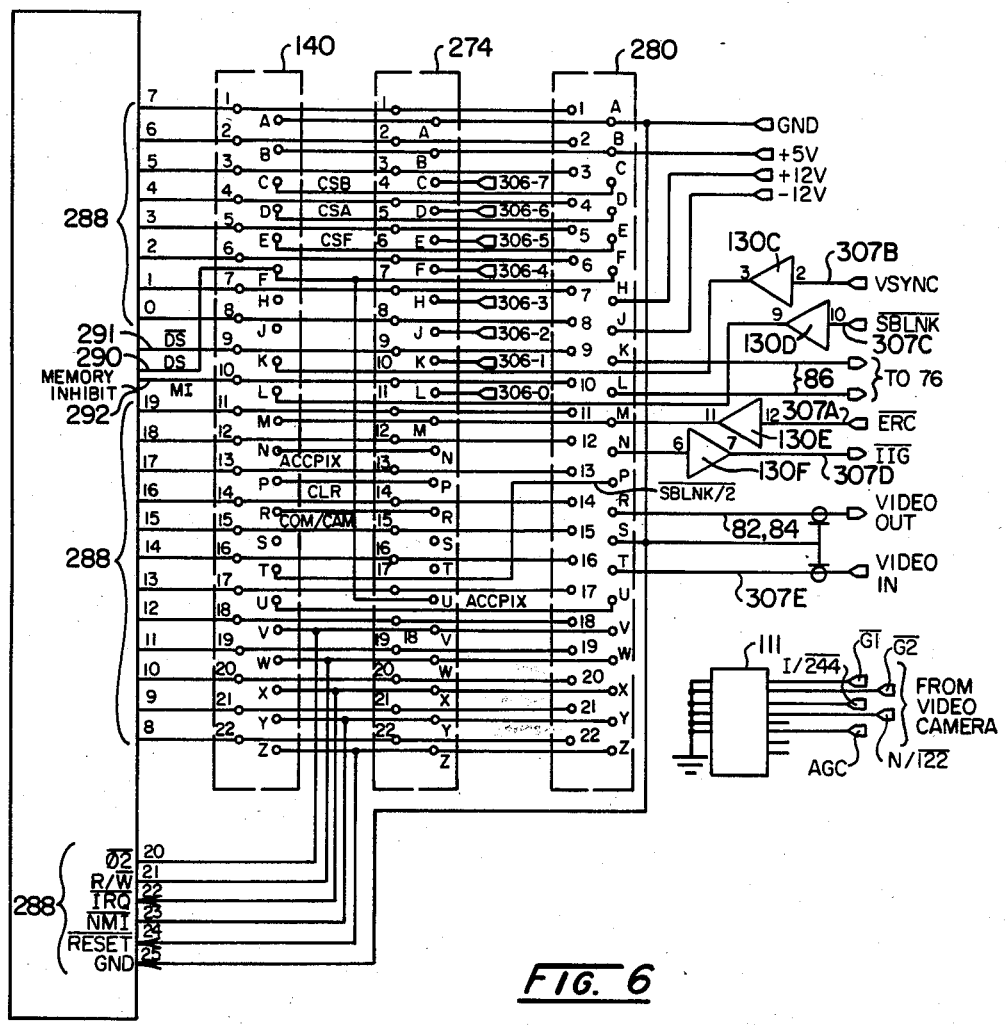
FIG. 6 is a wiring board connector strip diagram showing the connections between the various boards shown in FIG. 5.
Figure 7:
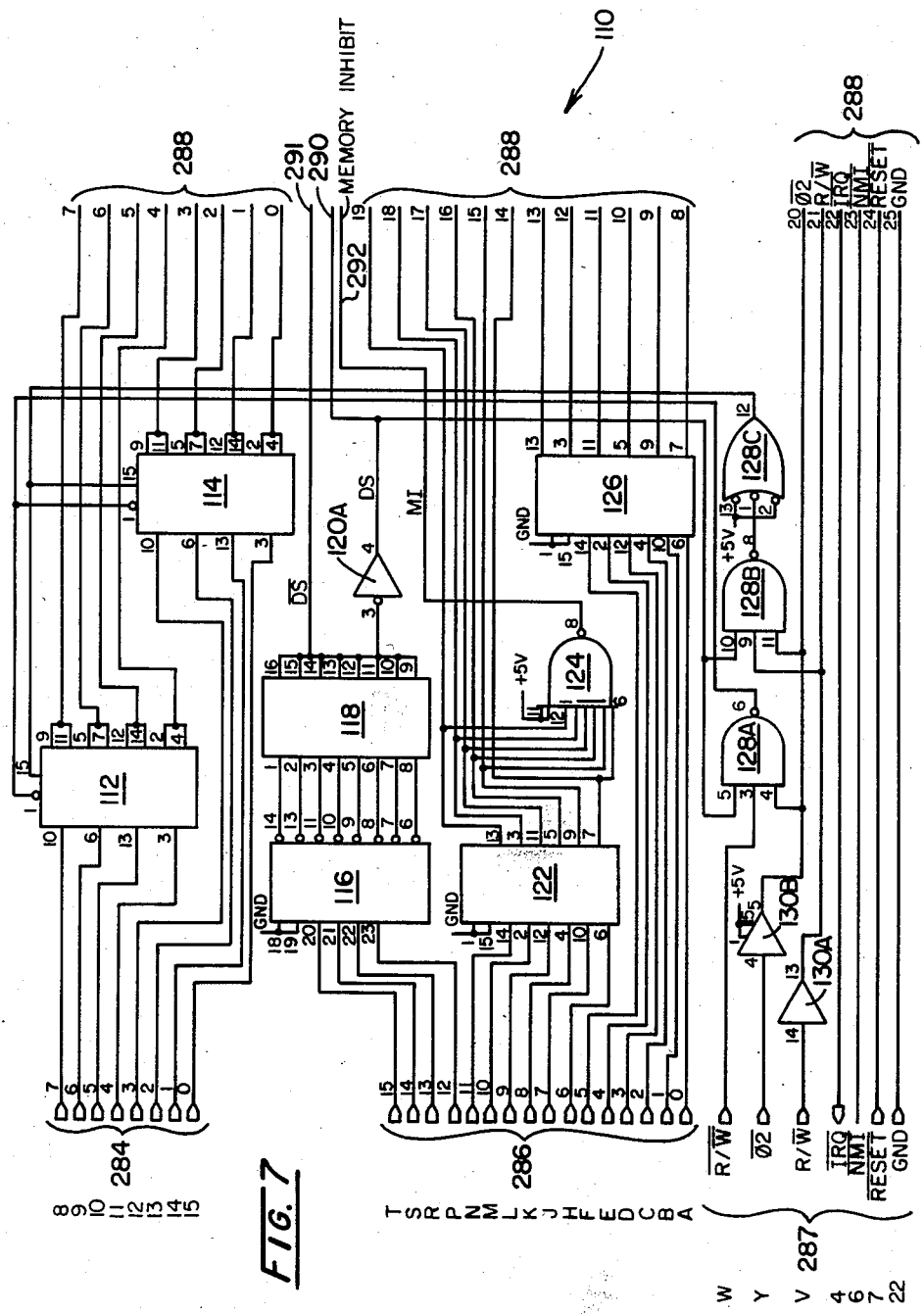
FIG. 7 is a circuit diagram of the buffer board shown in FIG. 5.

FIGS. 6 and 7 show the detailed circuitry of the buffer board 110 (FIG. 5) and the manner in which interconnections among the four boards are established. The easiest way to appreciate the interrelationship of FIGS. 6 and 7 is to place the left-hand edge of FIG. 6 adjacent the right-hand edge of FIG. 7 to illustrate the numerous interconnections between the buffer board and the other three boards. Since several of the signals placed on the connectors shown in FIG. 6 are actually generated by the circuitry shown in FIG. 7, the buffer board circuitry shown in FIG. 7 will be described before the interconnections shown in FIG. 6 are set out in detail.

The left-hand side of FIG. 7 shows the computer data bus 284, the computer address bus 286 and the third bus 287 which all connect the buffer board to the computer 80 (FIG. 4). The letters and numerals on the extreme left-hand side of FIG. 7 represent the lines of the AIM-65 J3 connector which is used to establish all connections between the buffer board and the computer. Further details concerning this connector may be obtained from the manufacturer's literature concerning the AIM-65 computer, and the nomenclature used for the various lines in the standard nomenclature used in the manufacturer's manual.

The first part of the circuitry shown in FIG. 7 to be described will be that used to generate the device select signal DS which has already been referred to above with reference to FIG. 5, and its inverse $\overline{DS}$. As will be explained in more detail below, the video-computer interface shown in FIGS. 5-13B contains 4K of memory, and this memory must be capable of being address by the process control computer. The circuitry used to generate the device select signal selects which 4K block of memory addresses from the computer will be alloted to the 4K memory in the interface. Since each 4K block of memory within the computer is defined by the most significant digit of a four-digit hexadecimal member, only addresses arriving on the computer address bus 286 and having the correct most significant hexadecimal digit should cause operation of the video-computer interface. Accordingly, the buffer board 110 is arranged to generate the device select signal when the most significant hexadecimal digit arriving on the address bus has a preselected value. For convenience, this circuitry is arranged so that the most significant hexadecimal digit which will cause generation of the device signal can be varied.

As shown in FIG. 7, lines 15-12 of address bus 286, which carry the most significant hexadecimal digit of the four-digit hexadecimal number on the address bus 286, are connected to pins 20-23 respectively of an integrated circuit 116, which is a Schottky 4-line to 16-line decoder/demultiplexer of the commercially-available 74LS154 type. Pins 18 and 19 of circuit 116 are grounded, thus permanently enabling this circuit for decoding. As is well known to those skilled in the art, the 74LS154 integrated circuit functions so that when pins 18 and 19 are held low, receipt of a 4-bit number at pins 20-23 will cause one of the 16 outputs (pins 1-11 and 13-17) to go low, the output which goes low being determined by all four incoming bits. In the instant buffer board, only output pins 6-11, 13 and 14 of circuit 116 are used, and these output pins are connected to pins 8-1 respectively of an integrated circuit switching assembly 118, which comprises eight parallel single poles single throw DIP switches. The output pins 9-16 of switch assembly 118 (which correspond to the inputs at pins 8-1 respectively) are jumpered and the jumpered output, which comprises the inverse device select signals $\overline{DS}$, fed to the line 291. The jumpered output from pins 9-16 of 118 is also fed to pin 3 of 120A. Integrated circuit 120 is a hex inverter of the commercially-available 74LS04 type. The inverted output from pin 4 of circuit 120A is the device select signal DS, which is placed on the line 290. (As will be explained below, integrated circuit 120 is physically present on the controller board and part 120A thereof is only shown in FIG. 7 for the sake of ease of explanation. In fact, the $\overline{DS}$ signal from circuit 118 is taken to connector C9 on the controller board as explained below, and fed thence to pin 3 of inverter 120A on the controller board. The inverted output from pin 4 of 120A is fed back to the buffer board via connector CF of the controller board.)

As will be apparent to those skilled in the art, switching assembly 118 is set so that one of the switches is closed and the remaining seven are open. Thus, the jumpered output will be high except when the input connected to the closed switch goes low, which occurs when lines A12-A15 are carrying a preselected hexadecimal digit; since only outputs 6-11, 13 and 14 of 116 are used, this predetermined hexadecimal digit can range from 5 to C. Normally, assembly 118 is set with the switch connecting pins 4 and 13 closed, which sets the preselected hexadecimal digit to 9.

The remaining 12 lines of the computer address bus 286 are handled by two bi-directional buffers 122 and 126, which are each a hex, 3-state buffer of the commercially-available 74LS367 type. Lines 11-6 of computer address bus 286 are fed to pins 14, 2, 12, 4, 10 and 6 respectively of buffer 122, while lines 5-0 of bus 286 are fed to pins 14, 2, 12, 4, 10 and 6 respectively of buffer 126. Pins 1 and 15 of both buffers 122 and 126 are grounded, thus permanently enabling the buffers for transmission of data from the bus 286 to the outputs of the buffers. The outputs at pins 13, 3, 11, 5, 9 and 7 of buffer 122 (which correspond to the inputs of pins 14, 2, 12, 4, 10 and 6 respectively and thus to the signals on lines 11-6 of bus 286) are placed on lines 19-14 respectively of bus 288. Similarly, the output to pins 13, 3, 11, 5, 9 and 7 respectively of buffer 126 (which correspond to the signals on lines 5-0 of bus 286) are placed on lines 13-8 respectively of bus 288.

As already mentioned above with reference to FIG. 5, the buffer board generates a memory inhibit signal, which is used to inhibit writing to the memory when this is necessary. Also as already explained, the video-computer interface contains 4K (4096) addresses, and any one of these addressed can be selected by the appropriate signals on lines 11-0 of computer address bus 286. Sixty-four of these addresses do not address memory directly; instead, these 64 addresses (combinations of signals on lines 11-0 of bus 286) are used to control the operation of the interface. Thus, the memory inhibit signal is generated to inhibit writing of data into the memories (to be described below) when the address designated on lines 11-0 of the address bus 286 is one which does not require writing into memory.

To generate the memory inhibit signal, MI, the outputs from pins 13, 3, 11, 5, 9 and 7 of buffer 122 (which correspond to the signals on lines 11-5 of the address bus 286) are fed to pins 1-6 respectively of integrated circuit 124, which is an 8-input NAND gate of the commercially-available 74LS30 type. The remaining two inputs, pins 11 and 12, of gate 124 are held high, being connected to the +5 V supply line. The output at pin 8 of gate 124 is the memory inhibit signal, MI, and is placed on the aforementioned line 292.

It will be apparent to those skilled in the art that MI will only go low when the signals on lines 11-6 of bus 286 are all high i.e. when the hexadecimal address on bus 286 is from YFC0-YFFF where Y is any hexadecimal digit, since integrated circuits 122 and 124 are enabled regardless of the most significant hexadecimal digit (i.e. regardless of the value of $\overline{DS}$). Accordingly, selection of the actual 64 reserved addresses is achieved using combinations of MI and DS (or $\overline{DS}$), as described in detail below. Note also that these 64 reserved addresses are the highest 64 addresses beginning with the preselected digit i.e. they are the highest 64 addresses in the 4K block assigned to the video-computer interface. As explained below, when the interface acquires video data, this data is stored sequentially in the addresses of the interface in ascending order. Thus, by reserving the highest 64 address one ensures that the sequence of stored video data is not interrupted by the block of reserved addresses, since such interruption could lead to difficulties in reading and analysis of the video data.

As shown in the bottom left-hand part of FIG. 7, bus 287 comprises lines W, Y, V, 4, 6, 7 and 22 of the aforementioned J3 connector. Line 4 carries an interrupt signal, $\overline{IRQ}$, line 6 carries signal $\overline{NMI}$ from the computer, line 7 carries a reset signal, $\overline{RESET}$, and line 22 carries a ground; these four lines simply pass straight through the buffer board and are placed on lines 22-25 respectively of bus 288.

The remaining signals carried by bus 287 are a read/write signal R/$\overline{W}$ on line V, the inverse of this read/write signal on line W and a computer clock signal $\phi 2$ on line Y. The signal R/$\overline{W}$ is fed to pin 14 of an integrated circuit 130A. Integrated circuit 130 is a three-state hex buffer of the commercially-available 74LS367 type provided with the conventional power connections at pins 16 and 8 (not shown) and with pins 1 and 15 connected to the +5 V supply line (as shown on inverter 130B of the integrated circuit described below) so that the six drivers of the integrated circuit are permanently enabled. The output from pin 13 of 130A is placed on line 21 of bus 288. Similarly, the $\overline{\phi 2}$ clock signal is fed to pin 4 of 130B, a further driver of the integrated circuit 130 just mentioned. The corresponding output from pin 5 of 130B is placed on line 20 of bus 288. Hereinafter, when a reference is made to the signals R/$\overline{W}$ and $\overline{\phi 2}$, it should be understood that these are the signals which have passed through the drivers 130A and 130B respectively.

In addition to being placed on lines 20 and 21 of the bus 288, the signals R/$\overline{W}$ and $\overline{\phi 2}$ are also subjected to a gating process in order to control enabling of a pair of buffers (described below) which control the two-way transmission of data between the computer data bus 284 and other parts of the video computer interface. The read/write signal R/$\overline{W}$ and its inverse are signals which indicate the direction in which data transmission should take place between the computer data bus 284 and lines 0-7 of bus 288. To produce appropriate enabling signals, the $\overline{\phi 2}$ signal from pin 5 of 130B is fed to pin 4 of a NAND gate 128A. Gate 128A comprises part of an integrated circuit 128, which is a triple 3-input NAND gate of the commercially-available 74LS10 type. The second input to gate 128A at pin 3 thereof is the inverse read/write signal, while the third input to gate 128A at pin 5 is the DS signal from pin 4 of inverter 120A. The output from pin 6 of gate 128A is supplied to pin 1 of each of a pair of buffers 112 and 114.

In addition to being supplied to pin 4 of 128A, the $\overline{\phi 2}$ signal from pin 5 of 130B is supplied to pin 11 of 128B, a second NAND gate on the same integrated circuit 128. The second input to pin 9 of 128B is the R/$\overline{W}$ signal from pin 13 of driver 130A, while the third input to pin 10 of 120B is again the DS signal from pin 4 of inverter 120A. The output from pin 8 of 120B is fed to pin 1 of 128C, the third NAND gate on the same integrated circuit 128. The remaining two inputs to pin 128C, pins 2 and 13, are held high, being connected to a +5 V supply line, so that gate 128C acts an inverter. The output from pin 12 of 128C is supplied to pin 15 of each of the aforementioned buffer 112 and 114.

It will be apparent to those skilled in the art that the outputs from gate 128A and 128B will not go low unless the signal DS goes high i.e. unless the hexadecimal digit on line 15-12 of computer address bus 286 has the correct value, thus indicating that the address on lines 11-0 of the same bus is one to which the video-computer interface should respond. Also, the outputs from gate 128A and 128B cannot go low unless the clock signal $\overline{\phi 2}$ goes high, a condition which indicates that the computer is ready to receive or transmit data. When both these conditions are fulfilled, if the inverse read/write signal fed to pin 3 of gate 128A is high (i.e. the read/write signal R/$\overline{W}$ is low), the output at pin 6 of gate 128A will go low. On the other hand, if the read/write signal R/$\overline{W}$ itself is high, the output at pin 8 of gate 128B will go low and the output of pin 12 of gate 128C will go high.

The aforementioned buffers 112 and 114 are bi-directional buffers of the commercially-available 8T26A type, manufactured by Signetics Corporation. As already mentioned, pin 1 of each of these buffers receives the output from pin 6 of gate 128A, while pin 15 of each buffer receives the output from pin 12 of gate 128C. Pins 10, 6, 13 and 3 of buffer 112 are connected to lines 7-4 respectively of the computer data bus 284. Similarly, lines 10, 6, 13 and 3 of buffer 114 receive lines 3-0 respectively of computer data bus 284. Pins 9 and 11 of buffer 112 are connected to line 7 of bus 288. Similarly, pins 5 and 7 of buffer 112 are connected to line 6, pins 12 and 14 of buffer 112 to line 5 and pins 2 and 4 of buffer 112 to line 4 of the same bus. In an exactly similar manner, pins 9 and 11 of buffer 114 are connected to line 3 of bus 288, pins 5 and 7 of buffer 114 to line 2, pins 12 and 14 of buffer 114 to line 1 and pins 2 and 4 of buffer 114 to line 0 of the same bus. Thus, buffers 112 and 114 establish two-way communication between lines 7–0 of the computer data bus 284 and lines 7–0 of bus 288, the direction of transmission being governed by the sign of the read/write signal R/$\overline{W}$; when R/$\overline{W}$ is low, the direction of transmission will be from bus 284 to bus 288, while when R/$\overline{W}$ goes high, the direction of transmission will be in the opposed direction.

To sum up, the circuitry shown in FIG. 7 produces a low value of the inverse device select signal $\overline{DS}$ on line 291 when the most significant hexadecimal digit of the address arriving on the computer address bus 286 has a preselected value indicating that the address is one which requires action by the video-computer interface. Under these same conditions, the DS signal on line 290 goes high. When the aforementioned hexadecimal digit has the preselected value and the signals on lines 11–0 of computer address bus 286 indicate that the address being received is one of the 64 addresses which controls operation of the interface rather than writing into memory, the memory inhibit signal MI is placed on line 292. Buffers 122 and 126 provide buffered transmission from lines 11–0 of computer address bus 286 and lines 19–8 of bus 288. Buffers 112 and 114 provide two-way transmission between lines 7–0 of the computer data bus 284 and lines 7–0 of bus 288, the direction of transmission depending upon the sign of the read/write signal R/$\overline{W}$. Lines 20–25 of bus 288 receive the signals from, or transmit the signals to, bus 287, except that the inverse read/write signal on line W of bus 287 is not placed on bus 288.

The interconnections between the four boards shown in FIG. 6 will now be described, together with the auxiliary circuitry shown in FIG. 6. As shown in that figure, each of the three boards 140, 274 and 280 is provided with connectors 1–22 and A–F, H, J–N, P and R–Z. For convenience, the connectors on the controller board 140 may hereinafter be referred to by a number or letter prefixed by "C", while the connectors on the memory board 274 and the analog board 280 may similarly be referred to with prefixes "M" and "A" respectively. Each of the three boards 140, 274 and 280 fits into the buffer board 110 so as to lie perpendicular to the plane thereof and contacts between the four boards are established by means of edge connectors on the controller, memory and analog boards and a bus on the buffer.

As shown in FIG. 6, lines 7–0 of bus 288 (which handle two-way communication with the computer data bus 284, as described above) are connected to connectors 1–8 respectively on each of the three boards 140, 274 and 148. Line 291, carrying the signal $\overline{DS}$, is connected to connector 9 on each board, while line 290, carrying the DS signal is connected to connectors CF, AF and MU. Line 292, carrying the signal MI, is connected to connector 10 on each of the boards 140, 274 and 280. Lines 19–8 of bus 288 (which, as explained above, carry the twelve least significant bits from lines 11–0 respectively of computer address bus 286) are connected to connectors 11–22 respectively on each of the boards 140, 274 and 280.

Lines 20–24 of bus 288 (carrying signals $\overline{\phi 2}$, R/$\overline{W}$, $\overline{IRQ}$, $\overline{NMI}$, and $\overline{RESET}$ respectively) are connected to connectors V, W, X, Y and Z respectively of each of the boards 140, 274, and 280. Line 25 of bus 288, the ground line, is connected to a conventional ground circuit (only the connector thereto shown in FIG. 6, since an appropriate form of ground connection will, it is believed, be readily apparent to those skilled in the art), and the same ground is connected to connector A on each of the boards 140, 274 and 280. Connector B on each of the same three boards receive +5 V from a conventional stabilized power supply (again not shown since it will be apparent to those skilled in the art). Connectors CC and AC are interconnected by a line which carries a control signal $\overline{CSB}$, connectors CD and AD are interconnected by a line which carries a signal CSA and connectors CE and AE are interconnected by a line which carries a control signal $\overline{CSF}$; all these three control signals are generated on the controller board 140 in a manner to be described below. Connectors AH and AJ receive +12 V and −12 V respectively from a conventional stabilized power supply (which will not be described in detail since it is believed that appropriate power supply circuit will be obvious to those skilled in the art.) Connectors AK and AL are video output connectors which supply the analog outputs on lines 86 to the oscilloscope 76 (FIG. 4).

Connectors C–F, H and J–L on the memory board 270 receive lines 7–0 respectively of the computer data bus 306. (For convenience, hereinafter an abbreviated form may be used to indicate lines in busses; for example 306-7 indicates line 7 of bus 306 and similarly for other lines and busses.) The vertical synchronization signal VSYNC received from the camera on line 307B is passed to circuit 130C, a third driver on the 74LS367 integrated circuit 130B previously described. The corresponding output at pin 3 of 130C is passed to connector CK. Similarly, the horizontal synchronization signal $\overline{SBLNK}$ received from the camer on line 307C is passed to pin 10 of 130D, a further driver of the 74LS367 integrated circuit 130, and the corresponding output from pin 9 of 130D is passed to connector CL. (All the integrated circuits shown on the right-hand side of FIG. 6 are physically located on the buffer board 110.) The $\overline{ERC}$ signal received from the camera on line 307A in fed to pin 12 of 130E, a further driver on integrated circuit 130, and the corresponding output from pin 11 of 130E is fed to connector M on each of the boards 140, 274 and 280.

Connectors CN and MN are interconnected by a line which carries the accept pixel signal, ACCPIX generated on the controller board in a manner described below. Connector AN is connected to pin 6 of 130F, the sixth the final driver on the integrated circuit 130 previously mentioned. The corresponding output at pin 7 of 130F in the $\overline{IIG}$ signal which is fed to the camera on line 307D, as described above with reference to FIG. 5. Connectors CP and MP are interconnected by a line which carries a "clear" signal CLR generated on the controller board 140 in the manner described below. Also, connectors CR and MR are interconnected by a line which carries the COM/$\overline{CAM}$ signal generated on the controller board as described below; this interconnection between connectors CR and MR is the line 304 shown in FIG. 5. Connectors CT and AP are interconnected by a line which carries a half-speed horizontal synchronization $\overline{SBLINK/2}$ generated on the controller board 140 as described below.

Connector AR is the video output from the analog board and is connected to line 84 as described above with reference to FIG. 5. The corresponding video input to the analog board on line 307E is taken to connector AT. Both lines 84 and 307E are conventional coaxial video lines, grounding for which is provided from connector AS, which is also connected to line 25 (the ground line) of bus 288.

Connectors CU and AU are interconnected by a line which carries the accept pixel signal, ACCPIX, generated on the controller board 140.

Finally, as shown in the lower right-hand corner of FIG. 6, the $\overline{G1}$, $\overline{G2}$, $I/\overline{244}$, $N/\overline{122}$ and AGC signals from the TN2500 camera, are fed to a DIP switch 111. This switch 111 grounds all of these signals except the N/122 signal, thereby holding the camera in the proper 30 Hz. sequential mode.

Figure 8:
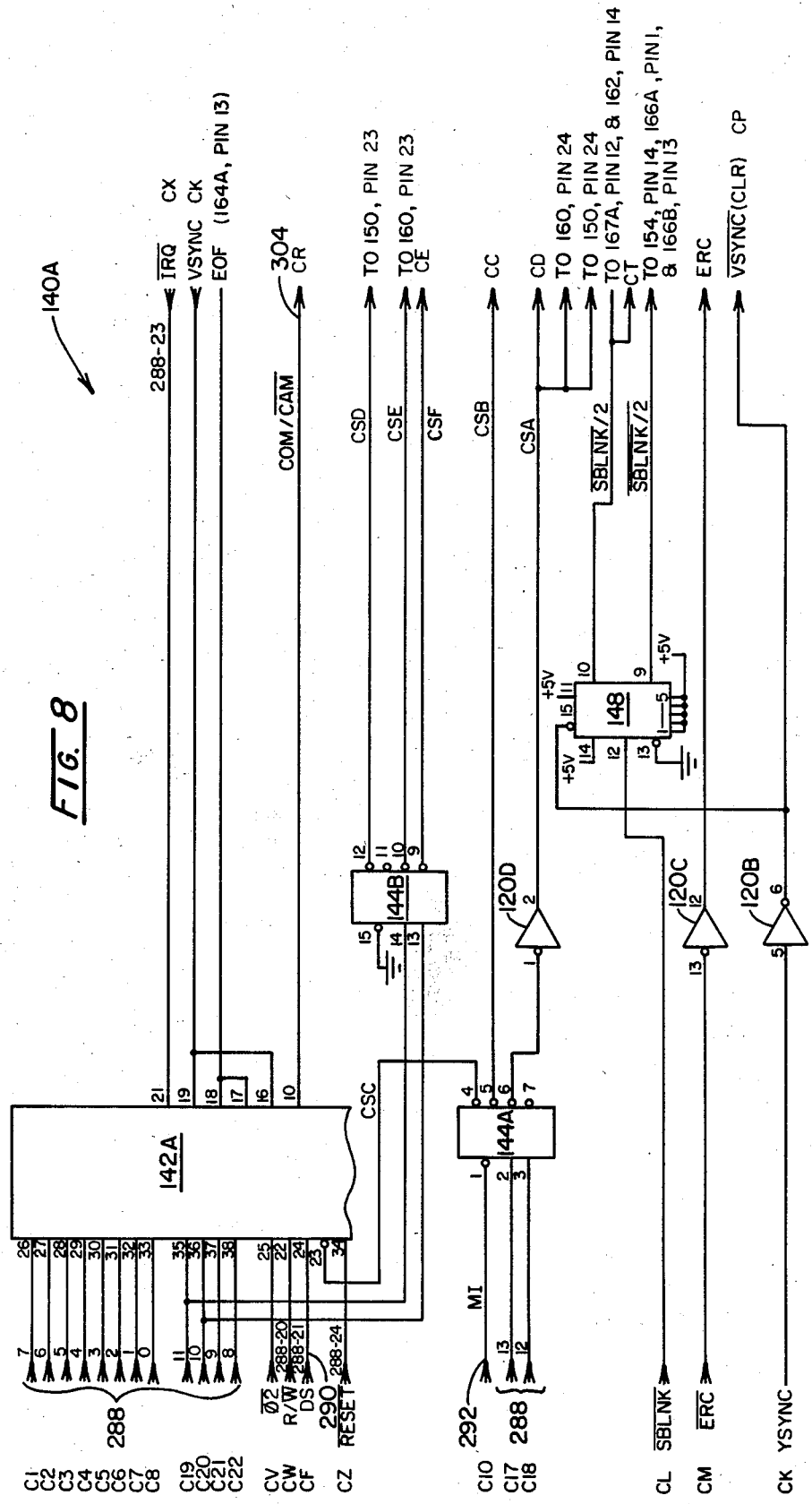
FIG. 8 is a circuit diagram of the PIA/VIA SELECT, COMPUTER COMMUNICATION block of the controller board shown in FIG. 5.

FIG. 8 shows the section 140A of the controller board (see FIG. 5). In FIGS. 8–13B, references beginning with C, M or A appearing at the extreme left or righthand edges of the figure indicate the connectors shown in FIG. 6 which carry the corresponding signals.

The circuitry shown in the lower part of FIG. 8 is responsible for handling and modifying various signals from the video camera to produce signals for use by other parts of the video-computer interface. The vertical synchronization signal VSYNC, received via connector CK, is fed to pin 5 of 120B, a second inverter on the 74LS04 integrated circuit 120 already mentioned. The corresponding inverted output from pin 6 of 120B is the inverse vertical synchronization signal $\overline{VSYNC}$, also designated CLR, which is passed to the memory board via connector CP as described above. The CLR signal is also used in the row control portion 140C of the controller board, as described below with reference to FIG. 10. The $\overline{ERC}$ signal received from the video camera via connector CN is passed to pin 13 of 120C, a further inverter on the 74LS04 integrated circuit already mentioned, and the corresponding output at pin 12 of 120C is the signal ERC, which is used in the column control section 140B of the controller board, as described below with reference to FIG. 10.

The horizontal synchronization signal $\overline{SBLNK}$, received from the camera via connector CL, is fed to pin 12 of integrated circuit 148, which is a dual J-K positive-edge-triggered flip-flop of the commercially available 74LS109 type. Although this integrated circuit contains two separate flip-flops, only the second flip-flop is used. Accordingly, pins 1–5 of circuit 148 are connected to the +5 V supply line and no connections are made to the outputs from pins 6 and 7. Pins 11 and 14 (the 2PR and 2J inputs respectively) of circuit 148 are connected to the +5 V supply line, pin 13 (the 2K input) is grounded, and pin 15 (the clear input for the second flip-flop) receives the signal $\overline{VSYNC}$ from pin 6 of inverter 120B.

Integrated circuit 148 acts as a frequency-divider. As explained above, the video-computer interface shown in FIGS. 5–13B is designed for use with the preferred General Electric TN2500 video camera in the interlacing mode, in which each line of video data is repeated twice. The horizontal synchronization signal $\overline{SBLNK}$ undergoes one cycle for each line of video data whether that line represents new data or merely a repetition of the previous line. In order to ensure that the video computer interface does not store random data, it is necessary to divide the frequency of the horizontal synchronization signal by 2, thereby producing a signal which only undergoes a single cycle for each new line of video data. This frequency division by 2 is accomplished by the flip-flop on integrated circuit 148. This flip-flop is reset by the signal $\overline{VSYNC}$ at the beginning of each frame of video data and thereafter operates using the horizontal synchronization signal $\overline{SBLNK}$ as its clock signal. Thus, the Q and $\overline{Q}$ outputs from pins 10 and 9 respectively of circuit 148 are a half-speed horizontal synchronization signal $\overline{SBLNK}/2$ and its inverse respectively. The $\overline{SBLNK}/2$ from pin 10 of 148 is fed to connector CT (for passage to the analog board 280, as described above with reference to FIG. 6) and is also fed to integrated circuit 162 pin 14 and integrated circuit 167A, pin 12, as described below with reference to FIG. 9. The inverse signal from pin 9 of 148 is fed to integrated circuit 154, pin 14, flip-flop 166A, pin 1 and flip-flop 166B pin 13, all described below with reference to FIG. 9.

The circuitry shown in FIG. 8 also includes an integrated circuit 144, which is a dual 1-of-4 decoder/demultiplexer of the commercially-available 74LS139 type. Integrated circuit 144 is used to generate various control signals for controlling the operation of the R6520 and R6522 interfaces described below, circuit 144 varying the values of the various control signals in accordance with addresses appearing on the computer address bus 286 (FIG. 7) as transmitted to the controller board 140 via the bus 288 as already described.

The first part of integrated circuit 144, designated 144A in FIG. 8, receives at its pin 1 (its enable input) the memory inhibit signal, MI, received from gate 124 (FIG. 7) pin 8 via line 292 and connector C10. Pins 2 and 3 (the two select inputs) on 144A receive the signals on lines 13 and 12 respectively of bus 288 via connector C17 and C18 respectively. As explained above with reference to FIG. 7, these signals on 288-13 and 288-12 correspond to the signals on lines 5 and 4 respectively of the computer address bus 286. As may be seen from the truth table for the 74LS139, when the memory inhibit signal goes low (thus indicating that the address appearing on the bus 286 is one of the 64 addresses reserved for controlling the operation of the video-computer interface, rather than writing into the memory thereof), the input at one of outputs 4–7 of 144A will go low depending upon the two bits received at pins 2 and 3. Thus, each of the outputs 4–7 of 144A produces a low control signal only when one of 16 specific addresses appears on the computer address bus.

Pin 7 of 144A is not used. The output from pin 6 of 144A is fed to pin 1 of 120D, which is a further inverter on the 74LS04 integrated circuit 120 already described. The inverted output from pin 2 of 120B is a control signal hereinafter designated CSA, which is fed to connector CD (for transmission to the analog board 280, as described above with reference to FIG. 6), to integrated circuit 150 pin (described below with reference to FIG. 9) and to integrated circuit 160 pin (described below with reference to FIG. 10). The output from pin 5 of 144A is a control signal hereinafter designated CSB, which is fed to connector CC for passage to the analog board 280, as described above with reference to FIG. 6. Finally, the output from pin 4 of 144A is a control signal CSC, which is fed to pin 23 of an integrated circuit 142 which is described below.

The remaining half of integrated circuit 144, designated 144B in FIG. 8, has its pin 15 (enable input) grounded, so that 144B is permanently enabled. Pins 14 and 13 of 144B receive the signals from lines 11 and 10 respectively of bus 288; as described above with reference to FIG. 7, these signals on lines 11 and 10 respectively of bus 288 correspond to the signals on lines 3 and 2 respectively of computer address bus 286.

It will be apparent from the truth tables for the 74LS139, that, because 144B is permanently enabled, one of its outputs at pins 9-12 will be low depending upon the value of the two bits received at its pins 13 and 14. Note that, unlike 144A, circuit 144B is not dependent for enablement upon MI and will thus produce its output depending upon the values of the bits on lines 3 and 2 of computer address bus 286, regards as the other 14 bits on bus 286. Pin 11 of 144B is not used. The output from pin 12 of 144B is a control signal CDS, which is fed to the aforementioned integrated circuit 150 (FIG. 9), pin 23. The output from pin 10 of 144B is a control signal CSE, which is fed to the aforementioned integrated circuit 160 (FIG. 10) pin 23. Finally, the output from pin 9 of 144B is a control signal designated $\overline{CSF}$, which is passed to connector CE for transmission to the analog board 280, as described above with reference to FIG. 6.

Figure 9:
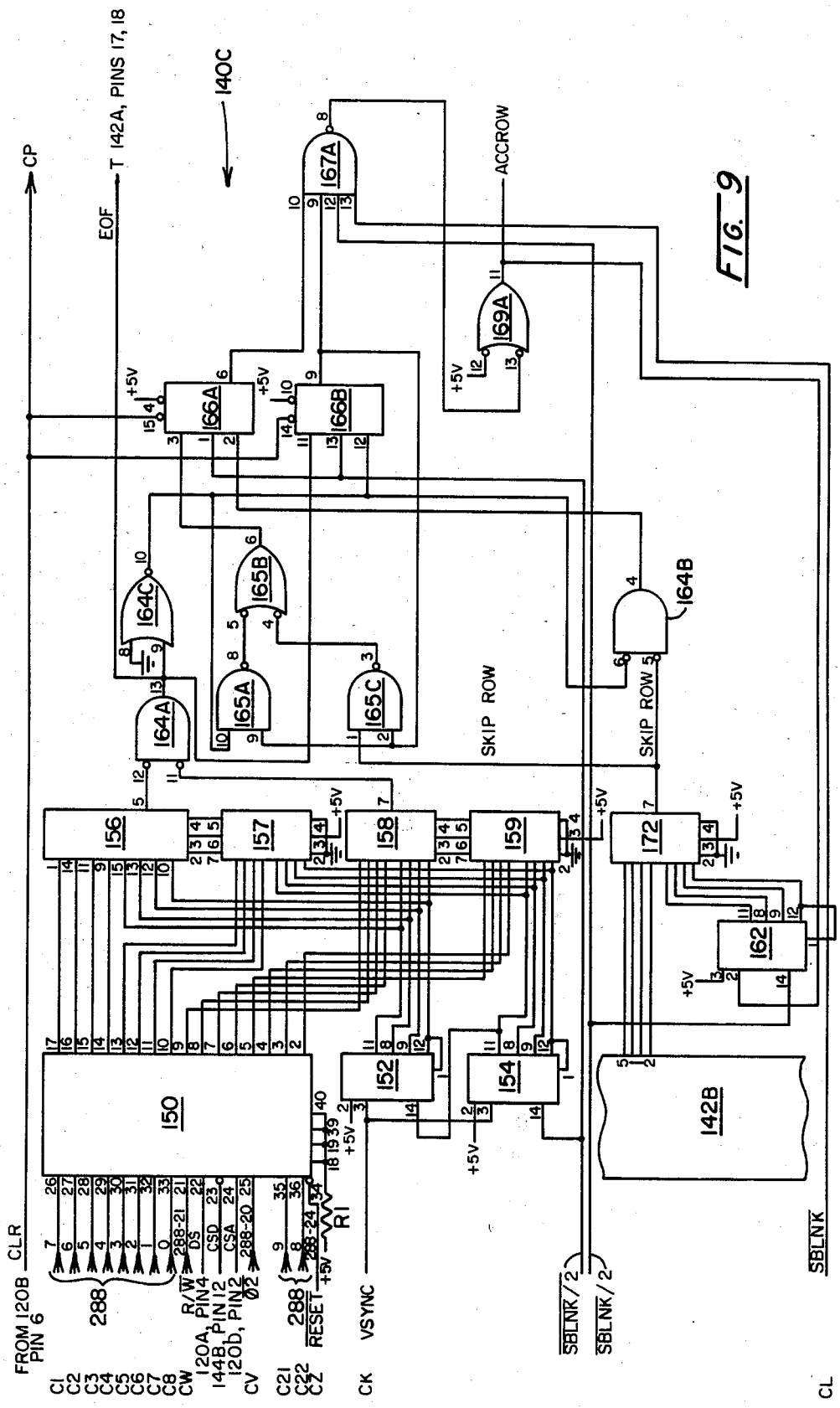
FIG. 9 is a circuit diagram of the row control portion of the controller board shown in in FIG. 5.
Figure 10:
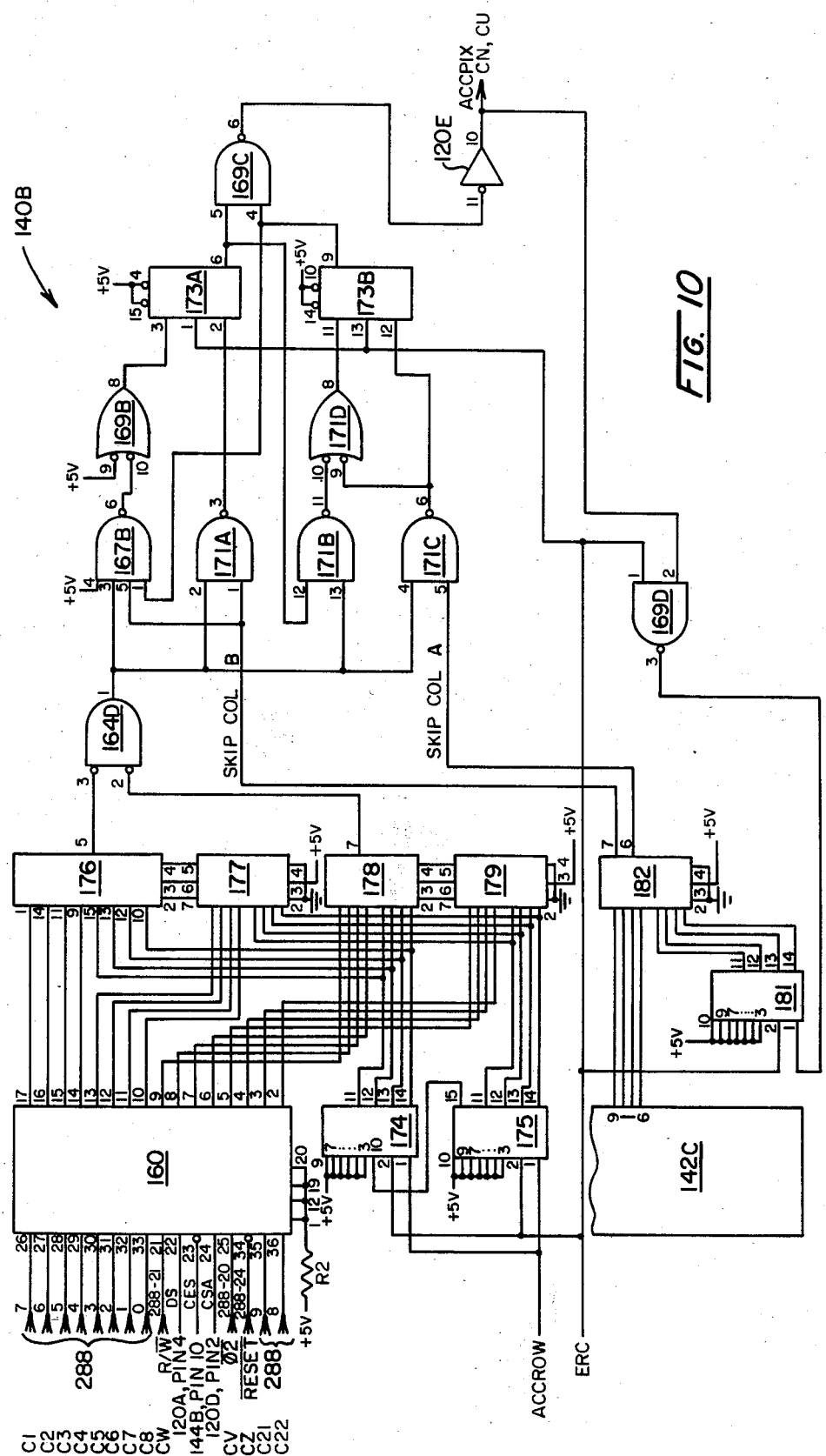
FIG. 10 is a circuit diagram of the column control portion of the controller board shown in FIG. 5.

The remaining integrated circuits are shown in FIG. 8 is a section 142A of an integrated circuit 142 which is a Versatile Interface Adapter, namely a R6522 input-/output port manufactured by Rockwell International Corporation. Further details of this device may be obtained by reference to Document No. 2900D47 Revision 1, published in October 1978 by Rockwell International Corporation. (Note that integrated circuit 142 is not a collocation of integrated circuits but a single unitary device; in this particular instance, the nomenclature 142A, 142B etc. is used solely for ease of reference to the drawings since various parts of the integrated circuit 142 are shown in FIGS. 8, 9 and 10, and the nomenclature does not imply that the various parts of integrated circuit 142 are in fact acting independently.) Integrated circuit 142 serves as a multiple latch to store various parameters sent from the computer and required by the video-computer interface, and also handles various communications with the video camera and the computer.

Pins 26-33 of 142A are connected to lines 7-0 respectively of bus 288; as explained above with reference to FIG. 7, these lines 7-0 of bus 288 are in two-way communication via the buffers 112 and 114 with lines 7-0 of the computer data bus 284. Pin 34 of 142A (the reset input) receives the $\overline{RESET}$ from line 287-7 via line 288-24 and connector CZ. Pins 35-38 of 142A are connected to bus 288 lines 11-8 respectively via connectors C19 and C22 respectively and thus receive signals corresponding to the four least significant bits of the computer address bus 286, as described above with reference to FIG. 7. Pin 25 of 142A receives the $\phi2$ signal from driver 130B (FIG. 7) via line 288-20 and connector CV. Pin 22 of 142A receives the read/write signal R/$\overline{W}$ from pin 13 of driver 130A (FIG. 7) via line 288-21 and connector CW. Pin 24 of 142A receives the signal DS from inverter 120A (FIG. 7) pin 4 via line 290 and connector CF. (The effect of the connections to pins 23 and 24 of circuit 142A is that 142A responds only to addresses XFC0-XFCF (where X is the preselected hexadecimal digit which causes DS to go high) appearing on the computer address bus 286 (FIG. 7). Pins 16 and 19 of 142A receive the vertical synchronization signal VYSNC from pin 3 of driver 130C (FIG. 6) via connector CK. Pins 17 and 18 of 142A receive the end-of-frame signal EOF from gate 164A pin 13 (see description of FIG. 9 below), pin 21 of 142A produces the interrupt signal $\overline{IRQ}$, which is placed on line 288-23 and passed via connector CX and line 287-4 (FIG. 7) to the computer. This interrupt signal is generated by 142A whenever either a VSYNC or a EOF signal is received by 142A and, as described below, forces the computer to follow an interrupt routine. Pin 10 of 142A produces the COM/$\overline{CAM}$ signal which is placed on line 304 and fed to connector CR for transmittal to the memory board 274 as described above with reference to FIG. 6. The value of COM/$\overline{CAM}$ signal is set by the circuit 142A in accordance with instructions received from the computer; when the signal is set low, the memory board is instructed to acquire video data from the camera, while when COM/$\overline{CAM}$ is high the computer can read video data from the interface.

FIG. 9 shows the row control portion 140C of the controller board 140. This row control portion 140C counts the rows of video data, generates appropriate signals when the video data being received from the camera is within the window previously set by the operator by defining first and last rows of this window, and also gates the signals thus generated by the row skip function previously set by the operator to determine for which rows within the window the video data are to be retained in the video-computer interface. The final output of the row control portion 140C is the accept row signal, ACCROW, which indicates that the video data being received from the camera relate to rows passing through the window and also that these rows are the selected rows within the window, as previously defined by the operator. Signal ACCROW is passed to the column control portion 140B of the controller board 140, as previously described with reference to FIG. 5. The row control portion 140C is also responsible for generating the end-of-frame signal, EOF, which is one of the signals used for generating the interrupt signal, $\overline{IRQ}$, as previously described with reference to integrated circuit 142A in FIG. 8.

Storage of the numbers representing the first and last rows of the window is effected by an integrated circuit 150, which is a Peripheral Interface Adapter or input-output port of type R6520 manufactured by Rockwell International. Further details of this integrated circuit may be obtained from Document No. 29000D40, Revision 2, published in October 1978 by Rockwell International Corporation. Basically, as used in the row control portion 140C, this device acts as a multiple latch to store the first and last row values.

Pins 26-33 of 150 receive signals from bus 288, lines 7-0 respectively via connectors C1-C8 respectively. As explained above with reference to FIG. 7, the signals on bus 288 lines 7-0 are those from computer data bus 284 lines 7-0 respectively, buffered by the buffers 112 and 114. Pin 34 of 150 receives the $\overline{RESET}$ signal from line 287-7 via line 288-24 and connector CZ. Pins 35 and 36 of circuit 150 receive the signals from lines 9 and 8 respectively of bus 288 via connectors C21 and C22 respectively; as explained above with reference to FIG. 7, these signals on lines 288-9 and 288-8 correspond to the 2 least significant bits of the address on the computer address bus 286. Pin 21 of circuit 150 receives the signal R/$\overline{W}$ on line 288-21 from driver 130A pin 13 (FIG. 7) via connector CW. Pins 22 and 24 of circuit 150 receives device select signal DS from invertor 120A pin 4 (FIG. 7), while pin 23 of circuit 150 receives control signal CSD from circuit 144B, pin 12 (see FIG. 8). Pin 24 of circuit 150 receives control signal CSA from pin 2 of invertor 120D (FIG. 8). As may be seen from consideration of the inputs to its pins 22-24, and the inputs to circuits 144A and 144B (FIG. 8), circuit 150 is addressed by addresses XFDO-XFD3 appearing on the computer address bus 286 (FIG. 7).

Pin 25 of circuit 150 (the enable input) receives the $\overline{\phi 2}$ signal from driver 130B pin 5 (FIG. 7) via line 288-20 and connector CV. Pins 18, 19, 39 and 40 of circuit 150 are held high, being connected to the +5 V supply line via a resistor R1.

The effect of the connections to pins 21-36 on circuit 150 is that upon receipt of a first appropriate address, XFDO, on the computer address bus 286 (FIG. 7), the 8-bit value simultaneously appearing on the computer data bus 284 (FIG. 7) and representing the first row value will be passed via bus 288, line 7-0 and latched in a first register in circuit 150. Similarly, upon receipt of a second address, XFD2 on the computer address bus 286 the 8-bit simultaneously appearing on computer data bus 284 and representing the last row value will be latched into a second register in circuit 150. The $\overline{\text{RESET}}$ input at pin 34 allows for resetting of circuit 150 when the computer, under the control of the operator, indicates that such resetting is desired.

The first row value latched in circuit 150 appears at pins 2-9 (port A in the manufacturer's nomenclature), while the last row value latched in circuit 150 similarly appears at pins 10-17 (port B in the manufacturer's nomenclature). These pins 2-17 of 150 provide the inputs to four integrated circuits 156, 157, 158, 159, each of which is a 4-bit magnitude comparator of the commercially-available 74LS85 type. To avoid confusion, input pin numbers are shown only on circuit 156, but the spatial arrangement of the inputs to each of the remaining three integrated circuits 157, 158, and 159 in FIG. 9 is exactly similar. Circuits 156 and 157 are interconnected so that they function as a single 8-bit comparator, the outputs from pins 5-7 of circuit 157 being fed to pins 4-2 (the cascading inputs) of circuit 156. Pin 3 of circuit 157 is connected to the +5 V supply line, while pins 2 and 4 of circuit 157 are grounded. Circuits 158 and 159 are arranged in exactly the same manner as circuits 156 and 157 to form an 8-bit comparator, the outputs from pins 5-7 of circuit 159 being fed into the cascading inputs, pins 4-2 respectively, of 158, pin 3 of 159 being connected to the +5 V supply line, and pins 2 and 4 of 159 being grounded.

The outputs from pins 17-14 of circuit 150, representing the the four most significant bits of the 8-bit last row value latched in circuit 150, are fed to pins 1, 14, 11 and 9 respectively of circuit 156. The outputs from pins 13-10 of circuit 150, representing the four least significant bits of the last row value, are similarly fed to pins 1, 14, 11 and 9 respectively of circuit 157. The outputs from pins 9-6 of circuit 150, representing the four most significant bits of the 8-bit first row value latched in circuit 150, are fed to pins 1, 14, 11 and 9 respectively of circuit 158, while the outputs from pins 5-2 of circuit 150, representing the four least significant bits of the first row value, are fed to pins 1, 14, 11 and 9 respectively of circuit 159.

The other set of inputs to circuits 156-159 are provided from a pair of integrated circuits 152 and 154, each of which is a four-bit counter of the commercially-available 74LS93 type, the circuits 152 and 154 being interconnected so as to form, in effect, a single 8-bit counter. In each of 152 and 154, pin 2 is connected to the +5 V supply line, pin 3 receives the VSYNC signal (from driver 130C, pin 3 via connector CK, as described above with reference to FIG. 6) and pins 12 and 1 are interconnected so that the maximum count length could be used. To provide the necessary carry from circuit 154 to circuit 152, pin 11 of 154 is connected to pin 14 of 152. The input to pin 14 of 154 is the inverse half-speed horizontal synchronization signal from integrated circuit 148, pin 9 (see FIG. 8). As will be apparent to those skilled in the art, the effect of the connection best described to circuits 152 and 154 is that at the beginning of each frame of video data the 8-bit counter formed by circuits 152 and 154 is reset to zero by the pulse in signal VSYNC. Thereafter, circuits 152 and 154 count new lines of video data using the inverse half-speed horizontal synchronization signal as their clock input. Thus, the 8-bit number stored in 152 and 154 at any time represents the number of the last new line of video data in the current frame.

The outputs from pins 11, 8, 9 and 12 of circuit 152, which represent the four most significant bits of the 8-bit number stored in circuits 152 and 154, are supplied to pins 15, 13, 12 and 10 respectively of circuits 156 and 158. Similarly, the outputs from pins 11, 8, 9 and 12 of circuit 154, which represent the four least significant bits of the numbers stored in circuits 152 and 154, are supplied to pins 15, 13, and 12 respectively of circuits 157 and 159.

The interconnected circuits 158 and 159 compare the 8-bit current row number which they receive from circuits 152 and 154 with the 8-bit first row value received from circuit 150. The output from pin 7 (the A less than B output) of circuit 158 is fed to pin 11 of integrated circuit 164A. Integrated circuit 164 is a quadruple 2-input NOR gate of the commercially-available 74LS02 type. The second input to pin 12 of 164A is taken from pin 5 (the A greater than B output) of circuit 156. As will be apparent to those skilled in the art, the output from pin 7 of circuit 158 remains high from the beginning of each frame of video data until the current row value stored in circuits 152 and 154 equals the first row value stored in circuit 150 i.e. until the first row of the window is reached. When the first row is reached, the output from pin 7 of circuit 158 goes low. On the other hand, the output from pin 5 of circuit 156 remains low from the beginning of each frame of data until the current row value stored in circuits 152 and 154 becomes greater than the last row value stored in circuit 150 i.e. until the first line after the window begins, then goes high. Thus, the output from pin 13 of gate 164A, which is the end-of-frame signal EOF, will only be high when the video data being received from the camera relates to the selected rows defining the window. As previously mentioned, the EOF signal is sent to circuit 142A, pins 17 and 18 (see preceding description with reference to FIG. 8).

It now remains to gate the EOF signal in accordance with a row/skip value previously set by the operator to produce the final ACCROW signal. This row/skip value specifies the number of lines to be skipped between each line to be accepted. At an appropriate point, the computer sends an 8-bit number which combines the 4-bit row/skip value with the 4-bit column skip value (the use of which is described below) on the computer data bus 284 (FIG. 7), and simultaneously sends an appropriate address, XFCI, on the computer address bus 286 (FIG. 7), thereby causing the 8-bit skip value on the data bus 284 to be latched in an appropriate skip register in integrating circuit 142. The row skip value appears at pins 5-2 of integrated circuit 142, as shown on section 142B in FIG. 9, and the outputs from these pins are fed to pins 1, 14, 11 and 9 respectively of integrated circuit 172, which is another 74LS85 4-bit comparator. As with circuits 157 and 159 described earlier, pin 3 of circuit 172 is connected to the +5 V supply line, while pins 2 and 4 are grounded. The other set of inputs of the circuit 172 are supplied by an integrated circuit 162, which is another 74LS93 counter. Pin 3 of 162 is connected to the +5 V supply line, while pin thereof (the second reset input) receives the ACROW signal, thereby ensuring that counter circuit 162 is reset each time the ACCROW signal is generated. Pins 12 and 1 of circuit 162 are interconnected to provide for maximum count length, while pin 14 of 162 receives the half-speed horizontal synchronization signal, $\overline{SBLNK}/2$ from circuit 148 pin 10 (FIG. 8). Thus, circuit 162 functions in generally the same manner as circuit 154 as previously described, and counts new lines of video data. Circuit 172 compares the current row value received from 162 with the row/skip value received from 142B. The output from pin 7 (the A less than B output) of circuit 172 will remain high until the value stored in 162 equals the row/skip value, then will go low. This output from pin 7 of circuit 172 will hereinafter be referred to as the "skip/row" signal. Since so long as it remains high, the value in 162 is less than the row/skip value, thus indicating that the accept row signal, ACCROW, should not be generated.

The skip row signal from pin 7 of circuit 172 is supplied to pin 5 of 164B, a second NOR gate on the 74LS02 integrated circuit 164 previously mentioned. To provide the other input to gate 164B, the EOF signal from pin 13 of gate 164A is supplied to pin 9 of 164C, a third NOR gate on integrated circuit 164 previously mentioned. The second input, pin 8, of gate 164C is grounded so that 164C acts as inverter, and the output from pin 10 of 164C is supplied to pin 6, the second input, of gate 164B. The output from pin 4 of 164B is supplied to pin 2 of circuit 166A. Integrated circuit 166 is a dual J-K negative edge triggered flip-flop of the commercially-available 74LS112 type. Pin 4 (the present input) of 164A is connected to the +5 V supply line, while pin 15 (the clear input) of circuit 166A receives the signal CLR from inverter 120B, pin 6 (see FIG. 8). Pin 1 of 166A (the clock input) receives the inverse half-speed horizontal synchronization signal from circuit 148, pin 9 (see FIG. 8).

The generation of the signals supplied to pin 3 of circuit 166A is rather complicated. The output from pin 10 of gate 164C is supplied to pin 10 of 165A, which is part of a quadruple 2-input positive NAND date of the commercially-available 74LS00 type. Pin 9 (the second input) of gate 165A receives the Q output from pin 9 of 166B, which is the second flip-flop on the 74LS112 integrated circuit 166 previously mentioned. The output from pin 8 of gate 165A is fed to pin 5 of 165B, a second NAND gate on the same integrated circuit 165. The skip/row signal from circuit 172 to pin 7 is fed to pin 1 of 165C, a third NAND gate on the integrated circuit 165 previously mentioned, the second input, pin 2, of this gate 165C being supplied with the Q output from pin 9 of 166B. The output from pin 3 of gate 165C is fed to pin 4, the second input, of gate 165B, and the output from pin 6 of gate 165B supplied to pin 3 of 166A. The Q output from pin 6 of 166A is fed to pin 10 of 167A. Integrated circuit 167 is a dual 4-input NAND gate of the commercially-available 74LS20 type.

166B is connected in a manner very similar to 166A. Pin 10 (the preset input) of 166B is connected to the +5 V supply line, pin 14 (the clear input) receives the CLR signal from inverter 120B pin 6 (FIG. 8). Pin 11 (the J input) receives the EOF signal from gate 164A pin 13, pin 13 (the clock input) receives the inverse half-speed horizontal synchronization signal from circuit 148 pin 9 (FIG. 8) and pin 12 (the K input) receives the signal from pin 10 of gate 164C. The Q output from pin 9 of 166 V is fed to pin 9 of gate 167. Pin 12 of 167 receives the $\overline{SBLNK}/2$ signal from circuit 148 pin 10 (FIG. 8) and pin 13 of gate 167 receives the $\overline{SBLNK}$ signal from driver 130D, pin 9 (FIG. 6), via connector CL. The output from pin 8 of gate 167 is supplied to pin 13 of 169A. Integrated circuit 169 is a quadruple 2-input positive NAND gate of the commercially-available 74LS00 type. The second input, pin 12 of gate 169A is connected to the +5 V supply line so that gate 169A acts as an inverter and the output from pin 11 of gate 169A is the accept row signal, ACCROW which is supplied to the row control circuitry shown in FIG. 10 and also, as previously described, to circuit 162 pin 2.)

Although the signal manipulation effected by the various gates and the flip-flops shown in the right-hand part of FIG. 9 is rather complex, those skilled in the art will be able, by following the signals passing through the circuitry described above, to confirm the following conditions required for ACCROW to go high. Firstly, either EOF must be high (i.e. the video data must be within the selected window defined by the first and last row values) or if EOF has just gone low, ACCROW can still be high in the first row of video data immediately following the negative transition of the EOF signal; this "overshoot" arises because of the way in which the flip-flops 166A and 166B toggle outputs in response to the half-speed horizontal synchronization signal and because the circuitry uses both $\overline{SBLNK}/2$ and its inverse. In addition, for ACCROW to be high, $\overline{SBLANK}$ and SBLANK/2 must both be high i.e. the video data do not relate to a horizontal blanking interval and do relate to a new, not a repeated line of video data; the necessary gating of the signal from flip-flop 166A and 166B with $\overline{SBLNK}$ and $\overline{SBLANK}/2$ is effected by gate 167A. Finally, if the row skip value latched in circuit 142 is N, for ACCROW to be high, the video data must relate to the selected one of a set of N+1 lines; as noted above, the skip row signal from pin 7 of circuit 172 remains high for N new lines of video data, then goes low for a single line counter circuit 162 is reset to zero by the ACCROW signal generated.

FIG. 10 shows the row control portion 140B of the controller board 140. The circuitry shown in the left-hand part of FIG. 10 is very similar to that shown in the corresponding part of the column control portion shown in FIG. 9, but the subsequent gating arrangements are somewhat different because there is no need to generate any signal corresponding to the EOF signal generated by the row control circuitry, nor is there any need to make allowance for both half-speed and full-speed synchronization signals, since the TN2500 video camera does not interlace columns in the same way it interlaces rows. Storage of first and last column values received from the computer is effected by an integrated circuit 160, which is another R6520 interface identical to integrated circuit 150 shown in FIG. 9. The connections to and functioning of circuit 160 are closely similar to those of circuit 150. Pins 26-33 of circuit 160 are connected to lines 7-0 respectively of bus 288 and are thus connected via buffers 112 and 144 to lines 7-0 respectively of computer data bus 284 (FIG. 7). Pin 34 of 160 receives the $\overline{\text{RESET}}$ signal on line 288-24 via connector CZ. Pins 35 and 36 of 160 are connected to lines 9 and 8 respectively of bus 288 and thus receive the two least significant digits appearing on computer address bus 286 (FIG. 7). Pin 21 of 160 receives the R/$\overline{\text{W}}$ on line 288-21 via connector CW. Pin 22 of circuit 160 receives the device select signal DS from inverter 120A, pin 4 (FIG. 7), while pin 23 of circuit 160 receives the control signal CSE from circuit 144B, pin 10 (see FIG. 8). Pin 24 of circuit 160 receives the control signal CSA from inverter 120D, pin 2 (FIG. 8). As may be seen from consideration of the inputs to its pins 22-24, and the inputs to circuits 144A and 144B (FIG. 8), circuit 160 is addressed by addresses XFD4-XFD7 appearing on the computer address bus 286 (FIG. 7). Pin 25 of 160 receives the $\overline{\phi 2}$ signal from pin 5 of driver 130B (FIG. 7) via line 288-20 and connector CV. Pins 1, 18, 19 and 20 of 160 are connected to the +5 V supply line via a resistor R2.

Integrated circuit 160 functions in a manner exactly parallel to that of integrated circuit 150 described above. Upon receipt of a first address, XFD4, on the computer address bus 286 (FIG. 7), circuit 160 will latch the first column value simultaneously appearing on computer data bus 284 into a first column register, whereupon receipt of a second preselected address, XFD6, on computer address bus 286, circuit 160 will latch the last column value simultaneously being on computer data bus 284 into a last column register. Obviously, the relevant addresses which cause latching of the first and last column values into circuit 160 are different from those which cause latching of first and last row values into circuit 150.

The outputs from circuit 160 are handled in a manner exactly parallel to those from circuit 150. The outputs from pins 17-14 of circuit 160, which represent the four most significant bits of the last column value, are fed to pins 1, 14, 11 and 9 respectively of integrated circuit 176. The outputs from pins 13-10 of circuit 160, which represent the four least significant bits of the last column value, are fed to pins 1, 14, 11 and 9 respectively of integrated circuit 177. The outputs from pins 9-6 of circuit 160, which represent the four most significant bits of the first column value latched in circuit 160, are fed to pins 1, 14, 11 and 9 respectively of integrated circuit 178, and finally the outputs from pins 5-2 of circuit 160, which represent the four least significant bits of the first column value, are fed to pins 1, 14, 11 and 9 respectively of integrated circuit 179. Each of the integrated circuits 176-179 is a four-bit comparator of the commercially-available 74LS85 type. Integrated circuits 176 and 177 are interconnected so as to act as an 8-bit comparator, the outputs from pins 5-7 of circuit 177 being fed to pins 4-2 respectively of circuit 176. Pin 3 of 177 is connected to the +5 V supply line while pins 2 and 4 are grounded. Similarly, integrated circuits 178 and 179 are interconnected to act as an 8-bit comprator, the outputs from pins 5-7 of circuit 179 being fed to pin 4-2 respectively of circuit 178, pin 3 of circuit of 179 being connected to +5 V supply line and pins 2 and 4 being grounded.

The second sets of inputs to circuits 176-179 are provided by integrated circuits 174 and 175. However, these integrated circuits 174 and 175, unlike the corresponding circuits 152 and 154 in FIG. 9, are synchronous 4-bit counters of the commercially-available 74LS161 type. Circuits 174 and 175 are interconnected so as to act as a single 8-bit counter, pin 15 (the carry output) of circuit 175 being connected to pin 10 (the enable T input) of circuit 174.

Pin 9 (the load input), pin 7 (the enable P input) and pins 6-3 (the data inputs) of circuits 174 and 175 are all connected to the +5 V supply line. Pin 10 (the enable T input) of circuit 175 is also connected to the same supply line so that circuit 175 is permanently enabled for counting while circuit 174 will only be enabled for counting when a carry output is present in pin 15 of circuit 175. Pin 1 of circuits 174 and 175 receives the $\overline{\text{ACCROW}}$ signal from pin 11 of gate 169A (FIG. 9), while pin 2 of circuits 174 and 175 receives the ERC signal from pin 12 of inverter 120E (FIG. 8).

As will be apparent to those skilled in the art, 174 and 175 will be reset to zero each time $\overline{\text{ACCROW}}$ goes low i.e. the counting by 174 and 175 will begin from zero at the beginning of every accepted line of video data, and, during each of these accepted lines, counters 174 and 175 use the ERC signal to generate a number representing the number of the pixel within the accepted row to which the simultaneously-arriving video data relates.

The outputs from pins 11, 12, 13 and 14 of circuit 174, which represent the four most significant bits of the 8-bit current pixel number stored in circuits 174 and 175 are fed to pins 15, 13, 12 and 10 respectively of each of circuits 176 and 178. Similarly, the outputs from pins 11, 12, 13 and 14 of 175, which represent the four least significant bits of the current pixel number, are fed to pins 15, 13, 12 and 10 respectively of circuits 177 and 179.

Circuits 178 and 179 compare the current pixel value received from circuits 174 and 175 with the first column value received from circuit 160. So long as the current pixel value is less than the first column value, the output at pin 7 (the A less than B output) of circuit 178 remains high, but as soon as the these two values are equal (i.e. as soon as the first pixel within the selected window has been reached) this output goes low. Similarly, circuits 176 and 177 compare the current pixel value from circuits 174 and 175 with the last column value from circuit 160 and once the current pixel value exceeds the last column value (i.e. as soon as the row being dealt with leaves the window), the output at pin 5 (the A greater than B output) circuit 176 goes high.

The output from pin 7 circuit 178 is fed to pin 2 of a NOR gate 164B, which is the fourth NOR gate on the 74LS02 integrated circuit 164 previously mentioned. For reasons exactly parallel to those explained above for the generation of the EOF signal by gate 164A (FIG. 9) in the column control circuitry, the output from pin 1 of gate 164D will only be high within the selected window. This output from pin 1 of 164D is fed to pin 2 of 167B (the second 4-input NAND gate on the 74LS520 integrated circuit 167 previously mentioned, to pin 1 of a gate 171A, to pin 13 of gate 171B and to pin 4 of gate 171C. Gates 171A, 171B and 171C are three separate NAND gates on a quadruple 2-input positive NAND gate of the commercially-available 74LS00 type.

For reasons exactly parallel to those explained above with reference to the row control circuitry, the output from pin 1 of gate 164D, which defines the window, must be gated with the column skip function to produce the final accept pixel signal, ACCPIX. For this purpose, the 4-bit value of the row skip function, which is latched into integrated circuit 142 in the manner previously described, is fed from pins 9-6 of circuit 142 (shown in portion 142C in FIG. 10) to pins 1, 14, 11 and 9 respectively of integrated circuit 182, which is another 4-bit comparator of the commercially-available 74LS85 type. Pin 3 of 182 is connected to the +5 V supply line, while pins 2 and 4 are grounded. The other set of data inputs to circuit 182 are provided by an integrated circuit 181, which is a 4-bit synchronous counter of the commercially-available 74LS161 type. Circuit 181 is arranged in a manner closely similar to circuit 175 previously described; pins 10, 9 and 7-3 of 161 are connected to the +5 V supply line, while pin 2 of circuit 181 receives the ERC signal from inverter 120C, pin 10 (FIG. 8).

The reset input to pin 1 of circuit 181 is a NAND'ed combination of signals ERC and ACCPIX, generated as described below. The outputs from pins 11, 12, 13 and 14 of circuit 181 are fed to pins 15, 13, 12 and 10 respectively of circuit 182. Obviously, cicuit 182 compares the pixel number received from circuit 181 with the column skip value received from circuit 142 and produces the usual outputs of a 74LS85 comparator.

However, at this point the column control circuitry shown in FIG. 10 diverages markedly from the row control circuitry shown in FIG. 9. The difference in circuitry is required by a difference between the forms of the horizontal blanking signal $\overline{SBLNK}$ and the element rate clock signal ERC. As will be explained in more detail below with reference to FIG. 14, $\overline{SBLNK}$ is high for the major part of each cycle during which video data is being received and only goes low during a relatively brief horizontal blanking interval. Because integrated circuit 148 (FIG. 8) is a positive edge triggered flip-flop, $\overline{SBLNK}/2$ is high for the whole of one line of video data (including the relative horizontal blanking interval) and low for the next line (again including the relative horizontal blanking interval). The presence of gate 167A (FIG. 9) in the column control circuitry, which gates a modified form of EOF with both $\overline{SBLNK}$ and $\overline{SBLNK}/2$, ensures that the positive and negative transitions of ACC-ROW are synchronized with the corresponding transitions of $\overline{SBLNK}$. Furthermore, because of the way in which the comparators 156-159 and the gate 164A (FIG. 9) operate, the negative transition of EOF at the end of the window corresponds with positive transitions in $\overline{SBLNK}$ and $\overline{SBLNK}/2$. Following such a negative transition of EOF, the presence of the flip-flops 166A and 166B permits a final high pulse in ACCROW, this final pulse (earlier referred to as the "overhang" beginning with the positive transition of SBLNK which coincides with the negative transition in EOF, and terminating with the immediately following negative transition in $\overline{SBLNK}$. Thus, all high-level pulses of a ACCROW are correctly synchronized with high-level pulses of $\overline{SBLNK}$.

In contrast, because there is no blanking interval between adjacent pixels comparable to the horizontal blanking interval between adjacent rows, $\overline{ERC}$ undergoes one complete cycle for each pixel, this cycle comprising a low value for the first half of the period for which video data from that pixel is present, and a high value for the second half of the same period. Similarly, ERC, the inverse signal which is actually counted by cicuits 174 and 175 (FIG. 10) is high for the first half of each output pixel period and low for the second half. Since it is important that the accept pixel signal remain high for the whole of the time for which video data from the accepted pixel are to be received in order to permit the memory board the maximum time to store the video data to be accepted (as already mentioned, since $\overline{ERC}$ has a frequency of approximately 4.5 MHz, the data from any given pixel is only present from about 0.22 microseconds, and any further reduction in this period is likely to cause extreme problems in storing the video data from the accepted pixel in the memoreis of the video-computer interface). Thus, the positive transition of ACCPIX must correspond with the positive transition of ERC denoting the start of the video data from the first of an accepted set of pixels, while the negative transition of ACCPIX does not correspond with a negative transition in ERC but rather with a positive transition in ERC which denotes the end of the last pixel to the accepted and the beginning of the subsequent pixel. In particular, ACCPIX is allowed to "overshoot" the end of signal 164-1 (the output from pin I of gate 164D in FIG. 10, the column control equivalent of signal EOF) in the same way that ACCROW is allowed to "overshoot" EOF i.e. after 164-1 goes low, because of the presence of flip-flops 173A and 173B (FIG. 10) described below, the next pixel following the negative transition of 164-1 can still be accepted. In the case of this last pixel, the negative transition of ACCPIX must be arranged to coincide not with the negative transition of ERC but with the first positive transition in ERC immediately following the positive transition which coincides with the negative transition in 164-1.

To produce an ACCPIX signal meeting the aforementioned requirements, the circuitry shown in FIG. 10 makes use of two different skip column signals, hereinafter designated skip column A and skip column B; this is of course in contrast to the row control circuitry shown in FIG. 9 which uses only a single skip row signal from pin 7 of circuit 172. The skip column A signal is the output from pin 6 (the A=B output) of comparator 182, while the skip column B signal is the output from pin 7 (the A less than B output) of the same comparator. As will be apparent to those skilled in the art, the negative transitions in the skip column A and skip column B signals will be spaced apart by one pixel period, the negative transition of the skip column B signal (and the positive transition of the skip column A signal) will coincide with the positive transition in ERC for the pixel which causes the number accumulated in circuit 181 to equal the column skip value appearing at pins 9-6 of circuit 142C, while the negative transition in the skip column A signal will coincide with the immediately subsequent positive transition in ERC, denoting the start of the following pixel.

The output from pin 1 of gate 164D (signal 164-1) is fed to pin 2 of gate 167B, which is the second 4-input NAND gate of the 74LS20 integrated circuit 167 previously mentioned. Pin 4 of 167B is connected to the positive supply line, pin 5 receives the skip column B signal from pin 7 of comparator 182, and pin 1 of gate 167B receives the Q output from flip-flop 173B described below. The output from pin 6 of gate 167B is fed to pin 10 of 169B, which is a further NAND gate on the 74LS00 integrated circuit 169 previously mentioned. The second input, pin 9, of gate 169B is connected to the +5 V supply line so that gate 169B acts as an inverter. The output from pin 8 of gate 169B is fed to pin 3 of flip-flop 173A. Integrated circuit 173 is a dual J-K negative-edge triggered flip-flop of the commercially-available 74LS112 type. Pins 4 and 15 (the preset and clear inputs) of 173A are both connected to the positive supply line. Pin 1 (the clock input) of 173A receives the ERC signal. Pin 1 of gate 164D is also connected to pin 2 of 171. Integrated circuit 171A is a quadruple 2-input positive NAND gate of the commercially-available 74LS00 type. The other input of pin 1 of gate 171A is the skip column B signal from pin 7 of comparator 182. The output from pin 3 of gate 171A is fed to pin 2 (the K input) of flip-flop 173A.

The $\overline{Q}$ output from pin 6 of flip-flop 173A is fed to pin 12 of 171B, which is a second NAND gate on the 74LS00 integrated circuit 171 previously mentioned. The other input to pin 13 of 171B is signal 164-1 from gate 164D, pin 1. The output from pin 11 of gate 171B is fed to pin 10 of 171D, which is another NAND gate on the same integrated circuit. Signal 161-1 from pin 1 of gate 164D is supplied to pin 4 of 171C, another NAND gate of the 74LS00 integrated circuit 171 previously mentioned. The other input to pin 5 of gate 171C is the skip column A signal from pin 6 of comparator 182. The output from pin 6 of gate 176C is supplied to second input, pin 9, of gate 171D and the output from pin 8 of gate 171D is supplied to pin 11 (the J input) of 171B, which is the second flip-flop on the 74LS112 integrated circuit 173 previously mentioned. Pin 13 (the clock input of flip-flop 173B receives the ERC signal from pin 12 of inverter 120E (FIG. 8). Pins 14 and 10 (the clear and preset inputs) of flip-flop 173B are connected to the positive supply line.

The Q output from pin 9 of flip-flop 173B is fed to pin 4 of 169C, which is a third NAND gate on the 74LS00 integrated circuit 169 previously mentioned. The other input to pin 5 of gate 169C is the $\overline{Q}$ output from pin 6 of flip-flop 173A. The output from pin 6 of gate 169C is fed to pin 11 of 120B which is a second inverter on the b 74LS04 integrated circuit 120 previously mentioned. The inverted output from pin 10 of inverter 120B is the ACCPIX signal having the characteristics previously mentioned. It should be noted that, because the gate 169C merely NAND's the outputs from flip-flops 173A and 173B, and does *not* effect gating with ERC in the same way that gate 167A effects gating with $\overline{SBLNK}$ and $\overline{SBLNK}/2$, provided the row skip function is set to zero so that every pixel on an accepted line and lying within the window is to be accepted, once ACCPIX has gone high at the first accepted pixel it does not thereafter go low until the end of the last accepted pixel, as described below in more detail with reference to FIG. 14A.

To provide proper resetting of the counter circuit 181, the ACCPIX signal from pin 10 of inverter 120B is fed to pin 2 of 169D, the fourth NAND gate on the 74LS00 integrated circuit 169 previously mentioned. The second input to pin 1 gate 169D is the ERC signal from inverter 120C, pin 12 (FIG. 8). The output from pin 3 of gate 169D is fed to pin 1 of counter circuit 181.

The ACCPIX signal from pin 10 of inverter 120B is fed to connectors CN and CU for passage to the memory board 274 and the analog board 280 respectively, as described above with reference to FIG. 6.

Figure 11:
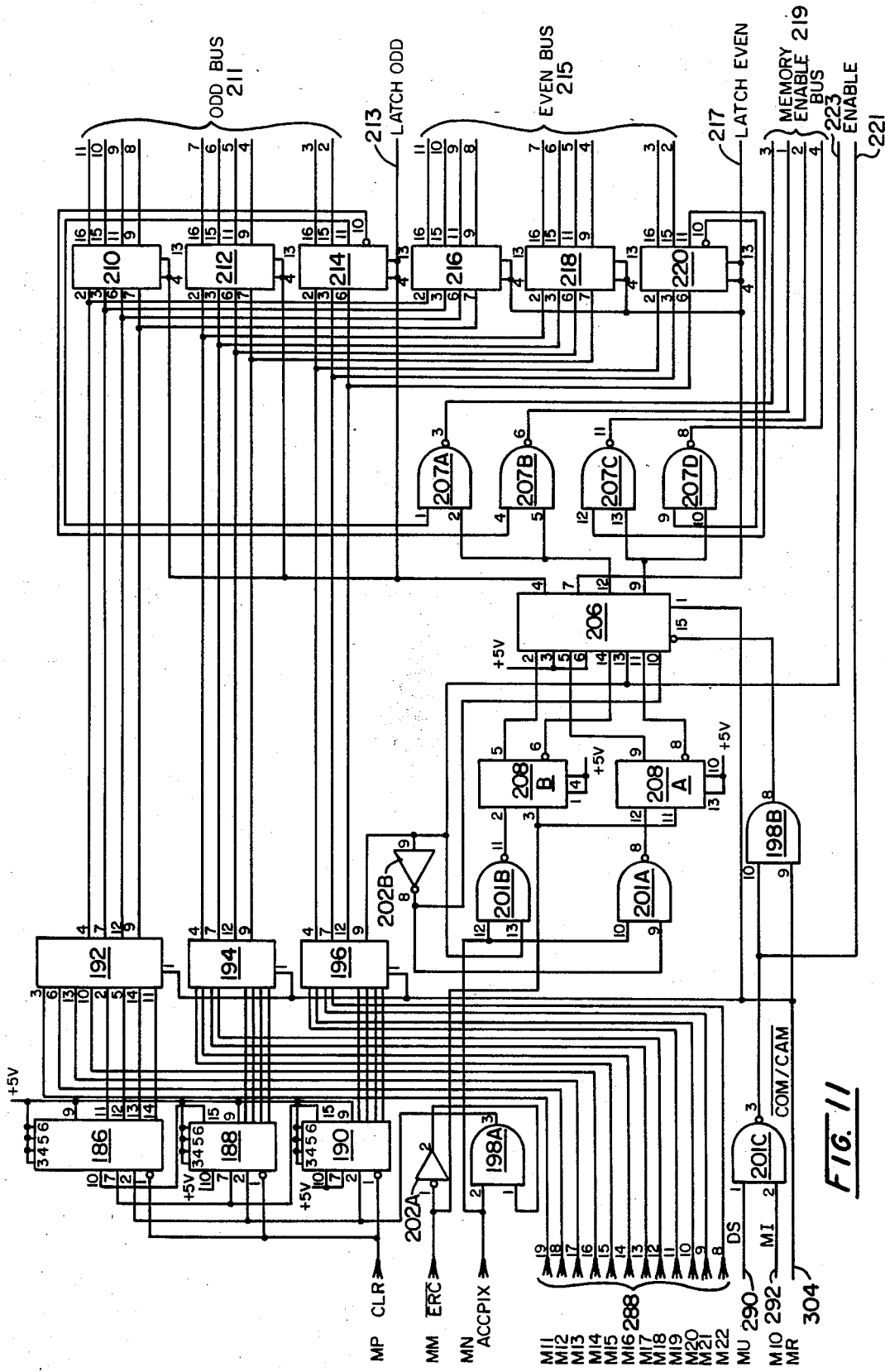

The circuitry of the memory board 274 will now be described with reference to FIGS. 11 and 12. In FIG. 11, integrated circuits 186, 188 and 190 are three 4-bit synchronous counters of the commercially-available 74LS161 type. As will be apparent to those skilled in the art, as 8-bit numbers representing video data from accepted pixels are fed to the video-computer interface via the bus 306 (FIGS. 4, 5 and 12) it is necessary to generate addresses to advise the memory of the video-computer interface of the various locations in which the incoming video data should be stored. Generation of the necessary addresses is affected by integrated circuits 186, 188 and 190, which are interconnected so as to generate the 12-bit addresses required by the 4K memory described below. Pins 3, 4, 5 and 6 (the four data inputs) and pin 9 (the load input) of each of 186, 188 and 190 are all held high being connected to the +5 V supply line. Pin 1 (the clear input) of each of 186, 188 and 190 receives the CLR signal from inverter 120B, pin 6 (FIG. 8) via connectors CP and MP, as described above with reference to FIG. 6. This feeding of CLR to the clear input of each of circuits 186, 188 and 190 ensures that all three counters are zeroed at the beginning of each frame of video data. To provide the clock input to circuits 186, 188 and 190, the $\overline{ERC}$ signal from driver 130E pin 11 (FIG. 6) via connector MM is fed to pin 1 of 202A. Integrated circuit 202 is a hex inverter of the commercially-available 74LS04 type. The inverted output from pin 2 of inverter 202A is fed to pin 2 of 198A. Integrated circuit 198 is a quadruple 2-input AND gate of the commercially-available 74LS08 type. The second input to pin 1 of gate 198A is the ACCPIX signal from pin 10 of inverter 120E, received via connectors CN, as described above with reference to FIG. 6. The output from pin 3 of gate 198A furnishes the clock input to pin 2 of each of circuits 186, 188 and 190.

Pins 10 and 7 (the two enable inputs) of circuit 190 are connected to the +5 V supply line so that circuit 190 is always enabled. The carry output from pin 15 of circuit 190 is fed to pin 7 (the enable P input) of circuit 188, pin 10 (the enable T input) of circuit 188 being connected to the +5 V supply line. The carry output from pin 15 of circuit 188 is fed to pin 10 (the enable T input) of circuit 186, while pin 7 (the enable P input) of circuit 186 receives the carry output from pin 15 of circuit 190. As will be apparent to those skilled in the art, the provision of gate 198A ensures that the counter circuits 186, 188 and 190 only count when the $\overline{ERC}$ signal is low and the ACCPIX signal is high, so that the counters count accepted pixels of video data. Furthermore, it will be apparent to those skilled in the art that whereas circuit 190 is permanently enabled, circuit 188 will be enabled only when a carry output is present at pin 15 of circuit 190 and that circuit 186 will be enabled only when carry outputs are simultaneously present at pins 15 of circuits 188 and 190. Thus, since circuits 186, 188 and 190 are reset by the CLR signal at the beginning of each frame of video data, as successive pixels are accepted the 12-bit number represented by the outputs of circuits 186, 188 and 190 will be incremented each time a pixel is accepted.

The outputs from pins 11–14 of circuit 186 (which represent the four most significant bits of the 12-bit address number generated by circuits 186, 188 and 190) are fed to pins 2, 5, 14 and 11 respectively of an integrated circuit 192. Similarly, the outputs from pins 11–14 of circuit 188 (which represent the four middle bits of the aforementioned 12-bit address) are fed to pins 2, 5, 14 and 11 respectively of integrated circuit 194, and to the outputs from pins 11–14 of circuit 190 (which represent the four least significant bits of the aforementioned 12-bit address) are fed to pins 2, 5, 14 and 11 respectively of an integrated circuit 196. Integrated circuits 192, 194 and 196 are each a Schottky quadruple 2-input 3-state multiplexer of the commercially-available 74-LS257 type. Pin 1 (the select input) of each of circuits 192, 194 and 196 is provided with the COM/-$\overline{CAM}$ signal from pin 10 of circuit 142A (FIG. 8) received via line 304 and connectors CR and MR, as described above with reference to FIG. 6.

The second set of inputs to each of the multiplexer circuits 192, 194 and 196 is provided from lines 19-8 of bus 288; as explained above with reference to FIG. 7, these lines 19-8 of bus 288 carry signals corresponding to the 12 least significant bits on the computer address bus 286, buffered via the buffers 122 and 126. Pins 3, 6, 13 and 10 of circuit 192 are connected to lines 19-16 respectively of bus 286, and thus receive signals corresponding to those on lines 11-8 respectively of computer address bus 286. Similarly, lines 3, 6, 13 and 10 of circuit 194 are connected to lines 15-12 respectively of bus 288 and receive signals corresponding to lines 7-4 respectively of computer address bus 286, while pins 3, 6, 13 and 10 of circuit 196 are connected to lines 11-8 respectively of bus 288 and thus receive signals corresponding to lines 3-0 of computer address bus 286.

Multiplexer circuits 192, 194 and 196 serve to permit both the computer address bus 286 and the 12-bit counter formed by circuits 186, 188 and 190 to furnish addresses to the memories of the memory board. When COM/CAM goes low, indicating that the computer has instructed the interface to acquire video data, the outputs of circuits 192, 194 and 196 track the inputs thereto from circuits 186, 188 and 190 respectively, whereas when COM/CAM goes high the outputs from circuits 192, 194 and 196 will track the inputs from bus 288, and thus the twelve least significant bits on the computer address bus 286.

As already mentioned, the memories used in the video-computer interface presently being described are too slow to acquire video data at the rate at which it is being received, and accordingly special circuitry is used so that one or other of two different memories is enabled, depending upon whether the 12-bit address represented by the outputs from circuits 192, 194 and 196 is odd or even i.e. depending upon whether the least significant bit (the output from pin 9 of circuit 196) is a 1 or 0. Accordingly, the outputs from pins 4, 7, 12 and 9 of circuit 192 (representing the four most significant bits of the 12-bit address to be used by the memories) are supplied to pins 2, 3, 6 and 7 respectively of each of a pair of integrated circuits 210 and 216. Similarly, the outputs from pins 4, 7, 12 and 9 of circuit 194 (representing the four middle bits of the 12-bit address) are fed to pins 2, 3, 6 and 7 respectively of a pair of integrated circuits 212 and 218. The outputs from pins 4, 7 and 12 of pin 196 (representing bits 3, 2 and 1 of the 12-bit address) are similarly fed to pins 2, 3 and 6 respectively of a pair of integrated circuits 214 and 220. Each of circuits 210, 212, 214, 216, 218 and 220 is a 4-bit bistable latch of the commercially-available 74LS75 type. As will be described in more detail below, circuits 210, 212 and 214 are arranged to act, in effect, as a single 10-bit latch which is enabled when the address from circuits 192, 194 and 196 is odd, subject to certain other conditions described below, and similarly, circuits 216, 218 and 220 are arranged to act as a single 10-bit latch when the address is even, subject to the same conditions.

To allow for proper enablement of the latch circuits 210-220, the output from pin 9 of circuit 196, representing the least significant bit of the address provided circuits 192, 194 and 196, is passed to pin 9 of 202B, which is a second inverter on the 74LS04 integrated circuit 202 already mentioned. The output from pin 9 of circuit 196 is also placed on a line 223 for purposes described below. The inverted output from pin 8 of 202B is passed to pin 9 of 201A. Integrated circuit 201 is a quadruple 2-input positive NAND gate of the commercially-available 74LS00 type. The second input to pin 10 of gate 201A is the ACCPIX signal from pin 10 of inverter 120E (FIG. 10) received via connectors CN and MN, as described above with reference to FIG. 6. The output from pin 8 of gate 201A is fed to pin 12 (the D input) of 208A. Integrated circuit 208 is a dual positive-edge-triggered flip-flop of the commercially-available 74LS74 type. Pin 11 (the clock input of flip-flop 208A) receives the ERC signal from pin 11 of driver 130E via connector MM, as described above with reference to FIG. 6. Pins 10 and 13 (the preset and clear inputs) of flip-flop 208A are connected to the +5 V supply line. The Q output from pin 9 of flip-flop 208A is fed to pin 5 of integrated circuit 206, which is a data selector/multiplexer of the commercially-available 74LS157 type. The Q̄ output from pin 8 of flip-flop 208A is fed to pin 11 of circuit 206.

The output from pin 9 of circuit 196, representing the least significant bit of the address, is fed to pin 13 of 201B, a second NAND gate on integrated circuit 201 already mentioned. The second input to pin 12 of gate 201B is the ACCPIX signal from connector MN. The output from pin 11 of gate 201B is fed to pin 2 (the D input) of 201B, which is the second flip-flop on the 74LS74 integrated circuit 208 already mentioned. Pin 3 (the clock input) of flip-flop 208B receives the ERC signal from the connector MM, while pins 1 and 4 (the clear and preset inputs) of flip-flop 208B are grounded. The Q output from pin 5 of flip-flop 208B is fed to pin 2 of integrated circuit 206, while the Q̄ output from pin 6 of flip-flop 208B is fed to pin 14 of circuit 206.

Pins 3 and 6 of circuit 206 are connected to the +5 V supply line. Pin 13 receives the output from pin 9 of circuit 196, while pin 10 receives the corresponding inverted signal from pin 8 of inverter 202B. Pin 1 (the select input) of circuit 206 receives the COM/CAM signal from line 304 via connector MR. To produce the input to pin 15 (the strobe input) of circuit 206, the device select signal DS received from pin 4 of inverter 120A (FIG. 7) via line 290 and connector MU is fed to pin 1 of 201C, which is a third NAND gate on the 74LS00 integrated circuit 201 previously mentioned. The second input to pin 2 of gate 201C is the memory inhibit signal, MI, from pin 8 of gate 124 (FIG. 7) received via line 292 and connector M10, as described above with reference to FIG. 6. The output from pin 3 of gate 201C is fed to pin 10 of 198B, a second AND gate on the 74LS08 integrated circuit 198 previously mentioned. The second input to pin 9 of gate 198B is the COM/CAM signal from line 304, and the output from pin 8 of gate 198B is fed to pin 15 (the strobe input) of circuit 206.

The output from pin 4 of circuit 206 is a latch odd signal which enables circuits 210, 212 and 214. Similarly, the output from pin 7 of circuit 206 is a latch even signal which enables 216, 218 and 220. Although the circuitry in the middle part FIG. 11 is somewhat complicated, those skilled in the art will readily be able to derive the conditions for generation of these latch odd and latch even signals. In particular, since the inputs DS and MI to gate 201C will only both go high when the most significant hexadecimal digit on the computer address bus is the preselected one requiring action by the interface, and when that address is not one of the 64 reserved addresses which indicate action by the interface other than writing to memory, the output from gate 201C (which is an enable signal and is placed on a line 221 for purposes to be described below) will only go low for the 4032 unreserved addresses. Accordingly, the output from gate 198B will only go high (disenabling circuit 206 and locking all its outputs low) when one of the 64 reserved addresses is involved and when COM/$\overline{\text{CAM}}$ is high, the latter condition indicating that the computer wishes to receive video data from the interface. This serves to prevent reading of data from the reserved addresses in the memory. Except for blocking of the 64 reserved addresses, when COM/$\overline{\text{CAM}}$ is high, the feeding of this signal to the select input of pin 1 will cause the outputs at pins 4 and 7 to track the corresponding high inputs at pins 3 and 6, thereby generating simultaneous latch odd and latch even signals and enable the computer to read all the video data stored in the memories.

When COM/$\overline{\text{CAM}}$ is low, indicating that the computer wishes the interface to acquire video data, the situation is more complicated and the overall result is that provided ERC is following its usual alternating pattern, indicating that the camera is actually sending video data to the interface, and ACCPIX is high, indicating the video data relates to an accepted pixel, when the output from pin 9 of circuit 196 goes high, indicating an odd address, pin 4 of circuit 206 will go low while pin 7 will go high, thereby generating a latch odd but not a latch even signal. On the other hand, when the output from pin 9 of circuit 196 is low, indicating an even address, pin 4 of circuit 206 will go high and pin 7 will go low, thereby generating a latch odd but not a latch even signal. However, because the flip-flops 208A and 208B are positive-edge-triggered and receive $\overline{\text{ERC}}$ at their clock inputs, toggling of the outputs of those flip-flops is synchronized with the positive transitions of $\overline{\text{ERC}}$, which occur half-way through each pixel period. Accordingly the transitions between latch odd and latch even signals lay one-half of a pixel period behind the corresponding transitions in the signal from pin 1 of circuit 196, for reasons which will be discussed below with reference to FIG. 14B.

The latch odd signal from pin 4 of circuit 206 is fed to pins 4 and 13 (the two enable inputs) of each of circuits 210, 212, and 214. The latch odd signal from pin 4 of circuit 206 is also placed on a line 213 for purposes described below. When the latch odd signal is high, the circuits 210, 212 and 214 are thus enabled, the outputs from pins 16, 15 11 and 9 each of circuits 210 and 212 and from pins 16 and 15 of circuit 214, which represent the 10 most significant bits of the 12-bit address furnished by circuits 192, 194 and 196, are placed on lines 11-2 of an odd bus 211. When the latch odd signal goes low, the existing address is latched on bus 211. Similarly, the latch even output from pin 7 of circuit 206 is fed to pins 4 and 13 of each of circuits 216, 218 and 220 so that when this latch even signal goes high the output from pins 16, 15, 11 and 9 of each of circuits 216 and 218 and from pins 16 and 15 of circuit 220 will correspond to the ten most significant bits of the address furnished by the circuits 192, 194 and 196, and these outputs are placed on lines 11-2 of an even bus 215; when the latch even signal goes low, this existing address is latched on bus 215. The latch even signal from pin 7 of circuit 206 is also placed on a line 217 for purposes to be described below.

The output from pin 11 of circuit 214 representing the inverse of the second least significant bit of the address output by 214, is fed to pin 1 of 207A. Integrated circuit 207 is a quadruple 2-input positive NAND gate of the commercially-available 74LS00 type. The output from pin 10, representing the second least significant bit of the address, is fed to pin 4 of a further gate 207B on the same integrated circuit 207. The second input to these two gates, pin 2 of gate 207A and pin 5 of 207B, taken from pin 12 of circuit 206. In a generally similar manner, the output from pin 11 of 220 is fed from pin 12 of a gate 207C on the same integrated circuit 207, and the output from pin 10 of circuit 220 fed to pin 9 of a further gate 207B on the same integrated circuit. The second inputs to these two gates, to pin 13 of gate 207C and pin 11 of gate 207D, are taken from pin 9 of circuit 206. The outputs from pin 6 at gate 207B, pin 11 of gate 207C, pin 3 of gate 207A and pin 8 of gate 207D are placed on lines 1–4 respectively of a memory enable bus 219. When the interface is applying video data, only one of the lines of the bus 219 will go low at any time, the number of the line which goes low being determined by the last two bits of the address furnished from circuit 196, and the transitions between memory enable signals being delayed relative to the corresponding changes at pin 12 and 9 of circuit 196 by one-half of a pixel period for reasons explained above with reference to the latch odd and latch even signals.

In FIG. 12, integrated circuits 236, 238, 240, 242, 244, 246, 248 and 250 are memory chips of the commercially-available 2114 type. Pins 15-17, 1-4 and 7-5 of each of memory circuits 236, 238, 244 and 246 are connected to lines 11-2 respectively of odd bus 211 and thus receive 10-bit addresses when the latch odd signal goes high. Similarly, pins 15-17, 1-4 and 7-6 of memory circuits 240, 242, 248 and 250 are connected to lines 11-2 respectively of even bus 215 and receive 10-bit addresses when the latch even signal goes high. (For simplicity, pin numbers of shown only on memory circuit 236. The spatial layout of pins in FIG. 12 is identical on the other seven memory circuits.) Pin 8 of circuits 236 and 244 and connected to line 4 of memory enable bus 219, pin 8 of circuits 238 and 236 to line 3 of the same bus, pin 8 of circuits 240 and 248 to line 2 of the same bus, and pin 8 of circuits 242 and 250 to line 1 of the same bus. Since, as already mentioned, only one line of bus 219 will go low at any one time, it will be seen that the memory circuits are used in four pairs, namely 236/244, 238/246, 240/248, and 242/250, and pair being enabled at any one time being determined by which of the lines of bus 219 goes low.

To control the direction of data flow into and out of the memories (i.e. to control whether the memories are being written into, or read from) the COM/$\overline{\text{CAM}}$ signal (on line 304, received via connector MR) and the R/$\overline{\text{W}}$ signal (from pin 13 of driver 130A (FIG. 7) via line 288-21 and connector MW, as described above with reference to FIG. 6) are fed to the two inputs of 198C, which is a third AND gate on the 74LS08 integrated circuit 198 previously mentioned. The output from gate 198C is fed to pin 10 of each of the memory circuits 236-250. Thus, to produce writing of data into the memories, both COM/$\overline{\text{CAM}}$ and R/$\overline{\text{W}}$ must go low; if either signal goes high, reading from the memory circuits can occur.

The aforementioned circuitry for supplying addresses, and enable and select inputs to the memory circuits 236-250 is relatively straightforward. The circuitry in the left-hand part of FIG. 12, which handles data flow to and from the memory circuits 236-250 is rather more complicated, for a number of reasons. Firstly, the memory circuits must be able to both receive video data from the camera data bus 306 and output video data to the computer data bus 284 (FIG. 7) via the bus 288, line 7–0 (writing of data from the computer data bus into the memories, which permits the memories to act as auxiliary memories for the computer, is possible e.g. for testing purposes, but is not required for normal operation of the interface). Secondly and more importantly, as already mentioned the video data for any pixel only remains on the bus 306 for approximately 0.22 microseconds, an interval which is insufficient to permit the enabled pair of memory circuits to acquire the video data. Accordingly, in accordance with the special data handling techniques of the invention, excessive 8-bit set of video data arriving on the bus 306, each set representing the intensity of one pixel, are latched alternately on a pair of latches 224 and 232. Thus, the video data from each pixel remains on the latches for longer than the time it is present on the bus 306, giving the memory circuits time to acquire the video data from the latches.

More specifically, lines 7–0 of bus 306 are connected to pins 18, 17, 14, 13, 8, 7, 4 and 3 respectively of each of integrated circuits 224 and 232. Integrated circuits 224 and 232 are each an octal D-type latch of the commercially-available 74LS373 type, and for simplicity pin numbers are shown only on circuit 224; the spatial layout of pins in FIG. 12 is identical for both circuits. Pin 1 of circuits 224 and 232 (the output control) receives the COM/$\overline{CAM}$ signal from line 304 via connector MR; thus, output from these latches will only occur when COM/$\overline{CAM}$ is set low by the computer, thereby instructing the interface to acquire video data from bus 306. Pin 11 of circuit 224 (the enable latch input) receives the latch odd signal on line 213 from pin 4 of circuit 206 (FIG. 11), while pin 11 of circuit 232 receives the latch even signal from pin 7 of circuit 206 via line 217. Since, as explained above, when the interface is set to acquire video data and the controller board produces the signal ACCPIX indicating that the pixel from which video data is being receives is one for which retention of the video data is required, the latch odd and latch even signals are generated alternately for successive accepted pixels, the effect of the aforementioned connections to pins 7 of circuits 224 and 232 is that the data arriving on bus 306 from pixels for which the data is to be retained, will be latched alternately in circuits 224 and 232, and since while video data is being acquired, the output controls (pin 1) of circuits 224 and 232 are continuously held low, the video data thus latched in 224 and 232 will be continuously present on the outputs thereof.

The outputs from pin 19, 16, 15 and 12 of circuit 224, representing the four most significant bits of the 8-bit video data latched in 224 are sent to pins 14–11 respectively of memory circuits 236 and 238. Similarly, the outputs from pins 9, 6, 5 and 2 of circuit 224, representing the four least significant bits of the video data latched in 224, are fed to pins 14–11 respectively of memory circuits 244 and 246. In an exactly similar manner, the outputs from pins 19, 16, 15 and 12 of circuit 232 are fed to pins 14–11 respectively of memory circuits 240 and 244, while the outputs from pins 9, 6, 5 and 2 of circuit 232 are fed to pins 14–11 respectively of memory circuits 248 and 250. Thus, each 8-bit piece of video data latched in 224 and 232 is split for storage, the four most significant bit being stored in the enabled one of memory circuits 236–242 and the four least significant bits stored in the enabled one of memory circuits 244–250.

Communication between the memory circuits 236 and 250 and lines 7–0 of bus 288 (which, as explained above with reference to FIG. 7, are in two-way communication with the similarly-numbered line of the computer data bus 284) is effected by four integrated circuits 222, 226, 228 and 230, each of which is a type 8T28 buffer manufactured by Signetics Corp. Again, for convenience, pin numbers are shown only on circuit 222; the spatial layout of the pins on all four circuits 222, 226, 228 and 230 is identical in FIG. 12.

Line 288-7 is connected to pins 2 and 4 of circuits 222 and 228. Line 228-6 is connected to pins 14 and 12, line 228-5 to pins 5 and 7 and line 228-4 to pins 11 and 9 of the same pair of circuits 222 and 228. Similarly, line 288-3 is connected to pins 2 and 4, line 288-2 to pins 14 and 12, line 288-1 to pins 5 and 7 and line 288-0 to pins 11 and 9 of each of the circuits 226 and 230.

Output and direction control for circuitry 222, 226, 228 and 230 is established by the circuitry shown in the lower left-hand portion of FIG. 12. The enable signal from pin 3 of gate 201C (see FIG. 11) is passed via line 221 to pin 2 of 234A. Integrated circuit 234 is a dual 1-of-4 decoder/demultiplexer of the commercially-available 74LS139 type. Pin 3 of circuit 234A receives the $\phi 2$ signal from pin 5 of driver 130B (FIG. 7) via line 288-20 and connector MV. Pin 2 of 234A receives the COM/$\overline{CAM}$ signal from line 304 via connector MR. Pin 7 of circuit 234A is connected to pin 15 of circuit 234B, which is the second decoder/demultiplexer on the integrated circuit 234. Pin 14 of 234B receives the signal from line 223, representing the output from pin 9 of circuit 196 (FIG. 11). Pin 13 of 234B is the R/$\overline{W}$ signal from pin 13 of driver 130A (FIG. 7) via line 288-21 and connector MW. The output from pin 9 of 234B is fed to pin 1 (the enable input of buffer circuits 222 and 226. The output from pin 10 of 234B is similarly fed to pin 1 of circuits 228 and 230. The output from pin 11 of 234B is fed to pin 3 of 202C, which is a third inverter on the 74LS04 integrated circuit 202 already mentioned, and the corresponding inverted output from pin 4 of 202C is fed to pin 15 circuits 222 and 226. Finally, the output from pin 12 of 234B is fed to pin 5 of 202D, a fourth inverter on the 74LS4 integrated circuit 202 already mentioned, and the corresponding inverted output from pin 6 of 202D is fed to pins 15 of circuits 228 and 230.

Those skilled in the art will appreciate that the effect of the integrated circuit 234 and inverters 202C and 202D is as follows. Unless the enable input to pin 15 of 234B is low, all the outputs of 234B will go high and all four buffer circuits 222, 226, 228 and 230 will be disabled. This enable input to pin 15 will only go low when the output from pin 7 of 234A goes low, which will only occur when the following conditions are simultaneously present:

A. The enable signal on line 221 is low, indicating that the address appearing on the computer address bus 286 is not one of the 64 reserved addresses previously mentioned;

B. The $\phi 2$ signal is high, indicating that the computer is in a position to accept data; and C. The R/$\overline{W}$ signal is high, indicating that the computer has asked the video computer interface to supply video data from its memories to the computer.
When all three of the above conditions are fulfilled, and the signal on line 223 is high (i.e. the last bit of the address generated by circuit 196 (FIG. 11) is a 1, and thus the address is odd), the output from pin 9 of 234B goes low, while the outputs at pins 10, 11 and 12 remain high. Thus, pin 1 of buffer circuits 222 and 226 goes low, and since the output from pin 11 of 234B is still high, the inverse of this output supplied to pins 15 of buffer circuits 222 and 226 also goes low. With the inputs to pins 1 and 15 of buffer circuits 222 and 226 both low, these two buffer circuits are enabled and read video data from the enabled pair of memory circuits 236/244 or 248/246 onto lines 7-0 of bus 288, thereby transmitting video data from these memory circuits to the computer. Since the output from pin 10 of 234B is still high, buffer circuits 228 and 230 are not enabled and no reading takes place from memory circuits 240, 242, 248 and 250.

If, on the other hand, the signal on line 223 is low, indicating that the least significant bit of the address is a 0 and thus that the address is even, the output from pin 10 of 234B goes low, while the outputs at pins 9, 11, 12 of 234B remain high, thus causing reading of data from the enabled pair 240 and 248 or 242 and 250 of the memory circuits via enable buffer circuits 228 and 230 onto line 7-0 of bus 288 and thence to the computer data bus 284, while buffer circuits 222 and 226 are diabled.

Figure 13A:
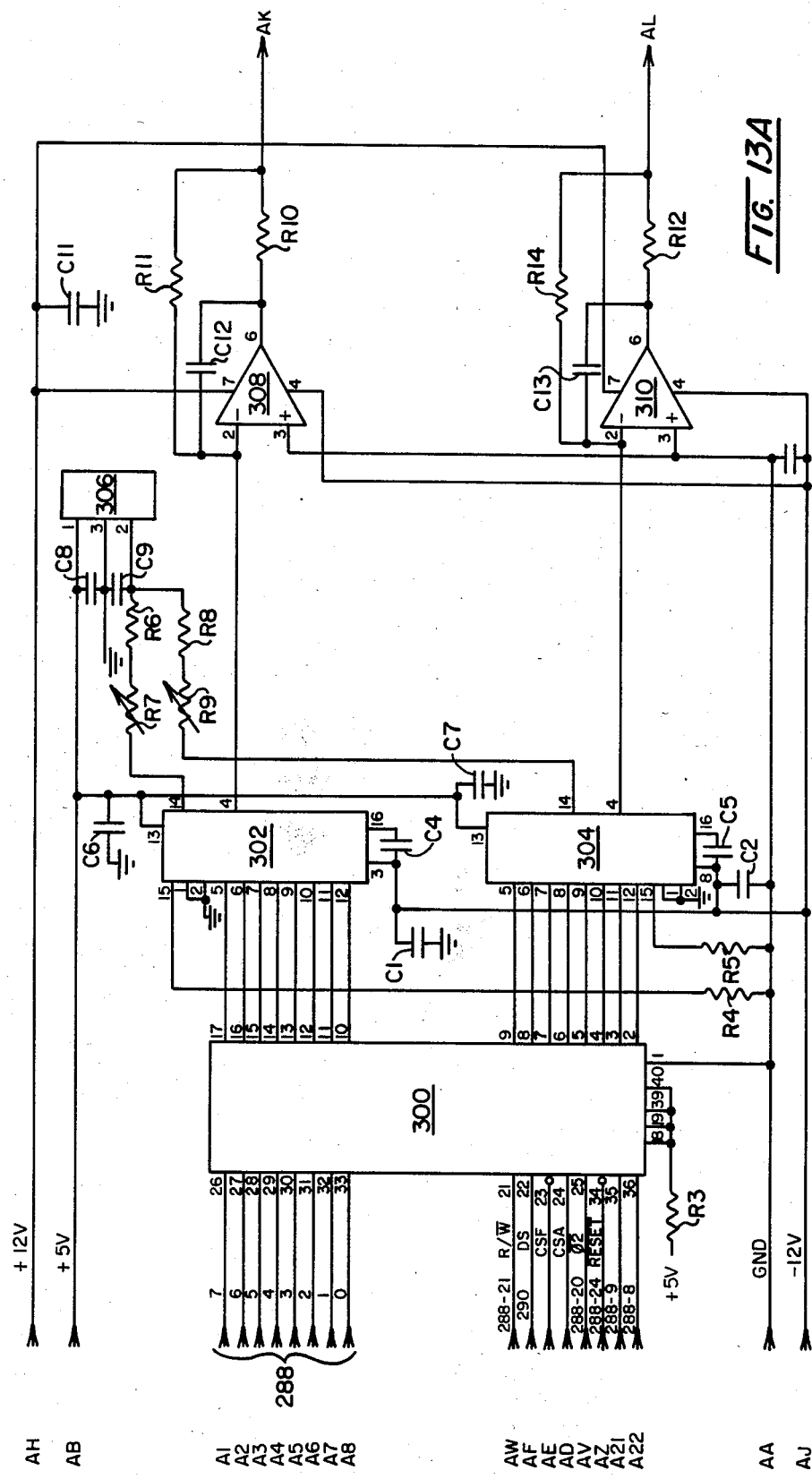
FIGS. 13A and 13B are circuit diagrams of the analog board shown in FIG. 5.

The circuitry of the analog board 280 will now be described with reference to FIGS. 13A and 13B. In FIG. 13A, integrated circuit 300 is a Rockwell 6520 Peripheral Interface Adapter similar to the integrated circuits 150 and 160 described above with reference to FIGS. 9 and 10. Circuit 300 is connected in a manner similar to that of circuit 150. Pins 26-33 of circuit 300 are connected to lines 7-0 of bus 288 and thus receive either data from the computer sent via computer data bus 284 (FIG. 7), as described below with reference to block 650 in FIG. 17. In fact, the major purpose of circuit 300 is to acquire such video data from bus 288, to latch it in its internal registers and thereafter to output this data to one of the two digital/analog converters described below for conversion to analog form and forwarding to the oscilloscope 76, as described in more detail below. Pin 21 of circuit 300 receives the R/$\overline{W}$ signal from line 288-21 via connector AW, while line 22 receives the DS signal from line 290 via connector AF. Pin 23 of circuit 300 receives the control signal CSF from circuit 144B, pin 9 (FIG. 8) and pin 24 of circuit 300 receives the control signal CSA from pin 2 of inverter 120D (FIG. 8). Thus circuit 300 is addressed by addresses XFDC-XFDF. Pin 25 of circuit 300 receives the $\phi 2$ signal from pin 5 of driver 130B (FIG. 7) via line 288-20 and connector AV. Pin 34 of circuit 300 receives the $\overline{RESET}$ signal from the computer via line 287-7, line 288-24 and connector AZ. Pins 35 and 36 of circuit 300 are connected to lines 9 and 8 respectively of bus 288 and thus receive the two least significant bits appearing on the computer address bus 286 (FIG. 7). Pins 18, 19, 39 and 40 of circuit 300 are connected to the +5 V supply line via a resistor R3, while pin 1 is grounded via connector AA.

The outputs from pins 17-10 of circuit 300 (port B in the manufacturer's nomenclature) are fed to pins 5-12 respectively of an integrated circuit 302. Similarly, the outputs from pins 9-2 of circuit 300 (port A in the manufacturer's nomenclature) are fed to pins 5-12 respectively of integrated circuit 304. Integrated circuits 302 and 304 are 8-bit digital/analog converters of the commercially-available 1408 type, manufactured by Motorola.

Pins 1 and 2 of circuits 302 and 304 are grounded. Pin 15 of circuit 302 is connected to the ground line (connector AA) via a resistor R4 and pin 15 of circuit 304 is similarly grounded by a resistor of 5. The −12 V supply line (connector AJ) is connected via a capacitor C1 to ground, via a capacitor C2 to the ground connector AA and directly to pin 3 of circuits 302 and 304. Pins 3 and 16 of each of circuits 302 and 304 are interconnected via capacitors C4 and C5 respectively.

Pin 13 of circuits 302 and 304 is connected to the +5 V supply line via connector AB, stabilization of the +5 V inputs to these pins 13 being achieved by capacitors C6 and C7 connected between the +5 V supply line and ground. The +5 V supply line is also connected to pin 1 of a power supply integrated circuit 306, which of the commercially-available Motorola 1403 type pin 3 of circuit 306 is grounded, pins 1 and 3 are bridged by a capacitor C8 and pins 3 and 2 are bridged by a capacitor C9. The output from pin 2 of circuit 306 is fed via a fixed resistor R6 and a variable resistor R7 connected in series to pin 14 of circuit 302, and is also fed via a fixed resistor R8 and a variable resistor R9 connected in series to pin 14 of circuit 304.

The analog output from pin 4 of circuit 302 is fed to pin 2 of an integrated circuit 308, which is a type CA 3100 analog amplifier manufactured by RCA. The positive input to pin 3 of amplifier 308 is taken from the ground connector AA, this ground connector being connected to the −12 V supply line (connector AJ) via a capacitor C10. Amplifier 308 receives the conventional power connections, +12 V from connector AH at pin 7 and −12 V from connector AJ at pin 4; note that the +12 V supply line is connected to ground via capacitor C11. The analog output from pin 6 of amplifier 308 is passed via a resistor R10 to connector AK and thence via one of the lines 86 to the oscilloscope 76, as described above with reference to FIG. 6. To provide feedback for the amplifier 308, pins 6 and 2 thereof are bridged by a capacitor C12, while the terminal of R10 remote from the amplifier 308 is connected to pin 2 of the amplifier via resistor R11.

The analog output from pin 4 of circuit 304 is treated in an exactly parallel manner, being fed to pin 2 of an amplifier 310, which is a further CA3100 amplifier identical to amplifier 308 just described. Amplifier 310 receives connections at pins 3, 4 and 7 identical to the corresponding connections to amplifier 308 and its analog output from pin 6 is sent via a resistor R12 to connector AL and thence via the second line 86 to the oscilloscope 76, as described above with reference to FIG. 6. Amplifier 310 is provided with a feedback capacitor C13 and a feedback resistor R14 connected in a manner exactly parallel to C12 and R11 associated with amplifier 308.

Figure 13B:
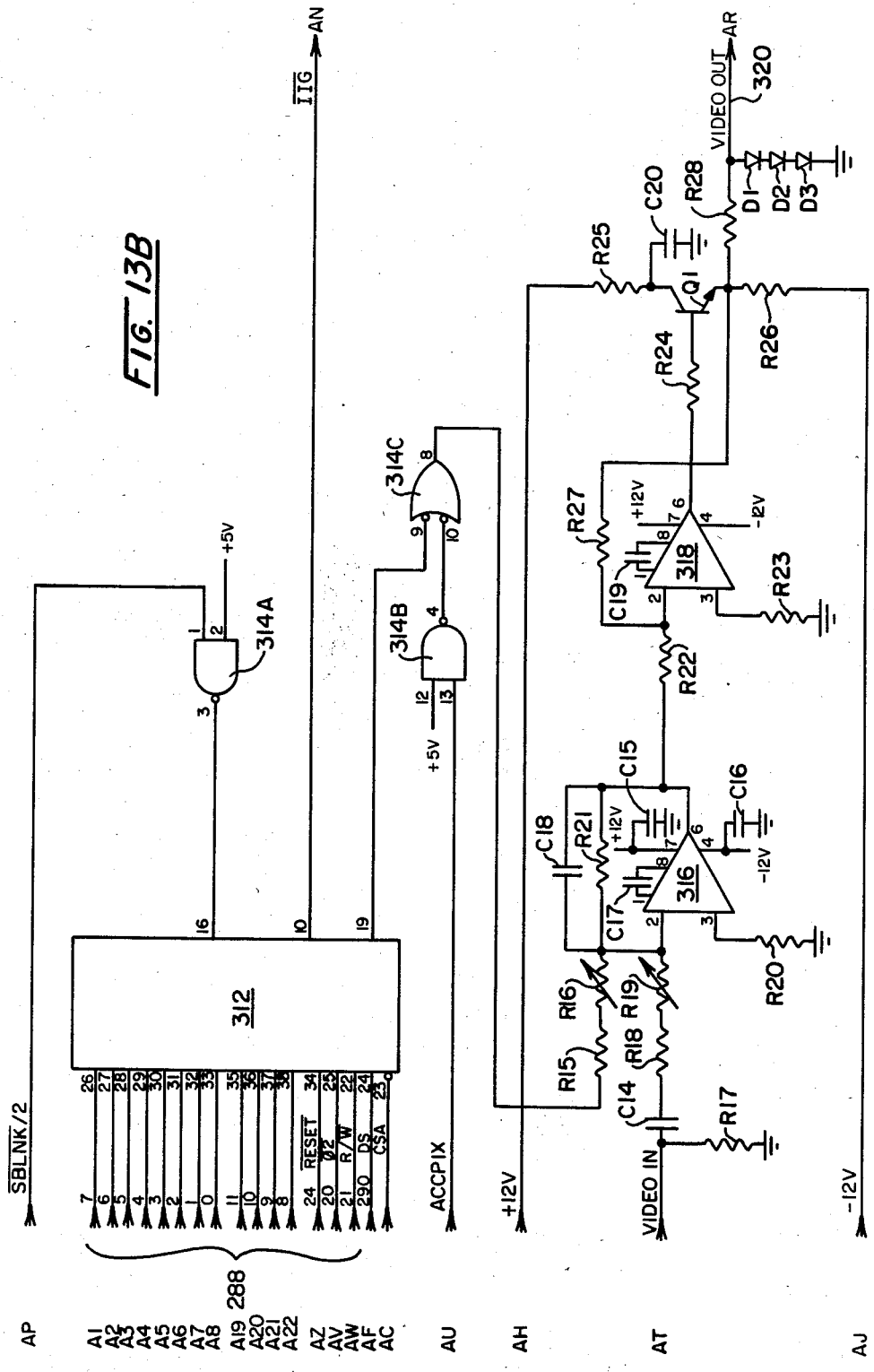

In FIG. 13B, integrated circuit 312 is a Rockwell R6522 Versatile Interface Adapter identical to integrated circuit 142 described above with reference to FIGS. 8-10. The connections to circuit 312 closely resemble those to circuit 142. Pins 26-33 of circuit 312 are connected via connectors A1-A8 respectively to lines 7-0 respectively of bus 288, and thus indirectly to the computer data bus 284, as explained above with reference to FIG. 7. Lines 35-38 of circuit 312 are connected via connectors A19-A22 respectively to lines 11-8 respectively of bus 288 and thus receive the four least significant bits appearing on the computer address bus 286 (see description of FIG. 7 above). Pin 34 of circuit 312 receives the $\overline{RESET}$ signal from line 288-24 via connector AZ, pin 25 of circuit 312 receives the $\phi 2$ signal from pin 5 of driver 130B (FIG. 7) via line 288-20 and connector AV and line 22 of circuit 312 receives the R/$\overline{\text{W}}$ signal from pin 13 of driver 130A via line 288-21 and connector AW. Pin 24 of circuit 312 receives the signal DS from pin 4 of inverter 120A (FIG. 7) via line 290 and connector AF. Pin 23 of circuit 312 receives the control signal CSB fro circuit 144A, pin 5 (FIG. 8). Thus, circuit 312 is addressed by the computer by addresses XFE0-XFEF.

The $\overline{\text{SBLNK}}$/2 signal from pin 10 of circuit 148 (FIG. 8) is fed via connectors CT and AB (see description of FIG. 6 above) to pin 1 of 314A. Integrated circuit 314 is a quadruple 2-input positive NAND gate of the commercially-available 74LS00 type. The second input to pin 2 of gate 314A is taken from the +5 V supply line, so that gate 314A acts as an inverter. The output from pin 3 of gate 314A is supplied to pin 16 of circuit 312.

As the analog board 280 is presently configured, the only function of circuit 312 is to generate the $\overline{\text{IIG}}$ which, as previously explained, causes integration of image intensity by the video camera over a number of frames. Upon receipt of a preselected address from the computer which causes appropriate inputs at pins 23, 24 and 35-38 of circuit 312, circuit 312 loads from the computer data bus 284 (FIG. 7) via lines 7-0 of bus 288, a value simultaneously appearing on the data bus and specifying whether $\overline{\text{IIG}}$ should be high or low. Circuit 312 then proceeds to output the appropriate value of $\overline{\text{IIG}}$ from its pin 2 to connector AN for transmission to the video camera via driver 130F (see FIG. 6). However, it will be appreciated that circuit 312 has considerable unused input/output capcity, and thus provides capability for further digital inputs/outputs if required in later variations of the interface.

The ACCPIX signal from pin 10 of inverter 120E (FIG. 10) is fed via connectors CU and AU to pin 13 of 314B, which is a second NAND gate on the 74LS00 integrated circuit already mentioned. The second input to pin 12 of gate 314B is taken from the +5 V supply line, so that gate 314B acts as an inverter. The output from pin 4 of gate 314B is fed to pin 10 of 314C, which is a third NAND gate on the 74LS00 integrated circuit 314 previously mentioned. The second input to pin 9 of gate 314C is taken from pin 19 of circuit 312. As the analog board is presently configured, this input to pin 9 of gate 314C is held low, so that 314 simply acts as a second inverter. However, obviously the provision of this connection to circuit 312 allows for possible gating of ACCPIX by various other functions if such gating is believed to be appropriate for modification of the image to be shown on the monitor.

Thus, at present, the output from pin 8 of 314C is the original ACCPIX signal. This signal is passed via a fixed resistor R15 and variable resistor R16 connected in series to pin 2 (the negative input) of integrated circuit 316, which is a type CA 3100 analog amplifier identical to integrated circuit 308 described above with reference to FIG. 13A. The analog video signal from the video camera is fed to connector AT, which is connected to ground via a resistor R17 and which is also connected via a capacitor C14, a fixed resistor R18 and a variable resistor R19 also connected in series to pin 2 of integrated circuit 316.

Circuit 316 receives the conventional power connections, +12 V to pin 7 and −12 V to pin 4. Pins 7 and 4 are also connected to ground via connectors C15 and C16 respectively. Pins 1 and 8 of circuit 316 are bridged by a capacitor C17 and pin 3 (the positive input) of circuit 316 is grounded via a resistor R20. To provide feedback for amplifier circuit 316, the output from pin 6 of circuit 316 is fed via an RC circuit (comprising a capacitor C18 and a resistor R21 connected in parallel) to pin 2 of circuit 316. The output from pin 6 of circuit 316 is also fed via a resistor R22 to pin 2 (the negative input) of circuit 318, which is another type CA 3100 analog amplifier. Pin 3 (the positive input) of circuit 318 is grounded via a resistor R23, pins 1 and 8 of circuit 318 are interconnected via a capacitor C19, pins 7 and 4 of circuit 318 receive the conventional +12 V and −12 V respectively power inputs. The output from pin 6 of circuit 318 is fed via resistor R24 to the base of an NPN transistor Q1. A resistor R25 and a capacitor C20 are connected in series between the +12 V supply line and ground, the resistor R25 being connected to the positive supply line, and the mid-point of the bridge formed by R25 and C20 is connected to the collector of Q1. The emitter of Q1 is connected to the −12 V supply line via a resistor R26, to pin 2 of circuit 318 via a resistor R27 and to a video output line 320 via a resistor R28. To limit the output potential which can be placed on the line 320, line 320 is connected to the anode of the first of a series of three Zener diodes, D1, D2 and D3 all connected in series, D3 being connected to ground. The video output line 320 is connected via connector AR and line 84 (see description of FIG. 6 above). As will be apparent to those skilled in the art, the effect of the circuitry shown in the lower part of FIG. 13B is that, when ACCPIX is low indicating a non-accepted pixel, the video output on line 320 is simply an amplified version of the video input from the camera. However, when ACCPIX goes high, the video output in effect reflects ACCPIX (the exact value depending of course upon the value of variable resistor R16), resulting in a heightened intensity on the video monitor. Thus, the circuitry enables an observer to determine visually the accepted pixels, which will appear with high intensity on the video monitor 72 (FIG. 4) and will be recorded by the video tape recorder 74.

FIG. 14A is a timing diagram showing the way in which various signals generated by the controller board are synchronized with signals from the video camera. It should be noted that the time-scale in the row controller timing diagram in the upper half of FIG. 14A is different from that in the column controlling timing diagram shown in the bottom half of the same figure, although of course, within each timing diagram the time scale is constant and the various rows of each timing diagram show the correct temporal correlations of the signals.

The top line in FIG. 14A is the $\overline{\text{SBLNK}}$ signal from the camera. As previously mentioned, this signal is high when video data is being transmitted by the camera for the major part of each horizontal line, but goes low for the relatively brief horizontal blanking interval occuring between lines. Shown immediately below $\overline{\text{SBLNK}}$ in FIG. 14A is $\overline{\text{SBLNK}}$/2, the output from pin 10 of flip-flop 148 (FIG. 8). As explained above, the interface is designed for use with the camera in the interlacing mode in which each line of video data is repeated twice and hence, in order to avoid storage of redundant video information by the interface, it is necessary to ensure that only data from the alternate lines of new video data is acquired by the interface. Flip-flop 148 divides the frequency of $\overline{\text{SBLNK}}$ by two, thus producing a signal which is high for the first (new) line of each successive pair of lines, and low for the second (repeated) line of each pair. Since flip-flop 148 is a positive-edge-triggered flip-flop of the 74LS109 type, both the positive and negative transitions of $\overline{SBLNK}$/2 coincide with the positive transitions in $\overline{SBLNK}$, so that the value of $\overline{SBLNK}$/2 during the horizontal blanking intervals remains at the value for the preceding line of video data. Also because flip-flop 148 is reset by $\overline{VSYNC}$ (FIG. 8) $\overline{SBLNK}$/2 is high for the same lines on each frame of video data.

The third line of FIG. 14A shows the end-of-frame signal EOF, the output from in 13 of gate 164A. As explained above, because of the way in which the comparators 156–159 operate, EOF goes high at the beginning of the first accepted line and goes low at the beginning of the first line following the new line of video data having the last row value latched in circuit 150. Accordingly, both the positive and negative transitions of EOF are synchronized with the positive transitions of both $\overline{SBLNK}$ and $\overline{SBLNK}$/2.

The fourth line of FIG. 14A represents the form of the signal ACCROW (the output from pin 11 of gate 164A in FIG. 9) when the row skip value latched in circuit 142 is set to 0 i.e. the video computer interface is set to acquire video data from every new line. Basically, ACCROW comprises EOF gated by both $\overline{SBLNK}$ and $\overline{SBLNK}$/2; this double gating is necessary to ensure that ACCROW only goes high on new lines of video data and also that the positive and negative transitions of ACCROW are synchronized with the corresponding transitions in $\overline{SBLNK}$. This double gating of EOF with $\overline{SBLNK}$ and $\overline{SBLNK}$/2 is effected by NAND gate 167A in FIG. 9. However, because of the presence of the negative-edge triggered flip-flops 166A and 166B, the beginning and end of the pulses of ACCROW are delayed relative to the beginning and end of EOF. Thus, after the positive transition of EOF, a complete cycle of $\overline{SBLNK}$/2 elapses (i.e. one new line of video data is skipped) before the first positive transition of ACCROW occurs. Thereafter, with the row skip value set to 0, the positive and negative transitions in ACCROW follow the corresponding transitions in $\overline{SBLNK}$ for which $\overline{SBLNK}$/2 is high until the negative transition of EOF occurs. Because of the presence of the flip-flop 166A and 166B, a positive transition of ACCROW can occur coincident with the negative transition in EOF and the simultaneous positive transitions in $\overline{SBLNK}$ and $\overline{SBLNK}$/2, and a further pulse of ACCROW follows immediately the negative transition of EOF. Thus, in the example shown in FIG. 14A, in which EOF goes high for new rows 3–7 of video data, ACCROW actually goes high to accept rows 4–8. The remaining two lines of the row controller timing diagram in FIG. 14A show the corresponding ACCROW signals for the same EOF signal but with row skip values of 1 and 2 respectively. Note that the first row accepted is the same in each case because of the manner in which the counter 162 and the comparator 172 (FIG. 9) operate.

The re-setting of counter circuits 152 and 154 (FIG. 9) by VSYNC (which goes high during the blanking interval successive frames) ensures that EOF is always generated for the same rows in each frame. Similarly, the resetting of counter circuit 162 by ACCROW ensures proper synchronization of the ACCROW pulses with EOF.

The time controller diagram in the lower part of FIG. 14A illustrates the temporal correlation between ACCROW and ACCPIX. When ACCROW goes high, counter circuits 174 and 175 (FIG. 10) are reset to 0 and counting can only occur when ACCROW goes low i.e. it is the negative transition of ACCROW which actually enables circuits 174 and 175 for counting and leads to the generation of ACCPIX. Furthermore, since pin 3 of circuits 174 and 175 is held high, it will be seen from the truth table for the 74LS93 counter that counting will only occur when ERC, the input to pin 2 of each circuit goes low; this ensures that positive transitions in signal 164-1 are synchronized with positive transitions in ERC, which indicate the start of new pixels (the signal $\overline{ERC}$ from the video camera is arranged so that it is the negative transitions in this signal, and thus the positive transitions in the inverse signal ERC, which indicate the start of new pixels.)

FIG. 14A shows a specimen signal 164-1 in which columns 2–5 are accepted. This is purely for illustrative purposes; as those skilled in the art will appreciate, since the negative transition of ACCROW coincides with a negative transition in $\overline{SBLNK}$, the period immediately following the negative transition in ACCROW is actually horizontal blanking interval for which no meaningful video data are received.

The next line below signal 164-1 in FIG. 14A is the ACCPIX signal corresponding to the 164-1 signal shown and with the column skip value set to 0. For reasons exactly parallel to those discussed above with reference to EOF and ACCROW, the presence of the flip-flops 173A and 173B (FIG. 10) delays both the positive and negative transitions in this ACCPIX signal by one complete cycle of ERC (i.e. by one full pixel) relative to the corresponding transitions in 164-1. Unlike ACCROW, when the column skip value is set to 0, ACCPIX remains high for the full width of the window because there are no blanking intervals between adjacent pixels comparable to the horizontal blanking interval between adjacent lines reflected in the low portions of $\overline{SBLNK}$. It is believed that those skilled in the art will have no difficulty in understanding the generation of the ACCPIX signals shown for column skip values of 1 and 2 respectively, since their method of derivation should be obvious from the foregoing discussion of ACCROW. Again, note that whatever the column skip value, the first accepted pixel is always the same.

Figure 14B:
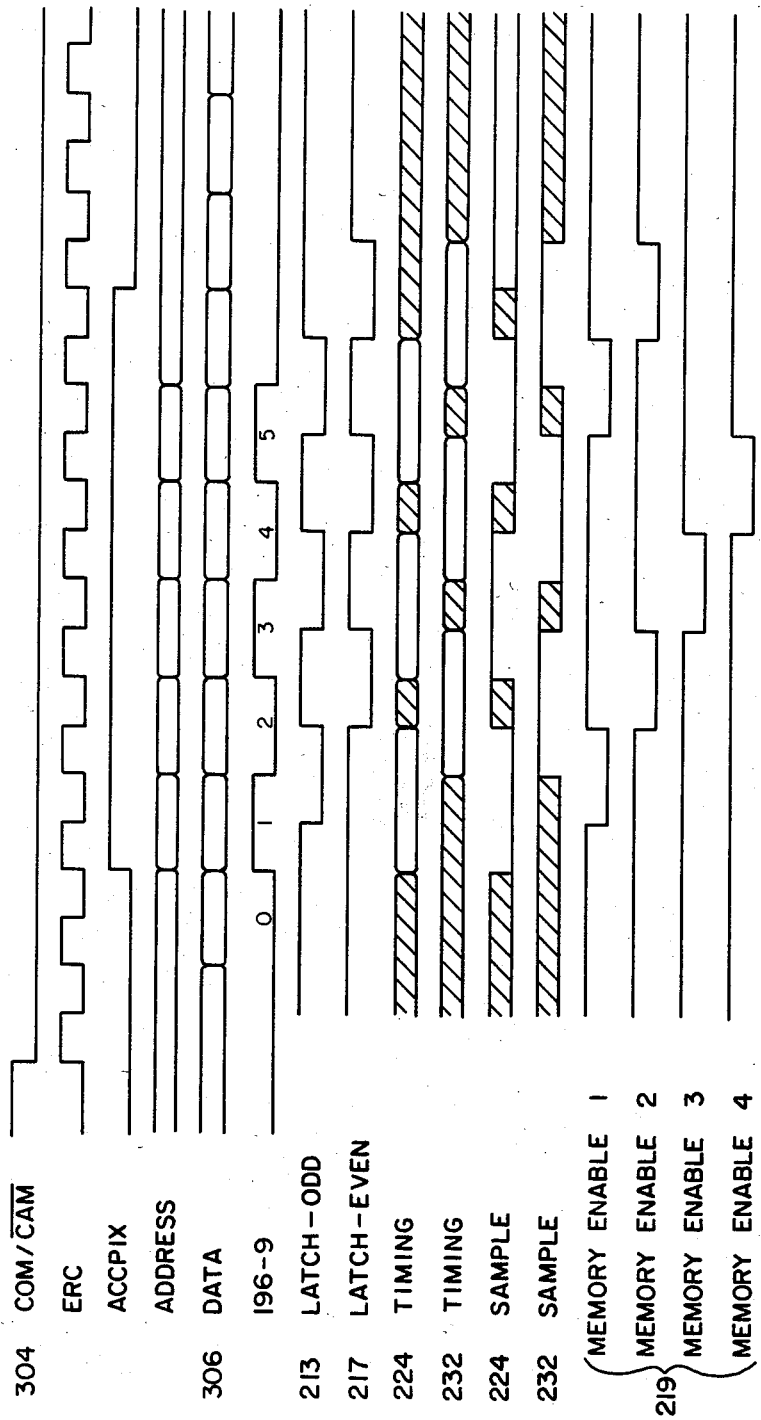

FIG. 14B is a timing diagram showing the temporal correlation of various signals produced on the memory board shown in FIGS. 11 and 12. The uppermost line in FIG. 14B is the COM/$\overline{CAM}$ signal on line 304. As already explained, this signal goes low, as shown on the left-hand side of FIG. 14B when the computer instructs the camer to acquire video data. The next line of FIG. 14B shows the signal ERC previously discussed with reference to FIG. 14A. The third line of FIG. 14B shows the ACCPIX signal previously shown in the fourth line of the column controller timing diagram in FIG. 14A; for simplicity, in the following discussion a column skip value of 0 is assumed.

The fourth line of FIG. 14B shows the intervals at which the address to be used by the memory can change, and the subsequent line shows the correspondingly synchronized intervals at which the data on the bus 306 can change. Both the address and the data signals are course synchronized with each other and with ERC, since ERC undergoes a complete cycle for each pixel while the address and data signals change only between adjacent pixels.

The sixth line of FIG. 14D represents the output from pin 9 of circuit 196 (FIG. 11). Since this represents the least significant bit of the 12-bit address generated by counters 186, 188 and 190 when COM/$\overline{CAM}$ is low, signal 196-9 is low and high in alternate pixels when ACCPIX is high (since counters 186, 188 and 190 can only be enabled when ACCPIX is high, because of the presence of gate 198A). When ACCPIX is low, signal 196-9 remains low.

The next two lines of FIG. 14B represent the latch-odd and latch-even signals on lines 213 and 217 respectively. When these two signals are being produced with COM/$\overline{\text{CAM}}$ low, they are always of opposite sign. The duration of the pulses in these two signals is the same as 196-9, but because of the presence of the flip-flops 208A and 208B (FIG. 11) the negative transitions of the latch-odd signal is one-half pixel, and the negative transition of the latch-even signal 1½ pixels, behind the first positive transition of signal 196-9. Similar delays occur at the end of the last negative transition of signal 196-9.

The last four lines of FIG. 14B show the four memory enable signals on lines 1–4 respectively of bus 219 (FIGS. 11 and 12). As will readily be apparent to those skilled in the art, these memory enable signals are produced by combining the latch-odd and latch-even signals with the signals from pins 10 and 11 of circuits 214 and 220, which represent the second least significant bit of the 12-bit address generated by counter circuits 186, 188 and 190 and relayed by multiplexer circuit 192, 194 and 196. Thus, for example, memory enable 1 only goes low on the first, third etc. low values of latch-odd, while memory enable 3 only goes low on the second, fourth, etc. low value of latch-odd. The relationship between latch-even and memory enables 2 and 4 is exactly the same.

To understand lines 9–12 of FIG. 14B, it is necessary to refer back to FIG. 12, and in particular the connections to the camera buffers 224 and 232. For convenience, in the following description, successive pixel periods will be designated by the numbers shown on the line designated "196-9" in FIG. 14B.

As previously mentioned in connection with FIG. 12, pin 1 (the output enable of circuits 224 and 232 receives the COM/$\overline{\text{CAM}}$ signal, which is kept low when the computer instructs the interface to acquire video data. Accordingly, when the interface is acquiring video data, circuits 224 and 232 always produce outputs. Because the video data arriving on bus 306 vary in an unpredictable manner, it is not possible to determine in advance whether the value on any line of bus 306 will change between any two adjacent pixels. However, it is known that such changes on bus 306 will only occur at transitions between adjacent pixels. Accordingly, when ACCPIX in FIG. 14B goes high between the pixels designated 0 and 1, the new values present on bus 306 will be reflected substantially immediately in the outputs from both circuits 224 and 232, since at this time both the LATCH-odd signal on line 213 and the LATCH-EVEN signal on line 217 are both high at this time, permitting the inputs of buffers 224 and 232 respectively to change substantially instantaneously with any change in the inputs thereto. However, half way through pixel 1, the LATCH-ODD signal goes low, thereby latching the outputs of circuit 224 at their existing value i.e. at the values corresponding to the video data for pixel 1. Accordingly, the outputs from buffer 224 will not change when the video data change between pixel 1 and pixel 2, and the video data for pixel 1, which appeared on the outputs of circuit 224 at the begining of pixel 1, will remain fixed until half way through pixel 2, when the LATCH-ODD signal again goes high. Thus, the video data for pixel 1 remain on the outputs of buffer 224 for one and one-half pixel periods, as indicated in the line designated "224-TIMING" in FIG. 14B, in which the blank areas denote the periods in which the outputs of buffer 224 cannot change and the shaded areas indicate the periods within which they can change. Since the LATCH-ODD signal only goes low in alternate pixels, the effect is that the video data for each odd-numbered pixel are present on the outputs of buffer 224 for one and one-half pixel periods. For example, the line designated "224-SAMPLE" shows the value of any output of 224 for which the corresponding input is a 0 at pixels 1 and 5 and 1 at pixel 3.

The operation of buffer 232 is exactly similar except that, of course, since the negative and positive transitions of LATCH-EVEN are 1 full pixel period behind the corresponding transitions in LATCH-ODD, it is the video data for the second, fourth and sixth etc. Accepted pixels are present on the outputs of circuit 232 for one and one-half pixel periods, as indicated by the line designated "232-TIMING" in FIG. 14B. The line designated "232-SAMPLE" shows the value of any one output of circuit 232 for which the corresponding input is a 1 at pixels 2 and 6 and a 0 at pixel 4.

WELD POOL WIDTH MEASUREMENT PROGRAM

The program used in the process control computer 80 shown in FIG. 4 to measure weld pool width in the image observed by the camera 68 (FIG. 4) will now be described with reference to FIGS. 15, 16A, 16B, 17 and 17A–H.

Figure 16A:
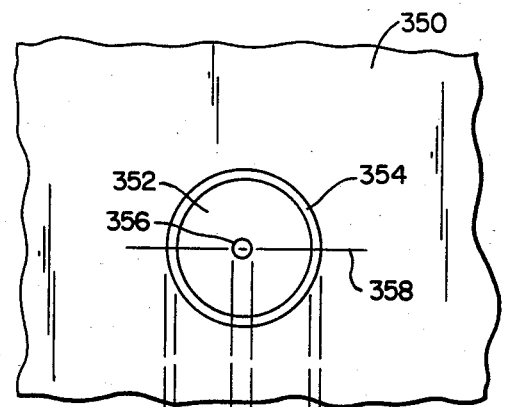
FIG. 16A is a schematic plan view of a weld puddle the width of which is to be measured by the weld puddle width measuring method of the invention.
Figure 16B:
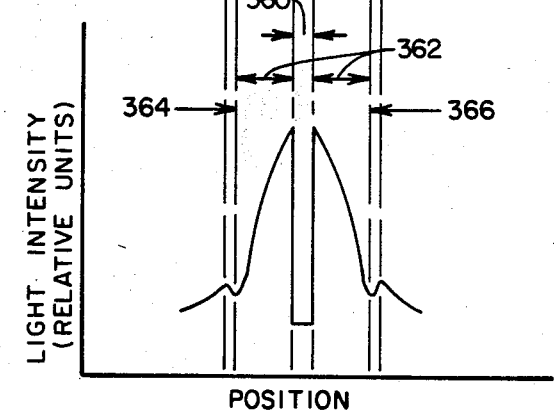
FIG. 16B is a graph showing the light intensity distribution across a diameter of the weld puddle shown in FIG. 16A.

FIG. 16A depicts an idealized version of the image seen by the camera 68 of a weld puddle and the surrounding metal. The image shows several different zones, namely base metal 350, which surrounds the weld pool and reflects light only diffusely, molten metal 352, which comprises the weld pool itself and which reflects light in a mirror-like fashion because of its molten state, and resolidifying metal 354 lying immediately adjacent the edge of the weld pool and in which the molten metal has begun to resolidfy. Also shown in FIG. 16A is the electrode "shadow" 356 which, for reasons described above, is present in the instant axial viewing apparatus. (It will of course be appreciated that the so-called "shadow" is an artifact of the viewing system and that the electrode does not in fact throw a shadow on the weld pool. However, hereinafter the term "shadow" will be used for convenience.) For simplicity, in FIG. 16A the shadow 356 has been shown as located centrally in the weld pool, although in actual operation it has been found that the electrode shadow will appear in various locations in the central area of the weld pool but not necessarily in the center thereof. Line 358 is one of the scanning lines of the camera 68 (FIG. 4) which produces the image shown in FIG. 16A, and FIG. 16B shows an idealized graph of light intensity along the line 358. It will be seen from FIG. 16B that five separate zones of light intensity are present along the line 358. Firstly, since line 358 passes through the electrode shadow, it includes a central zone 360 of low light intensity caused by the electrode shadow 356. On either side of the zone 360 are two zones 362 caused by the molten weld pool 352. Finally, the resolidifying metal 354 produces outer zones 364 and 366 of relatively low light intensity. Beyond the zones 364 and 366, the light intensity tends downwardly as the intensity of reflection from the metal 350 diminishes.

As shown in FIG. 16B, it has been found that two local minima of light intensity are present at the junctions between zones 362, 364 and 366; these local intensity minima occur at the edges of the weld pool and thus to measure the weld pool width it is necessary to detect these local mimima and to calculate the distance between them. Obviously, the true weld pool width will only be determined if the line 358 extends across a diameter of the weld pool. However, when using the instant axial viewing apparatus the weld pool will always be located in the same area of the image and thus even if the line 358 does not lie on a diameter of the weld pool, measuring the distance between the local mimima of light intensity on the line 358 will still yield a value representative of weld pool width, which will be sufficient, if, for example, it is only intended to use the data for maintaining weld pool width constant. The program described below analyzes only a single line of video data, allowing the operator to select which line is to be analyzed and thus to position the line 358 on a diameter of the weld pool in order to produce a proper weld pool width. It will be apparent to those skilled in the art, that by routine modification of the program described below, a series of lines of video data from the same image could be analyzed and the greatest width of weld pool thus determined calculated so as to yield a true maximum weld pool width without manual setting of the apparatus to position the line 358 in the correct position.

In the presently preferred embodiment of the invention, the computer 80 (FIG. 4) is a Rockwell AIM-65 computer which uses the Rockwell 6502 microprocessor chip. The AIM-65 computer, which is manufactured by Rockwell International Corporation, is used in the stock configuration as received from the manufacturer, with the jumpers in the standard configuration shown in the manufacturer's operating manual. The program described below was written in the 6502 microprocessor chip assembler language, further details of which are in the 6502 reference manual. All the programs described below written in this assembler language can be accommodated on a type 2716 EPROM inserted into socket Z-26 of the expansion board of the AIM-65 computer. As previously described, the computer operates on video data stored in the memory board of the video computer interface.

Figure 15:
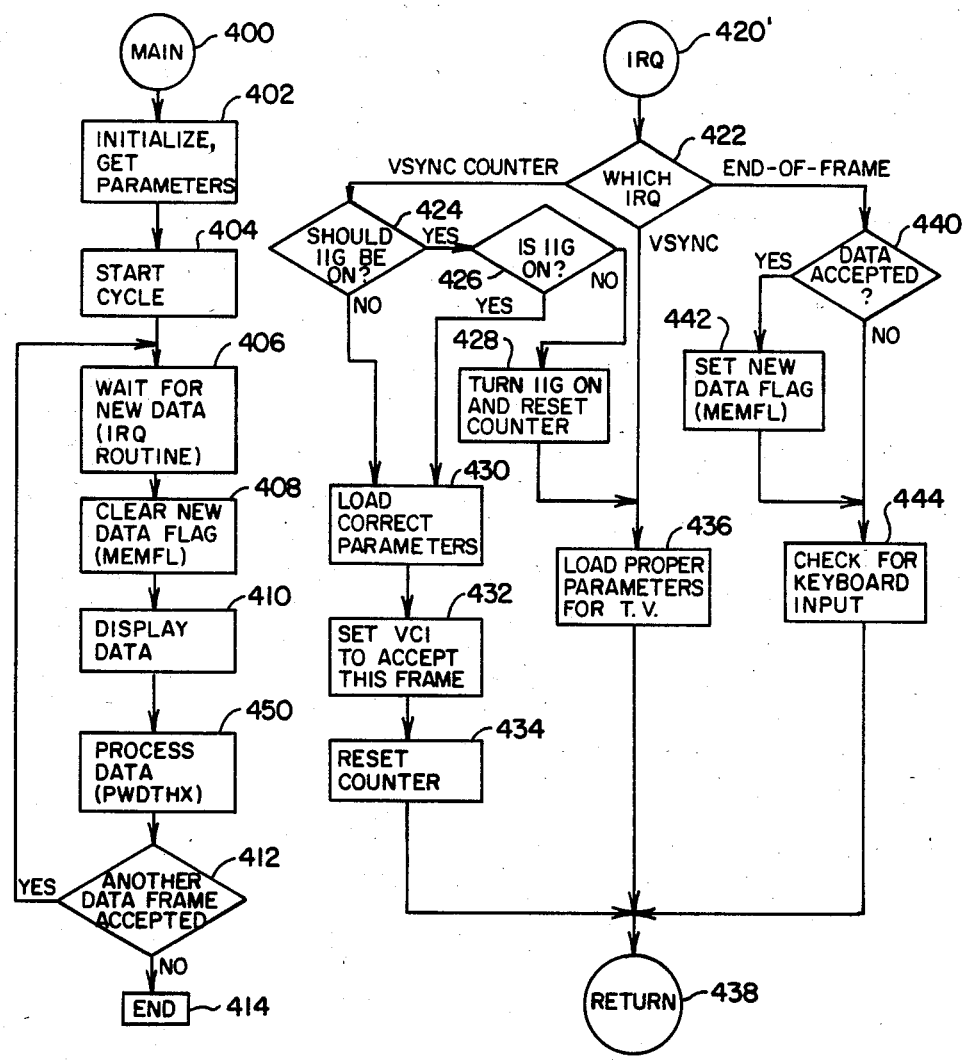
FIG. 15 is a flow chart showing the overall architecture of the computer program used in the computer shown in FIG. 4 to carry out the weld puddle width measuring method of the invention.
Figures 17, 17A:
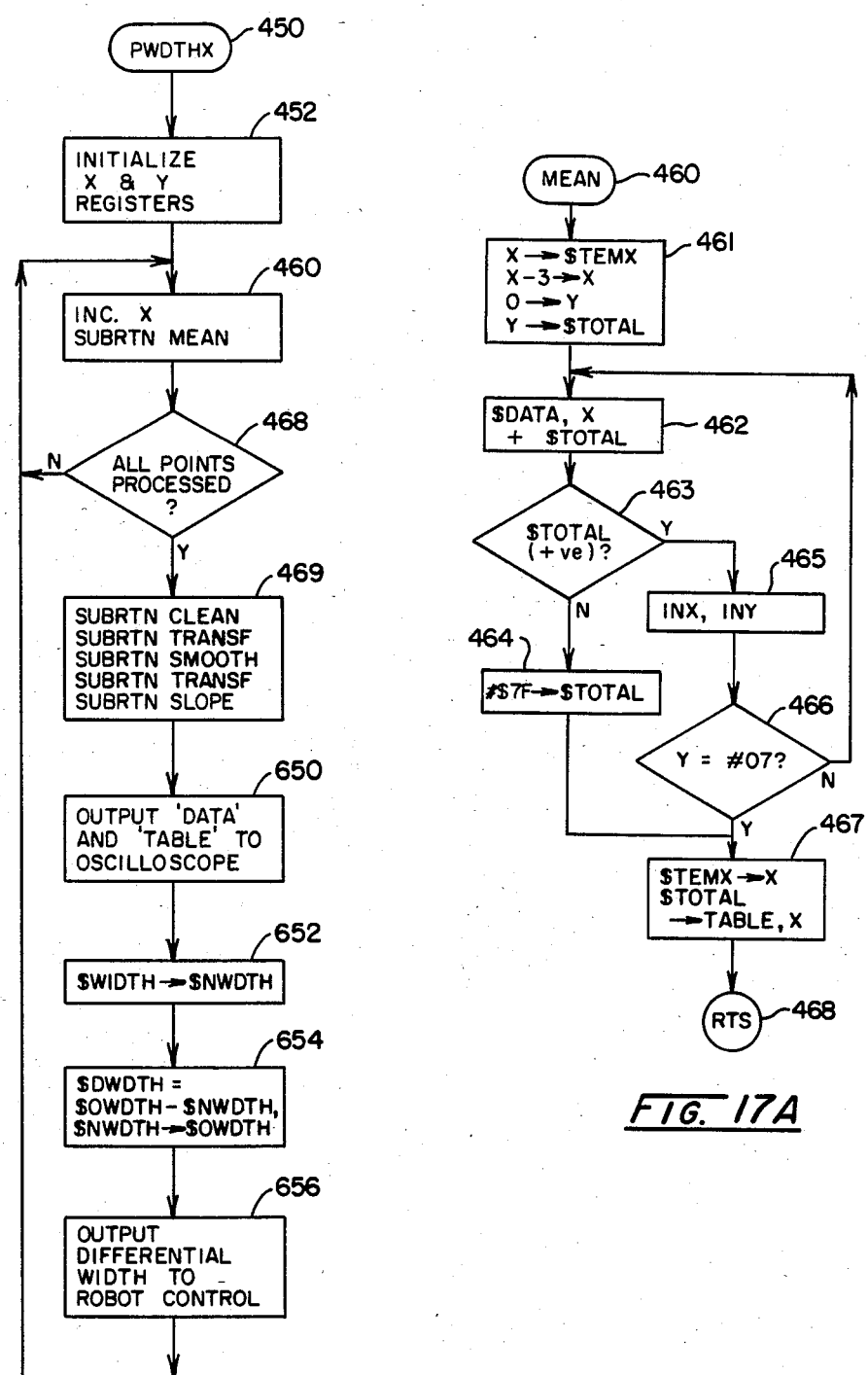
FIG. 17 is a flow chart of the program PWDTHX shown in FIG. 15.
FIG. 17A is a flow chart of the subroutine MEAN shown in FIG. 17.
Figure 17G:
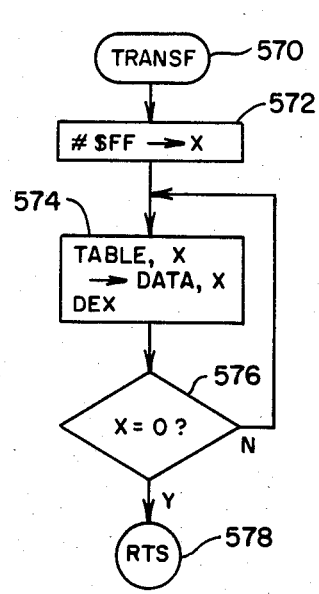
FIG. 17G is a flow chart of the subroutine TRANSF shown in in FIG. 17.
Figure 17H:
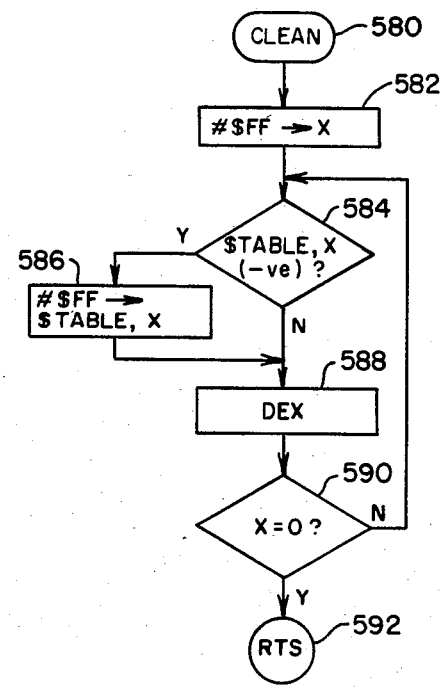
FIG. 17H is a flow chart of the subroutine CLEAN shown in FIG. 17.

The program shown in FIGS. 15 and 17-17H is, as previously mentioned, intended to find the position of the local mimima of intensity denoting the edges of the weld pool by analysis of a single line of video data, such as the line 358 in FIG. 16A. Accordingly, to use this program, the operator sets the video computer interface so that the window from which video is stored comprises a single complete line of video data. This is accomplished by setting the last row parameter equal to the first row parameter plus one, the first column value to 0, the last column value to FF(255 in decimal notation) and the row skip and column skip values both to 0. The resultant-single line window appears in the highlighted picture seen on the video monitor 72 (FIG. 4) as a single white line closely resembling a typical cursor and accordingly this single-line window may hereinafter be referred to by the term "cursor".

The program assumes that the light intensity curve along the line to be analyzed has the form shown in FIG. 16B, and that pixel 127 (75 in hexadecimal notation) lies within zone 360 in the light intensity minimum caused by the shadow of the electrode. Thus, the program will only function correctly if the operator sets the cursor so that the line 358 does indeed pass through the shadow of the electrode so that the zone 360 is present in the path of light intensity. Furthermore, the program assumes that the light intensity maxima present at the junctions between zones 360 and 362 are sufficiently bright that the corresponding light intensity values will have to be reduced to the predetermined limit by the subroutine MEAN described below, but that the areas which include the local intensity mimima i.e. the outer parts of zones 362 and zones 364 and 366, are of sufficiently low intensity not to be set to this predetermined limit by subroutine MEAN. Finally, the program assumes that any aberrations in light intensity values within zones 362 are insufficient to produce false local minima after the light intensity data has been smoothed by the various techniques described below. It has been found that the foregoing conditions are normally satisfied in practice.

In FIGS. 17-17H, the prefix "#" denotes an absolute number rather than a variable or register name. Prefix "$" denotes a hexadecimal value.

The overall architecture of the program employed is shown in FIG. 15. As will be seen from that figure, the program comprises a MAIN program and an INTERRUPT program. The MAIN program begins at 400 and proceeds to a block 402 where the computer is initialized and various parameters are acquired. The parameters acquired specify the window from which the memory board of the video computer interface is to acquire video data and include the first and last line and column of the window and the row skip and column skip functions which specify for exactly which pixels of video data should be stored by the video computer interface. The appropriate parameters are entered upon the keyboard of the computer 80 and stored in appropriate places therein, in a manner conventional in the art. After the appropriate parameters have been acquired at block 402, the program proceeds at 404 to start the video data analysis cycle by commanding the video computer interface to acquire the specified video data. Next, the waits at block 406 until new video data is available (from the INTERRUPT program). As will be explained below, when new data is available, the INTERRUPT program sets a new data flag, MEMFL, and the MAIN program waits at block 406 until it detects that this flag has been set. When setting of this flag is detected, the MAIN program proceeds, at block 408, to clear the flag MEMFL and then, at block 410, passes through a display data routine which outputs data to the oscilloscope 76 (FIG. 4) for observation by the operator. Obviously, if the oscilloscope display of data is not required, block 410 can be eliminated. From block 410, the MAIN program proceeds at block 450, to execute program PWDTHX to calculate the weld pool width from the newly-acquired data. Once PWDTHX has been completed, the MAIN program proceeds to decision block 412, which instructs the video computer interface to acquire the appropriate portion of another frame of video data. The MAIN program may leave block 412 to a termination point 414 if no data is to be accepted, but normally loops back from block 412 to block 416 to await the new data. Thus, the MAIN program operates as a continuous loop only directing the video computer interface to accept new data (at block 412) when the data processing program PWDTHX has processed the previous data (at block 450).

The interrupt routien, IRQ, is triggered by receipt of an interrupt signal by the computer from the video computer interface via the line 420 (FIG. 5). The interrupt program begins at 420' (FIG. 15) and proceeds to a three-way decision block 422 which determines which type of interrupt is occuring.

The first possible type of interrupt is designated VSYNC COUNTER. The VSYNC COUNTER interrupt is produced by a counter (located within the computer) which counts VSYNC interrupts received from the video camera via the video computer interface, thereby counting the number of frames of data which have elapsed. The computer can be set by the operator so that every fourth, fifth or similar frame of video data will be acquired by the video computer interface. In this setting of the program a VSYNC COUNTER interrupt will be gewerated after the appropriate number of frames has elapsed and the program will proceed from block 422 via a decision 424 (whose purpose will be explained below) to a block 430, which causes the appropriate parameters (those acquired at block 402 of the main program) to be sent to the video computer interface. Next, at block 432, the video computer interface is set to acquire a frame of video data i.e. to store the video data corresponding to the selected pixels in the memories on the memory board of the video computer interface. This is effected simply by instructing circuit 142A (FIG. 8) to set COM/$\overline{\text{CAM}}$ low. Finally, at block 434 the VSYNC COUNTER is reset to 0 and the interrupt program terminates at 438 with a return to the main program.

Although the interrupt program functions in the manner described above when it is only required to acquire a single, unintegrated frame of video data. The interrupt program is also provided with means to take advantage of the integration feature of the preferred TM2500 video camera. As already mentioned, if the IIG is turned on (i.e. the signal $\overline{\text{IIG}}$ set to a low level) the camera will integrate over a number of frames. This integration feature allows an operator to bring the pixel grey intensity within the optimum range for analysis. For example, the system might be operated so that only every 10th frame of video data will be stored in the video computer interface but the intensity of the frame that is stored will be integrated over three "normal" frames. In this situation, a VSYNC COUNTER is initially set to 7 so that when seven frames of video data have passed the interrupt program leaves block 422 and enters block 424. At block 424, the program determines (from registers representing previous manual settings on the keyboard) that the $\overline{\text{IIG}}$ signal should be turned on and therefore block 424 via the YES exit thereof to block 426, where it determines whether the $\overline{\text{IIG}}$ signal is in fact on. On the first pass through block 426, the signal will of course not be on, so the program proceeds from block 426 to block 428, where the computer causes the video computer interface to turn the IIG signal on and resets the VSYNC COUNTER to an appropriate value. If, as in the example suggested above, integration is to be effected over three frames, block 428 will set the VSYNC counter to the value three. From block 428, the program proceeds to block 436, which is exactly similar to block 430 and causes the computer to send data specifying the appropriate pixels to be accepted to the video computer interface. However, since no block corresponding to block 432 follows block 436, the effect of block 436 is only to cause highlighting of the appropriate pixels on the video monitor. From block 436, the interrupt program returns to the main program via 438.

Thus, when the computer is operating in a mode which requires integration of the image by the camera, the first pass through block 244 causes the IIG signal to be turned on and the counter to be reset to specify the number of frames to be integrated, but does not cause the video computer interface to be set to acquire data, since the program never passes through block 432. After the appropriate number of frames for integration, the VSYNC COUNTER flag will again be set and the block 424 entered a second time. The program will again proceed to block 426, but on this occasion, since the $\overline{\text{IIG}}$ signal is already turned on, it will proceed from the YES exit of block 426 to block 430 and proceed successively through block 432 and 434 as previously described to cause the video computer interface to acquire data. At block 434, not only will the counter be rset to the appropriate value (7 in the above example), but the IIG signal will be turned off. Finally, the interrupt program will return to the main program via 438.

The second possible type of interrupt flag is a VSYNC flag, which simply indicates receipt of a VSYNC signal from the camera by the video computer interface. (As may be seen from the description of the video-computer interface, the only interrupt signal actually sent to the interface to the computer is signal IRQ on line 420. Upon receipt of an IRQ signal, the computer interrogates a register within circuit 142 (FIGS. 8–10), to discover whether the IRQ signal was caused by a VSYNC signal or an EOF signal, since circuit 142 generates an IRQ signal on receipt of either VSYNC or EOF.) When, at block 422, a VSYNC flag is found, the program proceeds directly to the aforementioned block 436 at which the proper parameters are sent to the video computer interface in order to cause highlighting of the display on the video monitor and of the interrupt routine then exits at 438.

The third type of interrupt handled by the interrupt program is an end-of-frame (EOF) interrupt. When a EOF interrupt is detected at block 422 (indicating that EOF has gone low after the last selected row has been passed), the program proceeds from block 422 to a block 440 which tests whether video data has been accepted. In fact, the decision block 440 merely tests whether the COM/$\overline{\text{CAM}}$ signal is low, indicating that (at block 432) the video computer interface was set to accept video data. If at block 440 it is determined that video data has been accepted, the program proceeds, at 442, to set the new data flag MEMFL, which, as explained above, causes the main program to process the new data. From either the NO exit of block 440 or from block 442, the program proceeds at 444 to check for keyboard input, by checking the keyboard buffer, and to effect appropriate adjustment of parameters. Those familiar with the AIM-65 computer will be aware that it contains a buffer which can store only the latest keystroke by the operator. However, since the interrupt program will proceed through block 444 once each frame (thus typically 30 times a second), handling a single keystroke at each pass through block 444 is sufficient. The system is arranged so that the operator can, by means of single keystrokes move the first row of the "window" to be analyzed up or down, move the last row up or down and move the first and last columns left or right. To move any of these parameters more than one line or pixel at a time, repeated keystrokes are required. Further, single keystrokes will effect modification of the row skipping and column skipping functions. Since this manner of modifying parameter values within a computer program is conventional in the art, it is believed that no further explanation is required. From block 444, the interrupt program, as usual, returns to the main program via 5483.

Those skilled in the art will appreciate that the provision of the three-way decision block 422 is optional and that if desired the interrupt routine shown in FIG. 15 could be replaced by three separate interrupt routines.

Further details of the data processing routine PWDTHX are shown in FIG. 17. From that figure it will be seen that the first step in PDWTHX is a block 452 at which registers X and Y are initialized. Next, at block 460, the X register is incremented and a subroutine MEAN is run to produce an average value of the intensity at the point X. Next, at 468, the program tests whether all the points of video data have processed i.e. whether X has reached its maximum value. If not, the program loops back to 460 and continues cycling through this loop until all points have been processed. Once all points have been process, the program leaves block 468 via the positive exit thereof and proceeds, at 469, to run successively subroutines CLEAN, TRANSF, SMOOTH, TRANSF and SLOPE. Subroutine CLEAN looks for (erroneous) negative numbers in the video data, sub-routine TRANSF transfers data between tables, sub-routine SMOOTH removes abberational points which do not conform to the type of curve expected (as shown in FIG. 16B) and finally sub-routine SLOPE detects the local minima denoting the edge of the weld pool and hence the width of the weld pool.

After all the subroutines in block 469 have been completed, the routine PDWTHX proceeds, at 650, to output data generated at block 469 to the oscilloscope (FIG. 4). Next, at 652, the width value generated at block 469, which has been stored in a register $WIDTH, is transferred to a "new width" register $NWDTH. Then, at block 654, a differential width is calculated by subtracting $NWDTH from a previously stored "old width" $OWDTH. Also at 654, the old width value $OWDTH is replaced by the new width value $NWDTH, in order that the width just calculated can serve as the old width value for the next pass through block 654. The program then proceeds, at block 656, to output the differential width just calculated to the robot control device, which will be described in detail below with reference to FIG. 18.

As already mentioned, the main and interrupt programs shown in FIG. 15 are programmed onto a type 2716 EPROM inserted in socket Z-26 in the expansion board of the Rockwell AIM-65 computer. However, because of space limitations, the various subroutines shown in FIG. 17 are loaded into a similar EPROM placed in socket Z-25 on the same board.

Details of the sub-routine MEAN are shown in FIG. 17A. This program sums the intensity values for each particular point with the similar values for the 3 points on each side, to establish a MEAN value of intensity at each data point. As those skilled in the art will appreciate, this averaging process removes system noise and allows the analysis to use more reliable data. Also, sub-routine MEAN sets an upper limit on the averaged intensity values which will be handled by the later sub-routines. Since the program is only determining weld pool width, the regions of very high intensity in the central parts of the zones 362 (FIG. 16B) are of no interest and setting an upper limit on the intensities being processed in later subroutines helps to avoid generating spurious values caused by abberations in the weld pool. Subroutine MEAN begins, at 461, by saving the value of X (previously set at block 460 in FIG. 17) to a storage register $TEMX. The X register is then set equal to X-3 and registers Y and $TOTAL are set to 0. Next, at 462, the data value $DATA,X, representing the intensity at point X is added to $TOTAL and, at 463, the resultant value of $TOTAL is checked to see if it is less than a predetermined limiting value 7F. (The question "$TOTAL(+ve)?" at block 463 actually means "Is the most significant bit of the eight-bit number at 0?". As those familiar with the Rockwell AIM-65 computer will be aware, the 6502 microprocessor is an eight-bit microprocessor and, of course when this microprocessor is in fact handling eight-bit numbers which require a sign, the most significant bit of the 8-bit number is used as the sign bit. Although the light intensity data never involves negative numbers, it is convenient to use the fine-testing operation of the 6502 microprocessor to test when the running total in $TOTAL exceeds 127 (in decimal notation).) Normally, $TOTAL would be less than 7F and the sub-routine will therefore proceed from 463 to 465, where the registers X and Y are incremented and then to 466 where Y is tested to see if it is equal to 7. Since Y has been set to 0 at 461, on the first six passes through blocks 465 and 466 Y will not be equal to 7 and thus the subroutine will leave block 466 via the NO exit thereof and load back to block 462. However, after the seventh pass through blocks 462, 463 and 465, $TOTAL will be equal to the sum of the values of $DATA, X for the point X and the three points on either side, and Y will be incremented to 7 at 465. Accordingly, on this seventh pass the subroutine will leave block 466 via the YES exit thereof and proceed to block 467, where the "correct" value of X is returned from $TEMX to the X register and the value of $TOTAL is stored in a table of values, TABLE, X. From block 467, the subroutine returns to the program PWDTHX at 468.

If, on any pass through the block 463, it is determined that $TOTAL is not less than 7F, the sub-routine proceeds, at 464, to set $TOTAL equal to 7F, and then proceeds through blocks 467 and 468 as previously described. Thus, the value of $TOTAL recorded in TABLE X at 467 can never exceed 7F.

As previously mentioned and as indicated at block 468 in FIG. 17, subroutine MEAN is repeated for each point in the line of video data acquired. Once this has been done, the next subroutine to be applied is subroutine CLEAN (shown in FIG. 17H), as indicated by block 469 in FIG. 17.

As shown in FIG. 17H, from a start point at block 580, subroutine CLEAN proceeds, at block 582, to set X equal to FF (255 in decimal notation) and then, at block 584, to test whether the corresponding light intensity value placed in TABLE, X by subroutine MEAN is negative i.e. whether it is greater than (decimal) 127. If so, the value in TABLE, X is replaced by FF at block 586. From block 586, or from the negative exit of block 584, the program proceeds at block 588, to decrement X and then to test, at block 590, whether X is equal to 0. If not, the program loops back to block 584 but if X is equal to 0, the subroutine is exited via block 592.

It will be apparent to those skilled in the art that the sole effect of subroutine CLEAN is to replace any averaged light intensity values in TABLE, X which are greater than $75 with $FF. Subroutine CLEAN was originally designed to deal with the first three and last three pixels of video data which, as will be apparent to those skilled in the art, cannot be processed by subroutine MEAN because the combined effect of blocks 461, 465 and 466 in subroutine MEAN (FIG. 18A) is that this subroutine can only operate on values of X such that values are present in TABLE, X for values from $X-3$ to $X+3$. (Although not shown in FIG. 17A, for obvious reasons subroutine MEAN must incorporate screening operations to ensure that it does not attempt to process values of X for which not all of the necessary values are present in TABLE,X.) It has now been realized that subroutine CLEAN is in fact unnecessary since, except for the first three and last three values of X, no numbers greater than $75 can remain in TABLE X because of the presence of blocks 463 and 464 in subroutine MEAN. Furthermore, even the first three and last three values in TABLE, X, which might contain values not corresponding to averaged video data from subroutine MEAN, in no way affect the determination of weld pood width since, as will be described below, subroutine SLOPE determines weld pool width by beginning from the middle of the line of video data and working outwards in both directions, ceasing inspection of the light intensity data when the minima are located. Accordingly, any aberrant values representing video data at the extreme ends of the line, these being the values in TABLE, X which are not processed by subroutine MEAN, will not be reached. Accordingly, if desired subroutine CLEAN and the subsequent execution of TRANSF in block 469 of subroutine PWDTHX (FIG. 17) may be omitted to save computer time, which is of course always desirable when the computer is being used to control weld pool width in real time.

As shown in block 469 of program PWDTHX in FIG. 17, following the execution of CLEAN, the next subroutine to be executed is TRANSF shown in FIG. 17G. From a start point at block 570, subroutine TRANSF proceeds, at block 572, to load $FF into register X. Then, at block 574, the corresponding averaged light intensity data from TABLE, X are transferred to DATA, X the corresponding location in a second table DATA. X is then decremented and tested at block 576 to determine if it has been reduced to 0. If not, the program loops back to block 574; however, when X has been reduced to 0, the subroutine TRANSF is exited via block 578.

As will be apparent to those skilled in the art, subroutine TRANSF simply serves to transfer all data from TABLE to DATA. The purpose of this transfer is simply to save memory space and to avoid having to provide such space for several different tables containing the several different sets of data generated during processing of each line of video data. As will be apparent from FIG. 17, subroutines MEAN, CLEAN, SMOOTH and SLOPE operate sequentially on any given set of video data so that the starting data for each subroutine can be discarded as the subroutine has been completed.

As shown at block 469 in FIG. 17, following this first execution of subroutine TRANSF, the next subroutine to be executed is SMOOTH shown in FIG. 17E. The purpose of subroutine SMOOTH is simply to execute SMTH for all values of X from $FE to $01. As shown in FIG. 17E, subroutine SMOOTH accomplishes this by proceeding from a start point at block 520 to block 527, where X is set equal to $FE. Next, at block 524, subroutine SMTH is run and X is decremented, then at block 526 X is tested to see if it is equal to 0. If not, the program loops back to program 524, but when X is equal to 0 subroutine SMOOTH is exited via FIG. 17E.

Subroutine SMTH shown in FIG. 17F effects a final smoothing of the video data in order to eliminate local aberrations in the data which generate false local minima. As may be seen from a simple sketch, if a series of points are located on a relatively smooth curve, except that one of the points is, bcause of some random error, so displaced from the smooth curve that it is greater than or less than both of the adjacent points, a local minimum and local maximum will always be present in the curve in the area of the erroneous point, the erroneous point itself being either the maximum or minimum depending upon whether it is above or below respectively the smooth curve through the remaining points, and one of the points adjacent the erroneous point constituting the complementary minimum or maximum. To deal with such erroneous points, subroutine SMTH tests each value in DATA, X and, if the value is found to be greater than or less than both the adjacent values, replaces it with the mean of the adjacent values. As may also be seen from a simple sketch, if the same operation is performed on points representing a true maximum or true minimum in which the maximum or minimum is greater than or less than all of at least the four points closest thereto, the most that can happen to the curve is that the position of the maximum or minimum is shifted by one point in either direction. In practice, the risk of apparent displacement of the true minima by a single point (i.e. a single pixel) is negligible and much outweighed by the lowering of the risk of finding a completely erroneous minimum. Moreover, in practice subroutine SMTH will often not change the location of the true minima at all since such minima tend to be represented by several pixels of substantially the same light intensity, a formation on which SMTH will have no effect.

As shown in FIG. 17F, subroutine SMTH proceeds from a start point at block 540 to a block 542, where DATA, $(X-1)$ is transferred to a register LOC1; DATA,X is transferred to a register MARK; and DATA, $(X+1)$ is transferred to a register LOC2. Next, at block 544, the program tests whether the values in LOC1 and LOC2 are equal. If they are, the program proceeds to a block 544, where it tests whether MARK is equal to LOC1. If so, both the point being tested (DATA,X) and the two adjacent points all have the same value and no action is required other than transferring DATA,X to TABLE,X so subroutine SMTH places its results in TABLE,X. Accordingly, if block 554 yields a positive result, DATA,X is transferred to accumulator register ACCUM at block 562 and then at block 564, the contents of ACCUM are transferred to TABLE,X and subroutine SMTH is finally exited via block 566. If, however, block 554 yields a negative result, MARK is either greater than or less than both LOC1 and LOC2, so that DATA,X is deemed to be an erroneous point. Accordingly, in these circumstances the program proceeds from the negative exit of block 554 to a block 560 where ACCUM is set equal to (LOC1+LOC2)/2, and then this averaged value in ACCUM is transferred to TABLE,X at block 564 and subroutine SMTH exited at block 566 as previously described.

If at block 554 it is found that LOC1 and LOC2 are not equal, the program proceeds to block 566, where it tests whether MARK is equal to LOC1. If so, point DATA,X is equal to one of its adjacent points, is therefore deemed not to be an erroneous point and accordingly, the subroutine proceeds through blocks 562, 564 and 566 as previously described. If, however, at block 546 it is found that MARK is not equal to LOC1, the program proceeds to block 548 and tests whether MARK is equal to LOC2. If so, the value of DATA,X is again equal to one of the adjacent points and is deemed not to be an erroneous point, and accordingly the program proceeds through blocks 562, 564 and 566 as previously described.

If block 548 yields a negative result, none of the values in MARK, LOC1 and LOC2 are equal. Accordingly, the program proceeds to block 550 and tests whether LOC1 is greater than LOC2; if so, LOC1 and LOC2 are interchanged at block 552. From either the positive exit of block 550 or from block 552 the program proceeds to block 556. Blocks 550 and 552 are necessary because, as may be seen from FIG. 16B, the light intensity curve has a positive gradient in one zone 362 and a negative gradient in the other. Accordingly, to make the remaining operations of subroutine SMTH work correctly, it is necessary to ensure that LOC1 is greater than LOC2.

At block 556, the program tests whether MARK is greater than LOC1. If so, MARK is greater than both LOC1 and LOC2, DATA,X is deemed to be an erroneous point and the program proceeds through blocks 560, 564 and 566 as previously described, thereby ensuring that the value placed in TABLE,X is *not* DATA,X but is instead the mean of DATA,(X−1) and DATA,(X+1). If block 556 yields a negative result, the program proceeds to block 558 where it tests whether MARK is greater than LOC2. If not, MARK is less than both LOC1 and LOC2, DATA,X is deemed to be an erroneous point and the program proceeds through blocks 560, 561, 566 as previously described. If, however, block 558 yields a positive result, DATA,X is intermediate the adjacent points, is deemed not to be an erroneous point and accordingly, the program proceeds through via blocks 562, 564 and 566 as previously described, thereby placing the true value of DATA,X in TABLE,X.

Subroutines SMOOTH and SMTH complete the smoothing of the video data. Following execution of SMOOTH, as indicated at block 469 in FIG. 17, subroutine TRANSF is again executed to transfer the fully smoothed data placed in TABLE by subroutine SMTH to DATA. The program is now ready to find the local minima denoting the weld pool edges, this operation being accomplished by subroutine SLOPE shown in FIG. 17B.

As shown in FIG. 17B, subroutine SLOPE proceeds from a start point at block 470 to block 471 where it sets a direction indicator flag M equal to 0. Flag M is necessary because, for reasons previously described, subroutine SLOPE finds the two local minima associated with the weld pool edges by working outwardly from the "well" in light intensity in zone 360 (FIG. 16B). Flag M serves to indicate which way subroutine SLOPE is scanning light intensity data, M=0 indicating a scan to the left and M=1 indicating a scan to the right (in FIG. 16B).

From block 471, subroutine SLOPE proceeds to block 472 where X is set equal to $75 (117 in decimal notation). Since the TN2500 camera has about 235 usable pixels on each horizontal line (the remaining pixels being occupied by the horizontal blanking interval), pixel 117 will be substantially in the middle of the line and hence within zone 360 in FIG. 16B. Naturally, if for any reason an apparatus is used in which the image of the weld puddle is not exactly centered in the TV screen, it may be necessary to adjust the value of X loaded at block 472. Next, at block 473, subroutine EVALP is executed. Since subroutine EVALP is very simple in both concept and execution it will be described at this point.

As shown in FIG. 17D, subroutine EVALP proceeds from a start point at block 510 to a block 512, where M is tested to see if it is equal to zero. If so, M is decremented at block 514; if not, X is incremented at block 518. From block 514 or 518 subroutine EVALP is exited from block 516 back to subroutine SLOPE. Thus, subroutine EVALP decrements X when M is 0 and increments X when X is equal to 1, thereby moving one pixel to the left or right according to the value of M.

Thus, on each pass through subroutine SLOPE, since M is initially set equal to zero at block 471, block 473 merely serves to decrement X. From block 473, the program proceeds, at block 474, to test whether DATA,X, the fully smoothed light intensity value for pixel X provided by subroutines SMTH and TRANSF, is equal to $75. So long as the value of X is such that the corresponding pixel lies within zone 360 in FIG. 16B, DATA,X will be less than $75 and accordingly the program will loop back from block 474 to 473. However, after a number of passes through blocks 473 and 474, X will have been decremented sufficiently that the left-hand edge of zone 360 in FIG. 16B will have been reached. At this point, the values in DATA increase from their relatively low values to $7F since, as explained above, the maxima at the junctions of zones 360 and 362 in FIG. 16B are of sufficiently great intensity that, during execution of subroutine MEAN shown in FIG. 17A, the running total in $TOTAL will eventually become greater than $7F and subroutine MEAN will proceed to place $7F in each of the appropriate locations in TABLE. Accordingly, when subroutine SLOPE reaches the data relating to the inner parts of zone 362 in FIG. 16B, block 474 will produce a positive result and the program will proceed to block 474 where routine EVALP is again executed, thereby decrementing X.

From block 475 the program proceeds to block 476 which is identical to block 476. On the first few passes through blocks 475 and 476, the light intensity values in DATA still relate to the "saturated" regions adjacent the maxima of the light intensity curve for which the values in DATA are $7F, operation 476 will produce a positive result and the program will loop back to block 475. However, as the value of X is decremented by successive passes through block 475, eventually the values from DATA tested at block 476 will relate to non-saturated regions in the outer part of zone 362, and at this point block 476 produces a negative result, causing the program to proceed to block 477.

At block 477 subroutine EVALP is then executed to further decrement X. Next, at block 478, M is tested to see if it is equal to zero. When the subroutine SLOPE first reaches block 478, M will be equal to zero having been so set at block 471, and the program will therefore proceed to block 481 where subroutine SLP shown in FIG. 17C is executed. Since subroutine SLP is very simple, it is convenient to describe it at this point.

As shown in FIG. 17C, subroutine SLP simply proceeds from a start point at block 500 to a block 502 where it calculates the difference between DATA,(X+1) and DATA,(X−1) and places the result in the aforementioned register ACCUM. The difference thus placed in ACCUM is of course representative of the gradient of the fully smoothed light intensity curve at pixel X. It should be noted that, although at block 481 (FIG. 17B) subroutine SLOPE is analyzing data proceeding from the middle of FIG. 16B to the left, the difference calculated by subroutine SLP has the usual algebraic sign i.e. a positive value in ACCUM following block 502 indicates a curve which is increasing from left to right. Following block 502, subroutine SLP is exited at block 502 back to subroutine SLOPE.

On leaving block 481 in FIG. 17B, subroutine SLOPE proceeds to block 482. The designation "FLG. N=0?" in block 482 means that this block tests the most significant bit of the 8-bit number placed in ACCUM by block 502 in FIG. 17C to see if this bit is equal to zero. As previously explained with reference to 463, the 6502 microprocessor used in the AIM-65 computer normally uses the most significant bit as a sign bit. Thus, block 482 is actually testing the sign of the gradient calculated by subroutine SLP. So long as the video data being processed relate to the left-hand zone 362 in FIG. 16B, the gradient of the fully smoothed light intensity curve is always positive and thus operation 482 generates a positive result and the program simply loops back from block 482 to block 477. However, after repeated passes through block 477,478,481 and 482, subroutine SLOPE will reach the transition between zone 362 and zone 364, pass through the local intensity minimum associated with the weld pool edge and enter zone 364, in which the curve has a negative gradient. Thus, as soon as zone 364 is entered, operation 482 produces a negative result and the program proceeds to block 484 where M is tested to see if it is equal to zero. When subroutine SLOPE first reaches block 484, M will be equal to zero, having previously been set to zero at block 471, and thus blocks 484 will produce a positive result and the program will proceed to block 486, where the value of X, which now represents the location of the left-hand edge of the weld pool, is written into a hexadecimal register $WDL. From block 486, the program proceeds to block 488, which is identical to block 484 and thus, when subroutine SLP first reaches block 484 this block will produce a positive result, causing the program to proceed to block 489 where M is incremented to 1. The program then loops back from block 489 to block 472.

Subroutine SLOPE now proceeds to find the right-hand edge of the weld pool proceeding to blocks 472–478 in the same manner previously described, except that subroutine EVALP will now increment X rather than decrement this counter. Accordingly, on this second pass through blocks 472 through 478, subroutine SLOPE will examine the fully smoothed light intensity data beginning from approximately the center of zone 360 in FIG. 17B and proceeding from left to right in that figure until it reaches the point which the right-hand zone 362 is no longer saturated. Upon reaching 478 for the second time, block 478 will of course produce a negative result since M is now equal to 1 and accordingly the program will proceed from block 478 to block 479, which is identical to block 481 and executes subroutine SLP. Since the line intensity data now relate to the right-hand zone 362 in FIG. 16B, the slope value generated by subroutine SLP at block 479 will be negative. Accordingly, block 479 is followed by a block 480, which tests the sign of the gradient generated by subroutine SLP to see if this gradient is negative. If so, the program simply loops back to block 477 and proceeds to loop through blocks 477–480 until the boundary between zones 362 and 366 in FIG. 16B is reached, at which point the gradient becomes positive, block 488 produces a negative result, and the program proceeds to block 484. Since M is now equal to 1, block will produce a negative result and the program will proceed, at block 485, to write the value of X, which now represents the location of the right-hand weld pool edge, into a register $WDR.

From block 485, the program again proceeds to block 488. Since M is now equal to 1, this block will produce a negative result and the program will thus proceed to block 490, where M is restored to 0, the difference between $WDR and $WDL, which represents the width of the weld pool, is calculated and placed in a width register $WIDTH, and all positions of TABLE are filled with zeroes. Next, at block 492, X is set equal to $WDR and then, at block 494, $75 is placed in TABLE,X and X is decremented. The decremented value of X is then tested at block 496 to see if it is equal to $WDL. If not, the program loops back to block 494. It will be apparent to those skilled in the art that the combined effect of blocks 490, 492 and 494 and 496 is that the values in TABLE will be 0 for values of X less than $WDL and greater than $WDR (i.e. for areas outside the weld pool as found by the program) and $75 for all values X from $WDL to $WDR inclusive (corresponding to pixels within the weld pool as found). Thus, the values in TABLE by the time operation 494 has decremented X to be equal to $WDL constitute a square wave which is low outside the weld pool, high inside the weld pool and thus has its transitions at points corresponding to the weld pool edges. At this point, block 496 produces a positive result and subroutine SLOPE is exited via block 498.

This completes the sequence of subroutines represented by block 469 in FIG. 17. Accordingly, upon leaving subroutine SLOPE, the computer proceeds to block 650 in FIG. 17 where the tables DATA and TABLE are fed to the two separate traces of the double-trace oscilloscope 72 (FIG. 4). The subroutine used for this purpose is of a type which will be familiar to those skilled in the art and therefore will not be further described. It will be seen from the foregoing description of FIGS. 17A–17H that the data thus output to the oscilloscope at block 650 represent the fully smoothed light intensity data placed in table DATA by subroutines SMTH and TRANSF, and the square wave form having its transitions at the weld pool edges, which have been placed in TABLE by subroutine SLOPE. Accordingly, the two traces on the oscilloscope enable the operator to make a visual check of the correctness of the weld pool edges located by the software. Following block 650, program PWDTHX proceeds through block 652, 654 and 656 as previously described.

Figure 18:
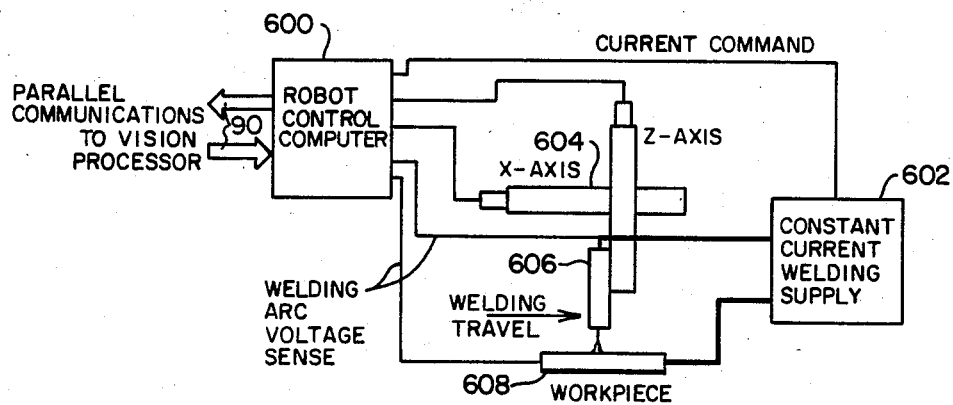
FIG. 18 is a block diagram of the welding process control apparatus used for controlling the width of the molten weld pool in the weld pool width measuring method of the invention.

FIG. 18 shows the apparatus used to control weld pool width in accordance with the invention. It will be seen from the description of FIG. 19 below, that FIG. 18 is in essence a slightly simplified version of the apparatus shown in FIG. 19; thus a single apparatus can be used for both control of the weld pool width and control of the mass and frequency of the weld pool.

The apparatus shown in FIG. 18 comprises a robot control computer 600 which in in two-way communication via lines 90 (also shown in FIG. 4) with the process control computer 80. The robot control computer 600 has a current command output line which controls the current produced by a constant current welding supply 602, which supplies current to a welding assembly comprising an electrode 606 and a workpiece or weldjoint preparation 608. The arc voltage between the electrode and the weld joint or preparation sensed by means of a pair of arc voltage sensing lines which are connected from the electrode and weld joint preparation respectively to the robot control computer 600. The robot control computer is also provided with output lines by which it can control the movement of the electrode 606 in at least two dimensions by means of a Z-axis translator and a X-translator 604. Obviously, a Y-axis translator and appropriate output line from computer 600 can be provided if desired. The differential width signals generated at block 656 (FIG. 17) are supplied to the computer 600 (FIG. 18) via the lines 90 and cause the computer 600 to control the current supply 602 so as to adjust the weld pool width towards the desired value.

It will be appreciated that the apparatus and software shown in FIGS. 14–18 can, for experimental purposes, be operated on data supplied to the video computer interface 100 (FIG. 4) via the line 82 rather than live from the video camera 68. Accordingly, the apparatus can be used to reconstruct how the parameters of weld pool width varied during the course of a test weld, even when no actual welding operation is taking place. Obviously, for commercial purposes, it will normally be desired to use the apparatus during actual welding operation, although the ability to make determinations of weld pool width ex post facto may be useful in certain circumstances for diagnostic or testing purposes.

WELD POOL OSCILLATION METHODS, WELD POOL MASS CONTROL METHOD AND WELD POOL MASS/FREQUENCY MEASURING APPARATUS

The weld pool oscillation methods and the weld pool mass control method of the invention will depend upon the fact that, like any mass of liquid, a weld pool has a natural frequency of oscillation which is related to the mass and density of the pool. By the techniques of the instant method, the natural frequency of oscillation of the weld pool may be measured, thereby producing a measurement of the mass of the pool. Repeated measurements of the natural frequency at spaced intervals permit changes in the frequency, and thus in the mass of the weld pool to be detected, and thus permit control of the mass of the weld pool. Furthermore, it will be apparent to those skilled in the art that, because weld pools tend to maintain a substantially constant geometry, the mass of the weld pool will be a function of the width of the weld pool and the depth thereof, this depth being equal to the weld penetration. Accordingly, measurements of both weld pool mass and width by the techniques of this invention permit calculation of weld pool depth and weld penetration, and thus allow for the control of weld penetration.

More specifically, it has been discovered that the welding arc itself exerts a downward force on the weld pool, thereby causing a depression of the upper surface of the weld pool. The downward force of the arc, and thus the amount of depression of the weld pool, has been found to be dependent upon the welding current. Accordingly, if the welding current is pulsed (i.e. the value of the current changed substantially for a relatively brief period) or if the arc is abruptly removed from the weld pool, the resultant change in downward force acting on the weld pool causes the weld pool to oscillate at its natural frequency. This oscillation of the weld pool will continue even after the orignal welding conditions are restored, that is to say after the pulse in the weld current is finished or after the arc is restored to the pool, thus permitting the natural frequency of oscillation to be measured after the transient phenomena which induced the oscillation have terminated, and allowing the mass of the weld pool to be measured in the absence of the transient disturbance and the mass of the weld pool under the steady-state welding conditions determined.

FIGS. 19–34 of the accompanying drawings show the presently preferred weld pool mass/frequency measuring apparatus of the invention used to carry out the measurements already described, including the necessary software. It should be noted that the apparatus and software shown in FIG. 19–34 is only designed to measure the frequency of oscillation of a weld pool. However, the apparatus and software shown in FIGS. 19–34 are so arranged that a single set of welding apparatus may incorporate both the frequency-measuring apparatus shown in FIGS. 19–34 and the weld pool width measuring apparatus previously described, thereby permitting simultaneous measurement of weld pool width and oscillation frequency, as required for controlling weld pool depth and hence welding penetration. In practice, it may often not be necessary to simultaneously measure weld pool oscillation frequency and width, since it has been found empirically that a relationship exists between frequency, weld pool width and depth and arc length as follows:

$$F = 19.14, W^{0.033} D^{-0.77} H^{-0.35},$$

where:
F is the oscillation frequency in Hertz;
W is the weld pool width in inches;
D is the weld pool depth (weld penetration in inches);
H is the arc length in inches.

Accordingly, if oscillation frequency and arc length arc held constant, control of weld pool depth and weld pool penetration can be achieved without direct measurement of weld pool width.

Obviously, if accurate measurements of weld pool oscillation frequency are to be achieved, all external driving forces which might affect the oscillation of the weld pool must be reduced to a minimum. One likely source of significant external driving forces which would interfere with measurement of weld pool frequency is variations in the power supply to the welding apparatus. Accordingly, the apparatus shown in FIGS. 19–25 makes use of a linear power supply in order to eliminate cyclic aberrations normally present in full-wave or half-wave recitified welding power supplies. Also, this apparatus includes various special smoothing circuits to smooth the power supply so that the only measurable oscillations in the weld pool occur at the natural frequency of the pool. In addition, the apparatus includes special circuitry to effect pulsing of the welding current, since this has been found to be the most convenient technique for inducing oscillation of the weld pool.

Figure 19:
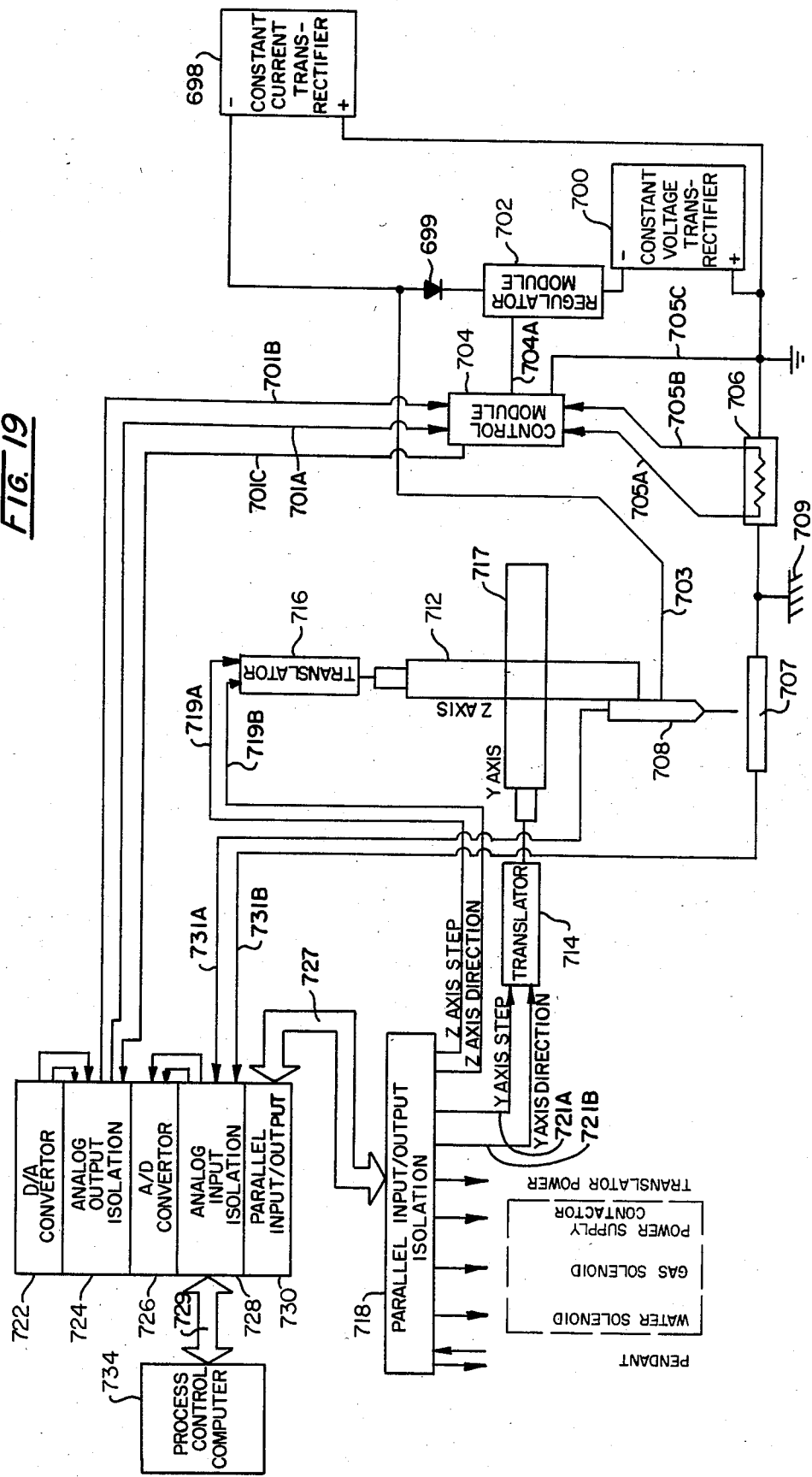
FIG. 19 is a block diagram of a weld pool mass/frequency measuring apparatus of the invention.

As shown in FIG. 19, the preferred weld pool mass/frequency measuring apparatus of the invention comprises a constant voltage power supply (transformer/rectifier) 700, which is of a commercially-available three-phase type, and a constant current power supply (transformer/rectifier) 698, which is also of a commercially-available three-phase type, the two power supplies being connected in parallel. The two power supplies are used because the instant weld pool oscillation methods require controlled variation in the welding current, and such variation is effected by regulation of the constant voltage power supply as described below. However, it is difficult to procure constant voltage power supply with sufficient capacity to effect commercial-sized welds. Accordingly, the constant current and constant voltage power supplies are used in parallel, the constant current power supply supplying the bulk of the welding current while the constant voltage power supply effects the necessary variation in the welding current. To ensure that no reverse flow of current can occur through a regulator model 702 (described below) because of the interconnection of the two power supplies, a diode 699 is connected between the negative terminal of the constant current power supply 698 and the end of the regulator module 702 remote from the negative terminal of the constant voltage power supply 700. The positive terminals of the power supplies 698 and 700 are connected via an in-line shunt 706, which permits measurement of actual welding current, to a "weld joint preparation" 707. (As explained below, for experimental purposes a bead-on-plate welding operation, which does not actually join two pieces of metal together, was performed, and thus integer 707 comprised only a single metal plate. Under commercial conditions, the weld joint preparation 707 would of course comprise the two metal portions to be welded together.) The line joining the shunt 706 to the weld joint preparation 707 is connected to a true earth ground 709. The negative terminal of the power supply 700 is connected via a regulator module 702 and a supply line 703 to a welding electrode 708, which is the non-consumable tungsten electrode normally used in a gas tungsten arc welding apparatus. The electrode 708 is also connected directly to the negative terminal of the power supply 698. The electrode 708 is movable vertically relative to the weld joint preparation 707 by a Z-axis positioner 712 and parallel to the horizontal upper surface of the weld joint preparation 707 by means of a Y-axis positioner 717. Both positioners 712 and 717 are screw-type positioners including stepper motors which rotate one revolution for each cycle of a phased square wave train input, the necessary square wave inputs being provided by a Z-axis translator 716 and a Y-axis translator 714 respectively. Both the translators 714 and 716 are of the commercially-available Summit 8083 type. The regulator module 702 is controlled by a control module 704 via a control line 704A. The control module 704 is connected to the shunt 706 by a pair of lines 705A and 705B, which provide the control module 704 with the potentials at either end of the shunt 706; thus, there exists between the line 705A and 705B a voltage which is proportional to the actual welding current passing through the shunt 706. The control module 704 is also connected by a line 705C to the line joining the shunt 706 to the positive terminals of the power supplies. This line 705 furnishes a ground for the control module 704. The control module also receives signals on a pair of lines 701A and 701B from an analog output isolation unit 724, and transmits ±15 V and ground to the unit 704 via a multi-line connector 701C. The analog output isolation unit 724 forms part of an interface assembly which also includes a digital/analog converter 722, an analog/digital converter 726, an analog input isolation unit 728 and a parallel input/output unit 730. As indicated in FIG. 9, the analog output isolation unit 724 receives signals from the digital/analog converter 722, and the analog/digital converter 726 receives signals from the analog input isolation unit 728. The interface assembly is itself connected via a two-way bus 729 to a process control computer 734. The computer 734 is a Rockwell AIM-65 digital computer, which is identical to the computer 80 described above with reference to FIGS. 4 and 5. The analog input isolation unit 728 is also connected to the welding electrode 708 via a line 731A and to the weld joint preparation 707 via a line 731B; thus, the analog input isolation unit receives signals on line 731A and 731B indicative of the actual voltage existing between the welding electrode and the weld joint preparation. The parallel/input output weld 730 is connected via a two-way bus 727 to a parallel input/output isolation unit 718. This unit 718 supplies X-axis step and Z-axis direction signals to Z-axis translator 716 via lines 719A and 719B respectively. Similarly, the unit 718 supplies Y-axis step and Y-axis direction signals to the Y-axis translator 714 via lines 721A and 721B respectively. Finally, as indicated in the lower left-hand portion of FIG. 19, the unit 718 is in two-way communication with a pendant, by means of which an operator can control an operation of the welding apparatus and sends output signals to a translator power unit. If desired, the unit 718 may optionally be arranged to control the water and gas solenoids and the power supply contactor of the apparatus, as indicated within the broken boundary in FIG. 19. However, in practice it has been found that these solenoids and contactor can be controlled by the operator himself without inconvenience, and thus the optional connections to unit 718 shown in FIG. 19 have not been included in the present form of the apparatus.

Figure 20:
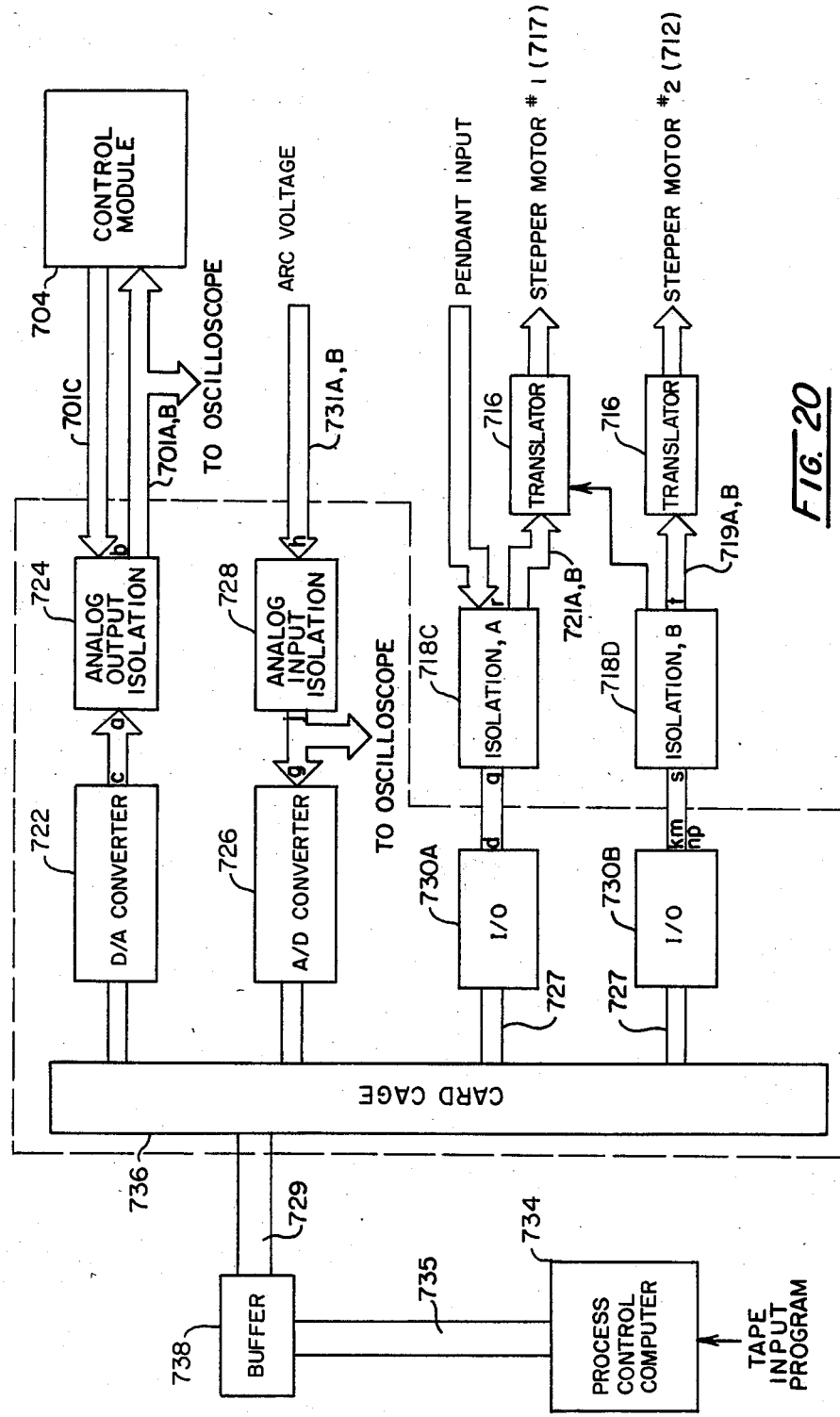
FIG. 20 is a block diagram showing in more detail the process control computer, digital analog converter, analog output isolation amplifier, analog digital converter, and analog input isolation module shown in FIG. 19, together with various associated circuitry.

Parts of the apparatus shown in FIG. 19, and especially the cotrol assembly comprising unit 722, 724, 726, 728 and 730, together with the unit 718, are shown in more detail in FIG. 20, in which 781C and 718D represent sub-units of the unit 718, and 730A and 730B sub-units of the unit 730, shown in FIG. 19. As shown in FIG. 20, the Rockwell AIM-65 computer 734 receives a tape input program; this program is fed to the J1 connector of the computer on pins L and M, with a ground line being provided to pin 1 of the same connector. The computer 734 communicates via a ribbon connector 735 with a buffer 738, which is in turn connected to the aforementioned bus 729, which has the form of the second ribbon connector. The buffer 738 and the two associated ribbon connectors 739 and 735 comprise a standard, commercially-available Rockwell RM65-7104 double-ribbon buffer system. The ribbon connector 735 is connected to the J3 connector on the expansion bus of the Rockwell AIM-65 computer 734.

The ribbon connector or bus 729 is connected to a card cage 736, which is a standard, commercially-available Rockwell RM65-70116 card cage. Further details of the RM65-7104 double-ribbon buffer system and the RM65-7016 card cage may be obtained from the manufacturer's literature. The card cage 736 not only serves to provide communication between the computer and the various parts of the control assembly and the unit 718, but also physically holds the remaining parts of the control assembly and unit 718, the various circuits on these unit being mounted on cards which are inserted into the card cage 736 in a manner which will be familiar to those skilled in the art. The units actually mounted within the card cage 736 are enclosed within the broken boundary in FIG. 20.

As shown in FIG. 20, the computer 734 communicates via the buffer 738 and the card cage 736 with the digital/analog converter 722 of the control assembly, this digital/analog converter 722 comprising a standard, commercially-available Gordos Model DA-410 circuit board, which is mounted on slot number 3 of the card cage 736. Connector c of converter 722 is connected to connector a of analog output isolation unit 724, which is mounted in slot number 1 of the card cage 736. As previously described, unit 724 is connected, via its connector b and lines 701A, 701B and 710C with control module 704. The output from connector b of unit 724 on lines 701A and 701B can also be fed to an oscilloscope (not shown) to be described below. The isolation unit 724 is necessary to provide signal isolation from the high power welding circuits themselves.

The computer 734 also communicates via buffer 738 and card cage 736 with the analog/digital converter 726, which is a standard, commercially-available Gordos Model AD-10 circuit board mounted in slot number 10 of card cage 726. Connector g of converter 726 receives signals from connector j of the analog input isolation unit 728, which is mounted in slot number 12 of the card cage 736. The outputs from connector j of unit 728 can also be supplied to the same oscilloscope as the signals from connector b of unit 724 as an indicator of the arc voltage. As described above with reference to FIG. 19, the unit 728 receives signals on lines 731A and 731B representative of the welding arc voltage and welding arc current, these inputs being received at connector h of unit 728. The analog/digital converter 726 has the capability for 16 single-ended or 8 double-ended input channels with a 0–10 V input signal range providing a resolution of 10 mV.

Also as shown in FIG. 20, the computer 734 communicates via buffer 738, card cage 736 and the bus 727 with two input/output units 730A and 730B, which form part of unit 730 shown in FIG. 19. The input/output units 730A and 730B are mounted in slots numbers 5 and 16 respectively of cage 736. Unit 730A is a standard, commercially-available Gordos GBPI/O circuit card, while unit 730B is a Rockwell RM65-5222 circuit board. Connector d of unit 730A communicates with connector q of an isolation A unit 718C, which also form part of the unit 718 shown in FIG. 19. Unit 718C is a standard, commercially-available Gordos Model PB-16 circuit board which is mounted on the right inside surface (in front view) of the card cage 736. Connector r of unit 718C handles communications with the pendant and also handles the outputs on lines 721A and 721B to the translator 714 which feeds its output to stepper motor number 1, the motor of y-axis positioner 717. Similarly, connectors k, n, m, and p of input/output unit 718B are connected to connector s of an isolation unit B, 718D, the second major portion of the unit 718 shown in FIG. 19. Unit 718D is a second standard, commercially-available Gordos Model PB-16 circuit board, which is mounted on the opposite surface of the card cage 736 from the unit 718C i.e. unit 718D is mounted on the left inside surface of the card cage as seen from the front thereof. Connector t of unit 718D is connected via lines 719A and 719B to the translator 716, as already described, and the output from translator 716 is fed to stepper motor number 2, the motor of z-axis positioner 712. Unit 718D also communicates with the translator 714. (The connectors among the isolation units 718C and 718D, the translators 714 and 716 and the stepper motors are simplified in FIGS. 19 and 20 for purposes of illustration. In fact, each translator receives power, direction, clock and common connections from the associated isolation unit and is connected to its associated stepper motor via a six-line connector. As explained in more detail below, isolation unit 718D only supplies the power connection to the Y-axis translator 714, the other three connections to translator 714 being handled by isolation unit 718C.)

Figure 21:
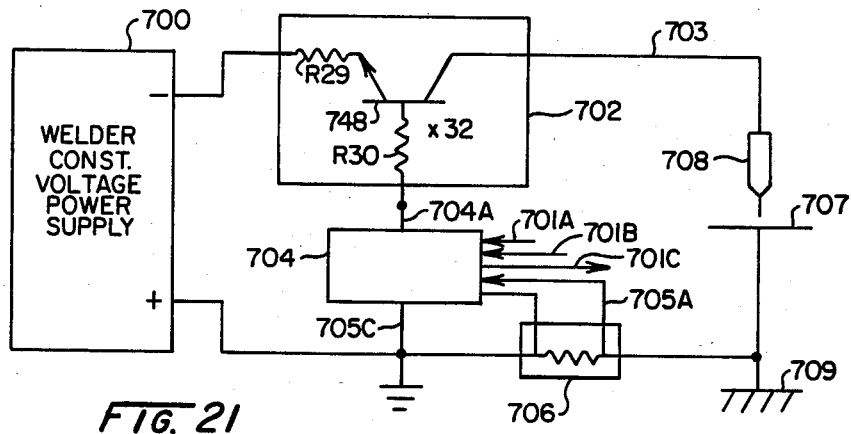
FIG. 21 is a circuit diagram showing in more detail the constant voltage power supply, regulator module, control module and associated circuitry shown in FIG. 19.

FIG. 21 shows in more detail the components shown in the lower right hand corner of FIG. 19. The constant voltage power supply 700 is a constant voltage, 3-phase power supply of the full-wave rectified type, being a National Cylinder Gas Companying Model DRCV-5 with a capacity of 35 volts, 500 amps. As previously mentioned, the negative terminal of the power supply 700 is connected to the regulator module 702. This module 702 comprises 32 resistor-transistor combinations, only one of which is shown in FIG. 21 for the sake of simplicity. These resistor-transistor combinations will be described in more detail below with reference to FIG. 23; for present purposes it is sufficient to note that each combination comprises a low value resistor R29 connected between the negative terminal of the power supply 700 and the emitter of a power transistor 748, which is a standard, commercially-available Motorola 2N6284 power transistor. The collector of each power transistor 748 is connected via the line 703 to the welding electrode 708 as already described, while the base of each transistor 748 is connected via a resistor R30 and the line 704A to the control module 704.

As explained above with reference to FIG. 19, the line 705B from the control module to the line joining the positive terminal of the power supply 700 to the shunt 706 provides a system ground. The lines 705A and 705B from the control module 704 are connected to opposed ends of the shunt 706 so that, as already mentioned, a potential difference exists between the line 705A and 705B proportional to the welding current which flows through the shunt 706. Also as already mentioned, the end of the shunt 706 remote from the power supply is connected to the weld joint preparation 707 and to the true earth ground 709. The control module 704 also receives, on lines 701A and 701B, an analog "set point signal", which is ultimately derived from a digital signal originating in the computer 734 and represents the desired welding current, and the control module supplies power to the digital/analog converter unit 724 (FIGS. 19 and 20) via the multi-line connector 701C.

Figure 23:
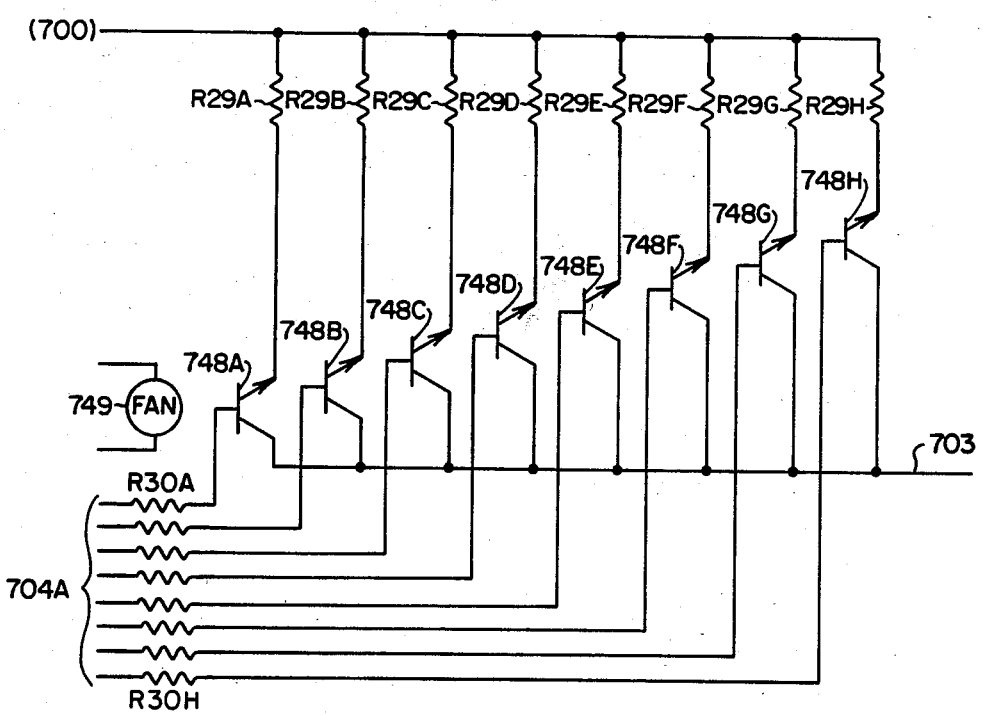
FIG. 23 is a schematic diagram of one of four identical heat sink units of the regular module shown in FIGS. 19–21.

Further details of the circuitry of the regulator module 702 are shown in FIG. 23. The 32 power transistors 748, together with their accompanying resistors R29, are arranged in four banks each containing eight transistors. Each of the four banks of transistors is mounted in a fan-cooled heat sink module as shown in FIG. 23. As shown in that figure, the supply line from the negative terminal of the power supply 700 is connected to one terminal of each of eight resistors R29A-H arranged in parallel. These low value resistors R29, which are conveniently given the value of 1 ohm, are provided to limit the maximum current which will pass through any one of the transistors 748. Although in theory the transistors 748 each receive identical base voltages and have identical gain characteristics, in practice not all the transistors will have exactly identical gains, so that a larger share of the welding current will be carried by those transistors having a high gain. To reduce the possibility of damage to transistors having high gain, the resistors R29 are inserted, thereby limiting the current carried by the high-gain transistors to an acceptable level. The terminal of each of the resistors R29A-R29H remote from the power supply 700 is connected to the emitter of its associated transistor 749A-749H, the base of each transistor being connected via a high resistor R30A-R30H to the line 704A as already described. The collector of each of the transistors 748A-748H is connected to the line 703. A fan 749, having normal 120 VAC power connections, is provided to cool the transistors 748 and their associated resistors R29.

Figure 22:
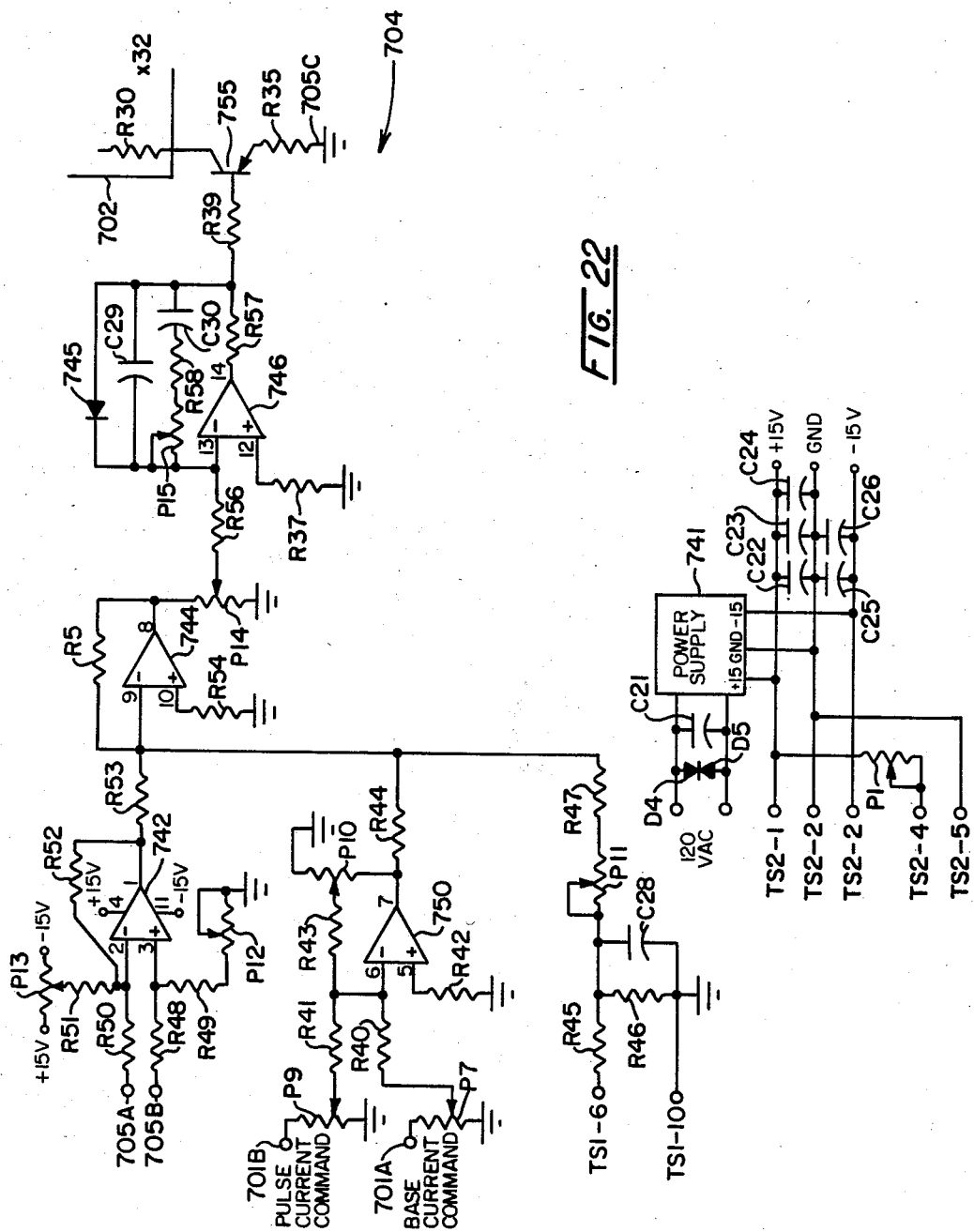
FIG. 22 is a schematic circuit diagram of the power supply shown in FIGS. 20 and 21.

FIG. 22 shows the power supply circuitry comprising the control module 704 shown in FIGS. 19, 20 and 21. In view of the relative complexity of this circuiry and the number of variable parameters involved, it is believed that the details of this circuitry will be more readily appreciated if consideration is first given to the type of output which it is designed to produce. This output is illustrated in the upper half of FIG. 26, which is a graph of arc current against time. It will be seen that the arc current desired comprises a steady base current level on which are superimposed regularly-spaced pulses. The parameters which defined this type of current pattern are the base current level, the pulse current level, i.e. the current level during these square pulses, the pulse duration and the pulse frequency (which may alternatively be specified as the delay between successive pulses). The circuitry shown in FIG. 22 is designed so that each of these pulses can be adjusted individually. The circuitry shown in FIG. 22 makes extensive use of multi-pin connectors, the pins of which are designated by a nomenclature TSX-Y, in which X represents the number of the connector and Y the number of the pin.

The lower part of FIG. 22 shows the power supply circuitry used in the control module. Power is supplied to a Polytron Devices Model P33±−15V power supply 741 from a conventional single-phase mains 120 VAC supply. In order to limit undesirable effects due to voltage transients in the mains supply, the mains supply leads are bridged by a pair of breakthrough diodes D4 and D5 which have their cathodes connected together and their anodes connected to the opposed mains supply lines. Diodes D4 and D5 limit the maximum voltage across the power supply inputs to approximately 130 V. The mains supply lines are also bridged by a smoothing capacitor C21.

The power supply 741 produces the conventional +15 V, −15 V and ground outputs. For smoothing purposes, the +15 V and ground supply lines are bridged by capacitors C22, C23 and C24 connected in parallel, these three transistors totaling 0.45 microfarad. Similarly, the −15 V and ground lines are bridged by capacitors C25 and C26, these two capacitors being connected in parallel and totaling 0.35 microfarad. The ground output of power supply of 741 is fed to connectors TS2-2 and TS2-5. The +15 V output of power supply 741 is fed to connector TS2-1 and is also fed via a potentiometer P1 (used as a variable resistor) to connector TS2-4. The −15 V output from power supply 714 is fed to connector TS2-3.

The circuitry in the upper part of FIG. 22 will now be described. Line 701A, which carries a signal originally generated by the computer 734 and converted to analog form by the converter 722 (FIG. 20), this signal representing the desired base current set by the operator by means of software described below, is connected to one fixed terminal of a potentiometer P7, the other fixed terminal of which is grounded. Potentiometer P7 serves to allow adjustment of the base current setting. The moveable terminal of potentiometer P7 is connected via a resistor R40 to pin 6 (the negative input) of an amplifier 750, which is of the LM324J type manufactured by National Semiconductor. Similarly, line 701B, which carries a signal originally generated by the computer 734 and converted to an analog form by the converter 722 (FIG. 20), this signal representing the desired pulse current set by the operator by means of the software described below, is connected to one fixed terminal of a potentiometer P9, the other fixed terminal of which is grounded. Potentiometer P9 serves to allow adjustment of the pulse current setting. The moveable terminal of potentiometer P9 is connected via a resistor R41 to pin 6 of amplifier 750. Pin 5, the positive input of amplifier 750 is grounded via a resistor R42. The output from pin 7 of amplifier 750 is fed to one fixed terminal of a potentiometer P10, the other fixed terminal of which is grounded. The moveable terminal of potentiometer P10 is connected via a resistor R43 to pin 6 of amplifier 750. As will be apparent to those skilled in the art from the foregoing description of FIG. 26, the computer provides the base current signal continuously to potentiometer P7 while welding is being performed, but only supplies the pulse current signal during the interval when the current pulses are present.

Pin 7 of amplifier 750 is connected via a resistor R44 to pin 9 of an amplifier 744, which is again of the LM324J type. Two other circuits also supply inputs to pin 9 of amplifier 744. In the first of these circuits, connector TS1-6 is connected to ground via resistors R45 and R46 connected in series. The mid-point of the bridge formed by resistor R45 and R46 is connected to one side of a potentiometer P11 which is used as a variable resistor. The same terminal of P11 is connected via a capacitor C28 to terminal TS1-10, and is also grounded. The terminal of potentiometer P11 remote from terminal D is connected via resistor R47 to pin 9 of amplifier 744. Terminals TS1-6 and TS1-10 are spare input terminals provided to allow testing of the control module circuitry without inputs from the computer.

The last input to pin 9 of amplifier 744 is provided by an amplifier 742, which is again of the LM324J type. Pins 2 and 3 of amplifier 742 are connected via resistors R50 and R48 respectively to the lines 705A and 705B from the shunt 706. Thus the normal input to amplifier 742 is a signal representing the actual welding current. To limit the possible inputs to amplifier 742, the fixed terminals of a potentiometer P13 are connected to the ±15 V supply lines and the movable terminal of P13 is connected via a resistor R51 to pin 2 of amplifier 742. In addition, pin 3 of amplifier 742 is connected via a resistor R49 to one side of a potentiometer P12 used as a variable resistor, the opposite side of P12 being grounded.

Amplifier 742 receives the conventional power connections, +15 V at pin 4 and -15 V at pin 11 and its output from pin 1 is fed back to its pin 2 via a resistor 52. The output from pin 1 of amplifier 742 is also fed via resistor R53 to pin 9 of amplifier 744.

Pin 10 (the positive input) of amplifier 744 is grounded via a resistor R54. The output from pin 8 of amplifier 744 is fed back to pin 9 thereof via a resistor R55. The output from pin 8 of amplifier 744 is also connected to one fixed terminal of a potentiometer 314, the other fixed terminal of P14 being grounded. The movable terminal of P14 is connected via a resistor R56 to pin 13 (the negative input) of an amplifier 746, which is again of the LM324J type. Pin 12 of amplifier 746 is grounded via a resistor R37. The output from pin 14 of amplifier 746 is fed via resistors R56 and R39 connected in series to the base of a transistor 755, of the commercially-available 2N6126 type. The emitter of transistor 755 is connected to ground via a resistor R35. The collector of transistor 755 is connected to each of the 48 base resistors R30 present in the regulator.

The feedback arrangement of amplifier 746 is somewhat complicated, three separate parallel connections being made from between resistors R57 and R39 to pin 13 of amplifier 746. The first of these three parallel connections includes a breakthrough diode 745 of the commercially-available IN4741 type, rated at 11V, 500mW. The second parallel connection comprises a capacitor C29. The third parallel connection includes a capacitor C30, a fixed resistor R58 and a potentiometer P15 (used as a variable resistor) all connected in series.

Figure 24:
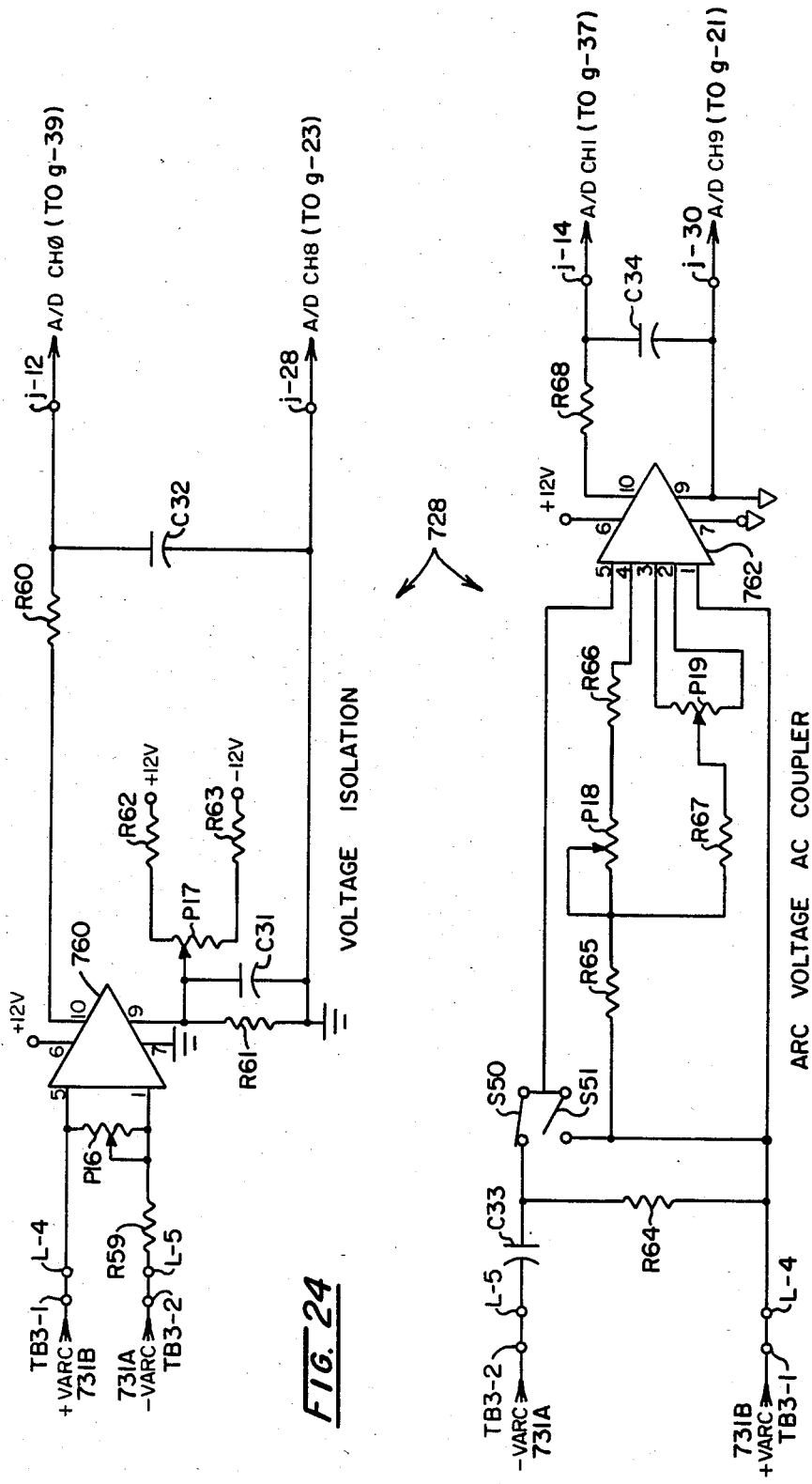
FIG. 24 is a schematic circuit diagram of the analog input isolation unit shown in FIG. 19.

FIG. 24 shows the circuitry of the analog input isolation unit 728 shown in FIGS. 19 and 20. As previously mentioned, this circuitry is inserted in slot number 12 of the card cage 736 (FIG. 20), receives its inputs via connector h and transmits it outputs on connector j to connector g of the analog/digital converter 726.

As shown in FIG. 24, the analog input isolation unit 728 comprises two separate circuits, namely a voltage isolation (DC coupled) circuit shown in the upper part of FIG. 24 and an arc voltage AC coupler circuit shown in the lower part of FIG. 24.

The card cage 736 (FIG. 20) is provided on its rear panel with five separate 2×10-pin connectors which are used to make the external connections to the control assembly. In a manner similar to that used for the multi-pin connectors on the control module 704 described above, hereinafter "PBX-Y" designates pin Y of connector X on the rear panel of the card cage. Where necessary, the left- and right-hand pins of each pair will be identified by suffices L and R respectively. Those skilled in the art will be aware that in such connectors the pins in each pair are bridged to effect the electrical connections. Each of the cards inserted in the card cage 736 also has its own multi-pin connectors which will be described individually with reference to the various cards, but it should be noted that a similar nomenclature will be used for these connectors; for example j-12 denotes connector j, pin 12. The various power supplies required by the circuits in the control assembly are provided either by the computer 734 or, in the case of the output side of the unit 724 via the multi-line connector 701C. The power supply circuits will not be described in detail, since it is believed that appropriate stabilized power supply circuits will readily be apparent to those skilled in the art. The +15 V supply from connector 701C is received at connector TB1-8, the ground supply at TB1-9 and the −15 V supply at connector TB1-10.

The analog input isolation unit 728 is provided with a 7-pin inline connector designated h and a 50-pin 2×25 line connector designated j. Connector h-1 receives +12 V from a stabilized power supply (not shown), connector h-2 receives the common or ground line from the same supply and connector h-3 receives the −12 V line from the same supply. Connector j-2 receives +15V from connector TB1-8, connector j-4 receives −15 V from connector TB1-10 and connector j-6 is connected to the ground connector, TB1-9. The other connections to connectors h and j are described individually below.

The "positive" arc voltage, hereinafter designated + VARC, received from the weld joint preparation 707 (FIG. 19) via line 731B is fed to connector TB3-1, and thence to connector h-4 on the analog input isolation unit 728. As shown in the upper part of FIG. 24, this connector h-4 is connected to pin 5 of an amplifier 760, which is a standard Model AD 289J amplifier manufactured by Analog Devices, Inc. The negative arc voltage, taken from welding electrode 708 (FIG. 19) via line 731A is fed to connector TB3-2, and thence to connector h-5 which, as shown in the upper part of FIG. 24, is connected via a resistor R59 to pin 1 of amplifier 760. Pins 1 and 5 of amplifier 760 are bridged by a potentiometer P16 used as a variable resistor.

Amplifier 760 receives the conventional power connections, +12 V at pin 6 and ground at pin 7. The positive output from pin 10 of amplifier 760 is fed via a resistor R60 to connector J-12. This output placed on connector j-12 is channel 0 of the input to the analog/digital converter 726 (FIG. 19); as indicated in FIG. 24, this connector j-12 is connected to connector g-39 of converter 726. Pin 9, the negative output, of amplifier 760 is grounded via an RC circuit comprising a resistor R61 and a capacitor C31 connected in parallel. Pin 9 of amplifier 760 is also connected to the moveable terminal of a potentiometer P17, the fixed terminals of which are connected via resistors R62 and R63 to the +12 V and −12 V supplies respectively. The grounded terminals of R61 and C31 are connected to connector j-28, which provides channel 8 of the input to the analog digital converter 726 (FIG. 19). As shown in FIG. 24, connector j-28 is connected to connector g-23 on the converter 726, and the connectors j-12 and j-28 are bridged by a capacitor C32.

As shown in the lower part of FIG. 24, the +VARC signal from connector h-4 is fed to pin 1 of an amplifier 726, which is a second AD289J amplifier identical to amplifier 760 previously mentioned. The −VARC signal from connector h-5 is fed to one plate of a capacitor C33; the opposed plate of C33 is connected to connector h-4 via a resistor R64 and is also connected to one terminal of a single-pole, single-throw switch S50. The opposite terminal of S50 is connected to pin 5 of amplifier 762. This pin 5 is also connected to one terminal of a second single-pole, single-throw switch S51. The opposed terminal of S51 is connected to connector h-4 and is also connected via a resistor R65, a potentiometer P18 (used as a variable resistance) and a resistor R66 to pin 4 of amplifier 762. The terminal of R65 remote from S51 is connected via a resistor R67 to the moveable terminal of a potentiometer P19, the fixed terminals of which are connected to pins 2 and 3 of amplifier 762.

When the welding apparatus is in use, S50 is closed and S51 is open, as shown in FIG. 24. However, when it is desired to set or change the offset adjustment on the converter 726, S50 is opened and S51 is closed.

Amplifier 762 receives the conventional power connections, +12 V at pin 6 and ground at pin 7. The output from pin 10 of amplifier 762 is fed via a resistor R68 to connector j-14. This output through connector j-14 is channel 1 of the input to the analog/digital converter 726 (FIG. 20) and, as shown in FIG. 24, connector j-14 is connected to connector g-37 on the converter 726. Pin 9, the negative output, of amplifier 762 is grounded and is also connected to connector j-30, which supplies channel 9 of the input to the analog/digital converter 726. As shown in FIG. 24, this connector j-30 is connected to connector g-21 on the converter 726. Connector j-14 and j-13 are bridged by smoothing capacitor 34.

The voltage isolation circuit shown in the upper half of FIG. 24 is used with the potentiometer p17 set so that the output (the potential difference between connectors j-112 and j-28) is approximately ⅓ of the arc voltage; this multiplexer is chosen to fit the range of the Gordos AD-10 convertor. Capacitor C32 and resistor R32 effect low pass filtering, and we preferably arranged to remove components above about 800 Hz. In the AC coupled circuit shown in the lower half of FIG. 24 capacitor C33 and resistor R64 effect high pass filtering, removing components below about 5 Hz., while capacitor C34 and resistor R68 effect low pass filtering, removing components above about 600 Hz.

Figure 25A:
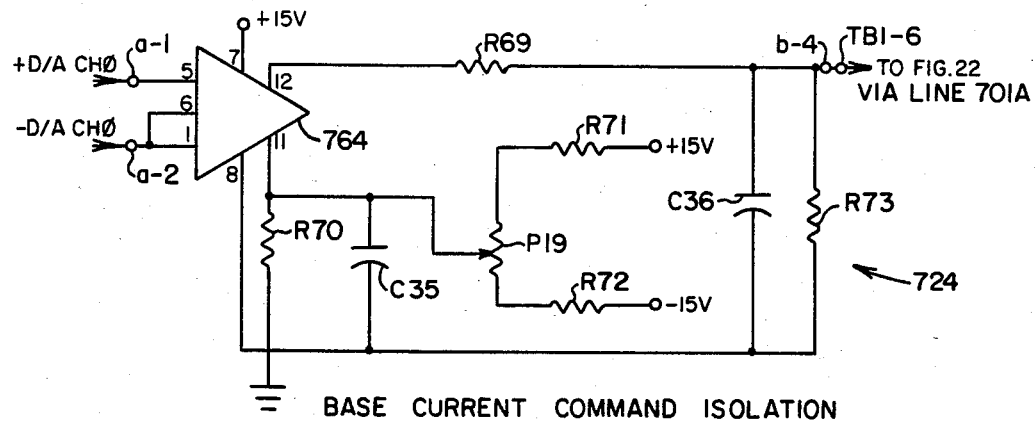
FIGS. 25A and 25B are schematic circuit diagrams of the analog output isolation unit in FIG. 19.
Figure 25B:
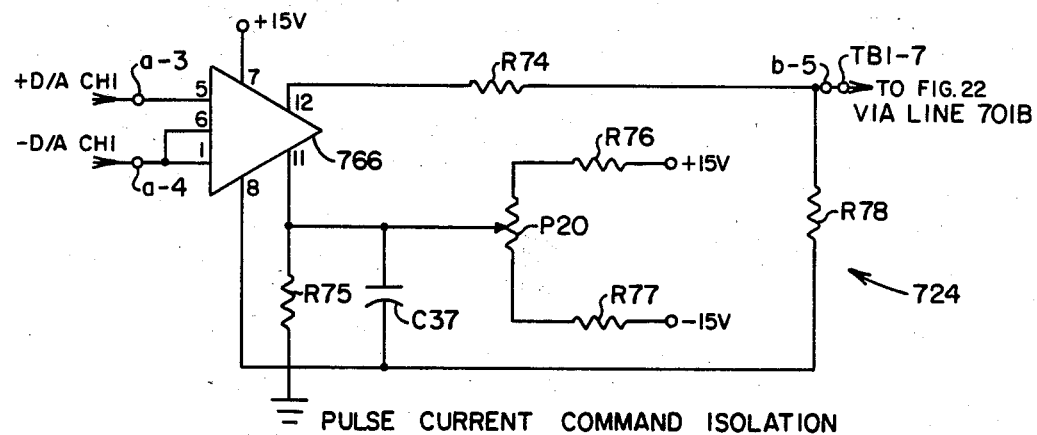

FIGS. 25A and 25B show the circuitry of the analog output isolation unit 724 shown in FIGS. 19 and 20. This circuitry comprises a base current command isolation circuit shown in FIG. 25A, and a pulse current command isolation circuit shown in FIG. 25B. The circuit shown in FIG. 25A sets the base current to be maintained during the welding process, while the circuit shown in FIG. 25B sets the level of the current to be maintained during the pulses. This circuitry serves to protect the digital/analog converter 722 from the high voltage and current transients which may occur at the welding electrode 708.

The circuit board carrying the circuits shown in FIG. 25 is provided with a 7-pin connector a and an 8-pin connector b. Connector b-1 receives the +15 V supply from connector TB1-8, connector b-2 receives the ground supply from connector TB1-9 and connector b-3 receives the −15 V supply from connector TB1-10. The remaining connections to connector a and b are described individually below.

As shown in FIG. 25A, connectors a-1 and a-2 receive the positive and negative outputs respectively from channel 0 of the digital/analog converter 722 (FIGS. 19 and 20). The potential difference between these positive and negative outputs is an analog signal, generated by the digital/analog converter 722 under directions from the computer 734, which represents the base current which the computer has set under the control of an operator. The positive input from connector a-1 is fed to pin 5 of an amplifier 764, which is a Model AD290 amplifier manufactured by Analog Devices, Inc. The negative input from connector a-2 is fed to pins 1 and 6 of amplifier 764. Amplifier 764 receives the conventional power connections, +15 V at pin 7 and ground at pin 8. The positive output from pin 12 of amplifier 764 is fed via a resistor R69 to connector b-4 which is connected via connector TB1-6 to line 701A. Pin 11, the negative output, of amplifier 764 is grounded via an RC circuit comprising a resistor R70 and a capacitor C35 connected in parallel, and is also connected to the moveable terminal of potentiometer P19, the fixed terminals of which are connected via resistors R71 and R72 to the +15 V and −15 V supply lines respectively. Connector b-4 is also connected to ground via an RC circuit comprising a resistor R73 and a capacitor C36 connected in parallel.

The circuit shown in FIG. 25B is identical to that shown in FIG. 25A, except that it receives the positive and negative inputs from channel 1 of the digital/analog converter 722 via connectors a-3 and a-4 respectively. An amplifier 766, which is a Model AD290 amplifier identical to the amplifier 764 previously described, receives the positive input at pin 5, the negative input at pins 1 and 6 and the conventional power connections, +15 V at pin 7 and ground at pin 8. The output from pin 12 of amplifier 766 is taken via a resistor R74 to a connector b-5 and thence via connector TB1-7 to line 701B. The remaining components of the circuit shown in FIG. 25B, namely resistors R75, R76, R77 and R78, the capacitor C37 and potentiometer P20 are connected in a manner identical to the resistors R70, R71, R72 and R73, the capacitors C35 and the potentiometer P20 in FIG. 25A; note, however, that there is no equivalent of C36 in FIG. 25B.

Hardware features not shown in the accompanying drawings are as follows. The operator pendant connected to isolation unit A, 718C in FIG. 20 is a 4×4 keyboard of a type which will be familiar to those skilled in the art having four drive lines hereinafter referred to as lines 4–7) and four sensing lines (hereinafter referred to as lines 0–3). Each of the operator-buttons provided enables a connection to be made between one of the drive lines and one of the sensing lines, thereby enabling the pendant to be scanned for one input at a time. The buttons provided, and the lines interconnected are as follows:

| Pushbutton | Lines Interconnected |
| --- | --- |
| Direction | 4-0 |
| X jog | 4-1 |
| Y jog | 4-2 |
| Z jog | 4-3 |
| Weld start | 5-3 |
| Weld stop | 6-3 |

At present, of course, since no X-translator is provided on the apparatus the X jog button is not useable; however, this button is provided for future expansion. The direction "button" has the form of a toggle switch which will remain in either of its positions when set by the operator. The remaining operator buttons are pushbutton switches which are biased open but can be held closed by the operator.

As previously mentioned, communications between the computer 734 and the pendant are made via the input/output unit 730A and the isolation A unit 718C in FIG. 20. More specifically, pendant lines 0–7 are connected to lines 0–7 of Port A of unit 730A. Communication between port A of unit 718C and the pendant is established via the 32-line connector r on unit 718C and connector TB5, the exact connections being as follows:

| Port A, Line No. | Connector r, Line No. | Connecter TB5, Pin No. | Pendant Line No. |
| --- | --- | --- | --- |
| 0 | 1 | 4 | 0 |
| 1 | 3 | 3 | 1 |
| 2 | 5 | 2 | 2 |
| 3 | 7 | 1 | 3 |
| 4 | 10 | 8 | 4 |
| 5 | 12 | 7 | 5 |
| 6 | 14 | 6 | 6 |
| 7 | 16 | 5 | 7 |

Port A of unit 730A is addressed by the computer 734 by the hexadecimal address 9C01.

Lines 2, 4, 6 and 8 of connector r are grounded, while lines 9, 11, 13 and 15 receive +5 V from a stabilized power supply. Lines 17-26 of connector r are not used.

Port B of unit 730A (addressed by the computer address 9C00), lines 0–5 are not used. Line 6 of this port carries a Y-axis translator clock signal, which is passed via connectors r-29 and r-31 and connector TB4-7 to pin 1 of the Y-axis translator 714. Line 7 of the same port B carries a Y-axis translator direction signal which is passed via connectors r-27 and TB4-10 to pin 2 of the Y-axis translator 714. Lines 28, 30 and 32 of connector r receive the common return from the Y-axis translator via connector TB4-5.

Port 1B of unit 730B (addressed by the computer as 9D00), lines 0, 1 and 6 are not used. Line 2 of the same port carries a Z-axis translator power signal, which is fed via connectors t-6 and TB2-10 to fuse 3 of the Z-axis translator 716. Line 3 of port 1B carries a Y-axis translator power signal which is fed via connector t-8 and TB4-10 to fuse 1 on the Y-axis translator 714. Line 4 of port 1B carries a X-translator power signal which is fed via connectors t-10 and TB3-10; however, since no X-axis translator is provided, the latter connector is not actually connected, this feature being provided for later development of the apparatus. Similarly, port 1B line 5 carries a X-axis translator direction signal which is taken to connector t-12 but not used. Line 7 of port 1B carries a X-axis translator clock signal which is taken to connectors t-16 and TB 3-7L but not used.

Port 2B (addressed as 9D10) of unit 730B lines 0–4 and 6 are not used. Line 5 of port 2B carries a Z-axis translator direction signal, which is fed via connector t-28, which is fed via connector TB2$-^{10}$ to pin 2 of the Z-axis translator 716. Line 7 of port 2B carries a Z-axis translator clock signal, which is fed via connectors t-32 and TB2-7 to pin 1 of the Z-axis translator 716.

The remaining connections to connector t are as follow. Lines 5, 7 and 9 of connector t are connected to the live side of a 115 VAC power supply. Lines 11 and 15 are designed to receive the common return from the (presently non-existant) X-translator and are connected to connector TB3-5. Lines 27 and 31 of connector t receive the common return from pin 5 of the Z-axis translator 716 via connector TB2-5.

In unit 718C, modules 0–3 and 14 are standard D.C. input modules, while modules 4–7, 13 and 15 are D.C. output modules. Modules 8–12 are empty. In unit 718D, modules 0, 1, 6, 8, 9, 10, 11, 12 and 14 are not used. Modules 2–5 are standard AC output modules and modules 7, 13 and 15 are standard DC output modules.

Connections via the TB connectors not previously discussed are as follows. In connector TB1, pins 1–5 are not used. Connector TB2, lines 1–3 are not used, while line 4 is grounded. Line 5 left and right serves to convey the common return from the Z-axis translator 716 to connector t-15. As already mentioned, lines 6–10 carry the signals from the Z-axis translator to the stepper motor.

The connector TB3, line 3 is grounded, while line 4 is a shield line. Line 5 provides the common return from the X-translator, when used, to connector t-7. Lines 6–10, which are intended to be connected to a X-axis translator are not used.

In connector TB4, lines 1 and 2 are not used. Line 3 serves as a shield line while line 4 is the ground line. Line 5 serves to convey the common return from the Y-axis translator 714 to connector r-13. As already mentioned, lines 6–10 carry the various signals to the Y-axis stepper motor from the Y-axis translator 714.

In connector TB5, lines 1–8 are used, as already described, to establish connections between the connector r and the pendant lines. Line 9 connects the pendant ground to the other lines, and line 10 is not used.

The analog/digital converter 726 is addressed by the computer 732 as address 9E0X (when X is any hexadecimal digit). The two channels of this converter have already been described above. The digital/analog converter 722 is addressed by the computer by addresses 9F0X. In addition to the channel 0 and 1 already discussed, this converter provides on channel 2 a DC sample data output and on channel 3 a DC pool oscillation output.

Figure 26:
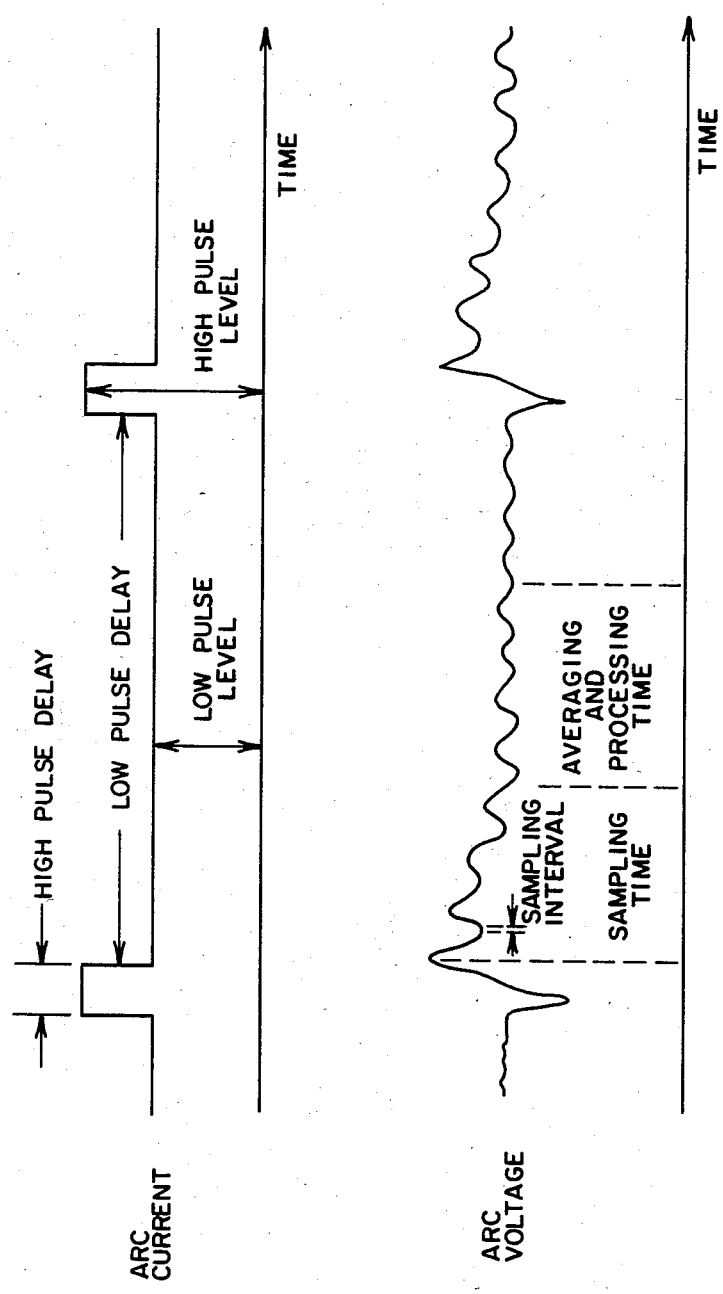
FIG. 26 is a graph showing the temporal relationship between arc current and arc voltage following arc pulsing in accordance with a weld pool oscillation method of the invention using the apparatus shown in FIGS. 19–25.

As previously mentioned, the upper part of FIG. 26 shows the form of arc current used in the instant weld pool oscillation methods, this arc current comprising a steady base current on which are superimposed square-wave pulses of a pre-determined duration and frequency. The lower part of FIG. 26 shows the corresponding arc voltage/time graph, the two parts of FIG. 26 being in temporal correlation. The arc voltage dips at the beginning of each current pulse because welding power is held constant. Because the current pulse causes oscillation of the weld pool, the initial dip in voltage is rapidly followed by an increase in voltage to above the steady state voltage present when the arc current is at its base level. The arc voltage attains its peak approximately at the same time as the current terminates and thereafter the voltage gradually and cyclically decays back to its initial value prior to the pulse. The gradual decay in the arc voltage is caused by the damping, primarily by gravity, of the cyclic oscillations induced in the weld pool by the current pulse, and the cyclic changes in the arc voltage are caused by the cyclic changes in arc length as the oscillating weld pool rises and falls relative to the tip of the welding electrode. The fast part of the cyclic decay in arc voltage is used as a sampling time, in which arc voltage is determined by the instant apparatus. Also shown in the lower part of FIG. 26 is the sampling interval, which is the interval required by the instant apparatus make one measurement of arc voltage. It will be seen that a large number of sampling intervals can be accommodated within the sampling time. Following the sampling time there is an interval designated "averaging and processing time", which is used by the computer 734 (FIG. 19) for analysis of the arc voltage measurements taken during the sampling time; if desired and necessary, the averaging and processing time may also be used by the computer to effect adjustments in base current and pulse current in order to maintain a constant weld pool mass by maintaining a constant frequency of oscillation. The pulse frequency should be adjusted so that, as shown in FIG. 26, the averaging and processing time is completed before the next current pulse occurs.

Figure 27:
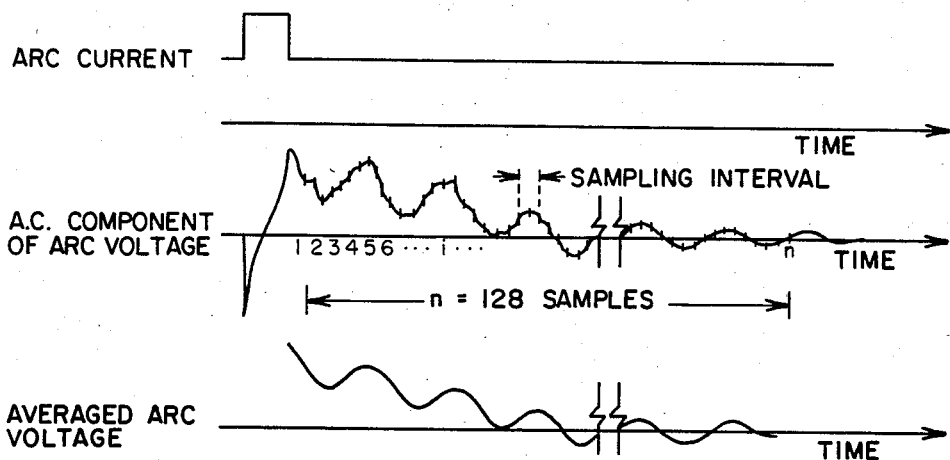
FIG. 27 is a graph similar to FIG. 26 but showing the relationships as actually measured using a computer averaged arc voltage curve generated in preferred weld pool oscillation method of the invention.

The uppermost part of FIG. 27 repeats the arc current/time graph in the upper part of FIG. 26 but shows only a single current pulse. The center part of FIG. 27 shows the corresponding arc voltage/time graph, but represents only the A.C. component of the arc voltage, which appeears at the outputs of the arc voltage AC coupler circuit shown in the lower part of FIG. 24. Also, as indicated by the short vertical lines in the second part of FIG. 27, the instant apparatus does not analyze the continuously-varying voltage, but rather samples the voltage at the mid-point of regularly-spaced sampling intervals, 128 of which are accommodated in each sampling time.

Figure 28:
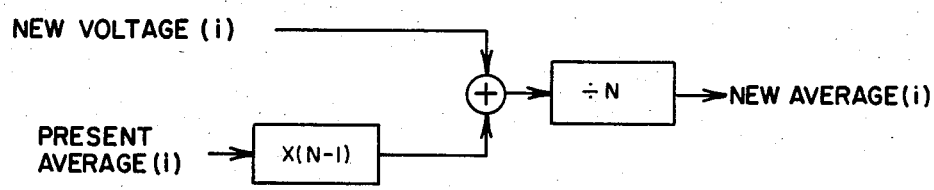
FIG. 28 is a flow chart showing the method used for continuous updating and averaging of the arc voltage signal in the preferred weld pool oscillation method of the invention.

The lowermost part of FIG. 27 shows an averaged arc voltage which the computer produces by averaging the discrete values produced as just described over a number of successive sampling times, this averaging being carried out by the algorithm shown in FIG. 28. It has been found that the instant apparatus produces sufficiently large amounts of aberrant data that analysis of the "raw" voltage data obtained from the curve shown in the central part of FIG. 27 may not give good results. Analysis of the averaged curve shown in the lowermost part of FIG. 27 has been found to give much superior results.

FIG. 28 shows the algorithm used to produce the average curve shown in the lowermost part of FIG. 27. When the ith digital voltage value (i.e. the voltage value for the ith sampling interval) of any sampling time is received by the computer, the previous average for the ith sampling interval is multiplied by (N−1) where N is a constant set by the operator using the software described below. The new voltage value is added to this product, and the resultant sum divided by N to produce the new average. It can be shown that this averaging process yields a wave form having a signal-to-noise ratio improved by a factor of $(2N-1)^{0.5}$.

It might be thought that it would be more logical to derive frequency data by averaging the last (say) 10 or so voltage values at each point. However, this method has the disadvantage of requiring extra storage space and also requiring a greater amount of calculation to produce the average curve. Although it is also in theory possible to obtain frequency data from the unaveraged curve shown in the central part of FIG. 27, and then to average the frequency so produced over a number of cycles, such a method would have the disadvantage that the final calculation of an average frequency would only occur after (say) every four or five sampling intervals, whereas the algorithm shown in FIG. 28 permits adjustment of welding parameters after every pulse.

Although the algorithm shown in FIG. 28 gives good results under steady-state welding conditions, which were used in the tests described below, this averaging method may give rise to difficulties if major changes occur in the welding parameters during a given run. In these circumstances, it may be necessary to use other averaging techniques, but it is believed that appropriate averaging techniques will readily be apparent to those skilled in the art.

Figure 29:
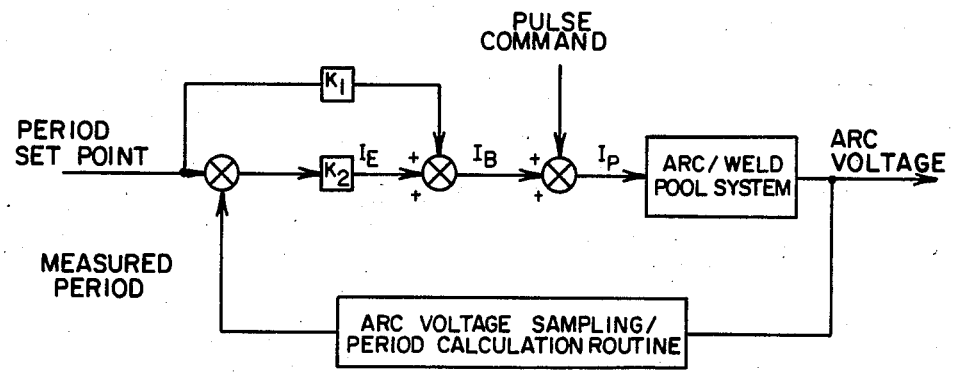
FIG. 29 is a flow chart showing the logic employed in the preferred weld pool mass measurement method of the invention.

FIG. 29 is an idealized flow diagram of the algorithm which is used for maintaining the mass of the weld pool constant despite variations in welding conditions. As will be apparent from the more detailed description below, the various steps of the algorithm shown in FIG. 29 are not carried out continuously but only at discrete intervals. As shown in FIG. 29, the operator establishes an initial set point for the frequency of oscillation of the weld pool which will produce the size of weld pool believed to be optimum for a given welding operation. This initial set point $K_1$ is put into the instant apparatus by the operator, who also establishes the other parameters using the potetiometer controls previously described. These initial settings by the operator establish a base current $I_B$. Upon a pulse command from the computer, this base current $I_B$ is increased to the pulse current $I_P$, which causes oscillations in the arc/weld pool system as previously described. Also as previously described, the resultant oscillations in the arc/weld pool system cause changes in the arc voltage, which is submitted to the arc voltage sampling/period calculation routine already discussed above to produce a measured period of oscillation, from which the actual weld pool mass $K_2$ can be calculated. The difference between the desired and actual weld pool masses is calculated, and a current correction $I_E$ calculated and used to adjust the base current. The resultant frequency calculation and base current is repeated at regular intervals after each current pulse. Updating can be frequent; for example, the preferred instant apparatus described above with reference to FIGS. 19–25 has been operated with updating of the weld pool mass every 1/15 of a second, using a sampling interval of 160 microseconds and a totaling sampling time of 15 milliseconds.

Figure 30:
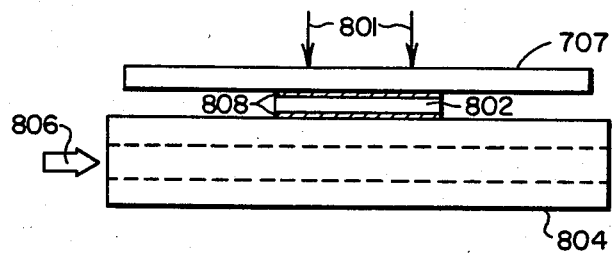
FIG. 30 is a schematic elevation of the eperimental "weld joint preparation" shown in FIG. 19 and used for testing the weld pool mass/frequency measuring apparatus of the invention shown in FIGS. 19–25.

FIG. 30 shows the "weld joint preparation" 707 shown schematically in FIG. 19, together with the mount therefor. As already mentioned, for experimental purposes the integer 707 was not a true weld joint preparation but rather a single plate, thereby allowing a bead-on-plate weld to be performed. As shown in FIG. 30, the plate 707, which is made of hot rolled mild steel, is mounted on a copper mount 802, which is in turn mounted on a hollow copper cooling block 804 provided with a channel through which a stream 806 of water can be passed for cooling purposes. A thermal joint compound 808 is provided between the copper mount 802 and both the plate 707 and the cooling block 804 to ensure good thermal contact. As will be apparent to those skilled in the art, in this apparatus the central region 801 of the plate 707 will be maintained much cooler during welding than the remaining parts of the plate 707 because this sample region will be in good thermal contact with the cooling block 804. Ordinarily, therefore, one would expect that as a weld crosses region 801 on plate 707, the size of the weld pool would decrease significantly because of the increase in the rate at which heat is removed from the weld pool. Accordingly, performing a weld in a straight line across region 801 provides a strenuous test of the ability of the weld pool oscillation methods of the invention to maintain a constant weld pool size despite major changes in weld pool conditions.

Figure 31:
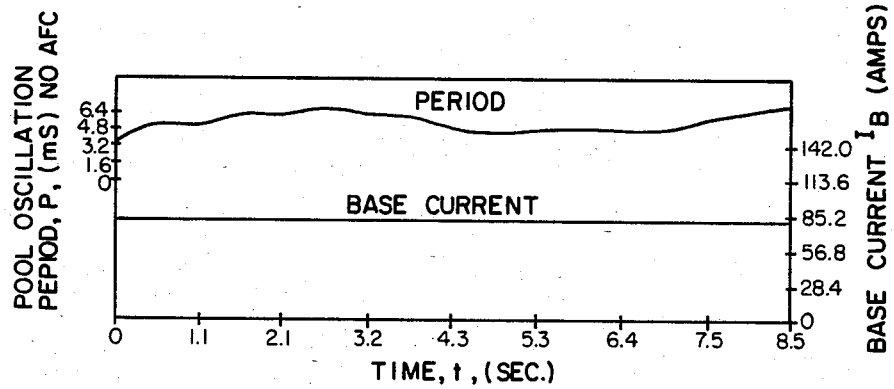
FIG. 31 is a graph showing the temporal relationship between frequency and base current in the absence of the weld pool mass measurement method of the invention.
Figure 32:
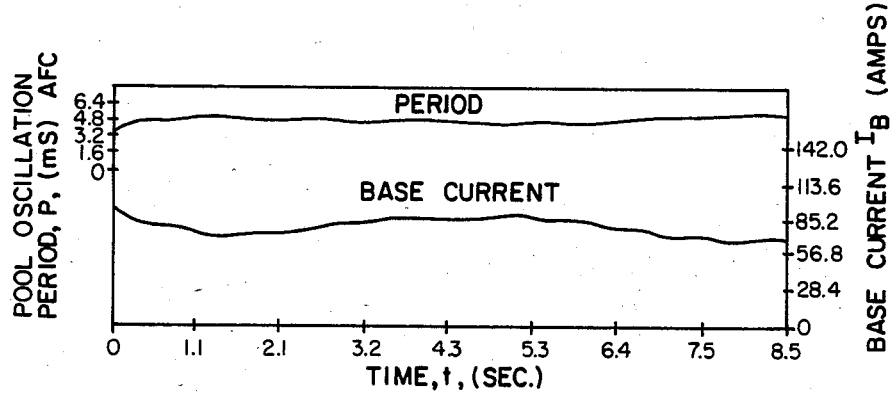
FIG. 32 is a graph similar to FIG. 31 but using the weld pool mass/frequency measurement method of the invention.

The improvement in maintaining constant weld pool size obtainable by the instant weld pool oscillation methods when using the apparatus shown in FIGS. 19–30 as illustrated in FIGS. 31 and 32. FIG. 31 is a part of test data taken using this apparatus but with the control system off so that a constant base current $I_B$ is maintained, this being the normal prior art condition. As will be seen from FIG. 31, although the base current remains constant, the period of oscillation, and thus the size of the weld pool, undergoes very substantial variations. In contrast, FIG. 32 shows a similar plot using the same apparatus but with the control system on so that base current is varied to maintain a constant weld pool size. It will be seen from FIG. 32 that substantial changes in base current occur, but that the period of oscillation, and thus the mass of the weld pool, are maintained with much less variation than with the prior art illustrated in FIG. 31.

WELD POOL OSCILLATION METHOD SOFTWARE

The software used in the computer 734 to carry out measurement of weld pool oscillation is shown in FIGS. 33, 33A–33L and 34. As already mentioned, the computer 734 is a AIM-65 Rockwell computer used in the standard configuration as received from the manufacturer. The software shown in FIGS. 33 and 33A–33G is stored in a single type 2716 EPROM in slot 225 of the computer's main board, and the software shown in FIGS. 33H–33L is stored in a similar EPROM in slot 226 on the same board.

The control program shown in FIG. 34 is stored on magnetic tape and fed to the tape input of the computer 734, as described above with reference to FIG. 20.

The tasks to be performed by the software include monitoring of operator inputs from the pendant, control of the two translators, control of the welding power supply and data collection and processing. The logic used is that shown in FIG. 29. The initial values of base current, pulse current, duration and frequency of pulses are set manually by the operator and thereafter the base current is adjusted automatically by the computer. The software also allows for an automatic voltage control mode (handled by sub-routine AVC shown in FIG. 33I), in which the computer samples the arc voltage and controls the Z-axis translator 716 so as to keep this arc voltage within acceptable levels. The use of the automatic voltage control is optional and this voltage control was not used in the tests described below.

The program MAIN 850 shown in FIG. 3 is the "home base" or "fall-back position" for the computer. Basically, this program waits for the user to request a parameter change or for an interrupt to be received from one of the interrupt timers associated with the various routines described below.

As already mentioned, several of the subroutines described below are associated with interrupt timers. As those skilled in the art are aware, interrupt timers are devices which generate interrupt signals which cause the computer to leave the routine it is previously executing and perform the routine specified by the associated interrupt timers. Each timer is loaded by the software with a time delay value of pre-determined magnitude. Each interrupt timer generates its interrupt signal after the appropriate predetermined time delay value has passed. In the present case, the sub-routine INTHAN shown in FIG. 33C is used to determine which interrupt signal has been received and thus which timer-associated sub-routine should be executed. After the routine associated with the received interrupt signal has been performed, the computer returns to the same place in the program where it was before the interrupt signal was received and the interrupt timer is reset, so that the same interrupt signal will not be generated again until after a further appropriate delay period has elapsed. Thus, any one subroutine cannot be called to frequently, so that the computer has time to perform all the necessary tasks. Also, only one interrupt is serviced at a time, so that the computer will execute the appropriate interrupt-associated sub-routine before returning to the previous task. Finally, the computer always returns to this program MAIN between interrupt-associated sub-routines. These interrupt-associated subroutines include the pendant monitoring routine PEND shown in FIG. 33J and the power supply pulsing routine PULSE shown in FIG. 33E. Subroutines START, STOP (both of which are shown in FIG. 33D) and JOG (shown in FIG. 33L) are called from subroutine PEND shown in FIG. 33J, while subroutines ATOD (shown in FIG. 33F) and COMPUT (shown in FIG. 33H) can be called from subroutine PULSE, as is the optional automatic voltage control routine AVC shown in FIG. 33I.

Figures 33, 33A:
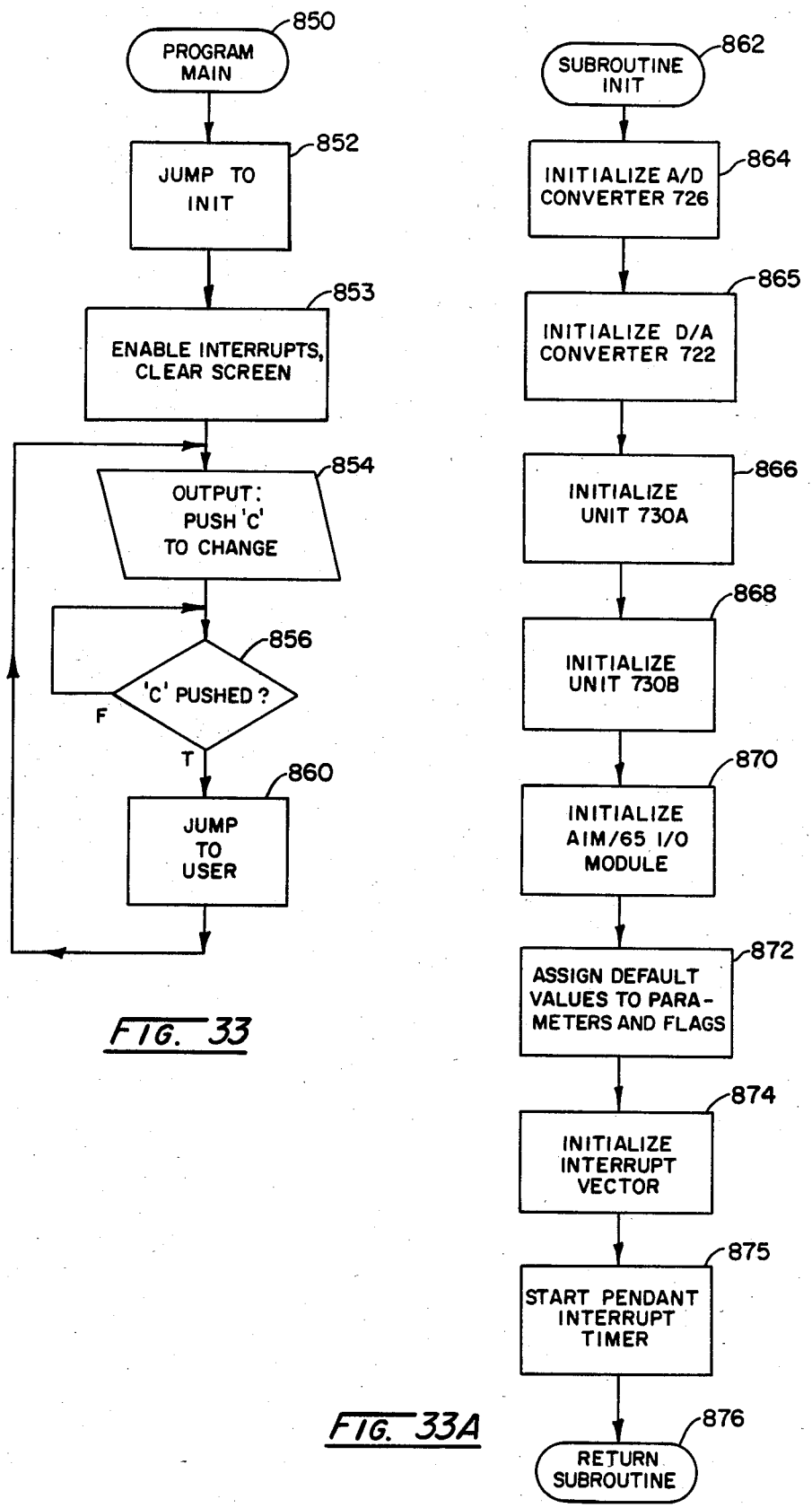
FIG. 33 is a flow chart of the computer program MAIN used in the weld pool mass/frequency measurement method of the invention.
FIG. 33A is a flow chart of the subroutine INIT shown in FIG. 33.

As already mentioned, program MAIN 850 shown in FIG. 33 is the "home base" for the computer. When welding is not being performed, the computer remains in the program MAIN, except that the subroutine PEND interrupt timer runs to enable the computer to scan the operator-operated pendant and execute any button pushes thereon. As shown on FIG. 33, the program MAIN 850 beings at block 852 by executing the subroutine INIT, which is an initialization routine which is describe below with reference to FIG. 33A. Since block 852 is outside the loops in the program MAIN, it is only executed when the computer begins operation, and is not repeated during any period of operation. Next, at 853 the interrupts are enabled, and the built-in screen on the AIM-65 computer is cleared. The program then proceeds at block 854, to output the phrase "PUSH C TO CHANGE" on the built-in screen. After a short delay provided to enable the user to respond, the program proceeds at block 856, a check whether the C key on the keyboard of the computer has been pressed, this being the key which the operator presses when he wishes to enter a parameter change. If key C has not been pressed, the program loops back to the beginning of block 856 and thus waits at block 56 until the C has been pressed, thereby waiting in a stand-by, non-operating condition until the operator proceeds to take action. When the operator presses key C, the program proceeds to block 860, where the subroutine USER is executed and, after return from subroutine USER, the program loops back to block 853.

Details of the subroutine INIT, referred to in block 852 of FIG. 33, are shown in FIG. 33A. From a beginning point at block 862, subroutine INIT initializes the analog/digital converter 726 (FIG. 20). Block 864 actually sets the period for which a pulse is to be maintained, and the duration of the delay between successive pulses. The program then proceeds, at block 865, to initialize the digital/analog converter 722 (FIG. 20). Next, at block 866, the input/output unit 730A (FIG. 20) is initialized, being loaded with initial values of various parameters calculated by the operator. The second input/output unit 730B is similarly initialized at block 868. At block 870 the computer input/output module is initialized. Thereafter, default values are assigned to various parameters and flags at block 872. As will be apparent to those skilled in the art, setting of such default values ensures that all required parameters always have some workable value, there no other value is provided by preceding operations. Then, at block 874, an "interrupt vector" is initialized. This "interrupt vector" is actually an address specifying the beginning of the interrupt handling subroutine INTHAN, and block 874 thus ensures that thereafter, whenever an interrupt is received, the program will jump to INTHAN. Next, at block 875, the pendant interrupt timer is started. Finally, the sub-routine INIT is exited at block 876, and a return made to the program MAIN.

The full listing for subroutine INIT is given in the Appendix to the present description to the conventional Rockwell 6502. Assembler Language. Also reproduced in this Appendix is the Labeling Routine which sets initial values of various variables used by subroutine INIT.

Figure 33B:
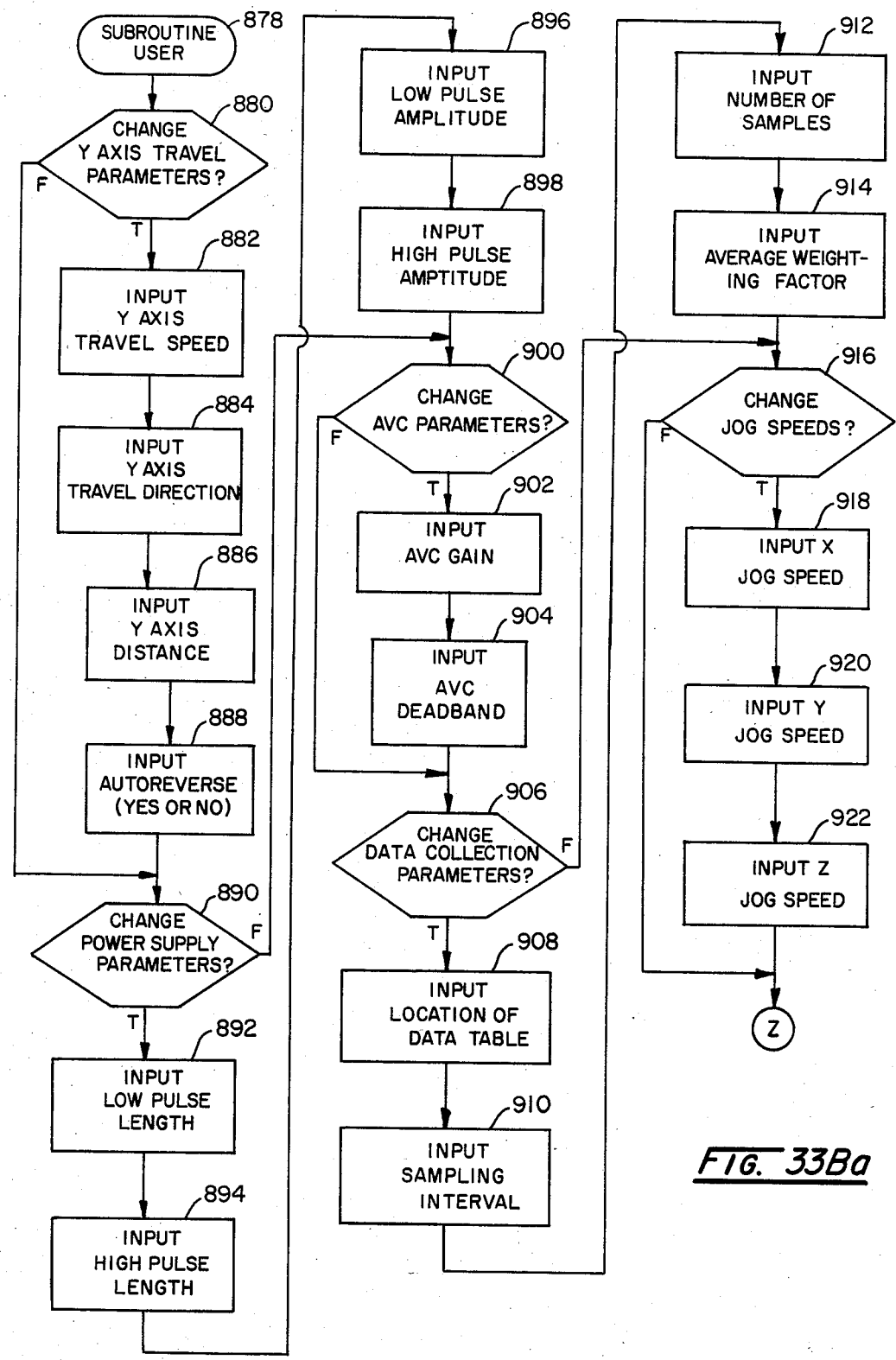
FIG. 33B is a flow chart of the subroutine USER shown in FIG. 33.
Figures 33B, 33C:
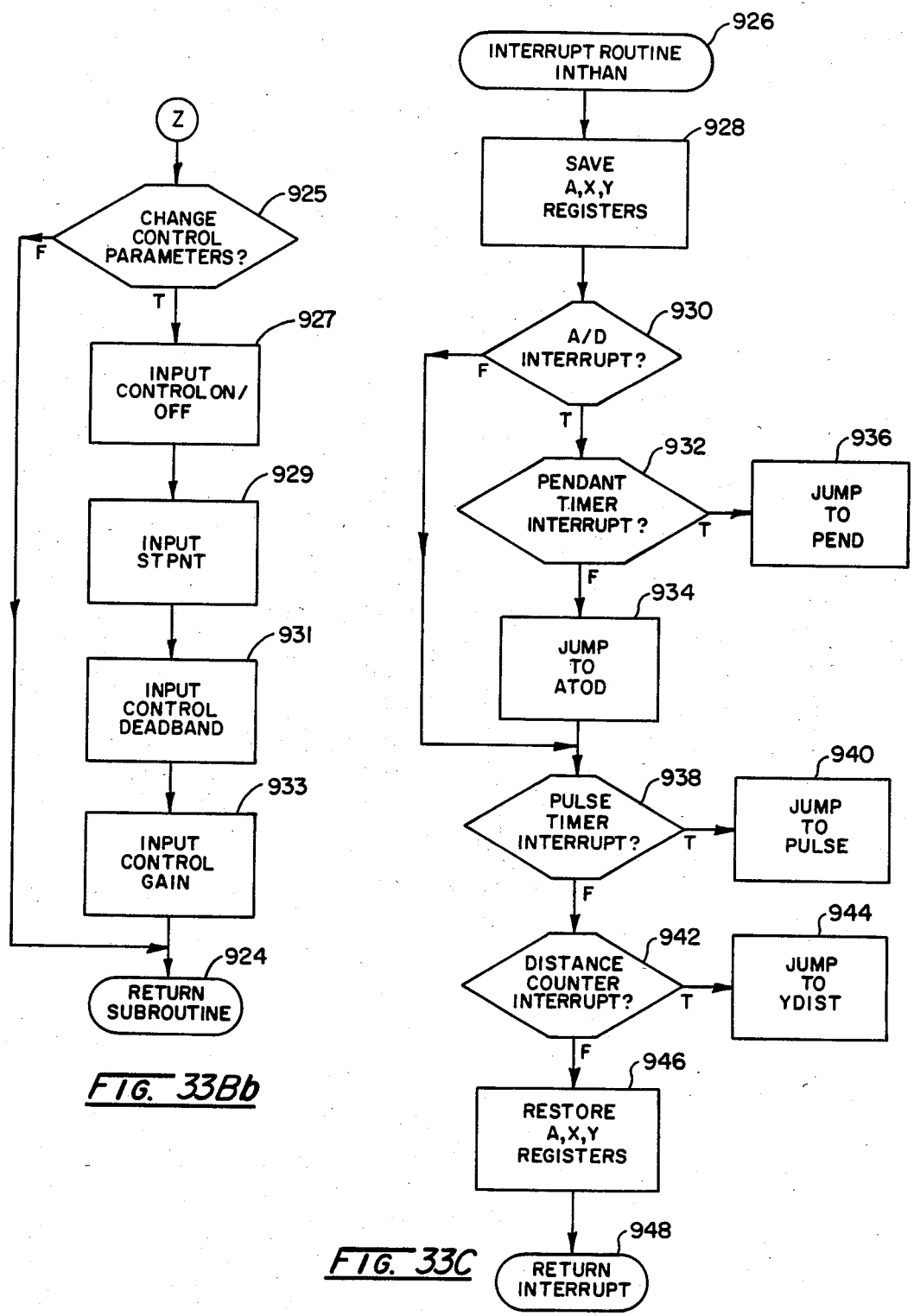
FIG. 33C is a flow chart of the subroutine INTHAN used to handle interrupts in the program MAIN shown in FIG. 33.
Figure 33D:
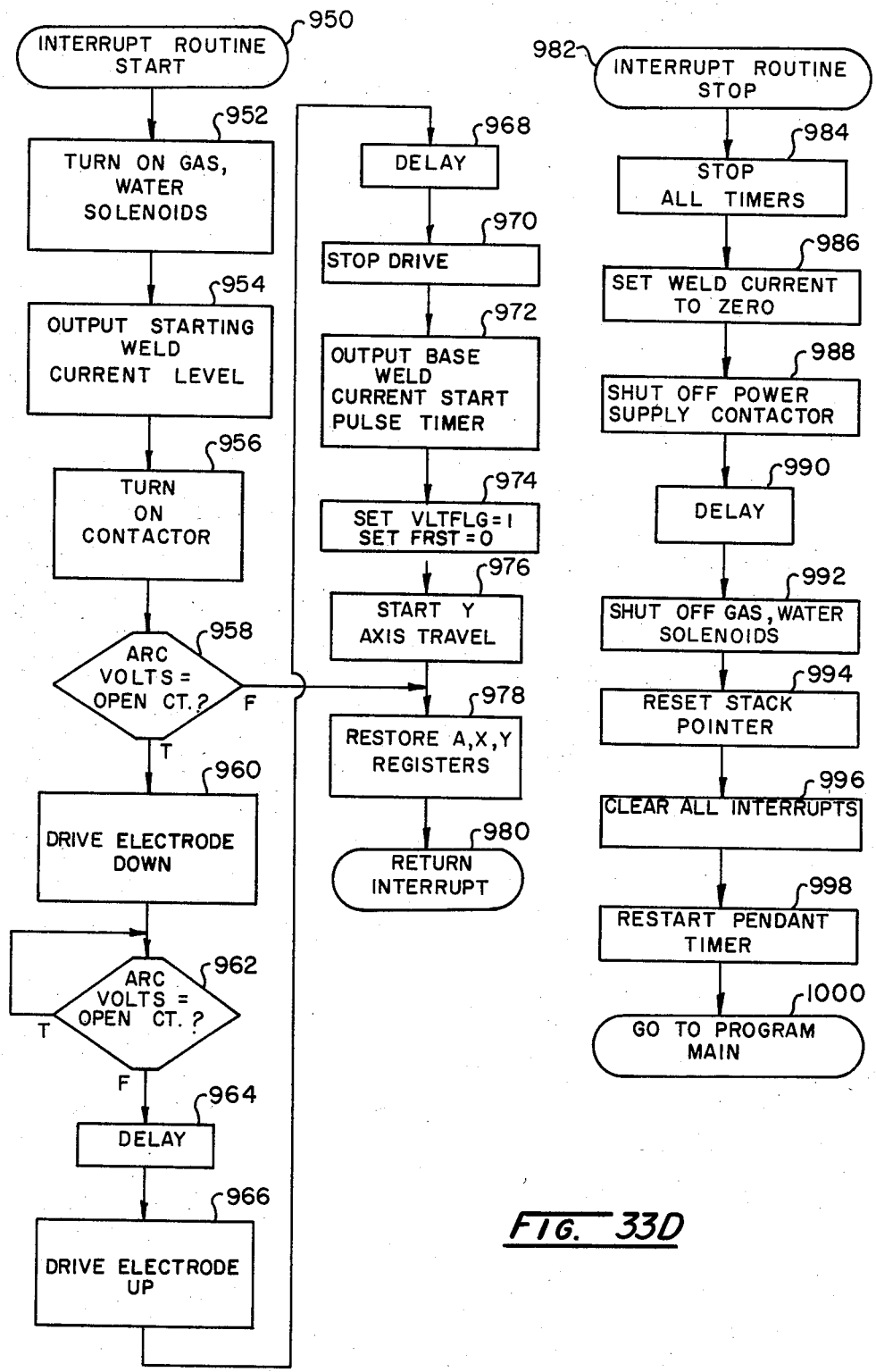
FIG. 33D is a flow chart of the subroutines START and STOP called by the subroutine PEND shown in FIG. 33J.

The subroutine USER, mentioned in block 860 in FIG. 33 is shown in more detail in FIG. 33B. As shown in FIG. 33B, subroutine USER proceeds from an entry point at block 878 to a block 880 where it displays on the computer display a message asking if the operator wishes to change the Y-axis travel parameters. If the operator presses Y (yes), the program displays to the operator, at block 882, a message asking the operator to input the Y-axis travel speed, then waits until the operator enters an appropriate response on the keyboard, and stores the response in an appropriate register. In an exactly similar manner, the program outputs messages to the operator and receives and stores the Y-axis travel direction at block 884, and the Y-axis distance at block 886. At block 888, the programmer is advised by the operator whether he wishes to use the autoreverse feature of the program. In the tests described below, the autoreverse feature was not used. The purpose of this feature is to allow the weld bead to reweld over the same path in the reverse direction, in order to determine whether there is any directional aberration to the data achieved in the experimental apparatus.

From block 888, or from block 880 if the operator presses any key other than Y, the program proceeds, at block 890, to display a message asking the operator whether he wishes to change the power supply parameters. If the operator presses key Y, the program proceeds through blocks 892, 894, 896 and 898 which, in a manner similar to that described above with regard to block 882, allow for inputs of "low pulse length" (i.e. spacing between successive current pulses in which the current is at the base level) at block 892, "high pulse length" (i.e. pulse duration) at block 894, "low pulse amplitude" (i.e. base current) at block 896 and "high pulse amplitude (i.e. pulse current) at block 898.

From block 898, or if the operator presses any key other than Y at block 890, the program proceeds, at block 900, to display a message asking the operator if he wishes to change the automatic voltage control (AVC). If the operator presses key Y, the program proceeds through blocks 902 and 904, which are both generally similar to block 882 described above, and in which the AVC gain and the AVC dead-band respectively are set. The AVC dead band sets the range within which variations in the arc voltage can occur without causing movement of the torch. As will be apparent to those skilled in the art, minor variations in the arc voltage is inevitable, and the presence of the dead-band is necessary if unnecessary changes in arc length by the Z-axis translator 716, and possible hunting is to be avoided.

From block 904, or if the operator presses any key other than Y at block 900, the program proceeds to block 906, where it displays a message asking the operator if he wishes to change data collection parameters. If the operator presses key Y, the program proceeds through blocks 908–914, which are all generally similar to block 882 described above, and which allow for input of the location of a data table at block 908, sampling interval at block 910, number of samples to be taken during each sampling time (see description of FIG. 26 above) at block 912 and average weighting factor at block 914. The average weighting factor input at block 914 specifies the value of parameter N in the algorithm shown in FIG. 28.

From block 914, or if the operator presses any key other than Y at block 906, the program proceeds at 916, to display a message asking the operator if he wishes to change JOG speeds i.e. the speed at which the translators 714 and 716 will move the welding torch 708 (FIG. 9) when the operator depresses the JOG buttons on the pendant. If the operator presses key Y, the program proceeds through blocks 918, 920 and 922, which are all generally similar to block 882 described above, and which allow for inputs of X, Y and Z JOG speeds respectively. Obviously, block 918 is superfluous in the apparatus shown in FIGS. 19–25, in which no X-translator is provided, but block 918 is included in the software to allow for future modifications.

From block 922, or if the operator presses any key other than Y at block 918, the program proceeds, at block 925, to display a message asking the operator if he wishes to change the parameters of the current control program (shown in FIG. 34). If the operator presses key Y, the program proceeds, at block 927, to ask the operator if he wants the current control program activated or not, and then, at blocks 929, 931 and 933, asks the operator to input the values of the set point STPNT, deadband and gain parameters respectively, required by the current control program.

From block 933, or if the operator presses any key other than Y at block 925, the subroutine USER is exited at 924 back to MAIN.

All the parameters which are input to the computer during subroutine USER must be pre-calculated by the operator and, where these parameters are numerical values, must be converted into hexadecimal notation since the AIM-65 computer will only accept numerical inputs in hexadecimal notation. The Y-axis travel speed (YSPD) set at block 882 cannot exceed two inches per minute and the input to the computer is calculated by the following equation:

$$YSPD = 15000 \times \text{travel speed (inches per minute)}$$

The 15,000 in this formula is in decimal notation. The Y-axis travel direction (YDIR) input at block 884 can only be + or − (left or right respectively). The Y-axis distance (YDIS) input at block 886 is the distance which the Y-axis translator 714 (FIG. 19) will move the welding torch during a welding operation and is input directly in inches, the permissible range of values being 01 to 0F (1–15 in decimal notation). As previously mentioned, the autoreverse feature input block 888 was not in fact used, but is simply input as Y (yes) or N (no).

The low pulse length (low pulse delay, LOPD) input at block 892 and the high pulse length (high pulse delay HIPD) input at block 894 are calculated from the following equation:

$$LOPD/HIPD = \text{delay time (seconds} \times 10^6)$$

In this formula, the $10^6$ is in decimal notation. The low pulse amplitude (base current, BASEI) input at block 896 and the high pulse amplitude (pulse current, PULSAMP) input at block 898 are calculated to the following formula:

$$BASEI/PULSEI = \text{current (amperes)} \times 10.23$$

In this formula, the 10.23 is in decimal notation. The value of PULSAMP to be input is the difference between the pulse and base currents, not the absolute value of the pulse current.

The optimum value of the AVC gain (AVCSPD) input at 902 is not usually known in advance, and accordingly an initial value is entered and adjusted based upon the operator's evaluation of welding performance. The value of AVCSPD can be zero or any hexadecimal number from 0400 to FFFF. Setting AVCSPD to 0 disables the AVC feature of the apparatus. The value of the AVC dead band (AVCDB) to be input at block 904 is 33.3 time the desired dead band value in volts.

The location of data table parameter (BASLOC) input at block 908 determines the locations in the computer memory of a sample table and average sample table for any particular test. Permissible values of this parameter are 0800 to 0E00 (in hexadecimal notation). The new data table is stored at the memory location corresponding to the value input and the average data table starts one memory page later. Thus, for example, if the input is 0E00 the first element of the new data table is located at address 0E00 and the first element of the average data table will be located at 0F00. The value of the sampling interval (SAMPIN) input at 910 is equal to the sampling interval in microseconds, while the number of samples input at block 912 is simply equal to the number of samples to be corrected; acceptable values range from 01 to FF (1-255 in decimal notation). (That is to say the software will accept values from 1 to FF; however, since the software is designed to detect two maxima and two minima in the arc voltage, a number of samples less than 5 will not produce any results and in practice a number of samples less than about 20 will not produce useful results. It has been found that using 128 samples generally gives good results. Similarly, the average waiting factor (NSET) input at block 914 is equal to y where $$N=2^y;$$

acceptable values of this parameter range from 1 to 5.

The X-axis and Z-axis jog speeds (XJGSPD and ZJGSPD respectively) input at blocks 918 and 922 respectively, should be equal to 30000 (in decimal notation) times the desired jog speed in inches per minute. The X-axis jog speed (XJGSPD) input at block 920 is calculated in substantially the same manner but using a multiplier of 15000 rather than 30000.

Before the details of the remaining software shown in FIGS. 33C-33L are described, it is necessary to outline the manner in which an operator performs the welding operation using the apparatus shown in FIGS. 19-25. Before initiating welding, the operator presses C on the keyboard and performs the USER subroutine as already described to change any desired welding parameters. Thereafter, before initiating welding the operator must position the torch in the correct position relative to the plate 707 (FIGS. 19 and 30) using the Y-JOG and Z-JOG buttons on the pendant. Once the welding electrode is in the correct position, the operator initiates welding by pressing the weld start button on the pendant, thereby, in a manner to be described below, causing the computer to automatically start welding using the touch/start method in which the welding electrode 708 (FIG. 19) is lowered until it touches the work piece and then withdrawn an appropriate distance, the arc being formed as the electrode is withdrawn. To stop the welding operation, the operator simply presses the weld stop button on the pendant.

FIG. 33C shows the interrupt routine INTHAN, which is executed whenever an interrupt is received and the execution of the appropriate subroutine; subroutine INTHAN is necessary because the program MAIN cannot distinguish between the various possible interrupt signals. From an entry point at block 926, subroutine INTHAN proceeds, at block 928, to store the contents of the A, X and Y registers temporarily in order to preserve these for later processing. Next, at block 930, a flag ADIFR, relating to the analog/digital converter 726 (FIG. 20) is checked to see if it is set. If the analog/digital converter interrupt ADIFR is set at block 930, the program proceeds, at 932 to check a flag ADIER, which is set when one of the buttons on the operator pendant is pushed, is checked, and if this flag is set, the program proceeds to block 936 and proceeds to execute subroutine PEND. (The two testing operations, blocks 930 and 932, are necessary because there are two separate interrupt timers associated with the analog/digital unit 726, namely a pendant timer which controls scanning of the pendant, and a sampling timer, which controls data collection. Receipt of an interrupt timer will cause block 930 to produce a positive result. Accordingly, when block 930 produces a positive result, block 932 is executed to determine which interrupt timer produced the interrupt. If it is the pendant timer, subroutine PEND must be executed as already described; if it is the sampling timer, subroutine ATOD must be executed, as described below.) If, however, at block 932 flag ADIER is not set, the program proceeds to block 934, and executes subroutine ATOD from block 930, or if the flag ADIFR is not found to be set at block 930, the program proceeds, at block 938, to test whether a pulse timer interrupt has been received. If a pulse timer interrupt has been received, the program proceeds to block 940 and executes subroutine PULSE. If no pulse timer interrupt has been received, the program proceeds, at block 942, to test whether a distance counter interrupt has been received. This distance counter indicates when the welding electrode has covered the Y-axis distance input at block 886 (FIG. 33B). If a distance interrupt is found at block 942, the program proceeds to block 944 and executes a subroutine YDIST; this subroutine YDIST basically deals with the (presently unused) autoreverse feature and merely makes appropriate arrangements for reversal of welding direction if the autoreverse feature is set. Otherwise, YDIST merely stops the movement of the welding electrode. If no distance counter interrupt is found at block 942, the program restores at block 946, the original values of the A, X and Y registers and then exits via block 948.

Figure 33J:
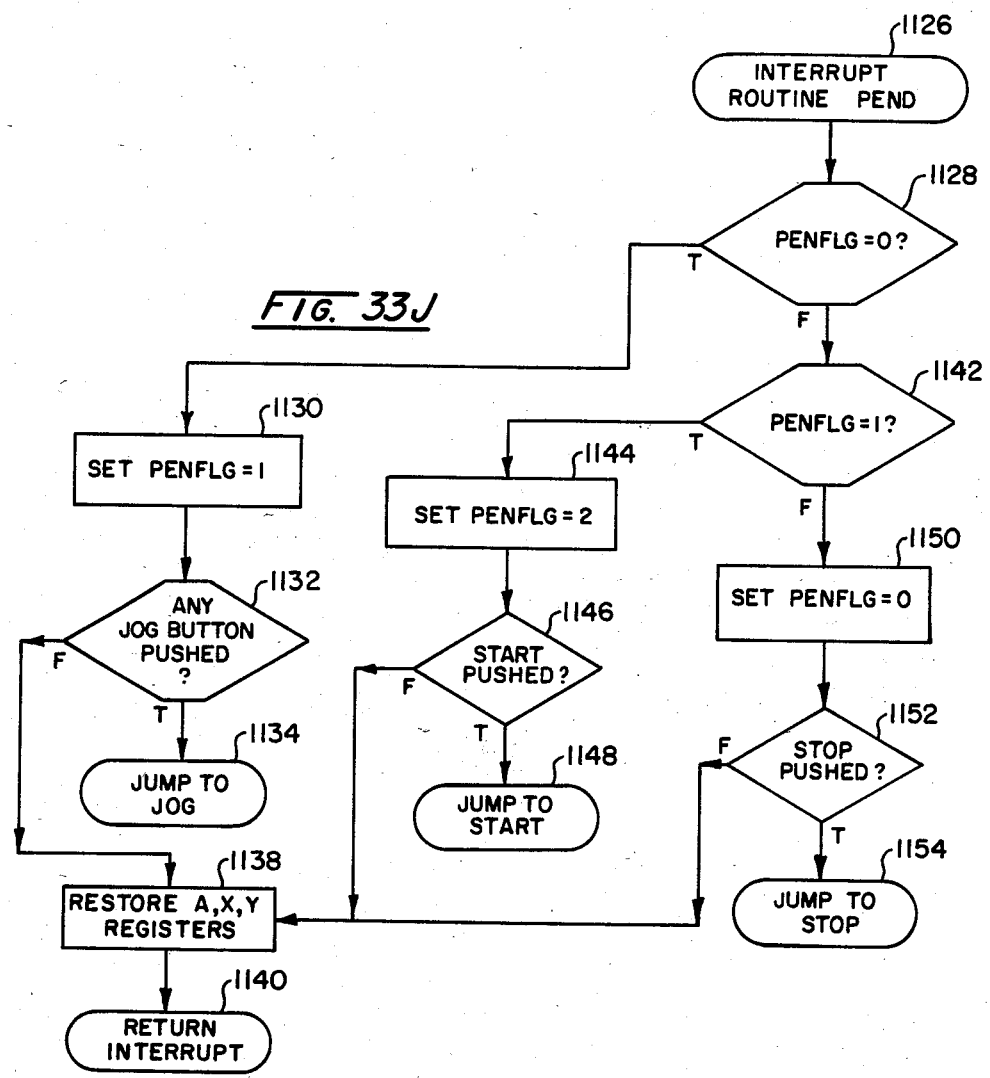
FIG. 33J is a flow chart of the subroutine PEND shown in FIG. 33C; P

The next subroutine to be described will be the subroutine PEND shown in FIG. 33J. As previously mentioned, the pendant has the form of a 4×4 matrix, in which each pushbutton interconnects one drive line and one sensing line. The subroutine PEND is called every 65 milliseconds. To scan a row of the matrix of the pendant, the appropriate drive line is energized and the sensing line checked. The optical isolators used in units 718C and 718D (FIG. 20) have a relatively slow response time of approximately 4 milliseconds. Accordingly, it is only possible to check one row of the pendant each time PEND is called, and the subroutine is arranged accordingly.

Selection of the row to be checked is controlled by a pendant flag, PENFLG set as described below. Accordingly, from a start point 1126, subroutine PEND proceeds immediately to block 1128, where it checks to see whether PENFLG is equal to 0. If so, the program proceeds to reset PENFLG to 1 at block 1130, and then at block 1132, checks to see whether any of the X, Y and Z-jog buttons in the first row have been pressed. To perform this operation, the computer must energize pendant line 4 and check each of the pendant sensing lines, lines 0-3, for an input. In practice, because of the very slow response of the optical buffer, the driving and sensing operations cannot both occur at block 1132, otherwise a delay of at least 4 milliseconds would have to be built into the program at block 1132 and subroutine PEND would consume an excessive amount of computer time. Accordingly, at block 1132 the computer actually energizes line 5 (the driving line for the second row), then immediately checks the sensing lines.

Because of the delay in optical isolators, the energization of line 5 has no immediate effect on the sensing lines, and the inputs from the sensing lines are determined by the energization of pendant line 4, which was effected on the previouss pass through subroutine PEND, during the checking of the third row as described below. Also, operation 1132 is somewhat more complicated than would appear from FIG. 33J since, for scanning purposes the direction buttons is part of the first row, but mere change in the direction button without any other button presses does not require calling of subroutine JOG. Accordingly, block 1132 first checks whether any buttons have been pushed in the first row and then checks whether the button pushed is the X, Y or Z-jog buttons actually results in the calling of subroutine JOG. If at block 1132, the sensing line inputs indicate that a button in the first row has been pressed, the program proceeds via block 1134 to the subroutine JOG shown in FIG. 33L. If at block 1132 it is determined that no buttons have been pressed, the program proceeds to block 1138 and restores the original contents of the A, X and Y registers (which were saved at block 928 (FIG. 33C) in subroutine INTHAN). Although not shown in FIG. 33K, block 1138 also restarts the pendant timer.

For experimental and testing purposes, it is convenient to have some method for physically removing the weld pool from the weld joint preparation so that the recess in the weld joint preparation thus produced can be measured to determine directly weld pool size and weld penetration. This feature can conveniently be provided by arranging for the software to control the operation of the gas solenoid (described above with reference to FIG. 19), and adding an appropriate subroutine between blocks 1152 and 1154 to cause a violent blast of gas to issue from the gas solenoid, thereby blowing the weld pool from the weld joint preparation.

If at block 1128 it is determined that PENFLG is not equal to 0, subroutine PEND proceeds to block 1142 and checks if PENFLG is equal to 1. If so, PENFLG is reset to 2 at block 1144 and then, at block 1146, the pendant is checked to see if the only button in the second row, namely the weld start button, has been pressed. For the same reason as explained above with reference to block 1132, at block 1146, it is actually pendant line 6 (the drive line for the third row which is energized and thereafter pendant line 3 (the fourth sensing line) is checked to see if the energization of pendant line 5 effected at block 1132 in the previous pass through subroutine PEND resulted, because of pressing of the weld start button, in a signal on pendant line 3. If the start button has been pressed, the program proceeds via block 1142 to the subroutine START shown in FIG. 33B. If the start button has not been pressed, the program proceeds from block 1146 through blocks 1138 and 1140 previously described.

Finally, if at block 1142 it is determined that PENFLG is not equal to 1, the third row of the pendant, which contains only the weld stop button must be checked. Accordingly, the program proceeds at 1150 to set PENFLG equal to 0 and then at block 1152, checks whether the stop button has been pressed. For the same reasons as explained above in relation to block 1132, at block 1152 the program actually energizes pendant line 4 (the drive line for the JOG row) and then immediately checks pendant line 3 for a signal caused by the energization of pendant line 6 at block 1146 in the previous pass through subroutine PEND. If at block 1152 it is determined that the stop button has been pressed, the subroutine proceeds via block 1154 to subroutine STOP shown in FIG. 33B. On the other hand, if at block 1152 it is determined that the stop button has not been pressed, the subroutine proceeds via blocks 1138 and 1140 described above.

The subroutine PULSE mentioned in block 940 in FIG. 33C will now be described in detail with reference to FIG. 33E. Subroutine PULSE controls the pulsing of the arc current in accordance with the parameters previously set by the operator (see description of blocks 890–898 given above with reference to FIG. 33B. From a start point at block 1002, subroutine PULSE proceeds at block 1004 to check the value of a pulse flag PFLG. This flag is provided to provide proper switching between the base and pulse currents. As already described with refernece to FIG. 33C, subroutine PULSE is called whenever a pulse timer interrupt is received. The manner in which the pulse timer is loaded will be described below, but it should be noted that subroutine PULSE is called when either a negative or positive transition in current is required i.e. at the beginning and end of each pulse. Accordingly, subroutine PULSE proceeds from a start point at block 1002 to a block 1004 where a pulse flag PFLG is tested to see whether it has a value 0 or 1. If the pulse flag is low, a negative transition in the current level is required, and this is handled by the remaining block in the right-hand column of FIG. 33E. On the other hand, if the pulse flag is high a positive transition in the current level is required, and this operation is handled by the blocks in the left-hand column of FIG. 33E.

If at block 1004, the pulse flag is found to be high, the program proceeds at block 1006 to set the pulse flag low and to read the DC coupled arc voltages. After the DC coupled arc voltage has been read, block 1006 switches the analog/digital converter 726 (FIGS. 19 and 20) so that it converts the A.C. coupled output from the circuit shown in the lower part of FIG. 24 rather than the DC coupled output from the circuit shown in the upper part of that Figure. As those skilled in the art are aware, the Gordos AD-10 circuit board used as the analog/digital converter unit 726, although having several input channels, only effects conversion of any one of these channels at any one time. Accordingly, the switching at block 1006 is required to set the converter 726 so that it will thereafter supply to the computer a digital signal representing the DC coupled arc voltage. Then, at block 1008, the program tests to see whether the AVC gain is equal to 0. If the AVC gain is not equal to 0, the program proceeds to block 1010 and executes subroutine AVC shown in FIG. 33I. Upon return from AVC, or if the AVC gain is found to be 0 at block 1008 (indicating that the operator does not wish the AVC gain feature to be used), the program proceeds to block 1012, where the current is set to the pulse current value, the value of HIPD (the high pulse delay indicating the duration of the pulse) is loaded into the pulse timer and the pulse timer is restarted. Thereafter, the program proceeds at block 1014, to restore the original contents of the A, X and Y registers (which were saved at block 928 in FIG. 33C) and then exits via block 1016.

If, on the other hand at block 1004 the pulse flag is found to be low, this pulse flag is reset to high at block 1018, the value of LOPD (the low pulse delay, indicating the gap between pulses) is loaded into the pulse timer and the pulse timer restarted at block 1020 and thereafter blocks 1022 and 1024 terminate the pulse current and restore the current to its base value. Next, at block 1026, the sampling interval (set by the operator at block 910, as described above with reference to FIG. 33B) is tested to see it is is equal to 0. If the sampling interval is not equal to 0, the subroutine ATOD is executed at block 1028 and immediately thereafter the subroutine COMPUT is executed at block 1030. The contents of the A, X and Y registers are then restored at block 1032 (these registers having been saved at block 928 in FIG. 33C) and subroutine PULSE is exited at block 1034. If at block 1026 it is found that the sampling interval is equal to 0 (which indicates that the operator does not wish voltage sampling to be effected), the program proceeds directly from block 1026 to block 1032 and then exits via block 1034 as previously described.

Figure 33K:
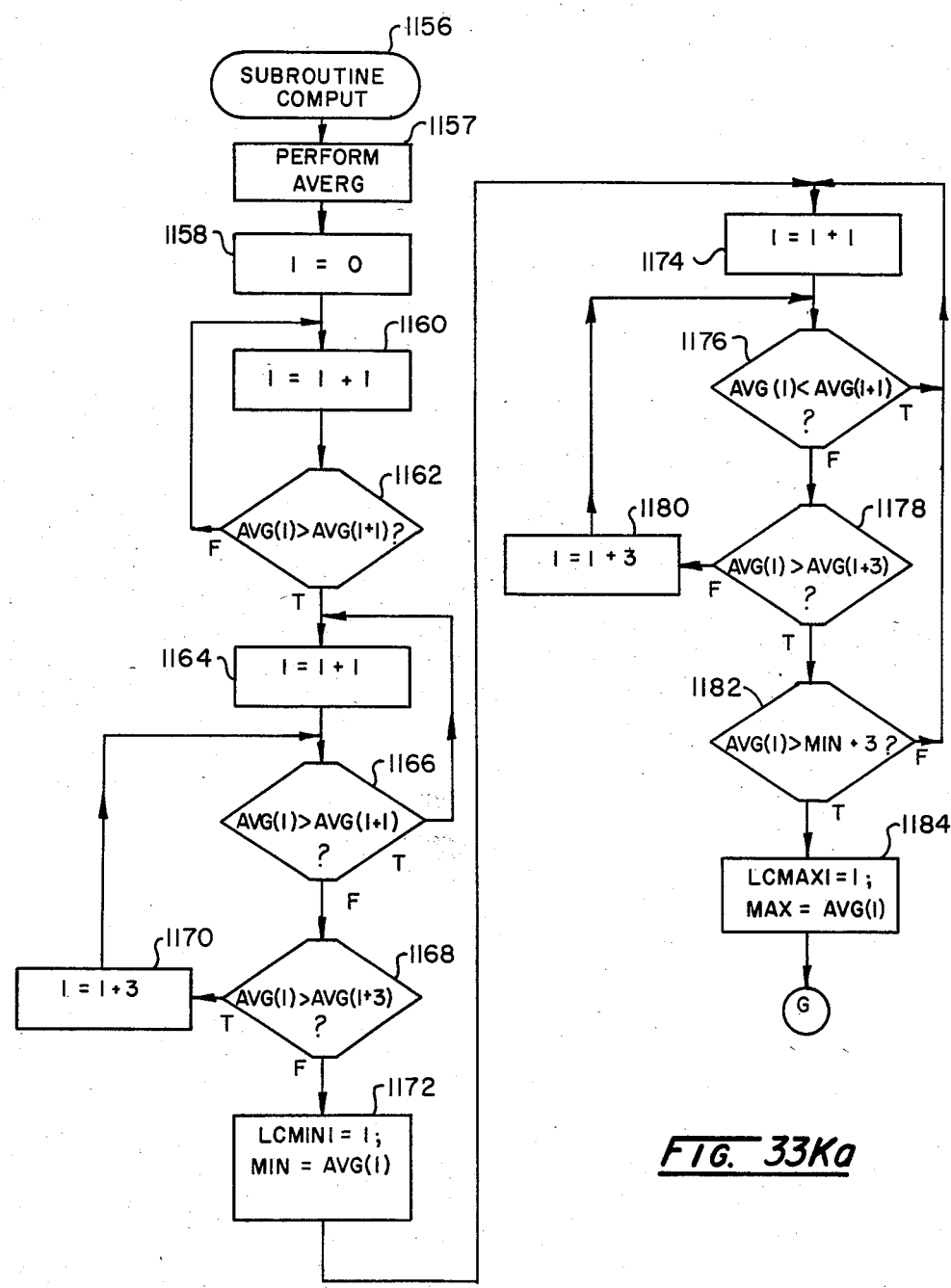
FIG. 33K is a flow chart of the subroutine COMPUT called by the subroutine PULSE shown in FIG. 33E.
Figure 33K:
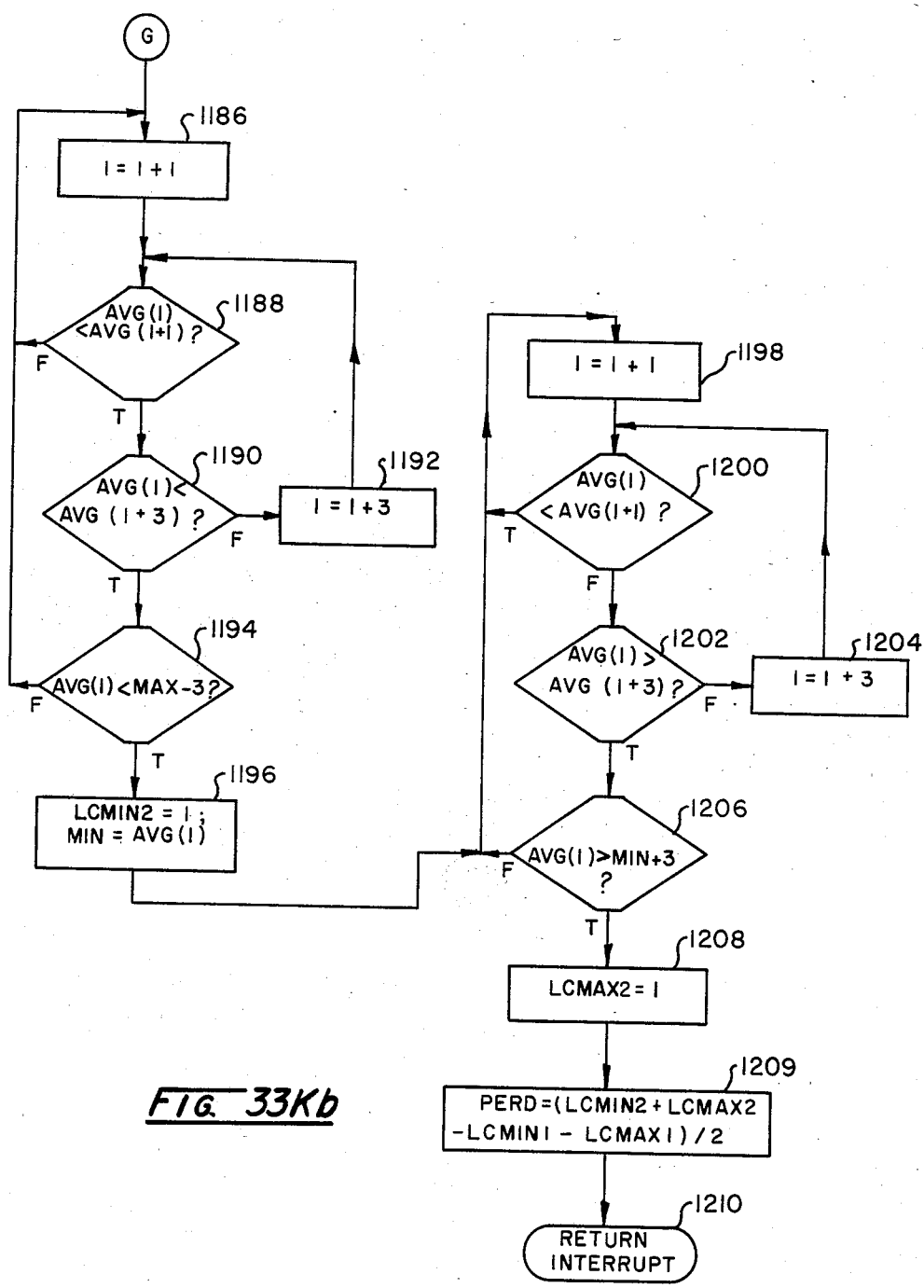
Figure 33L:
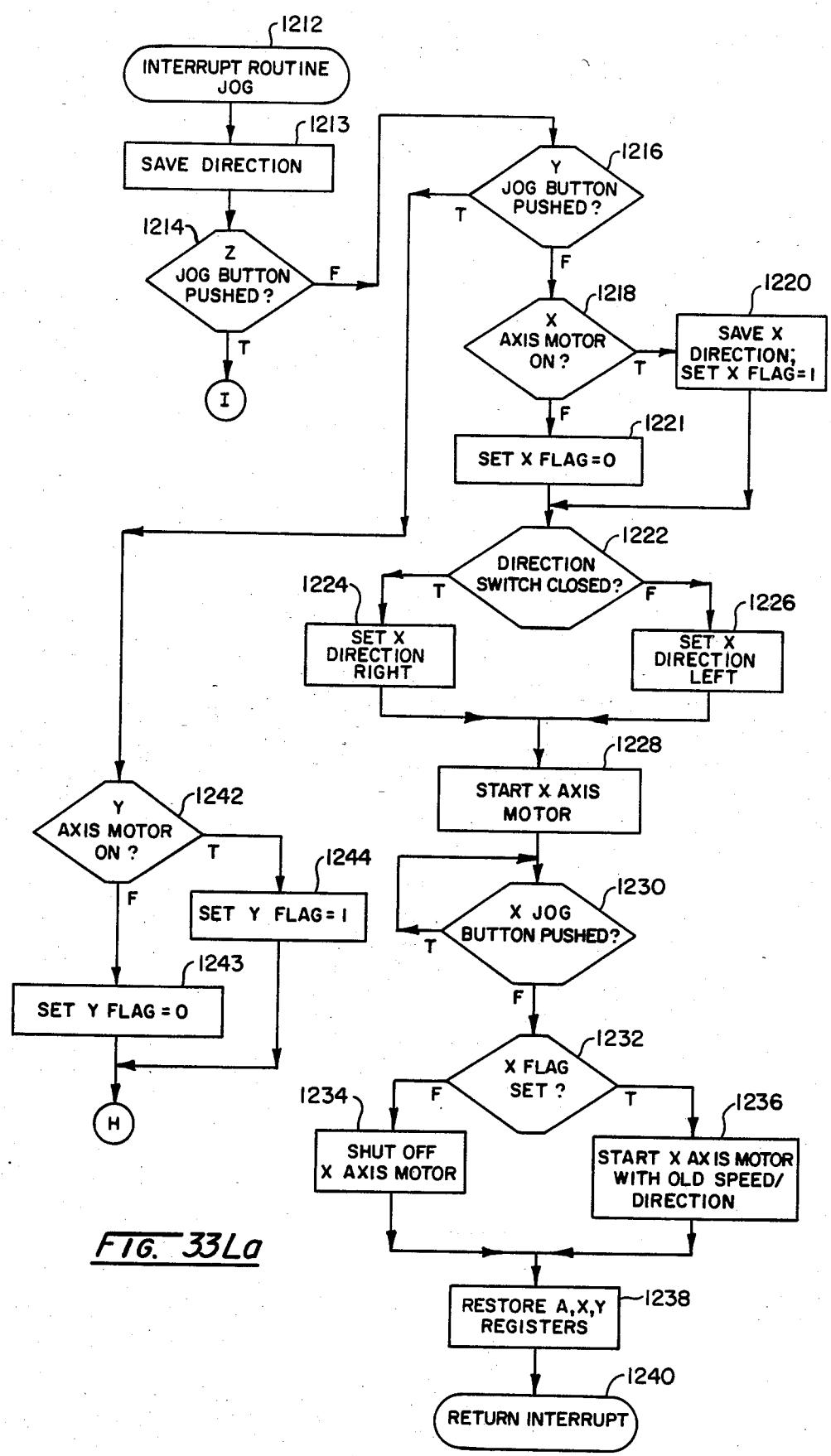
FIG. 33L is a flow chart of the subroutine JOG called by the subroutine PEND in FIG. 33J.
Figure 33L:
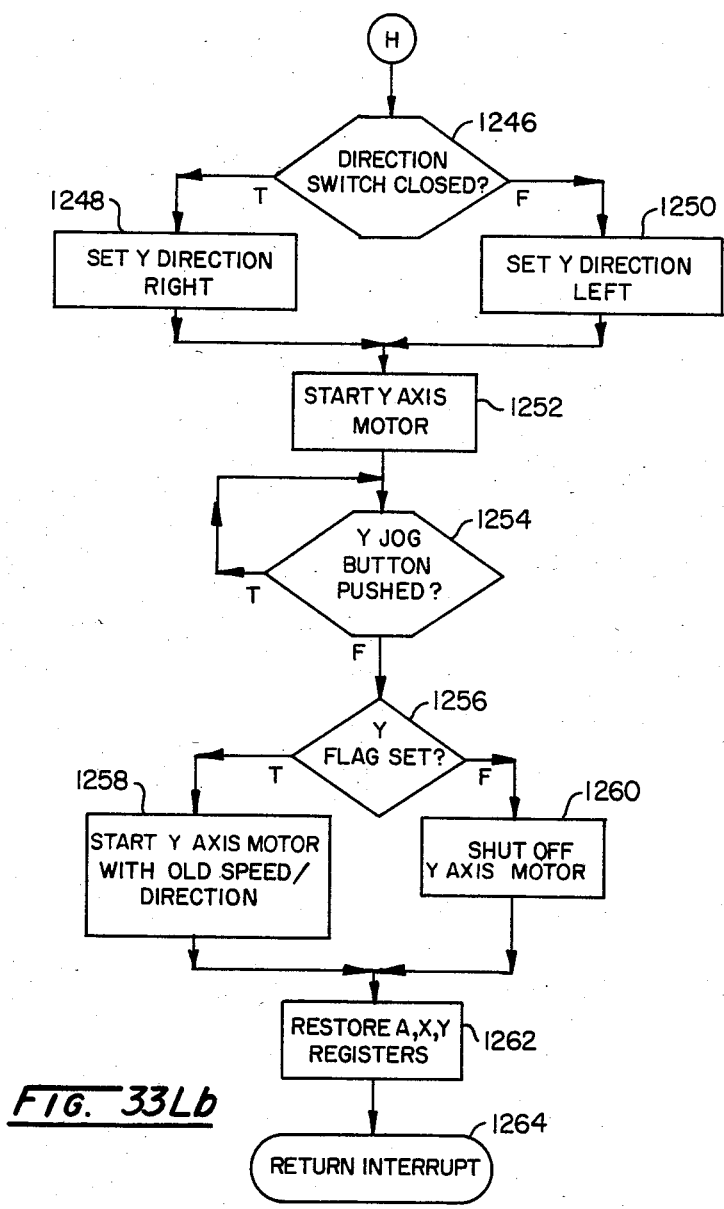
Figure 33L:
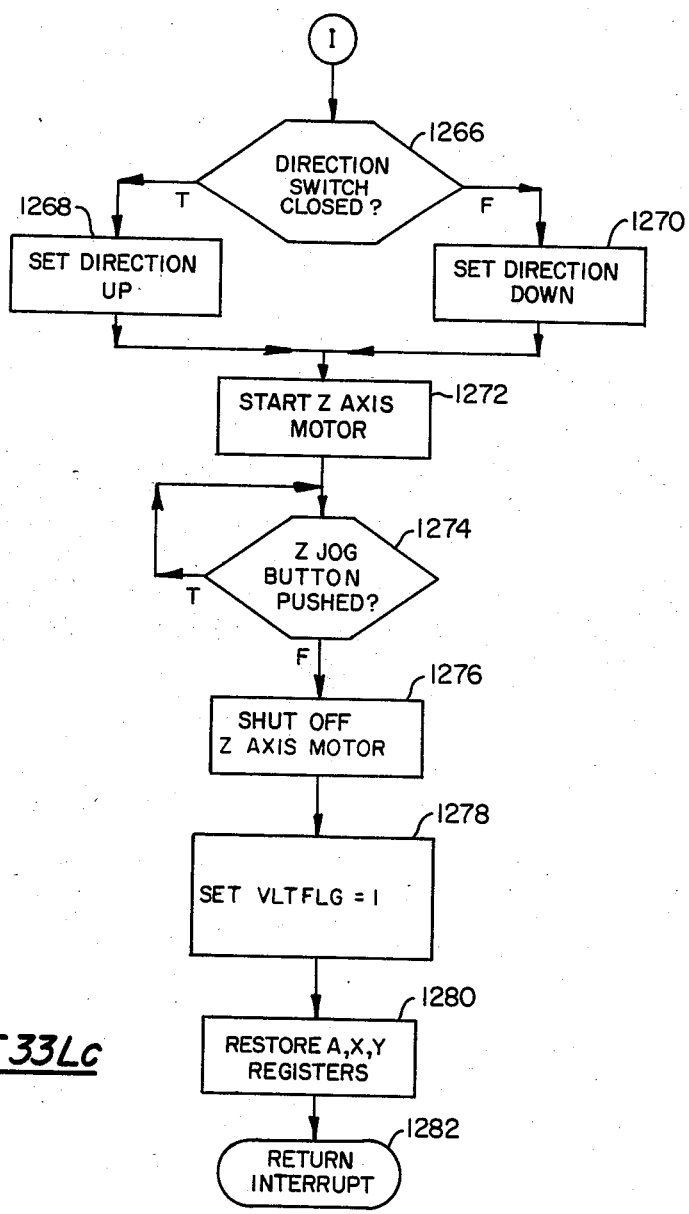

The subroutine JOG, which is called via block 1134 in subroutine PEND (see above description of FIG. 33J) is shown in FIG. 33L.

From a starting point at block 1212, subroutine JOG Proceeds, at block 1213, to save the value of the direction switch. Next, at block 1214, the subroutine tests to see whether it is the Z-jog button which has been pushed. It should be noted that block 1214 is not analogous to block 1132 in FIG. 33J; since it has already been established that one of the buttons in the first row has been pushed, it is only necessary for operation 1214 to check whether the sensing line on which the Z-jog button is located is producing an appropriate response. If at block 1214, it is found that the Z-jog button has been pushed, the program proceeds, as indicated by I-I in FIG. 33L, to a block 1266 to be described below. If at 1214 it is found that the Z-jog button has not been pushed, the program proceeds, at block 1216, to check whether the Y-jog button has been pushed. If not, the interrupt was from the X-jog button and accordingly, block 1218 the program tests whether the X-axis motor is switched on. If so, a X flag, XFLG is set to the value 0 at block 1220; if not, the same flag is set to the value of 1 at block 1221. From block 1220 or block 1221, the program proceeds, at block 1222, to check whether the direction switch is closed (as described above, this direction was saved at block 1213). If the direction switch is closed, the chosen direction is right, set at block 1224; if not, the direction is left, set at block 1226. After executing either block 1224 or 1226, the X-axis motor is started at block 1228.

Once the motor has been started, the program proceeds at block 1230, to test whether the X-jog button is still pushed and, so long as this button is still pushed, the program merely loops through block 30, allowing continuous motion by the X-axis motor. When the X-axis job button is released, the program proceeds, at block 1232, to check whether the X flag, XFLG is set. If the X flag was not set i.e.=0, thereby indicating that the X-axis motor was switched off at block 1218, the X-axis motor is switched off at block 1234, whereas if the X flag is set indicating that the X-axis motor was on at block 1218, the program proceeds from block 1232 to block 1236, where the X-axis motor is allows to reume its former speed and direction. From block 1234 to 1236, the program proceeds at block 1238, to restore the original contents of the A, X, Y registers (saved at block 928 in FIG. 33C) and is excited via block 1240.

It will be appreciated that since no X-axis motor is actually used in the present form of the apparatus, blocks 1218–1240 are presently superfluous but are provided in case it should be desired to provide an X-axis translator in the apparatus.

If at block 1216, it is found that the Y-jog button has been pushed, the program proceeds from block 1216 to a block 1242, which is the beginning of a sequence of blocks 1242–1264, which are Y-axis blocks exactly parallel to the X-axis blocks 1218–140 described above. Accordingly, blocks 1242–1264 will not be further described.

As mentiond above, if at block 1214 it is found that the Z-jog button has been pushed, the program proceeds, as indicated in I—I in FIG. 33L, to block 1266, which is the first of a sequence of blocks 1266–1282 which handle the Z-axis motor. However, the sequence of block for the Z-axis motor is somewhat different from those for the X- and Y-axis motors, since the Z-axis motor is not operated during welding (except for automatic operation by the subroutine AVC), and thus there is no need to save and restore original settings of the Z-axis motor in the same way that blocks 1218, 1220, 1221, 1232, 1234 and 1236 save and restore the original settings of the X-axis motor. Accordingly, block 1266 is *not* equivalent to blocks 1218 and 1242, but is instead a direction switch testing operation exactly similar to blocks 1222 and 1246. Block 1266 begins a sequence of blocks 1266, 1268, 1270, 1272 and 1274 which are exactly parallel to the sequence of blocks 1222–1230 respectively associated with the X-axis. When the Z-jog button is released, the program leaves block 1274 and proceeds at blocks 1276 to shut off the Z-axis motor. Next, at block 1278, the set point voltage is obtained for the subroutine AVC. Also at block 1278, a flag VLTFLG is set equal to 1 for purposes to be described below. Thereafter, the program executes blocks 1280 and 1282 which are exactly parallel to blocks 1238 and blocks 1240 respectively described above.

The subroutines START and STOP mentioned in blocks 1148 and 1154 respectively in subroutine PEND (FIG. 33J) will now be described with reference to FIG. 33D. As already mentioned, the subroutines START and STOP are called via subroutine PEND when the operator presses the weld start and weld stop buttons respectively on the pendant.

The starting point of subroutine START is designed 950 in FIG. 33D. The first step in subroutine START is omitted from FIG. 33D for the sake of convenience; this initial step checks whether an arc status register indicates that an arc is already present, thus indicating that the operator has pushed the start weld button by mistake. If the arc is already pressed, the subroutine START is exited. If the initial operation indicates that an arc is not present, the program proceeds, at line 952, to turn on the gas and water solenoids (via isolation unit 718—see FIG. 19) and then at block 954, causes the control module 704 (FIG. 19) to set a starting weld current level. This starting weld current level is set in the initialization routine of the apparatus and is not set by the operator in the subroutine USER described above, since the optimum starting current level is fixed for a given apparatus and it is unnecessary to reset it before every run. Next, at block 956, the power supply contractor again via unit 718 in FIG. 19. The program then proceeds, at block 958, to test whether the DC coupled arc voltage indicates an open circuit i.e. whether any arc has in fact been established. If the arc voltage at block 958 indicates that there is no open circuit, so that an arc has already been established, the program proceeds to a block 978 described below. Normally, however, at block 958 it will be found that there is an open circuit, indicated by an arc voltage of approximately 70 volts, and accordingly, the program proceeds, at block 960, to operate the Z-axis motor so as to lower the welding electrode 708 towards the plate 707. Once the lower of the welding electrode has begun, the DC coupled arc voltage is tested at bock 962, the program looping through block 962 until the arc voltage drops almost to 0, indicating the establishment of an arc; as those skilled in the art are aware, such an arc will only be established when the electrode 708 is touching or almost touching the plate 707. Once the arc is established, the program waits at block 964 for a predetermined period; this delay is desirable because the operations of the computer software are so fast that it is desirable to allow the arc to stabilize before the computer takes any further action. The program then proceeds to begin driving the Z-axis motor in the opposed direction at block 966, passing through a predetermined delay at block 968 and stopping the movement of the electrode at a block 970, thereby raising the electrode 708 and establishing a proper gap between the electrode 708 and the plate 707 for the welding operation. Thus, blocks 952–970 automatically establish the welding arc by the touch-start method. (Obviously, if the solenoids and the contactor are operator controlled, blocks 952, 956, 960, 962, 964, 966, 968 and 970 can be omitted.) The program then proceeds, at block 972, to set the weld current to the base value, and to load the pulse timer (the same pulse timer used in subroutine PULSE described above with reference to FIG. 33E) with the low pulse delay LOOPD and the the start of the pulse timer. Next, at block 974, a flag VLTFLG is set equal to 1, and a flag FRST equal to 0; as described below with reference to FIG. 33H, flag FRST is needed by the subroutine AVERG to advise it that welding has just started, so that the next set of data to be received will be the first data set of a weld run, while flag VLTFLG is required by subroutine AVC, as described below. Next, at block 976, the computer energizes the Y-axis motor to cause movement of the welding electrode parallel to the Y-axis, thereby beginning the bead-on-plate welding operation. Finally, from block 976, or from the NO exit of block 958, the program proceeds to restore the original values of the A, X and Y registers (which were saved at block 928 at FIG. 33C), and the subroutine START is finally exited via block 980.

The subroutine STOP is also shown in FIG. 33D is straightforward. When the operator presses the weld stop button on the pendant, subroutine STOP is called via subroutine PEND described above. From a starting point at block 982, the program proceeds to stop all timers at block 984, to set the weld current to 0 at block 988 and to turn off the power supply contactor at block 988. The program waits at a delay block 990 of predetermined duration, this delay allowing the arc to completely cease before the gas and water solenoids are shut off at block 992. (Obviously, if the solenoids and the contactor are operator-controlled, blocks 988 and 992 are omitted.) Next, at block 994 a stack pointer is resent. Finally, all interrupt registers are cleared at block 996 and at block 998 the pendant interrupt timer is restarted (it will be recalled that the operator can of course use the pendant buttons when welding is not in progress, although all the other interrupt timers are disabled when welding is not proceeding), and then, at block 1000, subroutine STOP is exited to program MAIN, block 854.

The subroutine ATOD mentioned in block 934 of subroutine INTHAN shown in FIG. 33C, and in block 1028 of subroutine PULSE shown in FIG. 33E, will now be described with reference to FIG. 33F. By comparing FIGS. 26 and 33F, it will be seen that subroutine ATOD is called by subroutine PULSE immediately after a restoration of welding current from the pulse current level to the base current level and thus at the beginning of the sampling time shown in FIG. 26. This ensures that any ith voltage value determined by ATOD is always taken at the same interval after the negative transition of the weld current. Subroutine ATOD performs sampling of the arc voltage during the cyclic decay of the arc voltage with the damped oscillations of the weld pool, as described above with reference to FIG. 26.

From a starting point at block 1036, subroutine ATOD proceeds, at block 1038, to clear the timer interrupt flags, thereby enabling further interrupts to be received. In fact block 1038 clears an interrupt disable flag which was previously blocking other interrupts. Next, at block 1040, a sampling timer, which is responsible for timing the sampling intervals referred to above with reference to FIG. 26, is loaded with the value of the sampling interval set at block 9 line 10 in subroutine User (FIG. 33B) and then, at block 1042, the program proceeds to repeated testing of the value in the sampling timer, looping through block 1042 until the sampling interval has elapsed, and then proceeding from block 1042 to a block 1044 where the AC coupled arc voltage (from the arc voltage AC coupled circuit shown in the lower part of FIG. 24) is read. From this arc voltage is added at block 1046 an arbitrary offset arc voltage, which allows all the voltage values to be recorded as positive numbers to simplify later handling. The arc voltage plus offset calculated at block 1046 is then, at block 1048, stored in DATA(I), position I of a table DATA. On the first pass through block 1048 I is equal to 0, this setting being effected at block 1056 described below. Next, at block 1050, the value AVG(I) is output to an oscilloscope. As will be described below in connection with subroutine AVERG shown in FIG. 33H, AVG(I) is the averaged arc voltage shown in the lowermost part of FIG. 27 for the sampling point number I for which the offset-corrected arc voltage has just been placed in DATA(I). Moreover, since AVG(I) is calculated during subroutine COMPUT by means of subroutine AVERG, and subroutine COMPUT is only called at block 1030 of subroutine PULSE (see FIG. 33E) immediately following the calling of subroutine ATOD at block 1028, the value of AVG(I) output at block 1050 is the value of this average calculated by COMPUT and AVERG following the previous sampling interval i.e. the oscilloscope display runs one complete pulse interval behind real time. It will be appreciated that the average output at block 1050 is actually in digital form and has to be converted to analog form by the digital/analog converter 722 (FIG. 19) before being sent to the oscilloscope. Block 1050 is also provided to means to place a marker or cursor at the minima and maxima located by subroutine COMPUT so that the operator can check visually that the software is locating the correct maxima and minima.

Following block 1050, I is incremented by 1 at block 1052 and is then tested at block 1054 to see if it is equal to NSAMP, the number of samples to be taken during the sampling interval, this number previously having been set by the operator at block 912 in subroutine USER (FIG. 33B). If at block 1054 I is not equal to NSAMP, the sampling time (see FIG. 26) has not ended and further voltage samples must be collected. Accordingly, the program loops back from block 1054 to block 1041. If, however, I is equal to NSAMP at block 1054, the sampling time is completed, and I is set equal to 0 at block 1056 so that, when ATOD is next called, on the first pass through block 1040 the offset-corrected arc voltage will be placed in DATA(0), and all values in DATA will be placed in the correct locations. The sampling timer is then stopped at block 1050 and next at block 1060, the analog/digital converter 726 (FIGS. 19 and 20) is switched so that it converts DC coupled output from the voltage isolation circuit shown in the upper part of FIG. 24 rather than the AC coupled output from the arc voltage AC coupler circuit shown in the lower part of FIG. 24. This switching of the analog/digital converter inputs is necessary because the subroutine ATOD works on the AC coupled arc voltage, whereas the subroutine PULSE, block 1006 (FIG. 33E) requires the DC coupled arc voltage. Finally, subroutine ATOD is exited via block 1062 back to subroutine PULSE.

The subroutine COMPUT and AVERG will now be described with reference to FIGS. 33K and 33H respectively; as may be seen from FIG. 33K, the subroutine AVERG is actually called by subroutine COMPUT and in order to understand the process carried out by subroutine COMPUT it is necessary to first decribe the averaging process carried out by subroutine AVERG.

As shown in FIG. 33K, the subroutine COMPUT proceeds from a start point at block 1156 to block 1157 where subroutine AVERG is called. As shown in FIG. 33H, subroutine AVERG proceeds from a start point at block 1076 to block 1078 where it tests whether the values which have just been placed in table DATA by subroutine ATOD are the first data set of a weld run; this test is accomplished by testing the flag FRST (previously) set at block 974 in rountine START (FIG. 33D) is equal to 0. If FRST is equal to zero, and thus the table DATA contains the first data set for weld run, the program proceeds from block 1078 to block 1092, where a counter I is set equal to 0. Then, at block 1094, AVG(I), the ith position in the average arc voltage table AVG referred to above at block 1050 in subroutine ATOD (FIG. 33F) is set equal to DATA(I). Next, the value of I is incremented at block 1096 and tested at block 1098 to see if it is equal to NSAMP, the number of samples, and therefore, the number of positions in DATA and AVG. If at block 1098 I is not equal to NSAMP, the program loops back to 1094. As will be apparent to those skilled in the art, the program will pass through blocks 1094, 1096 and 1098 NSAMP times, and will thereby transfer all NSAMP values in DATA to the corresponding locations in AVG. Finally, on the NSAMPth pass through block 1098, I will be equal to NSAMP and the program will be leave block 1098 set FRST equal to 1 at block 1099 and exit back to COMPUT via block 1100.

If, however, at block 1078 VLTFLG is not set, and thus the data in DATA relate to a second or later set of a weld run, subroutine AVERG must carry out the averaging process the logic of which is shown in FIG. 28. Accordingly, the program proceeds from block 1078 to block 1080 where I is again set equal to 0. Thereafter, at block 1082 the "old average" in AVG(I) is multiplied by (N-1), where N is the average weighting factor, as explained above with reference to FIG. 28. The resultant multiplied value in AVG(I) is then, at block 1094, increased by DATA(I) and the sum divided by N at block 1086 to produce the "new" value of AVG(I). Following block 1086, the program proceeds to blocks 1088 and 1090, which are exactly parallel to blocks 1096 and 1098 respectively described above, and which serve to ensure that program passes through blocks 1082–1086 NSAMP times, thereby calculating new values for all the NSAMP positions in AVG. When all the new AVG values have been calculated, subroutine AVERG is exited via blocks 1009 and 1100, and the program returns to the exit of block 1157 in COMPUT (FIG. 33K).

Following the return from subroutine AVERG, the main portion of subroutine COMPUT is used to determine the oscillation frequency of the weld pool by searching for maxima and minima in the averaged arc voltage curve. To avoid excessive consumption of computer time, subroutine COMPUT locates only the first two maxima and minima. Subroutine COMPUT also incorporates checks to ensure that small aberrations in the averaged arc voltage curve which may produce temporary false changes in the sign of the gradient of the curve are not recorded as true maxima and minima.

Upon return from subroutine AVERG at the exit from block 1157, the counter I is reset to 0 at block 1158 and then incremented by 1 at block 1160. (FIG. 33K shows a slightly idealized form of the routine COMPUT in which the search for the minimma and maxima is begun with the first point on the averaged arc voltage curve. In practice, it is probably unwise to begin with this first point, since transient effects associated with the negative transition in the weld current may tend to produce false maxima and minima during the first few readings. Accordingly, the block 1158 I may be set to a small positive integer rather than 0. With a 140 millisecond sampling interval, it has been found convenient to begin the search for minima and maxima by setting I equal to 10 (hexadecimal) at block 1158. However, the number to which I is set at block 1158 should not exceed NSAMP/2, since otherwise it may not be possible to locate two maxima and minima.) Following the incrementing of I at block 1160, block 1162 tests whether AVG(I) is greater than AVG(I+1) i.e. whether the slope of the average voltage curve is negative. Because the first true change of direction in the average arc voltage curve is a minimum (see the last graph in FIG. 27) if at block 1162 the slope is not negative it is necessary to follow the curve until a negative portion is obtained. Accordingly, if at block 1162 the slope is not found to be negative, the block loops back to 1160 and continues to loop through block 1160 and 1162 until a descending portion of the average arc voltage curve is located. When such a descending portion of the curve is located, the program proceeds from 1162 to block 1164 where I is again incremented and then again to block 1166 which is identical to block 1162 and again tests for negative slope of the curve. If the slope of the curve is still found to be negative at block 166, the program loops back to 1164. Thus, the program will continue to loop through blocks 1164 and 1166 until block 1166 indicates that the slope of the curve is no longer negative, thereby indicating that a potential minimum has been located. Once this potential minimum has been located, the program proceeds, at block 1168, to test whether the voltage at the potential minimum is greater than the voltage at the third succeeding point. If at block 1168 it is found that the arc voltage at the potential minimum is greater than the arc voltage at the third succeeding point, this indicates that the potential minimum is in fact spurious since with the sampling intervals used with experimental work of about 140 milliseconds, it is not possible to proceed from a true minimum to a true maximum and back to a lower value in three sampling intervals. Accordingly, if block 1168 gives a positive result, I is incremented by 3 at block 1170 and the program loops back to block 1166, thereby resuming the search for a true minimum on the far side of the aberration. If, however, at block 1168 gives a negative result, the potential minimum is accepted as a true minimum and the program proceeds at block 1172, to copy the value of I into a first minimum location register LCMIN1 and to copy the appropriate averaged arc voltage value from AVG(I) into a first minimum voltage register, MIN1.

Since the location of the first minimum has now been located, the program proceeds to locate the first maximum. Firstly, at block 1174, I is again incremented by 1 and then at block 1176 AVG(I) is tested to see if it is less than AVG(I+1) i.e. whether the curve has a positive slope. Since the first minimum has now been passed, initially the curve will have a positive slope and block 1176 will give a positive result, causing the program to loop back to block 1174. Accordingly, so long as the slope of the curve remains positive, the program will simply loop through blocks 1174 and 1176. However, when a point is reached at which the slope of the curve is no longer positive, this constitutes a potential first maximum and the program proceeds from block 1176 to block 1178, which is identical to block 1168 described above and tests whether the value of the curve at the potential maximum is greater than at the third succeeding sampling point, as would be the case for true maximum. If block 1178 yields a negative result, indicating that the potential maximum is in fact merely an aberration, the program proceeds to increment I by 3 at block 1180 and then loops back to block 1176 to resume the search for a true maximum. If block 1178 gives a positive result, indicating a true maximum, the program proceeds at block 1182, to determine if the value of the curve at the potential maximum is greater than MIN+3, MIN being the value of the curve of the previousl minimum stored at block 1172. Block 1182 acts to screen potential maxima by testing whether the voltage at the potential maxima differs from that of the potential minimum by at least 30 mV. Empirically, it has been found that if this condition is not satisfied the potential maximum will be due to an aberration. If block 1182 gives a negative result, the program loops back to block 1174 and resumes the search for a true maximum. If, however, block 1182 gives a true result, the program proceeds, at block 1184, to copy I, which now represents the location of the first maxima into a first maximum location register LCMAX1, and to copy the corresponding value of the curve into register MAX.

The program then proceeds, as indicated by G—G in FIG. 33K, to a series of blocks 1186, 1188, 1190 and 1192, which are exactly parallel to blocks 1164, 1166, 1168 and 1170 respectively previously described, accept of course that they locate the second minimum rather than the first. However, if block 1190 yields a positive result, the program proceeds to a further testing block 1194, which is exactly analogous to block 1182 previously described but tests whether the value of the curve at the potential second minimum differs from the value of the curve at the previous maxima by at least 30 millivolts. If not, the program loops back to block 1186. If block 1194 yields a positive result, at block 1196 the location of the second minimum is copies into register LCMIN2 and the corresponding minimum value of the curve copies into MIN.

The program then proceeds to locate the second maximum using a series of blocks 1198, 1200, 1202, 1204 and 1206 which are exactly analogous to blocks 1174, 1176, 1178, 1180 and 1182 respectively previously described and function in exactly the same manner. When block 1206 produces a positive result, the position of the second maxima is written into register LCMAX2 at block 1208.

The actual period of oscillation, PERD, is calculated by block 1209, which follows block 1208. Since the difference between the locations of the first and second maxima should constitute one period, and the locations between the first and second minima should also equal one period, the best value of the period is obtained by averaing these two differences i.e.

$$PERD = [(LCMAX2 - LCMAX1) + (LCMIN2 - LCMIN1)]/2$$

which is the formulae applied at block 1209.

Subroutine COMPUT has been simplified in FIG. 33K for purposes of illustration. The form of COMPUT shown in FIG. 33K represents the subroutine actually carried out when the subroutine COMPUT is able to locate two maxima and two minima i.e. when a "proper" set of data is received. To allow for cases where less than two maxima and two minima are found, subroutine COMPUT makes use of a counter CYCNT. CYCNT is set equal to zera between blocks 1156 and 1157, and at the same point the "old" values of LCMIN1, LCMIN2, LCMAX1 and LCMAX2 from the previous pass through subroutine COMPUT are saved in temporary storage registers. Each time a true maximum or minimum is detected (i.e. at blocks 1172, 1184, 1196 and 1208) CYCNT is incremented by 1. Between blocks 1208 and 1209, the value of CYCNT is tested. If CYCNT=4, all the desired minima and maxima have been detected and block 1209 is effected in the form shown in FIG. 33K. If CYCNT is not equal to 4, the operations performed are as follows:

(a) CYCNT=0; no tru minima or maxima have been detected, so the "saved" old values of LCMIN1, LCMIN2, LCMAX1 and LCMAX2 are restored to these registers, then block 1209 is performed as written, thereby keeping the indicated period unchanged.

(b) CYCNT=1; only one true minimum has been detected and PERD is set equal to 2×LCMIN1;

(c) CYCNT=2; one true minimum and one true maximum have been detected and PERD is set equal to 2×(LCMAX1−LCMIN1);

(d) CYCNT=3; two true minima and one true maximum have been detected and PERD is set equal to (LCMIN2−LCMAX1)+0.5(LCMIN2−LCMIN1).

In addition to calculating PERD, block 1209 also outputs the value of perd to channel 3 of the digital-/analog converter 722 (FIG. 20) for transmission to the oscilloscope or other recording device.

The last of the subroutines shown in FIGS. 33-33L to be described in the subroutine AVC shown in FIG. 33I. As previously mentioned, subroutine AVC is called by block 1010 in subroutine PULSE (FIG. 33E) and is thus effected immediately before each positive transition in the weld current after the arc voltage has resumed its original, steady-state value which it assumes during a steady base current. Accordingly, AVC adjustment only occurs once per pulse, shortly before the beginning of each pulse. This placement of subroutine AVC prevents the subroutine interfering with the detection of the variations in arc voltage caused by weld pool oscillation, and also prevents the voltage set by subroutine AVC from being disturbed by the variations on arc voltage caused by the current pulses.

As shown in FIG. 33I, subroutine AVC commences at a start point 1102. Although not shown in FIG. 33I, the first operation in subroutine AVC is to read the AVC gain parameter which has been set by the operator at block 902 in subroutine USER (FIG. 33B). If this AVC gain is equal to 0, the AVC feature of the apparatus is disabled and accordingly subroutine AVC is immediately exited.

If the AVC gain parameter is not equal to 0, subroutine AVC proceeds, at block 1104, to read the AC coupled arc voltage V and then, at block 1106, tests to see whether the flag VLTFLG is set. As previously mentioned, flag VLTFLG is set equal to 1 either by block 974 of subroutine START (FIG. 33D) or by block 1278 of subroutine JOG (FIG. 33Lc). Thus, this flag is set at the beginning of each welding run or on each occasion when the operator adjusts the vertical location of the welding electrode 708 (FIG. 19); either of these occurrences necessitates a resetting of the reference arc voltage V(COMMAND), and accordingly if block 1106 produces a positive result, V(COMMAND) is reset equal to the arc voltage (previously read at block 1104) at block 1107. Although not shown in FIG. 33I, block 1107 also resets VLTFLG equal to zero. From block 1107, subroutine AVC is immediately exited via block 1124.

If, however, at block 1106 it is found that flag VLTFLG is not set, this indicates that at least one previous pass through subroutine AVC has occured since the beginning of the last weld run or the Z-axis movement of the electrode 708, and thus comparison of the actual arc voltage with the reference arc voltage is required, with adjustment of the Z-axis position of the electrode 708 if the difference between the actual and reference value of the arc voltage exceeds the arc voltage deadband (set by the operator at block 904 in subroutine USER—see FIG. 33B). Accordingly, if block 1106 produces a negative result the program proceeds, at block 1108, to calculate the difference between the reference arc voltage and the actual arc voltage, and then tests, at block 110, whether this difference is negative. If the difference is positive, the Z-axis direction is set to up at block 1112; if the difference is negative, the Z-axis direction is set to down at block 1114 and then the sign of the difference is reversed at 1116, since the succeeding operations require a positive difference (or error).

From block 1112 or 1116, the program proceeds, at block 1118, to test whether the error is less than the deadband value. If the error is less than the deadband, the Z-axis motor is shut off at block 1120, and the subroutine AVC is then exited via block 1124. If, however, at block 1118 the error is found to be greater than the deadband, the program proceeds, at block 1122, to calculate an appropriate speed for the Z-axis motor, and then the Z-axis motor is started at block 1123. Block 1122 is provided to prevent unnecessary hunting on the Z-axis, such as might occur if a constant Z-axis motor speed were employed to correct errors in arc voltage. The motor speed calculated at 1122 should be sufficient to change the arc length so as to correct the arc voltage error before the next pass through subroutine AVC multiplied by some constant not greater than one. In practice, block 1122 multiplies the error by a constant which is set empirically for a particular apparatus. From block 1123, subroutine AVC is exited via block 1124.

As previously mentioned, FIG. 34 shows the program fed to the tape input of the computer, this program serving to carry out adjustment of the welding current by the logic shown in FIG. 29. The program begins, at block 1302, by setting a register equal to FORCUR equal to a set point value STPNT (set at block 929 in subroutine USER, FIG. 33B) multiplied by $K_1$. From block 1302, the program proceeds, at block 1304, to calculate a period error (which is of course, not the same as the voltage error calculated at block 1108 in subroutine AVC in FIG. 33I) by calculating the difference between STPNT and PERD, PERD having previously been calculated by subroutine COMPUT as described above. Next, at block 1306, the sign of the period error is calculated; if the error is positive, a negative error flag is cleared at 1308, whereas if the error is negative, the same flag is set at block 1310 and the sign of the error is changed since the later parts of the program require a positive error value.

From block 1308 or 1310, the program proceeds, at block 1312, to test whether the error is greater than a deadband value (set at block 931 in subroutine USER, FIG. 33B). If the error is less than the deadband, no change in welding current is needed and the program is exited via block 1330. If, however, the error is greater than the deadband the error is then multiplied by a gain control $K_2$ (set at block 933 in subroutine USER, FIG. 33B) at a block 1314 to calculate an error current $I_E$. The program then proceeds, at block 1316, to test whether the negative error flag previously referred to is set. If not, an increase in welding current is required and $I_E$ is added to $I_F$ (the previous value of the welding current) at block 1318. If, however, at block 1316 the negative error flag is set, the welding current must be reduced and the new welding current value is set equal to the difference between $I_F$ and $I_E$ at block 1320.

From block 1318 or 1320, the program proceeds to block 1322 which is the beginning of the last section of the program, this last section being provided to ensure that the actual current will not be adjusted outside minimum and maximum limits MINC and MAXC respectively, which are permanently set in the software but, of course, depend upon the particular welding apparatus being used. Accordingly, block 1322 tests whether I, the new value of the welding current, is less than MINC, and if so I is set equal to MINC at block 1324. From block 1322 or 1324, the program proceeds, block 1326, to test whether I is greater than MAXC; if so, I is set equal to MAXC at block 1328. From block 1326 and 1328, the program is exited via block 1330. Although not shown in FIG. 34, if it is necessary to set the current at either block 1324 or 1328, a warning flag is placed in the system to advise the operator that the program shown in FIG. 34 is attempting the adjust the weld current outside the preset limits, an indication of possible error in the apparatus.

Using the apparatus and software shown in FIGS. 19-34, a number of experimental runs were performed using bead-on-plate welding techniques. Conditions were varied to provide a wide variety of weld pool sizes and oscillation frequencies. The results of these returns are shown in Table 1 below:

TABLE 1

| Run # | Base Current (Amps) | Travel Speed (in/min) | Arc Voltage (volts) | Pool Osc. Freq. (Hz.) | Pool Width (in.) | Pool Depth (in.) |
|---|---|---|---|---|---|---|
| 1 | 100 | 1 | 9.4 | 306 | .206 | .188 |
| 2 | 100 | 1 | 10.4 | 273 | .191 | .169 |
| 3 | 100 | 1 | 11.3 | 208 | .225 | .197 |
| 4 | 75 | 1 | 9.2 | 416 | .163 | .122 |
| 5 | 75 | 1 | 10.2 | 348 | .150 | .131 |
| 6 | 75 | 1 | 11.2 | 300 | .163 | .125 |
| 7 | 100 | 2 | 10.2 | 250 | .181 | .197 |
| 8 | 100 | 2 | 9.2 | 375 | .144 | .181 |
| 9 | 75 | 2 | 10.2 | 312 | .138 | .138 |
| 10 | 75 | 2 | 9.1 | 394 | .144 | .122 |
| 11 | 75 | 2 | 11.0 | 312 | .144 | .141 |
| 12 | 100 | 3 | 9.3 | 319 | .119 | .144 |
| 13 | 100 | 3 | 10.0 | 306 | .144 | .125 |
| 14 | 75 | 3 | 10.2 | 326 | .122 | .122 |
| 15 | 75 | 3 | 9.2 | 429 | .116 | .106 |
| 16 | 75 | .5 | 10.2 | 333 | .206 | .156 |
| 17 | 75 | .5 | 11.0 | 300 | .213 | .144 |
| 18 | 100 | .5 | 11.0 | 219 | .225 | .200 |
| 19 | 100 | .5 | 10.0 | 273 | .231 | .169 |
| 20 | 100 | .5 | 12.3 | 167 | .238 | .188 |
| 21 | 100 | 2 | 10.0 | 273 | .138 | .163 |
| 22 | 100 | 1 | 10.0 | 288 | .175 | .169 |
| 23 | 100 | 1 | 11.0 | 221 | .200 | .206 |
| 24 | 100 | 1 | 11.5 | 183 | .238 | .200 |
| 25 | 100 | 1 | 12.0 | 155 | .231 | .225 |
| 26 | 100 | 1 | 12.5 | 147 | .263 | .219 |
| 27 | 100 | 1 | 13.0 | 133 | .275 | .231 |
| 28 | 100 | 2 | 11.5 | 214 | .169 | .169 |
| 29 | 100 | 2 | 12.1 | 185 | .181 | .175 |
| 30 | 100 | 2 | 13.0 | 161 | .225 | .219 |
| 31 | 100 | 1 | 13.6 | 115 | .263 | .238 |
| 32 | 100 | 1 | 14.0 | 136 | .250 | .206 |
| 33 | 100 | 2 | 13.4 | 140 | .200 | .188 |

The weld pool width and depth quoted in Table 1 above were determined by the standard techniques of making a cut through the completed weld, and polishing and etching the exposed surface to reveal the shape of the weld pool and finally manually measure the width and depth. The data in Table 1 were analyzed by multiple linear regression analysis for variation of weld pool oscillation frequency with weld pool width and depth and the best fit was found to be given by the equation:

$$F = 19.5 W^{-0.42} B^{-1.02} \quad (1)$$

where F is the weld pool oscillation frequency in hertz and W and D are the weld pool width and depth respectively in inches. The coefficient of correlation ($R^2$) for the data in Table using the above equation was 0.7368.

A second round of multiple linear regression analysis was performed on the data in Table 1 because plotting of the data suggested an interrelationship between arc voltage and weld pool oscillation frequency. Accordingly, it was felt that including one of the welding parameters as an extra term in the equation would improve the correlation significantly. However, the welding parameter chosen was arc length rather than arc voltage because arc length is more readily controllable than arc voltage, being precisely controllable by the Z-axis translator of the apparatus.

This second run of multiple linear regression analysis produced the final equation mentioned in the introductory part of this section of the application; namely:

$$F = 19.4 W^{0.033} B^{-0.77} H^{-0.35} \quad (2)$$

where H is the arc length in inches and F, W and D are as given above.

The coefficient of correlation against equation (2) for the data in Table 1 is 0.912, showing the significant improvement in correlation obtainable by allowing for arc length. Because the variation of F with W is so small, the algorithm described above with reference to FIG. 29 and implemented by the program shown in FIG. 34 is capable of producing very uniform weld pool dimensions by maintaining the oscillation frequency, and hence the mass, of the weld pool constant without direct measurement of weld pool width. Nevertheless, as previously mentioned, the weld pool oscillation frequency measuring apparatus and associated software shown in FIGS. 19-34 are designed so that a single set of welding apparatus can incorporate both weld pool oscillation frequency measurement and the weld pool width measurement apparatus and software described above with reference to FIGS. 1-18. Such apparatus incorporating both weld pool oscillation frequency and weld width control is capable of real time analysis and control of both weld pool oscillation frequency, and hence mass, and weld pool width to provide a very high degree of control of the weld process. Also as mentioned above, simultaneous control of weld pool mass and weld pool width will permit control of weld pool penetration, thereby permitting closely-controlled welds with less than full weld penetration.

Although the weld pool oscillation measuring apparatus and software shown in FIGS. 19-34 use a very linear power supply to remove all aberrations which might interfere with natural weld pool oscillation, it will be appreciated that the need for such very linear power supplies, which might not be suitable in a commercial apparatus, can be avoided by using more sophisticated mathematical techniques. In particular, if the cyclic variation in arc voltage after weld current pulsing is subjected to Fourier analysis by methods which will be known to those skilled in the art, aberrations of known frequency in the power supply can be removed from the arc voltage curve and the natural frequency of the pool thereby analyzed.

It will also be apparent to those skilled in the art that oscillation of the weld pool in the instant weld pool oscillation methods may be achieved by methods other than pulsing the welding current, current pulsing being used in the preferred instant apparatus because of its ability to produce a known level of weld pool disturbance on demand and with accurate repetition. For example, weld pool oscillation could be induced by striking the weld joint preparation with a hammer or similar instrument, or a piezo-electric or other vibrator could be mounted on the weld joint preparation to drive weld pool oscillations.

REFLECTED BEAM APPARATUS

Figure 35:
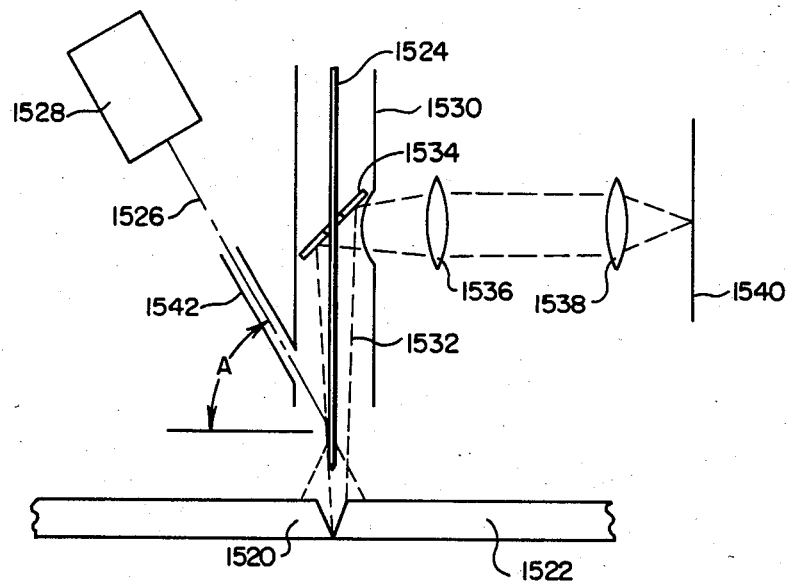
FIG. 35 is a schematic side elevation of a first reflected beam apparatus of the invention.
Figure 36:
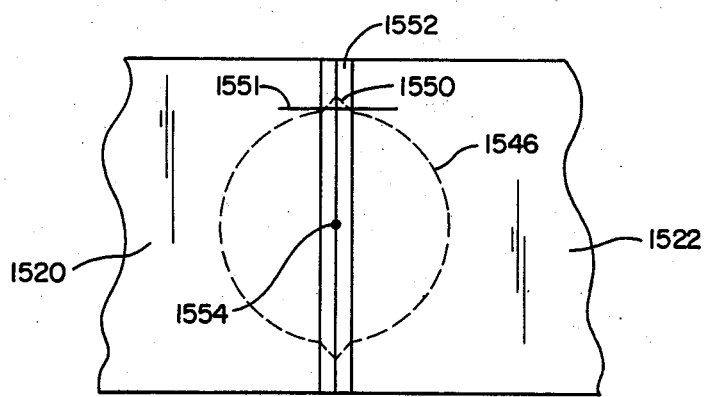
FIG. 36 is a plan view showing the illuminated area produced on a bevel type weld joint preparation using the reflected beam apparatus shown in FIG. 35.

FIG. 35 shows a schematic side elevation of a first reflected beam apparatus of the invention being used to track the weld line 1554 (FIG. 36) in a bevel groove type weld joint preparation comprising two portions 1520 and 1522 of base metal have their adjacent edges beveled so as to form a groove 1552 (FIG. 36) in the center of which lies the weld line 1554 (FIG. 36).

The reflected beam apparatus shown in FIG. 35 is intended for use in gas metal arc welding (GMAW) and includes a consumable welding electrode 1524 disposed adjacent the weld line of the weld joint preparation. The reflected beam apparatus and method of the invention are especially suitable for use in GMAW using a consumable electrode, since the consumable electrode will normally have a surface which is cleaner, and hence more reflective, than other types of electrodes. However, the reflected beam apparatus and method of the invention can be practiced with other types of electrodes, although in some cases polishing or other treatment of the electrode may be necessary to produce a sufficiently reflective surface. It should be noted that in FIG. 35 the apparatus is shown in a condition prior to welding with no arc established between the electrode 1524 and the weld joint preparation; it is one of the advantages of the reflected beam apparatus and method of the invention that detection of the weld line can be effected prior to the start of the welding process, and the apparatus and method thus used to position the welding electrode accurately on the weld line before welding commences.

The electrode 1524 is surrounded by a cylindrical gas retention tube 1530 which serves the conventional function of retaining the purge gas around the electrode 1524. The tube 1530 is provided with a cylindrical side branch 1542 having an axis which forms an acute angle with the axis of the main part of the tube 1530. A laser beam 1526 generated by a laser 1528 (which is preferably a helium-neon laser) is directed axially through the side branch 1542 so as to strike the electrode 1524 at a point spaced from, but close to, the tip of the electrode 1524. The beam 1526 is thus reflected from the reflective surface of the electrode 1524 to form an illuminated area on the weld joint preparation; the nature of this illuminated area will be discussed further below with reference to FIG. 36. Light from this illuminated area reflected approximately parallel to the axis of the electrode 24 passes up the tube 1530 as a beam 1532 and strikes a mirror 1534 fixedly mounted within the tube 1530 at 45° to the axis of the electrode 1524. The mirror 1530 is provided with a central aperture to allow the electrode 1524 to pass therethrough. After reflection from the mirror 1534, the beam leaves the tube 1530 via an aperture provided in the tube 1530 adjacent the mirror 1534 and is collimated by a convex lens 1536 to produce a parallel beam of light which passes through a second convex lens 1538 to form an image in an image plane 1540. As in the apparatus shown in FIGS. 1-3, the image in the image plane 1540 may be observed by eye but in practice the image plane 1540 will normally be occupied by a video camera which generates a video signal representative of the image, and it is this video signal which is normally used for analysis of the image produced by the apparatus shown in FIG. 35. Those skilled in the art will appreciate that the collimating lens 1536 is not absolutely necessary but is desirable for the same reasons as described above with reference to the apparatus shown in FIG. 1.

Obviously, in the apparatus shown in FIG. 35 the illuminated area on the weld joint preparation must be sufficiently small that it can be seen by the optical system just described, which in effect looks down the tube 1534. To produce a sufficiently small illuminated area, the apparatus should be arranged so that the laser beam 1526 strikes the electrode 1524 close to, but not coincident with, the tip of the electrode and the angle A between the axis of the laser beam 1526 and the plane normal to the axis of the electrode 1524 should be made as large as possible. When the apparatus shown in FIG. 35 is actually being used for welding, the tube 1542 serves to prevent smoke rising from the welding operation obscuring the laser beam 1526.

The laser beam 1526 desirably has a width approximately equal to the width of the electrode 1524 at the point where the beam strikes the electrode, the widths of the beam and the electrode both being measured along an axis normal to both the axis of the beam and the axis of the electrode. Normally, of course, both the beam and the electrode will be circular and it is only necessary to make the diameter of the beam equal to the diameter of the electrode. Using a beam having a diameter approximately equal to the diameter of the electrode produces an approximately annular illuminated area on the weld joint preparation, as will be described below with reference to FIG. 36. Using a beam which is too narrow will produce an illuminated area having the form of only a small arc of an annulus, which will lead to difficulties if the arc does not intersect the weld line, while using a beam which is too wide may result in undesirable direct illumination of the weld joint preparation by that part of the laser beam which misses the electrode.

FIG. 36 shows the illuminated area produced on the bevel groove type weld joint preparation as shown in FIG. 35 when the laser beam 1526 shown in that figure has a diameter approximately equal to the diameter of the cylindrical electrode 1524. As will be seen, from FIG. 36, the illuminated area 1546 has substantially the form of a complete annulus. The use of a circular cross-section electrode is preferred so that a simple annular illuminated area is produced on the weld joint preparation. The form of the illuminated area shown in FIG. 36 is highly idealized. In practice, the illuminated area is most strongly illuminated on the side of the electrode facing the incident beam, and the intensity of illumination decreases in both directions as one proceeds around the annular illuminated area until, on the side of the electrode facing away from the incident beam, the intensity of illumination falls to zero. The electrode of course casts a shadow on the weld joint preparation on the side of the electrode facing away from the incident beam.)

Where the annulus 1546 crosses the beveled edges 1552 of the metal portions 1520 and 1522 and the weld line 1554, an irregularity 1550 occurs in the annulus 1546, this irregularity 1550 having the form of a V-shaped deformation with the point of the V extending away from the center of the annulus. When the apparatus shown in FIG. 35 has not been used to weld the metal portions 1520 and 1522 together, there will of course be two such V-deformations in the annulus 1546, whereas during actual welding there will be only one such deformation since the groove behind the electrode will be filled with resolidified metal from the already-completed portion of the weld. The process described below for automatic tracking of the weld line detects the position of the weld line by analyzing video data along lines such as the line 1551 shown in FIG. 36, the line 1551 extending through the V-shaped deformation 1550.

As already mentioned, the illuminated area 1546 shown in FIG. 36 is produced using a cylindrical electrode. As will be apparent to those skilled in the art, electrodes having other cross-sections will produce different illuminated areas, with the adaption of the weld line location methods described below to illuminate areas produced from non-circular cross-section electrodes is believed to be within the competence of those skilled in the art. Also, of course, the exact type of irregularity in the illuminated area depends upon the nature of the weld joint preparation; for example, if the weld joint preparation is of the butt type rather than the bevel groove type shown in FIGS. 35 and 36, the irregularity where the illuminated area crosses the weld line will have the form of a dark gap in the illuminated area.

It will also be apparent to those skilled in the art that the reflected beam apparatus of the invention does not necessarily have to view the illuminated area axially of the electrode; for example, the illuminated area could be viewed by a video camera looking obliquely at the illuminated area. However, as in the other methods of the invention previously described, axial viewing is preferred in order that, during the welding operation the very bright arc will be obscured by the electrode so that no image of the arc appears in the image plane 1540 (FIG. 35). Obviously, elimination of the very bright light from the arc makes it much easier to view the illuminated area and locate the irregularities.

Figure 37:
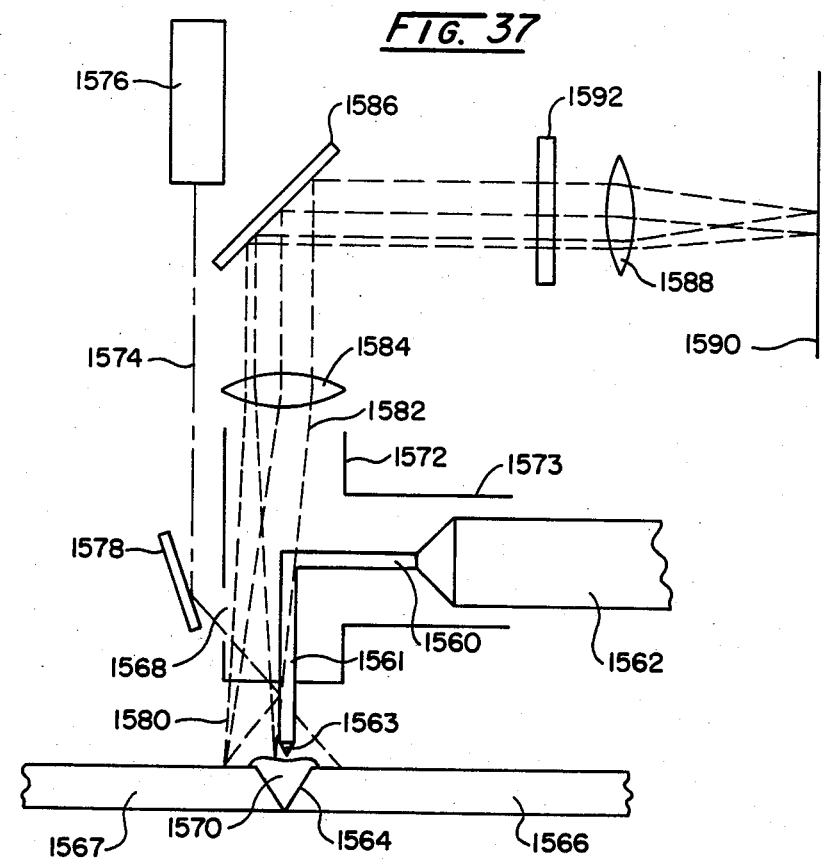
FIG. 37 is a schematic side elevation of a second reflected beam apparatus of the invention.

FIG. 37 shows a second reflected beam apparatus of the invention which allows simultaneous tracking of weld line and analysis of the weld pool. The apparatus shown in FIG. 37 is closely similar to that shown in FIG. 1 and is also intended for GTAW. However, the apparatus shown in FIG. 37 also incorporates means to reflect a laser beam off the welding electrode.

In FIG. 37, an electrode holder 1562 supports an L-shaped electrode having two sections at right angles to one another, namely a horizontal section 1561 adjacent the electrode holder 1562 and a vertical section 1561 which extends vertically downwardly from the end of the horizontal section 1560. FIG. 37 shows the apparatus in use; from the tip 1563 at the lower end of the vertical section 1561 of the electrode, an electric arc (omitted from FIG. 37 for the sake of clarity) extends to a bevel groove type weld joint preparation comprising metal portions 1566 and 1567. The adjacent edges 1564 of the metal portions 1566 and 1567 are bevelled to form a groove in which resides a molten weld pool 1570 formed by the electric arc. The vertical section 1561 of the electrode is surrounded by a cylindrical gas retention tube 1572, which serves to retain inert purge gas around the electrode. The tube 1572 is provided with a side branch 1573 which accommodates the horizontal section 1560 of the electrode and the electrode holder 1562.

A helium-neon laser 1576 directs its beam 1574 onto a mirror 1578 which deflects the beam 1574 through an aperture 1568 provided in the wall of the tube 1572 onto the vertical section 1561 of the electrode. As in the apparatus shown in FIG. 35, the laser beam is reflected off the electrode to form an annular illuminated area on the weld joint preparation; it should be noted that the position at which the beam strikes the electrode is arranged so that this illuminated area lies outside the weld pool 1570. Rays 1580 of light from the weld pool and surrounding portions of the weld joint preparation traveling substantially parallel to but spaced from the axis of the vertical section 1561 of the electrode travel up the tube 1572 as a beam 1582. As will be apparent to those skilled in the art, the beam 1582 includes both light from the arc reflected from the weld pool and surrounding parts of the weld joint preparation and laser light originating from the aforementioned illuminated area produced by the reflection of the laser light from the vertical section 1561 of the electrode. The beam 1582 is collimated by a collimating lens 1584, deflected from a mirror 1586, passed through a filter 1592 and finally passed through a convex lens 1588 which forms an image of the weld pool and surrounding area of the weld joint preparation, including the aforementioned illuminated area, on an image plane 1590 which will, as in apparatus of the invention previously described, normally be occupied by a video camera. The filter 1592 is arranged to pass a narrow band of wavelengths including the frequency of the helium-neon laser 76, thereby reducing the intensity of the reflected light from the arc relative to the reflected laser light from the illuminated area. As in the apparatus of the invention previously described, the image in the image plane 1590 does not include an image of the arc, since direct light from the arc is blocked by the vertical section 1561 of the electrode.

As will be appreciated by those skilled in the art, a tungsten or similar non-consumable electrode tends to develop a relatively non-reflectively oxide coating after a period of welding an it may be necessary to remove this oxide coating by polishing or a similar technique at appropriate intervals in order that the portion of the electrode upon which the beam impinges will be sufficiently reflective to produce a proper illuminated area upon the weld joint preparation.

The manner in which video data from the apparatus shown in FIG. 35 or 37 is analyzed automatically to locate the weld line is described below. It should be noted that, since the instant reflected beam apparatus can be arranged so that the illuminated area forms just outside the weld pool, it will normally not be necessary to build in delay techniques to allow for the distance between the point at which the weld line is detected and the actual position of the welding torch, such as are necessary in prior art techniques in which tracking of the weld line occurs a substantial distance in front of the welding torch.

REFLECTED BEAM METHOD

Figure 40:
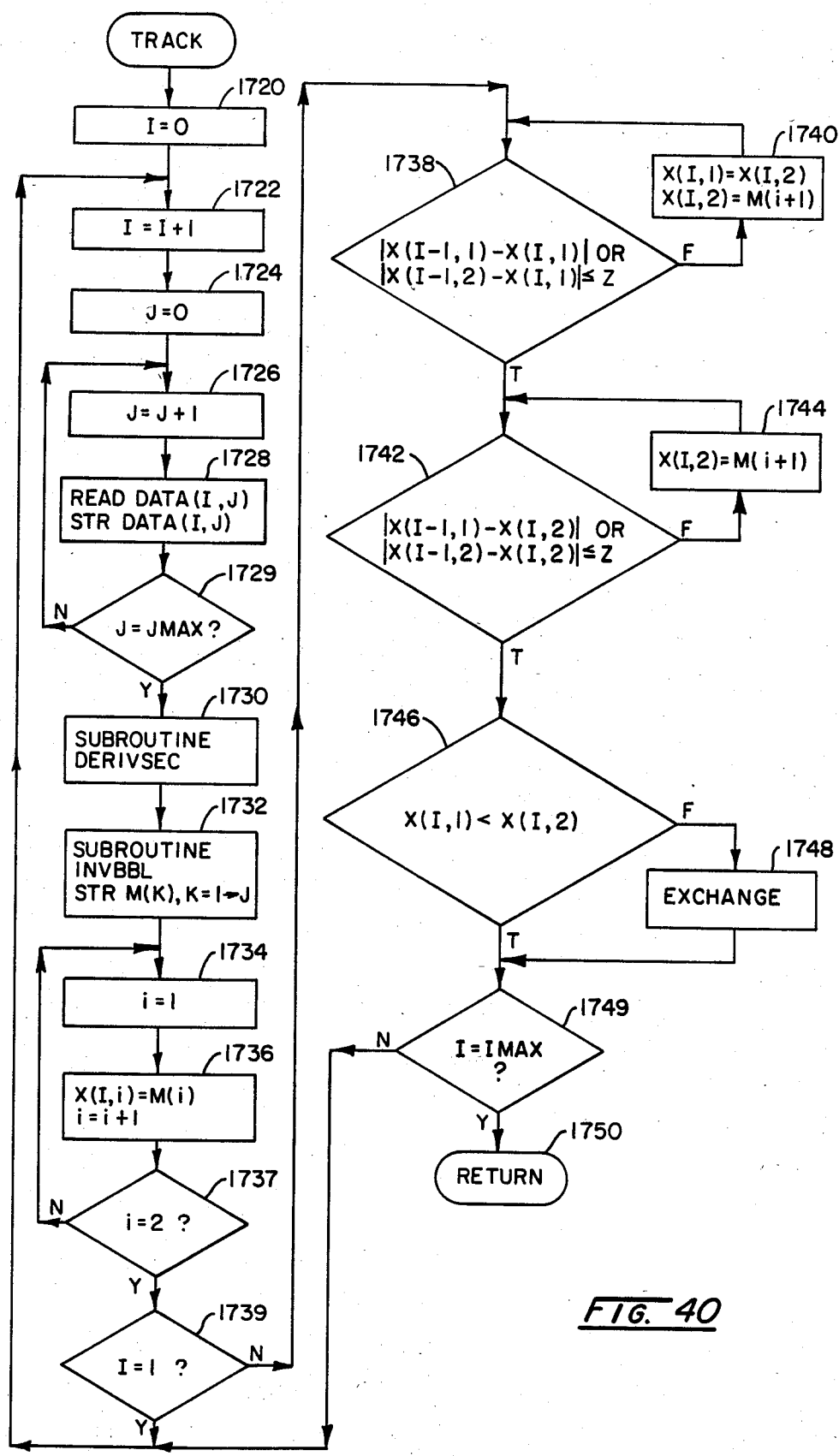
FIG. 40 is a flow chart of the subroutine TRACK shown in FIG. 39.

The software used to carry out the instant reflected beam method on bevel type weld joint preparations is shown in FIGS. 39-42. FIG. 39 shows the overall architecture of the software, with FIGS. 40-42 showing the subroutines TRACK, LNGRES and CONTROL mentioned in FIG. 39. Unlike the weld pool width measuring software described above with reference to FIGS. 15 and 17-17H, the software shown in FIGS. 39-42 is not designed to act upon a single row of video data, but rather upon a plurality of lines such as line 1551 in FIG. 36. As will be apparent from the detailed description of the software below, the software locates the weld point line by finding the intersection of lines such as 1551 with the V-shaped irregularity 1550, and then applying linear regression to the two sets of points detected, thereby locating the two lines constituting the irregularity 1550. Finally, the point of intersection of these two lines of the irregularity 1550 is calculated, thereby locating the tip of the V-shaped irregularity, which lies on the weld line.

The selection of an appropriate window for use in this method is thus a matter for the skill and judgement of the operator, but obviously it is desirable to restrict the width of the window, (i.e. restrict the number of columns from which video data are accepted) since the width of the image of the irregularity is much less than the full width of the screen. In order to locate the intersections of the scan lines such as line 1551 with the irregularity, it is desirable that, if possible, the row skip value be set to zero so that no pixels are skipped within each accepted line. However, since the aim of the software is to locate the intersections of lines such as 1551 with the two lines constituting the V-shaped irregularity 1550, row skipping is permissible. Indeed, since the error in locating the intersections of line 1551 and irregularity 1550 will normally be substantially constant regardless of which line is chosen as line 1551, it will be apparent to those familiar with linear regression techniques that, if the number of lines which can be accepted is limited, it is better to employ row skipping so as to spread the available lines over as large as possible an extent of the dimension of irregularity 1550 parallel to weld line 1552 in order to provide the most accurate location of the lines constituting irregularity 1550. In most situations, the image of irregularity 1550 is so small relative to the whole image seen by the video camera that neither row skipping nor column skipping is necessary, especially if the width of the video window is restricted.

The upper part of FIG. 38 shows an enlarged view of the area of FIG. 36 including the irregularity 1550 and line 1551. Also indicated in the upper part of FIG. 38 are the X and Y axes used in the calculation, the X-axis being taken parallel to the weld line (which in FIG. 38 is a linear weld line) and the Y-axis taken horizontally in FIG. 38.

The graph A in FIG. 38 shows the light intensity on line 1551. It will be seen that this light intensity comprises a relatively low background level on which are superimposed two substantially triangular peaks, the summit of each peak lying at one of the intersections of the line 1551 with irregularity 1550. Graph B in FIG. 38 shows the first derivative of the light intensity curve shown in graph A; as those skilled in the art are aware, differentiation of peaks such as those shown in graph A produces a first derivative in which the sign of the derivative changes very abruptly as the curve passes through a peak. Graph C in FIG. 38 shows the second derivative of the curve shown in graph A. For present purposes, it is only necessary to note that the positions of the peaks in graph A, and thus of the intersections of line 1551 with irregularity 1550, are represented by two intense minima in the second derivative curve shown in graph C. The software shown in FIGS. 39-42 is designed to locate these two minima in the second derivative curve. However, because the graphs shown in FIG. 38 are somewhat idealized, in practice the two most intense minima in the second derivative of the light intensity may not represent the true positions of the intersections, these intersections being represented by other, less intense minima. Accordingly, the software shown in FIGS. 39-42 incorporates checks to screen out obviously impossible intersection positions.

As already mentioned, FIG. 39 shows the overall architecture of the software used in the weld tracking method for bevel type weld joint preparations. From a starting point at block 1700, the program proceeds to a memory assignment and initialization block 1702, which assigns areas in memory for the various data which will be generated during the program and initializes various registers. Since this type of memory assignment and initialization routine will be familiar to those skilled in the art, it is not necessary to describe it further. Next, at block 1704, an initialization and "get parameters" routine is performed, in which the software acquires the necessary parameters, including the first and last row end column values and the row skip and column skip values which are used to define the windows without which the video-computer interface is to store data. (Although it is not explicitly mentioned in the description of FIG. 15 above, it will be apparent to those skilled in the art that block 402 in FIG. 15 includes a subroutine similar to the subroutine USER (FIG. 33B) to enable the operator to enter the parameters required by the video-computer interface. Since the parameter entered at block 402 include all the parameters required by the software shown in FIGS. 39-42, the latter software simply acquires the parameters its needs at block 1704 and thus requires no separate subroutine for handling keyboard inputs. Thereafter, at block 1706, the program sets the COM/CAM signal low, thereby instructing the video-computer interface to acquire video data from the camera. The program then waits, at block 1708, for the negative transition of the EOF signal, which indicates acquisition of video data from the complete window by the video-computer interface. (As previously mentioned, the negative transition of the EOF signal does not exactly correspond with the end of the acquisition of video data and therefore, of course, block 1708 incorporates a further small delay to ensure that all video data from the window have been acquired by the video-computer interface before the later processing steps of the program are executed.) Once the program has waited at block 1708 for the appropriate period, it proceeds to block 1710, where the COM/CAM signal is set high, thereby preventing the video-computer interface from acquiring further data and allowing the computer to read the previously-acquired video data from the interface. The program then proceeds through subroutines TRACK, LNGRES and CONTROL at blocks 1712, 1714 and 1716 respectively to analyze the video data received from the interface and thus to locate the weld line and generate control signals which can be supplied to an apparatus such as that shown in FIG. 18 or 19 and thus to control the movement of welding electrode. From block 1716, the program loops back to block 1706 for a further round of video data acquisition and analysis.

Subroutine TRACK is shown in more detail in FIG. 40. This subroutine detects the intersections of the camera scan lines, such as line 1551 in FIGS. 36 and 38, by generating the second derivative of the light intensity data curve and by finding the minima therein. The subroutine also provides checks to reject spurious minima.

As shown in FIG. 40, subroutine TRACK commences, at block 1720, by setting a counter I=to 0. Counter I is a counter which counts rows within the window of accepted video data, while counter J mentioned below counts pixels within the accepted part of each accepted row of the window. The maximum allowable values of I and J, designated $I_{max}$ and $J_{max}$ below, are of course dependent upon the first and last row and column values and the row skip and column skip values entered by the operator at block 1704 (FIG. 39) and are in fact calculated by the program at block 1704. Next, at block 1722, I is incremented by 1, then at block 1724 J is set equal to zero and at block 1726 incremented by 1. The program then proceeds at block 1728, to read DATA (I,J) from the video computer interface into an appropriate table of the computer memory. (It will be noted from the foregoing description of the video computer interface that video data from accepted pixels are simply stored in successive locations within the memory of the video-computer interface beginning with address 0. Accordingly, block 1728 must incorporate means to calculate the address within the memory at which DATA (I,J) is located. Calculation of the necessary address is of course easily accomplished by methods which will be familiar to those skilled in the art.) It should be noted that the table designated DATA(I,J) at block 1728 in FIG. 40 is the table of raw video data stored in the memory of the computer and is not equivalent to the table DATA containing smoothed video data described above with reference to FIGS. 17-17H. In the program shown in FIGS. 39-42, smoothing of the video prior to analysis is not desirable since this would tend to flatten out the peaks in the video data and make the location of the minima in the second derivative curve representing the intersection of the camera scan lines with the irregularity 1550 (FIG. 36) less precise.

Following block 1728, the program tests, at block 1729, whether J is equal to its maximum allowable value, $J_{max}$. If not, the program loops back to block 1726. Accordingly, it will be seen that the effect of blocks 1726, 1728 and 1729 is to transfer all the video data for the Ith accepted line from the video-computer interface to the computer memory. Once this has been achieved, when J is equal to $J_{max}$, block 1729 produces a positive result and the program proceeds, at block 1730, to run a subroutine DERIVSEC, which determines the second derivative of the set of data for the Ith accepted line now stored in the computer memory. Those skilled in the art will be familiar with various subroutines which may be used as the subroutine DERIVSEC; for example, such a subroutine need only comprise two successive passes through a differencing block such as block 502 in FIG. 17C. Accordingly, it is believed that no further description of the subroutine DERIVSEC is required. Next, at block 1732, the program performs an inverse bubble sort on the second derivative values generated at block 1730 i.e. block 1732 arranges the second derivative values in increasing order so that the first values in the rearranged table represent minima in the second derivative curve, the strongest minima being located in the first few positions in the rearranged table. It should be noted that, since it is the positions of the minima in the second derivative curve which are required rather than the actual minimum values, what block 1732 actually does is to perform an inverse bubble sort on the second derivative values, and simultaneously compile a corresponding table, designated M(K), which shows the corresponding locations from which the rearranged second derivative data were produced i.e. M(K) is a table of locations arranged in increasing order of the corresponding second derivative data.

The program then proceeds, at block 1734 to set a counter i = 1 and the, at block 1736, to set X(I,i) equal to M(i), and then to increment i. i Is then tested at block 1737 to see if it is equal to 2; if not, the program loops back to block 1734. It will be seen that the program proceeds through blocks 1734, 1736 and 1737 twice, thereby writing M(1) and M(2) into X(I,1) and X(I,2) respectively. Thus, X becomes a table each line of which represents the locations of the two most intense minima found in the second derivative of the video data from the the Ith accepted line.

After the second pass through block 1736, block 1737 produces a positive result and the program proceeds to block 1739 where it tests whether I is equal to 1 i.e. whether the data being handled relate to the first accepted line of the window. If so, there are no previous values in table X with which the locations just placed in X(1,1) and X(1,2) can be compared and accordingly the program loops back from block 1739 to block 1722 and proceeds to deal with data from the second line in the manner already described. If, however, I is greater than 1, the program proceeds from block 1739 to block 1738, which is the first of a sequence of operations designed to check that the locations of the second derivative minima placed in X by block 1736 are true locations of intersections by comparing these locations with locations from the previous line of data.

Block 1738 compares X(I,1) with X(I−1,1) and X(I−1,2) i.e. with the minima locations found on the previous line. If X(I,1) is in fact a true minimum location, it will lie within a distance Z (an operator-fixed parameter representing an allowable range of variation in location position between adjacent lines) of one of the minima locations for the previous line; note that since there has been no previous attempt to sort X(I,1) and (XI,2) by magnitude, the relative magnitudes of these two locations are not fixed and X(I,1) may correspond to either of the minima locations found in the previous line, so that the alternative tests shown in block 1738 is necessary. If block 1738 produces a negative result, X(I,1) is a false minimum and it is hence discarded at block 1740, X(I,2) being written into X(I,1) and M(3) being written into X(I,2). Note that block 1740 actually replaces X(I,2) with M(i+1) so that, should block 1738 detect at least two false minima locations in succession, necessitating two, or perhaps even more, passes through block 1740, different minima will be placed in X(I,1) and X(I,2) on each pass through block 1740. From block 1740, the program loops back to block 1738. Thus, block 1738 will only produce a true result when it is determined that X(I,1) represent a true minimum. When this occurs, the program proceeds to block 1742. Blocks 1742 and 1744 are exactly parallel to blocks 1738 and 1740 respectively, except that they test whether X(I,2) is a true minimum location, and that at block 1744 it is of course not necessary to change X(I,1) since this has already been determined to be a true minimum location at block 1738.

When block 1742 produces a positive result, the program proceeds, at block 1746, to test the relative magnitude of the two true minima locations now present in X(I,1) and X(I,2). As previously noted, there has been there has been no previous attempt to determine the relative magnitudes of these two locations, so either can represent either the left-hand or right-hand intersection in FIG. 38. Obviously, for the linear regression analysis to be carried out by subroutine LNGRES (see below) to operate properly, it is essential to arrange X so that the values of X(I,1) represent the intersections where the left-hand line in FIG. 38 and the values in X(I,2) represent intersections with the right-hand line in FIG. 38. Accordingly, if block 1746 produces a negative result, the two minima locations in X(I,1) and X(I,2) are interchanged from block 1748. From block 1748, or if block 1748 produces a positive result, the program proceeds, at block 1749, to test whether $I_{max}$ i.e. whether all accepted lines have been processed. If not, the program loops back to block 1722 and proceeds to deal with the next line, but if block 1749 produces a positive result, subroutine TRACK is exited via a block 1750 and proceeds to subroutine to LNGRES shown in FIG. 41.

As shown in FIG. 41, subroutine LNGRES first, at block 1760, performs linear regression on the minima locations in X(I,1) to derive a regression equation for the left-hand line of irregularity 1550 (FIG. 38). The program then proceeds to block 1762 and performs a similar linear regression operation on the data in X(I,2) to derive the equation across the right-hand line of irregularity 1550. Since the appropriate linear regression equation and modes of implementing them on computers will be apparent to those skilled in the art, no further description of blocks 1760 and 1762 is required. The program then proceeds, at block 1764, to solve the two equations thus generated to determine X and Y, the coordinates of the tip of the V-shaped irregularity 1550, this tip representing, as previously mentioned, the point on the weld line.

In a typical commercial bevel type weld joint preparation, the sloping surfaces 1520 (FIG. 35) lie at an angle of approximately 45° to the horizontal surfaces of the metal portions, the angle between the two lines of irregularity 1550 (FIG. 36) is approximately 90°, so that slight errors in the equations of the two lines constituting irregularity 1550 do not produce inordinate errors in location of the point of intersection.

Following block 1764, subroutine LNGRES is exited at block 1766 and the program proceeds to subroutine CONTROL shown in FIG. 42. As shown in that FIG. subroutine CONTROL first procures, at block 1770, X and Y set-points SPX and SPY respectively, which were obtained at block 1704 (FIG. 39), and which represent the desired location of the point on the weld line represented by the tip of irregularity 1550 (FIG. 38). Next, at block 1774, the program calculates a horizontal correction signal HOR equal to a constant, $k_1$, times the difference between the actual value of Y determined by subroutine LNGRES and SPY, the desired value of Y. Thereafter, its associated circuit at block 1776, a vertical direction signal VER is calculated as a constant, $k_2$, times the difference between the actual and desired values of X. Subroutine CONTROL is then exited via block 1778.

The horizontal and vertical correction signals generated by subroutine CONTROL can be applied to Y-axis and Z-axis translators respectively in order to bring the position of the detected point on the weld line back to its desired position; note that a vertical correction is required since the radius of the circle 1546 (FIG. 36) and thus the position of the tip of the irregularity 1550 which is the point (X,Y) is dependent upon the vertical position of the welding electrode. No correction to the X-axis translator is required since this translator is moving the welding electrode at the desired welding speed along the X-axis. Thus, the third weld tracking method described above not only serves to locate the weld line, but can also be used to maintain the welding electrode a proper distance from the weld join preparation.

It will be apparent to those skilled in the art that the control mode effected by subroutine CONTROL is a relatively simple one which might, depending upon the values chosen for $k_1$ and $k_2$, tend to produce hunting. If desired, subroutine CONTROL could be modified to average the horizontal and vertical corrections signals over a period of time, thereby dampening the movement of the X-axis and Z-axis translators to prevent hunting.

It will also be apparent to those skilled in the art that the software shown in FIGS. 39-42 represents a very simple method of following the weld line and that considerably more sophisticated techniques may be desirable to cope with various problems which may be encountered in practice. In particular, the checks carried out by subroutine TRACK shown in FIG. 40 depend upon finding two proper minima in the first line in which such minima are present and thereafter comparing minima in each subsequent line with the position of the minima in the immediately preceding line. Obviously, if one or both of the minima found in the first line are false, there is no guarantee that proper minima will be located and thus the linear regression analysis will not give proper results. Also, the software shown in FIGS. 39-42 is only intended to cope with relatively minor deviations in the direction of the weld line; essentially, this software is intended for use with weld lines which are intended to be linear but which in practice deviate by a few degrees either way from the intended direction. As already mentioned, in a typical bevel type weld joint preparation the two lines constituting the irregularity 1550 meet at approximately 90°. Accordingly, if the weld line 1554 deviates by more than about 45° from the intended vertical (in FIG. 38) direction, none of the scan lines of the camera, such as the line 1551 in FIGS. 36 and 38, will yield two true intersections with the irregularity 1550 and the software will become inoperable.

Those skilled in the art will be aware of various techniques which could be used to overcome these problems. Firstly, subroutine TRACK shown in FIG. 40 could be modified to check that all the minima are tested for depth before being placed in matrix X in order to ensure that only minima which has sufficient depth to give a reasonable assurance that they are true minima are placed in matrix X. Secondly, a relatively straightforward modification of blocks 1738-1744 in FIG. 40 can be made so that if a line generates only one acceptable minimum, the minima present in the next line are compared with only the one acceptable minimum present in the preceding line, thereby allowing one series of points defining one of the two lines constituting the irregularity 1550 to be begun before the other. (As will be apparent from consideration of FIG. 38, it will only take a relatively small deviation of the weld line 1554 from the ideal position for a few scan lines to yield a true intersection with one side of the irregularity but not with the other.) When a later scan line yields two acceptable minima, the second set of data, representing the other side of the irregularity 1550, can be begun.

Guarding against aberrant minima in the first scan line to detect such minima is more difficult. One might compare the apparent intersections on the first line where the corresponding values for the first line on the preceding analysis or (probably better) compare the actual intersection positions found for the first line with those calculated from the linear regression lines generated during the previous frame analyzed. Alternatively, one might locate provisional intersection positions for the first few lines generating acceptable minima, group these apparent intersection positions into two groups representing the apparent sides of the irregularity 1550 and then average the resulting values. Even if one of the provisional minima represents an aberrant minimum, the average should give a reasonably accurate value for a true location, which can then be used to check the provisional values and eliminate false ones.

If the apparatus and software shown in FIGS. 35-42 is used to track weld lines which undergo considerable changes in direction, it will be necessary to ensure that the position of the weld line as seen by the camera does not deviate by more than about 30° from the ideal position shown in FIG. 38, in order to ensure that there will be at least a few scan lines which do generate two genuine intersections with the irregularity 1550. One simple way to cope with very curved weld lines is to mount the camera so that it is rotatable about the axis of the welding electrode and to arrange the software that when the angle of deviation of the weld line from the ideal position shown in FIG. 38 exceeds about (say) 30°, an "angle error" signal is generated which will cause the camera to rotate about the axis of the welding electrode to store the position of the weld line, as seen from the camera, to its optimum position.

Alternatively, to avoid physical movement of the camera while still coping with large movements in the position of the irregularity seen by the camera, more sophisticated image analysis techniques could be employed. Firstly, to cope with translations of the irregularity along the X and Y axes, one could arrange the software so that once the position of the tip of the irregularity has been detected in the first frame, the position of this tip is used to generate signals which alter the parameters defining the window from which video data is retained by the video computer interface so that the irregularity remains appropriately located within this window. Large rotations of the irregularity relative to the camera scan lines can be allowed for by changing the lines along which the software looks for the intersections with the two lines constituting the irregularity 1550. Although the software described above uses the camera scan lines parallel to the Y-axis as the line 1551, other lines can obviously be used. Since the light intensities for each separate accepted pixel are stored independently in DATA(I,J), lines running at approximately 45° to the X and Y axes can be constructed by changing both I and J by + or −1 simultaneously, and analysis of light intensity along such diagonal lines carried out in a manner very similar to that described above with reference to FIG. 40, merely by modification of blocks 1722-1728. Obviously, it is also a simple matter to carry out detection of intersections by proceeding along lines parallel to the X-axis merely by changing the order in which I and J are incremented in subroutine TRACK. Accordingly, if subroutine TRACK is modified so that it can carry out the search for intersections between the analysis lines and the irregularity using any one of four different sets of analysis lines (two of these sets being parallel to the X and Y-axes respectively, and the other two being diagonal sets at 45° to both axes), it will always be possible to find a set of lines such that the weld line 1554 (FIG. 38) is within about $22\frac{1}{2}°$ of the perpendicular to one of the sets of lines, which will result in several of the lines in this set generating two genuine intersections with the irregularity 1551. Also, the software would of course need to be modified so that when the angle between the optimum position of the weld line for the set of lines being used for analysis and the actual position of the weld line exceeded (say) about 25°, the software would automatically switch to an alternative set of analysis lines. It is believed that the necessary modification to the software will readily be apparent to those skilled in the art.

If the software is modified to cope with very large deviations of the weld line from the optimum position, it will also be necessary to modify subroutines CONTROL shown in FIG. 42. In particular, to allow for very large deviations in the direction of the weld line, which will cause the Y-axis coordinate of the tip of the irregularity to be comparable to that of the X-axis coordinate thereof, it will be necessary to generate a X-axis correction signal in order to slow the rate of movement of the welding electrode along the X-axis in order to prevent the rate of movement of the electrode relative to the weld joint preparation becoming too large. Also, block 1776 in FIG. 42 should be modified so that the vertical error signal is proportional to $[(X^2+Y^2)^{\frac{1}{2}}-(SPX^2+SPY^2)^{178}$. Finally, if as suggested above, the software is modified so that the window from which video data is retained by the video computer interface is modified as the irregularity moves within the field of view of the camera, it may be necessary to allow for similar automatic adjustment of SPX and SPY depending upon the position of the window at any given time.

It will also be apparent to those skilled in the art that a number of other control schemes could be utilized to detect a V-shaped irregularity, but all such schemes would appear to necessitate a logical scheme which is generally similar to that described above with reference to FIGS. 39–42. Obviously, very different software would be necessary for tracking weld lines in butt or other types of weld joint preparation, but it is believed that development of such software is within the skill of those skilled in the art. In the case of butt type weld joint preparation, in which the weld line will appear as a narrow dark strip which will cause a break in the circle 1546 (FIG. 36), at least two different approaches appear possible. Firstly, one could detect the intersections of the camera scan lines with the circle 1546 by looking for minima in the second derivative of the light intensity curve by the technique described above for finding intersections of line 1551 with irregularity 1550. One could then search for a dark strip located between these intersections by looking for the maximum and minimum in the first derivative of the light intensity curve which should be associated with the edges of the strip. Finding the mid-point between the first derivative maximum and minimum should locate the weld line with sufficient accuracy. An alternative and better method would be detect the intersections of the camera scan lines with the circle 1546 (FIG. 36) as already described, to fit the resultant points of intersection to the equation of a circle and then to track around this circle, using curve-following techniques which will be familiar to those skilled in the art, to locate the point at which the intensity of the circle diminishes very suddenly, thus detecting the gap in the circle caused by the weld line.

LOW POWER ARC APPARATUS AND METHOD

Figure 43:
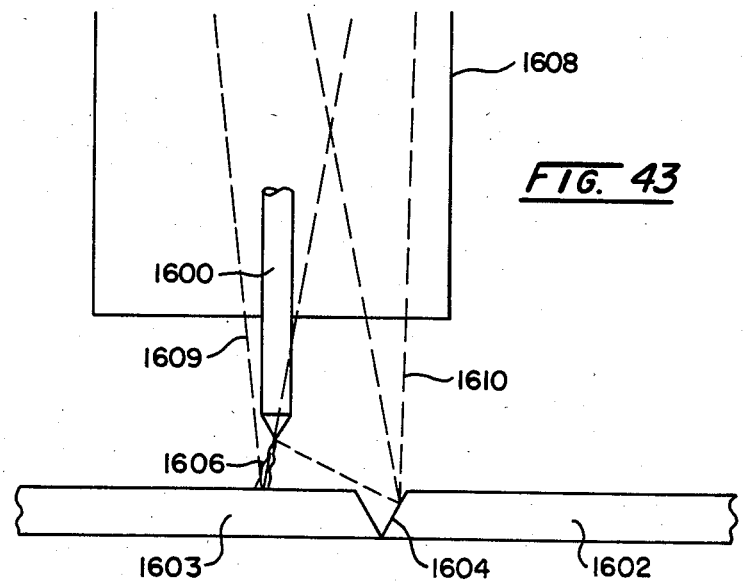
FIG. 43 is a schematic side elevation of a low-power arc apparatus of the invention.

FIG. 43 shows a low power arc apparatus of the invention being used to locate a welding electrode in its proper position relative to a weld line prior to beginning welding. FIG. 43 shows a welding electrode 1600, which is surrounded by a cylindrical gas retention tube 1608. The electrode 1600 is disposed adjacent a weld joint preparation of the bevel groove type, this weld joint preparation comprising two metal portions 1602 and 1603 disposed adjacent one another, their adjacent edges being beveled so as to define a groove 1604 at the center of which lies the weld line. A very low current arc 1606 has been established between the electrode 1600 and the weld joint preparation; this arc is of sufficiently low power that no weld pool is formed on the weld joint preparation but is of sufficient power to generate light. Light from the arc is reflected from the weld joint preparation, both from the flat surfaces of the metal portions spaced from the groove, and from the beveled edges of the groove 1604. Rays of light traveling substantially parallel to, but spaced from, the axis of the electrode 1600, including rays such as 1609 reflected from the flat surface of the metal portion 1603 and rays such as 1610 reflected from the beveled sides of the groove 1604, pass up the tube 1608 and are thereafter brought together to form an image by an appropriate axial viewing system of the invention, such as those shown in FIGS. 1-3, 35 or 37. The resultant image shows the area of the weld joint preparation surrounding the electrode 1600 and, as usual, does not include a view of the arc 1606, since the axial viewing position causes the arc to be obscured by the tip of the electrode. Because of the reflection of light from the walls of the groove 1604, the groove will show up as an irregularity on the image and will thus be located. Obviously, it is necessary that the welding electrode be placed close enough to the groove 1604 that the groove can be seen in the image obtained by looking down the tube 1608.

It will be appreciated that, of course, if the weld joint preparation is of the butt type rather that the bevel groove type, the weld line will appear in the image seen by means of the axial viewing system as a dark line or strip rather than by reflection of light from the walls of a groove.

To carry out the low power arc method of the invention, an operator initially locates the electrode at a point near the weld line, lowers the electrode in contact with at least one of the metal portions of the weld joint preparation, initiates current flow at a predetermined, very low level and withdraws the electrode slowly to establish a low current arc insufficient to melt the metal of the weld joint preparation. The operator may continue to withdraw the electrode until such time as the arc is broken. While the low power arc exists, image of the area of the weld joint preparation surrounding the electrode is formed in the manner already described and the weld line located either visually by an operator viewing a video monitor or by automatic analysis of the image by a computer. The electrode is then properly aligned with the weld line and normal welding can commence.

Obviously, a portion of the image seen using the apparatus shown in FIG. 43 may be retained in the memory of a video computer interface such as that described above with reference to FIGS. 5-13B or described below with reference to FIGS. 45-51 and the stored portion of the image thereafter analyzed to determine the weld line. Also, the image may if desired be recorded on video tape for later analysis. Either of these storage techniques may be especially useful if the duration of the low power arc is very short e.g. if the operator is unable to determine the position of the weld line visually during the brief interval when a low power arc is operating, he could use a video tape recorder with a "freeze-frame" technique to determine the correct position after the arc is extinguished.

FLOWING POOL APPARATUS AND METHOD

Figure 44A:
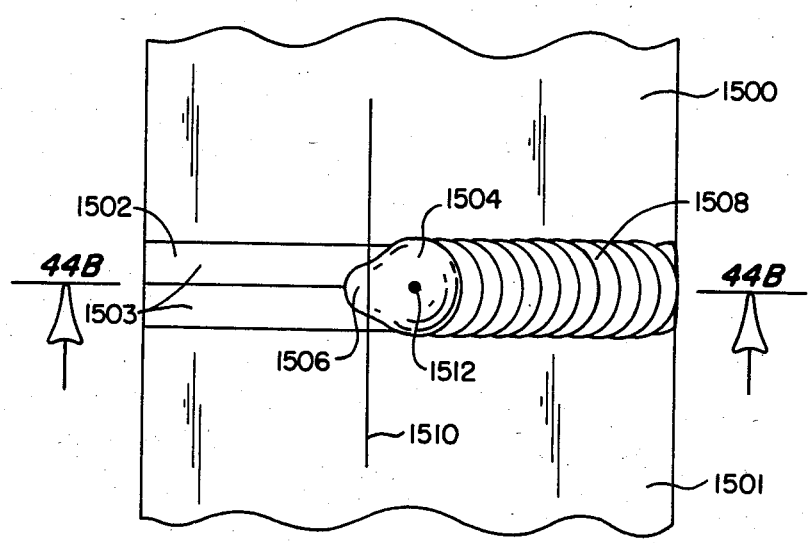
FIG. 44A is a top plan view of a weld joint preparation in which the weld line is being followed by the flowing pool method of the invention.

FIG. 44A represents a top plan view of a welding operation in which a weld line is being tracked by the instant flowing pool method. A weld joint preparation of the bevel groove type is formed by two metal portions 1500 and 1501 disposed adjacent one another. The adjacent edges of the two metal portions 1500 and 1501 are beveled to form bevel faces 1503, between which lies the weld line 1502. An arc (omitted from FIG. 44A for the sake of clarity) has been struck between a welding electrode 1512 and the weld joint preparation, thereby creating a molten weld pool 1504 in the groove between the two metal portions. Welding is being performed from right to left in FIG. 44A, so that behind the weld pool 1504 is an area of resolidified metal 1508 where welding has been completed, while a leading portion 1506 of the weld pool is free to flow into the groove between the two metal portions where welding has yet to be effected. The relative heights of the areas 1508, 1504 and 1506 may be better seen from the section in FIG. 44B.

Figure 44B:
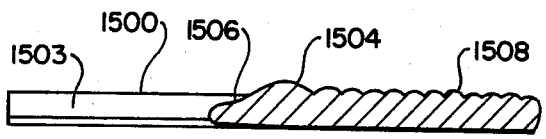
FIG. 44B is a section along the line 44B—44B in FIG. 44A.

As the leading portion 1506 of the weld pool 1504 flows into the groove, a concave deformation appears in the normally convex surface of the weld pool. When the weld pool is viewed axially of the electrode by an axial viewing apparatus of the invention such as those shown in FIGS. 1-3, 35 and 37, this concave deformation in the leading portion 1506 of the weld pool 1504 produces a local minimum of light intensity which can be seen by a human observer but which is perhaps more easily detected automatically. In particular, if an image of the weld pool and surrounding areas shown in FIGS. 44 and 44B is formed by a video camera in which one of the scan lines is a line such as 1510 in FIG. 44A passing through the leading portion 1506 of the weld pool 1504, the light intensity along the line 1510 will display *three* local minima, the usual two local minima associated with the edges of the weld pool (cf. FIG. 16B above) and a central local minimum associated with the concave deformation and indicating the position of the weld line. Accordingly, the light intensity along the line 1510 may be analyzed to determine the central local minimum and hence locate the weld line. Location of this central local minimum is readily effected using the AIM-65 computer in conjunction with a video-computer interface such as those described with reference to FIGS. 5-13B above or 45-51 below, and a modification of the software described above with reference to FIGS. 15 and 17, this modification generating the positions of three local minima rather than two. It is believed that the necessary changes in software will be obvious to those skilled in the art.

Although primarily intended for use in conjunction with bevel type weld joint preparations, the flowing pool method of the invention may also be used in conjunction with butt type weld joint preparation. In butt-type preparations, the same type of concave deformation of the welded pool appears, although in this case it is due to the leading portion of the weld pool flowing into the gap between the two metal portions, rather than into a groove.

SECOND VIDEO COMPUTER INTERFACE

FIGS. 45-51 show circuit diagrams of the presently preferred video-computer interface which can be substituted for that shown in FIGS. 5-13 above. This video-computer interface uses faster memories than that previously described and thus avoids the necessity for the odd/even switching operation in the previous video-computer interface. Also, the video-computer interface shown in FIGS. 45-51 has been arranged so that all the components can be mounted on a single, specially-prepared pinted circuit board which communicates via a single edge connector with the J1 socket on the standard Rockwell AIM-65 mother board (for details of this mother board see the manufacturer's manual). This connector provides a 16-line address bus and an 8-line data bus, together with accompanying read/write signal R/W̄ and a clock signal φ2, (which are all shown on the left-hand side of FIG. 45). The letters and numbers on the extreme left-hand edge of FIG. 45 indicate the lines from the computer which carry the relevant signals, in accordance with the standard nomenclature used in the manufacturer's manual.

As in the video-computer interface previously described, the interface shown in FIGS. 45-51 makes extensive use of large scale integrated circuits, some of which contain several separate circuits. In many cases, the individual circuits on a single chip are used in widely separated parts of the circuitry. Hereinafter for convenience, each integrated circuit will be given a number prefixed by U and the separate circuits on the same chip will be indicated by letters following the chip number. Thus, for example, U1A and U1B represent separate circuits located on the same chip but used in two different parts of the circuitry.

Figure 45:
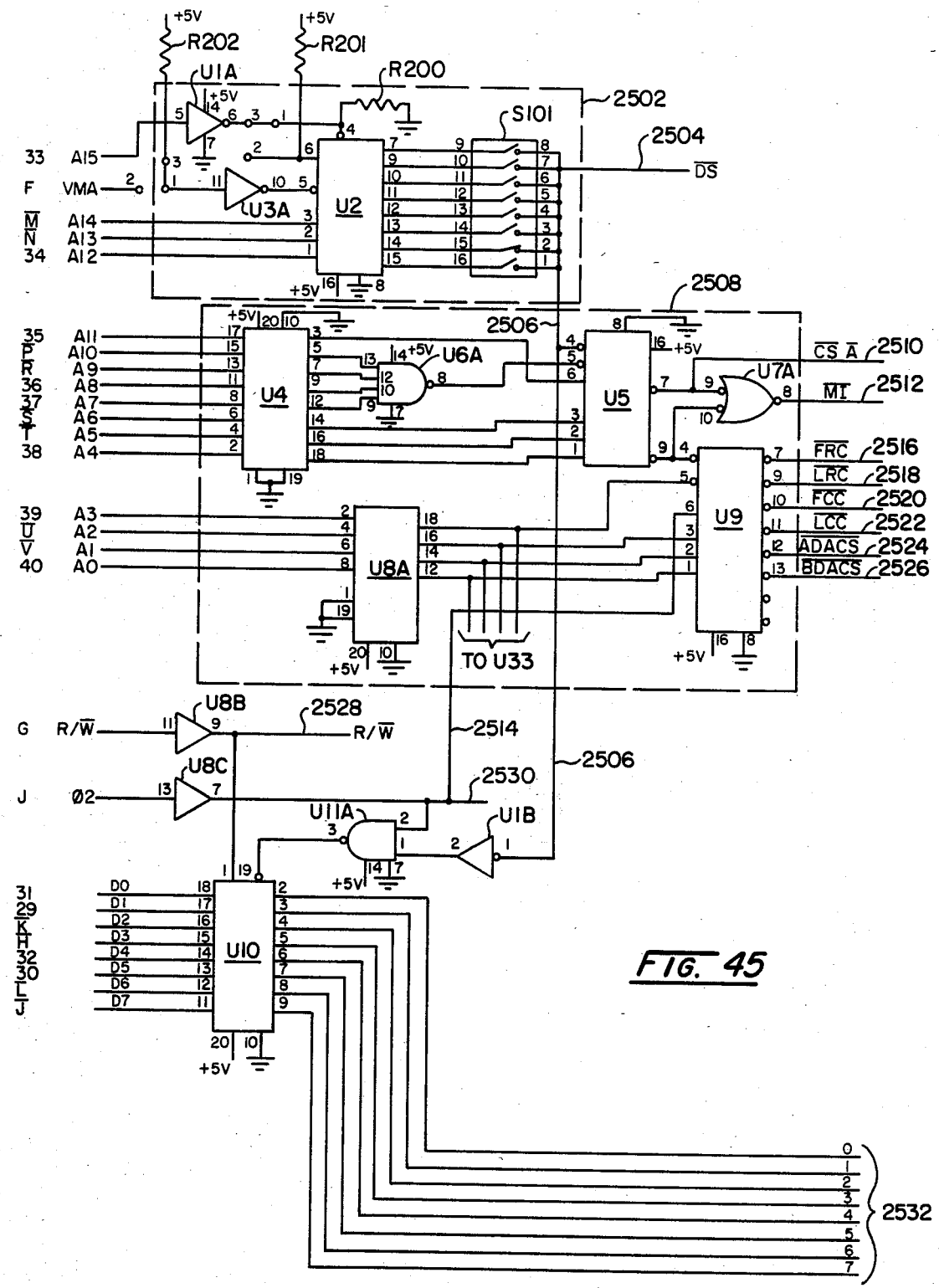

The first part of the circuitry shown in FIG. 45 to be described is the block select circuit indicated by broken boundary 2502 in FIG. 45. As will be explained in more detail below, the video-computer interface shown in FIGS. 45-51 contains 4K of memory, and this memory must be capable of being addressed by the process control computer. The block select circuit 2502 selects which 4K block of memory addresses from the computer will be given to the 4K memory in the interface. Since each 4K block of memory within the computer is defined by the most significant digit of a four-digit hexadecimal number, only addresses arriving on the computer address bus and having the correct most significant hexadecimal digit should cause operation of the video-computer interface. Accordingly, the block select circuit 2502 is arranged to generate an enable signal when the most significant hexadecimal digit arriving on the address bus has a preselected value. For convenience, the block select circuit 2502 is arranged so that the most significant digit which will cause generation of the enable signal can be varied.

As shown in FIG. 45, line A15 of the address bus, which carries the most significant bit, is fed to pin 5 of an inverter U1A. Integrated circuit U1 comprises a commercially-available 74LS04 integrated circuit, with conventional power connections at pins 14 and 7. The inverted output from pin 6 of U1A is fed to pin 4 of U2, this pin 4 also being connected to ground via a resistor R200. integrated circuit U2 is a commercially-available 74LS138 Schottky 1-of-8 decoder/demultiplexer integrated circuit, provided with the normal power connections at pins 16 and 8 as shown in FIG. 45. A +5 V supply line is connected via resistor R201 to pin 6 of U2, and the same supply line is also passed via a resistor R202 to pin 11 of an inverter U3A. Integrated circuit U3A is another commercially-available 74LS04 integrated circuit. The inverted output from pin 10 of U3A is passed to pin 5 of U2. Since pins 4, 5 and 6 of U2 are the enable pins, it will be seen from the truth table for the 74LS138 that the effect of the inputs to these three pins is that decoding will only take place when the most significant bit arriving on line A15 is a 1. Thus, the preselected leading hexadecimal digit can only range from 8 to F.

Lines A12-A14 of the computer address bus are connected to pins 1-3 respectively of U2 while the eight outputs from pins 7 and 9-15 of U2 are fed to lines 9-16 respectively of a switching assembly S101, which comprises eight parallel single pole single throw DIP switches. The opposite terminals of the switches at pins 8-1 respectively of assembly S101 are jumpered and the jumpered output (which is a device select signal, hereinafter designated DS̄) passed to two lines 2504 and 2506.

As will be apparent to those skilled in the art, switching assembly S101 is set so that one of the switches is closed and the remaining seven are open. Thus, the jumpered output will be high except when the input connected to the closed switch goes low, which will occur only when lines A12-A15 of the address bus are carrying a predetermined hexadecimal digit from 8-F. Assembly S101 is illustrated in FIG. 45 with the switch connecting pins 15 and 2 closed, which sets the predetermined hexadecimal digit to 9.

The next part of FIG. 45 to be described is the device select circuit indicated by the broken boundary 2508 in FIG. 45. The device select circuit serves to provide various enabling signals for controlling the operation of other parts of the video computer interface. As already explained, the interface contains 4K (4096) addresses, any one of which can be selected by the appropriate signals on lines A0-A11 of the address bus. Sixty-four of these addresses do not address memory directly; instead, these 64 addresses (combinations of signals on lines A0-A11) are used to control the operation of the interface. The device select circuit also generates a memory inhibit signal which inhibits writing of data into the memories when the address designated on lines A0-A11 of the address bus is one which does not require writing into memory.

Lines A4-A11 of the address bus are connected to lines 2, 4, 6, 8, 11, 13, 15 and 17 respectively of U4, which is a commercially-available 74LS244 inverting Schottky octal buffer/line driver. U4 is provided with the conventional power connections at pins 20 and 10, while the 1Ḡ and 2Ḡ pins 1 and 19 respectively are connected to a common ground. The output from pin 3 of U4 (corresponding to the signal on line A11) is fed to pin 6 of U5, which is another commercially-available 74LS138 Schottky 1-of-8 decoder/demultiplexer. The outputs from pins 12, 9, 7 and 5 of U4 (corresponding to the signals on lines A7-A10 respectively of the address bus) are fed to pins 9, 10, 12 and 13 respectively of U6A. Integrated circuit U6 is a commercially-available 74LS20 dual 4-input NAND gate provided with the conventional power connections at pins 14 and 7. The output from pin 8 of U6A is fed to pin 5 of U5. The outputs from pins 18, 16 and 14 of U4 (corresponding to the signals on lines A4-A6 of the address bus respectively) are fed to pins 1, 2 and 3 respectively of U5. The D̄S̄ signal on line 2506 is fed to pin 4 of U5, thereby ensuring that U5 will only affect decoding when the block select circuit 2502 produces a signal indicating that the most significant hexadecimal digit arriving on the address bus has the correct preselected value. U5 receives the conventional power connections at pins 16 and 8. The output from pin 7 of U5, hereinafter designated C̄S̄Ā, is fed directly to a line 2510, and is also fed to pin 9 of U7A. Integrated circuit U7 is a commercially-available 74LS08 quadruple 2-input NAND gate. The output from pin 9 of U5 is fed to pin 10 of U7A. The output at pin 8 of U7A, which is a memory enable (inverse memory inhibit) signal hereinafter designated M̄Ī, is fed to a line 2512.

It will be apparent to those skilled in the art that the effect of the connections among U5, U6A and U7A is that the enable function E of U5 is given by:

$$E = A_{11}.A_{10}.A_9.A_8.A_7$$

where $A_X$ is the value of the signal on line Ax of the address bus. The value of the signal $\overline{MI}$ (the inverse of MI) is given by:

$$MI = E.A_6.A_5,$$

while the value of the signal $\overline{CSA}$ on line 2510 is given by:

$$\overline{CSA} = E.A_6.A_5.A_4$$

Thus, MI is positive only for the uppermost 32 addresses and CSA is positive only for the uppermost 16 addresses.

Lines A0–A3 of the address bus (corresponding to the least significant hexadecimal digit) are fed to pins 8, 6, 4 and 2 respectively of U8A. Integrated circuit U8 is another commercially-available 74LS244 inverting Schottky octal buffer/line driver provided with the normal power inputs at pins 20 and 10 and having pins 1 and 19 connected to a common ground. The output at pin 18 of U8A (corresponding to the signal on line A3 of the address bus) is fed to pin 5 of U9, which is another commercially-available 74LS138 Schottky 1-of-8 decoder/demultiplexer. The outputs at pins 12, 14 and 16 of U8A (corresponding to the signals on lines A0, A1 and A2 respectively of the address bus) are fed to pins 1, 2 and 3 respectively of U9. Pin 4 of U9 receives the output from pin 9 of U5, while pin 6 of U9 is connected to a line 2514 which, as explained below, carries a clock signal $\phi 2$ from the computer. U9 receives the conventional power connections at pins 16 and 8.

It will be apparent to those skilled in the art that U9 will only be enabled for decoding when U5 is enabled, the signals on lines A4–A6 are such that the output at pin 9 of U5 goes low, the signal on line A3 is high and the signal $\phi 2$ on line 2514 is also high. Under these conditions, U9 will effect decoding of the signals on lines A0, A1 and A2 of the address bus (as inverted by buffer U8A) and one of the outputs on pins 7 and 9–15 of U9 will go low. Pins 14 and 15 of U9 are not used. The outputs at pins 7 and 9–13 of U9 are control signals which control the operation of various latches and two digital/analog converters, as described in more detail below. The signal from pin 7 of U9 on a line 2516 is a first row control signal, hereinafter designated $\overline{FRC}$. The signal from pin 8 of U9 on line 2518 is a last row control signal, hereinafter designated $\overline{LRC}$. The signal from pin 10 of U9 on line 2520 is a first column control signal, hereinafter designated $\overline{FCC}$ and the signal from pin 11 of U9 on line 2522 is a last column control signal, hereinafter designated $\overline{LCC}$. The output from pin 12 of U9 on line 2524 is a first digital/analog control signal hereinafter designated $\overline{ADACS}$, while the output from pin 13 of U9 on line 2526 is a second digital/analog control signal hereinafter designated $\overline{BDACS}$.

The memory read/write signal, $R/\overline{W}$, fed by the computer to line 6 of the J1 connector of the mother board, is passed to pin 11 of U8B, part of the aforementioned 74LS244 integrated circuit U8. The corresponding output from pin 9 of U8B is fed to a line 2528 to provide an amplified memory read/write signal, the uses of which will be described below. The output from pin 9 of U8B is also fed to pin 1 of U10, which is a commercially-available 74LS640 bi-directional buffer. As those skilled in the art are aware, pin 1 of the 74LS640 controls the read/write direction, and thus the read/write direction of U10 is controlled by the memory read/write signal $R/\overline{W}$ from the computer.

The clock signal $\phi 2$ from line J of the J1 connector is fed to pin 13 of U8C, a further part of the aforementioned 74LS244 integrated circuit U8. The corresponding output from pin 7 of U8C is placed on the line 2514 which, as already mentioned, is connected to pin 6 of U9. The output from pin 7 of U8C is also fed to a line 2530, for purposes which will be described below, and to pin 2 of U11A. U11 is a commercially-available 74LS00 Schottky quadruple 2-input NAND gate. To provide the other input to the gate U11A, the signal on line 2506 (which, as already described, is the signal indicating that the hexadecimal digit on lines A12–A15 of the address bus had a preselected value indicating that the address is one which affects the video-computer interface) is fed to pin 1 of U1B, a further part of the 74LS04 inverter U1 already described, and the corresponding output from pin 2 of U1B is fed to pin 1 of U11A. U11 is provided with the conventional power connections of pins 14 and 7. The output from pin 3 of U11A is fed to pin 19 (the enable pin) of U10. It will be apparent to those skilled in the art that the effect the connections established by U8C, U1B and U11A is that U10 is only enabled when the most significant hexadecimal digit on the address bus has the preselected value and the clock signal $\phi 2$ is positive.

U10 is provided with conventional power connections at pins 20 and 10, while pins 18–11 of U10 are connected to lines D0–D7 respectively of the data bus (lines D0–D7 are lines 31, 29, $\overline{K}$, $\overline{H}$, 32, 30, $\overline{L}$ and $\overline{J}$ respectively of the aforementioned J1 connector of the mother board). The signals from pins 2–9 of U10 (corresponding to the signals at pins 18–11 respectively) are placed on lines 0–7 of a buffered data bus 2532. Hereinafter for convenience, line 0 of bus 2532 will be referred to as line 2532-0 etc., and similarly for other buses.

It will be apparent to those skilled in the art that the effect of the circuitry just described is that incoming signals from the computer data bus are only transmitted to the bus 2532 when the most significant hexadecimal digit simultaneously appearing on lines A12–A15 of the address bus indicates that the signal is one intended for the video-computer interface, when the clock signal $\phi 2$ is positive and when the read/write signal $R/\overline{W}$ indicates that writing to the memory of the video-computer interface is intended. Similarly, transmission of data from the bus 2532 to the computer data bus will only occur when the preselected most significant hexadecimal digit appears on the address bus, the memory read/write signal is negative and the clock signal $\phi 2$ is positive.

Figure 46:
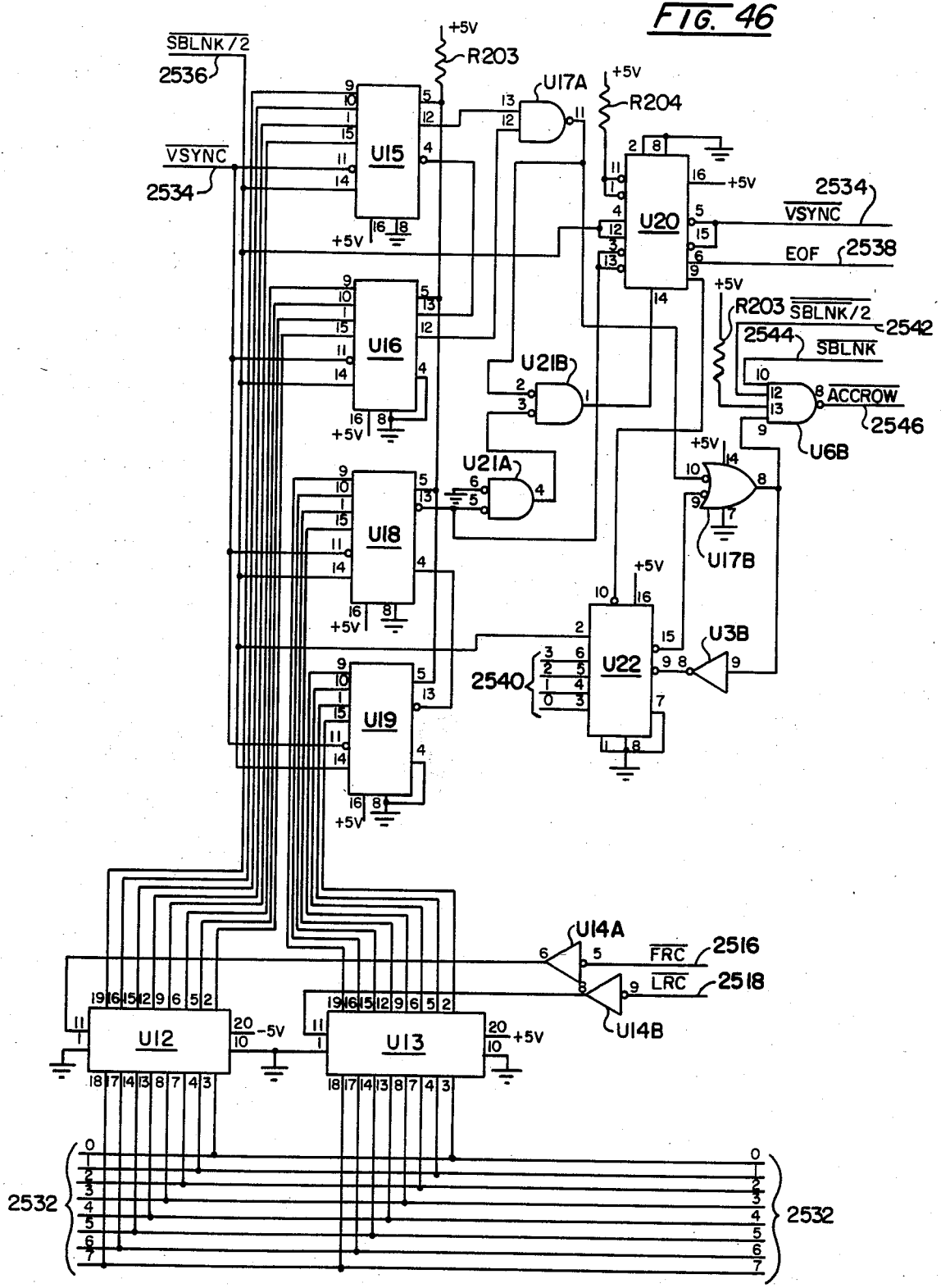

FIG. 46 shows circuitry which corresponds in substance to the row control portion 140C of the controller board 140 shown in FIG. 5. As shown in FIG. 46, lines 2532-7 to 2532-0 of the buffered data bus 2532 are connected to pins 18, 17, 14, 13, 8, 7, 4 and 3 respectively of each of a pair of integrated circuits U12 and U13. U12 and U13 are each an octal D-type latch of the commercially-available 74LS373 type, and are each provided with conventional power connections at pins 20 and 10. U12 and U13 both have pin 1 (output enable) grounded. To provide a latch enable signal to U12, the $\overline{FRC}$ signal from pin 7 of U9 (FIG. 45) appearing on line 2516 is fed to pin 5 of U14A. Integrated circuit U14 is a hex inverter of the commercially-available 74LS04 type. The inverted output from pin 6 of U14A is passed to pin 11 of U12. Similarly, the $\overline{\text{LRC}}$ signal from pin 8 of U9 (FIG. 45) appearing on line 2518 is fed to pin 9 of U14B, a further part of the same U14 integrated circuit, and the corresponding inverted output from pin 8 of U14B is fed to pin 11 of U13.

U12 serves as a first row latch. As will be apparent to those skilled in the art, when the address on the computer address bus is that specifying that the data on the data bus represents a value of the first row of the "window" from which video data is to be retained, the output from pin 7 of U9 goes low, so that the latch enable function at pin 11 of U12 goes high and U12 thus latches to the 8-bit value simultaneously appearing on the buffered data bus 2532. Thus, U12 serves to store the 8-bit first row value of the window. U13 operates in an exactly similar manner, except that it is a last row latch and serves to store the value of the last row of the window.

The outputs of pins 19, 16, 15 and 12 of U12 (which correspond to the signals originally received at pins 18, 17, 14 and 13 respectively, and which represent the four most significant bits of the 8-bit row value) are fed to pins 9, 10, 1 and 15 respectively of an integrated circuit U15. Similarly, the outputs from pins 9, 6, 5 and 2 of U12 (which correspond to the inputs of pins 8, 7, 4 and 3 respectively of U12 and specify the four least significant bits of the first row value) are fed to pins 9, 10, 1 and 15 respectively of U16. Integrated circuits U15 and U16 are each a commercially-available 74LS191 synchronous up/down 4-bit counter. These two four-bit counters are interconnected so that they function in effect as an 8-bit counter, pin 13 (the ripple clock output) of U16 being connected to pin 4 of U15. Both U15 and U16 are provided with conventional power connections at pins 16 and 8. Also, both U15 and U16 have their down/up input, pin 5, connected via a resistor R203 to a +5 V supply line, thereby locking them in the down-counting mode. Pin 11 on both U15 and U16, the load input, receives the vertical synchronization signal, $\overline{\text{VSYNCH}}$, from a line 2534; the manner in which the signal is placed on the line 2534 will be described below. Pin 14 on both U15 and U16 receives the half-speed horizontal synchronization signal, $\overline{\text{SBLNK}}/2$ from a line 2536; the manner in which this signal is generated will be described below. Finally, pin 4 of U16 is grounded. The max/min output from pin 12 of U15 is taken to pin 13 of a NAND gate U17A. U17 is a Schottky quadruple 2-input NAND gate of the commercially-available 74LS00 type. Similarly, the max/min output from pin 12 of U16 is fed to pin 12 of U17A.

As will be apparent to those skilled in the art, U15, U16 and U17A serve as an 8-bit first row counter and at the beginning of each frame, the $\overline{\text{VSYNC}}$ signal from line 2534 causes the 8-bit first row value latched in U12 to be loaded into U15 and U16, the four most significant bits going to U15 and the four least significant bits going to U16. Thereafter, the $\overline{\text{SBLNK}}/2$ signal from line 2536 causes the 8-bit first row value thus loaded to be decremented when each new line of data is begun (as already explained, it is necessary to divide the frequency of the horizontal synchronization signal by 2 in order to overcome the effect of interlacing when the preferred TN2500 video camera is employed). After the desired number of lines have passed, the outputs at pins 12 of U15 and U16 go high simultaneously, thereby causing the output at pin 11 of U17A to go low. Thus, the output at pin 11 of U17A only goes low when the first line of the window to which video data is to be stored has been reached.

Generation of an appropriate signal when the last row of the video window has been reached is accomplished in a generally similar manner. The outputs at pins 19, 16, 15 and 12 of U13 (which correspond to the inputs of pins 18, 17, 14 and 13 respectively thereof, and which define the four most significant bits of the last row value latched in U13) are fed to pins 9, 10, 1 and 15 respectively of U18, while the outputs from pins 9, 6, 5 and 2 of U13 (which correspond to the inputs at pins 8, 7, 4 and 3 respectively, and which represent the four least significant bits of the last row value latched in U13) are fed to pins 9, 10, 1 and 15 respectively of U19. Integrated circuits U18 and U19 are each 4-bit counters of the commercially-available 74LS191 type. The remaining connections to U18 and U19 are exactly similar to those to U15 and U16 respectively. Thus, each of U18 and U19 has its pin 5 connected to the +5 V supply line via resistor R203, its pin 11 connected to the line 2534 and its pin 14 connected to the line 2536. Conventional power connections are made to U15 and U19 at pins 16 and 8 on each chip, pin 4 of U19 is grounded, and pin 13 of U19 and pin 4 of U18 are interconnected.

It will be apparent to those skilled in the art that the operation of U18 and U19 is exactly parallel to that of U15 and U16. At the beginning of each frame, the $\overline{\text{VSYNC}}$ signal from line 2534 causes loading of the 8 bits of the last row value latched in U13 into U18 and U19, and thereafter the $\overline{\text{SBLNK}}/2$ signal from line 2536 causes the 8-bit value thus loaded to be decremented each time a new line of video data is begun. Accordingly, when the appropriate number of lines has elapsed, the ripple clock output at pin 13 of U18 goes low, thus signalling the end of the window. It is now necessary to process the outputs from U17A and from pin 13 to U18 in order to generate both an end-of-frame signal, EOF, which will signify the acquisition of video date by the interface, and to gate the signals indicating the rows to be accepted in a manner dependent upon the row skip function, in order that lines of video data may be skipped when the instructions set by the operator on the computer require this. Generation of the EOF signal is accomplished by an integrated circuit U20 which is a dual J-K positive-edge triggered flip-flop of the commercially-available 74LS109 type. The ripple clock signal from pin 13 of U18 is fed directly to pins 3 and 13 (the two $\overline{\text{K}}$ inputs of the two flip-flops on U20). The same ripple clock signal from pin 13 of U18 is also passed to pin 5 of U21A. Integrated circuit U21 is a Schottky quadruple 2-input NOR gate of the commercially available 74LS02 type. Pin 6 of U21A is grounded so that U21A acts an inverter the output from pin 4 of U21A is fed to pin 3 of U21B, a further NOR gate on integrated circuit U21. Pin 2 of U21B receives the output from pin 11 of U17A, and the output from pin 1 of U21B is fed to pin 14 (the J2 input) of U20. Pins 4 and 12 (the two CP inputs) of U20 receive the $\overline{\text{SBLNK}}/2$ signal from line 2536, while pins 1 and 11 the ($\overline{\text{C1}}$ and $\overline{\text{S2}}$ inputs respectively) of U20 are held positive, being connected to the +5 V supply line via a resistor R204. U20 receives the conventional power connections at pins 16 and 8, and its pin 2 (J1 input) is grounded. Pins 5 and 15 of U20 (the $\overline{\text{S1}}$ and $\overline{\text{C2}}$ inputs respectively) receive the $\overline{\text{VSYNC}}$ signal from line 2534. Pin 6 (the Q1 output) of U20 provides the EOF signal on a line 2538. The use of this signal will be described below.

Although the exact operation of U20 and its associated circuitry is somewhat complex, it will be apparent to those skilled in the art that the EOF signal on line 2538 will only begin to be generated after U20 has received a pulse indicating the beginning of a frame (i.e. after the output from U17A indicates that the beginning of the window has been reached) and will terminate when the output from pin 13 of U18 indicates that the end of the window has been reached. Thus, the EOF signal on line 2538 indicates passage through the window for which video data is to be generated, in the same manner as the corresponding signal shown in FIG. 14 above.

The row skipping function is handled by an integrated circuit U22, which is a synchronous 4-bit up-/down binary counter of the commercially-available 74LS169 type. U22 has conventional power connections at pins 16 and 8. Pin 1 is grounded (thereby locking the counter in the down-counting mode) and pin 7 is also grounded, thereby holding the enable P function permanently low. Pin 2 of U22 (the CP input) receives the $\overline{\text{SBLNK}}$/2 signal from line 2536, while pins 3, 4, 5 and 6 are connected to lines 0, 1, 2 and 3 respectively of a four-line bus 2540. This bus 2540 carries a four-bit signal representing the row skip function; the manner in which the signals are placed on the bus 2540 will be described below. Pin 10 of U22 (the enable $\overline{T}$ input) of U22 receives the $\overline{Q2}$ signal fom pin 9 of U20, thereby ensuring that U22 only counts while the video signal is within the window defined by the first and last row counts latched in U12 and U13 respectively.

The ripple counter output from pin 15 of U22 is fed to pin 9 of U17B, a further NAND gate on the 74LS00 integrated circuit U17 mentioned above. U17B has the conventional power connections at pins 14 and 7. The other input to U17B at pin 10 thereof is derived from pin 11 of U17A. The output from pin 8 of U17B is fed to pin 9 of U3B, a second inverter on the integrated circuit U3 mentioned above. The inverted output from pin 8 of U3B is fed to pin 9 (the load input) of U22.

It is believed that the mode of operation at U22 will be apparent to those skilled in the art. U22 is not operational until the first line of the window has been reached. When the input from pin 11 of U17A to pin 10 of U17B goes low, the output at pin 8 of U17B goes high, the output at pin 8 of U3B goes low, and the low input at pin 9 of U22 causes loading of a 4-bit row skip value into U22. U22 then counts down at a rate determined by the signal $\overline{\text{SBLNK}}$/2 on line 2536 (i.e. U22 counts new lines of video data) until its counter reaches 0. When the counter reaches 0, the output at pin 15 of U22 goes low, and since both inputs to U17B are now low, its output changes. Once the ripple clock pulse from pin 15 of U22 is ended, the output of U17B changes and the successive countdown cycles of U22 are repeated until the last line of the video window is reached. Once the last line has been reached, the input at pin 10 of U22 goes high, thus terminating the operation of U22.

The output from pin 8 of U17B is also fed to pin 9 of U6B, which is a second 4-input NAND gate on the 74LS04 integrated circuit U6 previously mentioned. Pin U13 of U6B is held high, being connected to the +5 V supply line via a resistor R205. Pin 12 of U6B receives the inverse of the half-speed horizontal synchronization signal (i.e. the inverse of $\overline{\text{SBLNK}}$/2) from a line 2542, while pin 10 U6B receives the horizontal blanking signal $\overline{\text{SBLNK}}$ from a line 2544. The manner in which the appropriate signals are placed on the lines 2542 and 2544 will be described below. Obviously, the action of U6B is to gate the output from pin 8 of U17B by both the $\overline{\text{SBLNK}}$ line signal and the inverse half speed horizontal synchronization signal. The output from pin 8 of U6B on a line 2546 is the accept row signal, $\overline{\text{ACCROW}}$.

Figure 47:
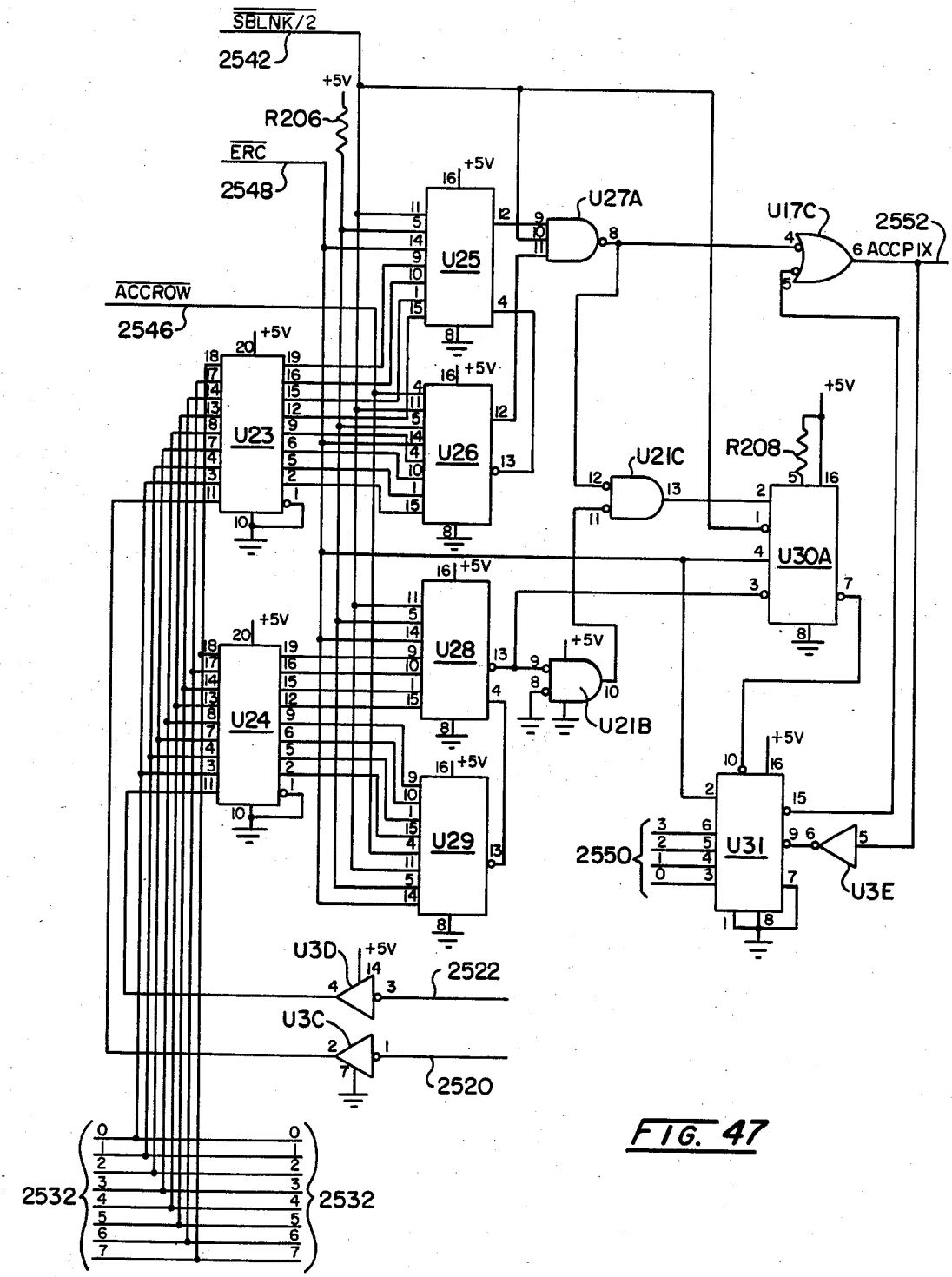

FIG. 47 shows column control circuitry which functions in the same manner as the column control portion 140B of the controller board 140 shown in FIG. 5. In general, the column control circuitry shown in FIG. 47 functions in a manner very similar to that of the row control circuitry shown in FIG. 46 except of course that the appropriate counting circuits have to be reset by the half-speed horizontal synchronization signal, not by the vertical synchronization signal, and that the counters must count pixels not lines, so that the counters count using the pixel-counting signal $\overline{\text{ERC}}$, not the half-speed horizontal synchronization signal.

As shown in FIG. 47, signals from lines 0-7 of buffered data bus 2532 are fed to pins 3, 4, 7, 8, 13, 14, 17 and 18 respectively of each of two integrated circuits U23 and U24, which are each octal D-type latches of the commercially-available 74LS373 type. U23 and U24 receive the conventional power connections at pins 20 and 10 and each have pin 1 (output enable) grounded. The $\overline{\text{FCC}}$ output from pin 10 of U9 on line 2520 (FIG. 45) is, as shown in FIG. 47, fed to pin 1 of U3C, which is a third inverter on the aforementioned 74LS04 integrated circuit U3. The inverted output from pin 2 of U3C is fed to pin 11 (the latch enable input) of U23. Similarly, the $\overline{\text{LCC}}$ from pin 11 of U9 on line 2522 (FIG. 45) is, as shown in FIG. 47, fed to pin 3 of U3D, which is a fourth inverter on the aforementioned 74LS04 integrated circuit U3. As shown in FIG. 47, integrated circuit U3 receives the conventional power connections at pins 14 and 7. The inverted output from pin 4 of U3D is fed to pin 11 (the latch enable input) of U24.

As will be apparent to those skilled in the art, U23 functions as a first column latch loading an 8-bit first column value from bus 2532 when the signal from pin 10 of U9 indicates that the value on the buffer data bus 2532 represents a first column value. Similarly, U24 acts as a last column latch loading an 8-bit last column value when the output from pin 11 of U9 indicates that the signal on the data bus represents a last column value.

First column counting is effected by a pair of integrated circuits U25 and U26 which function in a manner very similar to the first row counting action of integrated circuits U15 and U16 described above. U25 and U26 are each a 4-bit synchronous up/down binary counter of the commercially-available 74LS191 type, and the two integrated circuits interconnected so as to act, in effect, as a single 8-bit counter. The outputs from pins 19, 16, 15 and 12 of U23 (representing the four most significant bits of the 8-bit first column value latched in U 23) are fed to pins 9, 10, 1 and 15 respectively of U25, while the output from pins 9, 6, 5 and 2 respectively of U23 (representing the four least significant bits of the 8-bit first column value latched in U23) are fed to pins 9, 10, 1 and 15 respectively at U26. U25 and U26 receive the conventional power connections at pins 16 and 8, the inverse half-speed horizontal synchronization signal at pin 11 (the load input) and the element rate clock or pixel counting signal $\overline{\text{ERC}}$ from a line 2548 at pin 14 (the clock input). Pin 5 (the down/up input) of each of U25 and U26 is connected to a +5 V supply line via a resistor R206, thereby locking U25 and U26 in the down-counting mode. The ripple clock output from pin 13 of U26 is fed to pin 4 (the enable input) of U25. Pin 4 (the enable input) of U26 receives the accept row signal $\overline{ACCROW}$ from line 2546.

As will be apparent to those skilled in the art, when $\overline{ACCROW}$ goes negative, U26 is enabled. As soon as the inverse half-speed horizontal synchronization signal from line 2542 goes negative, U26 loads the four least significant bits of the 8-bit first row value latched in U23. U26 then proceeds to decrement this 4-bit number once for every pixel scanned, using the $\overline{ERC}$ signal from line 2548. After U26 has counted down to zero, its ripple clock output at pin 13 goes negative, thereby enabling U25 since the inverse half-speed synchronization signal will still have the same value (obviously U26 will cont to zero in less than one line of video data). U25 proceeds to load the four most significant bits of the 8-bit first column value latched in U23. Thereafter, U26 goes through a number of countdown cycles and at the end of each cycle U25 decrements its counter value by 1. Obviously, when a number of pixels corresponding to the pre-selected first column value latched in U23 have elapsed, both U25 and U26 will count down to zero simultaneously, and both their max/min outputs at pin 12 will go high simultaneously. The signal from pin 12 of U25 is fed to pin 9 of U27A, while the signal from pin 12 of U26 is fed to pin 11 of U27A. Pin 10 of U27A receives the inverse half-speed horizontal synchronization signal from line 2542. U27 is a Schottky triple 3-input NAND gate of the commercially-available 74LS10 type. As will be apparent to those skilled in the art, the output of U27A at pin 8 thereof will only go low when the $\overline{ACCROW}$ signal is negative (i.e. the line is to be accepted), counters U25 and U26 have counted a number of pixels equal to the first column value latched in U23 and the inverse half-speed horizontal synchronization signal on line 2542 is positive (i.e,. the line represented by the incoming video signal is a new line of video data, not a repeated line).

Last column counting is handled by two integrated circuits U28 and U29, which are each of the aforementioned 74LS191 type. The output at pins 19, 16, 15 and 12 of U24 are fed to pins 9, 10, 1 and 15 respectively of U28, while the outputs at pins 9, 6, 5 and 2 of U24 are fed to pins 9, 10, 1 and 15 of U29. Pin 4 (the enable input) of U29 receives the $\overline{ACCROW}$ signal from line 2546. Pin 11 on both U28 and U29 receives the inverse half-speed horizontal synchronization signal from the line 2542, pin 5 on U28 and U29 is connected to +5 V supply line via a resistor R206 and pin 14 on U28 and U29 receives the $\overline{ERC}$ signal from line 2548. U28 and U29 are each provided with the conventional power connections at pins 16 and 18, and the ripple counter output at pin 13 of U29 is connected to pin 4 (the enable input) of U28. For reasons which will be apparent to those skilled in the art from the foregoing description of the operation of U18, U19, U25 and U26, the ripple clock output on pin 13 of U28 will only go low when U28 and U29 have counted a number of pixels equal to the last column value latched in U24.

The ripple clock output from pin 13 of U28 is fed to pin 9 of U21B which is a further NOR gate on the 74LS02 integrated circuit U21 previously mentioned. U21B receives the conventional power connections at pins 14 and 7 and its pin 8 (second input) is grounded to that U21B acts as an inverter. The output from pin 10 of U21B is fed to pin 11 of U21C, a third NOR gate on the same 74LS02 integrated circuit U21. Pin 12 (the second input) of U21C receives the output from pin 8 of U27A.

The output at pin 13 of U21C is fed to pin 2 (the J1 input) of U30A. Integrated circuit U30 is a positive edge-triggered dual J-K flip-flop of the commercially-available 74LS109 type. U30A serves substantially the same function in the column control circuitry as the similar integrated circuit U20 serves in the row control circuitry. However, since there is no need for the column control circuitry to generate any signal analogous to the EOF signal generated by integrated circuit U20 in the row control circuitry, only one of the flip-flops on U30 is used in the column control circuitry. Pin 1 (the $\overline{C1}$ input) of U30A receives the inverse half-speed horizontal synchronization signal from line 2542, pin 4 (the CP1 input) of U30A receives the $\overline{ERC}$ signal from line 2548, and pin 3 (the $\overline{K1}$ input) of U30A receives the ripple counter output from pin 13 of U28. U30A is provided with the conventional power connections at pins 16 and 8, and its pin 5 (the $\overline{S1}$ input) is also connected to the +5 V supply line via a resistor R208. The $\overline{Q1}$ output at pin 7 of U30A is fed to pin 10 (the enable T input) of an integrated circuit U31. Integrated circuit U31 is a synchronous 4-bit up/down counter of the commercially-available 74LS169 type and functions as a column skip counter in substantially the same manner as the integrated circuit U22 described above functions as a row skip counter. Pin 2 (the CP input) of U31 receives the $\overline{ERC}$ signal from line 2548, while pins 6, 5, 4 and 3 of U31 (the four data inputs) are connected to lines 3, 2, 1 and 0 respectively of a bus 2550, which carries a 4-bit number defining the column skip function. The manner in which the column skip function is placed on bus 2550 will be described below. U31 receives the conventional power connections at pins 16 and 8, pin 1 is grounded to lock U31 in the down-counting mode, and pin 7 is also grounded so that the enable $\overline{P}$ function of U31 is always enabled.

The ripple carry output from pin 15 of U31 is fed to pin 5 of U17C, a third NAND gate on the integrated ciruit U17 previously mentioned. The second input to pin 4 of U17C is supplied from pin 8 of U27A. The output at pin 6 of U17C is the accept pixel signal, ACCPIX, which is placed on a line 2552 for purposes to be described below. The output from pin 6 of U17C is also supplied to pin 5 of U3E, a further inverter on the 74LS04 integrated circuit U3 previously mentioned. The inverted output from pin 6 of U3E is fed to pin 9 (the load input) of U31.

It will be apparent to those skilled in the art that the circuitry just described causes U31 to operated in a manner substantially analogous to U22. U31 is only enabled at pin 10 when the row and column numbers of the incoming video data relate to the desired window. When the video data relate to this window, U31 goes through successive cycles of loading the column skip function from bus 2550, counting down to zero and, upon reaching zero, outputing a ripple carry output pulse from pin 15. Thus, U31 serves to gate the accept pixel signal ACCPIX in accordance with the column skip function previously set by the operator.

The circuitry shown in FIG. 48 serves to multiplex signals from the computer with signals from the camera and to handle communications with the memories in the video computer interface. Although the detailed layout is somewhat different, the circuitry shown in FIG. 48 corresponds largely to the PIA/VIA SELECT, computer communication portion 140A of the controller board 140 and the memory control portion 274A of the memory board 274 shown in FIG. 5.

The circuitry shown in the upper left-hand part of FIG. 48 is responsible for handling and modifying various signals from the video camera to produce signals used by other parts of the video-computer interface. The horizontal synchronization signal, $\overline{SBLNK}$ from the video camera (this signal appears on line 20 of the J2 connector of the AIM-65 mother board) is fed to pin 13 of U7C, a third AND gate on the 74LS08 integrated circuit U7 mentioned above. The second input to U7C at pin 12, is held high, being connected to a +5 V supply line via a resistor R210, so that U7C functions as an amplifier. The output from pin 11 of U7C is fed to pin 12 (the CP2 input) of U30B, which is the second flip-flop of the 74LS109 integrated circuit U30 already mentioned. U30B receives the conventional power connections at pins 16 and 8. Pins 11 and 14 (the S2 and J2 inputs respectively) are held high, being connected to the +5 V supply line via resistor R210. Pin 13 (the $\overline{K2}$ input) of U30B is grounded.

The vertical synchronization signal, VSYNC from line 24 of the J2 connector of the AIM-65 mother board, is fed to pin 9 of U1C, a further inverter on the 74LS04 integrated circuit U1 already mentioned. The corresponding inverted input from pin 8 of U1C, the inverse vertical synchronization signal, $\overline{VSYNC}$ or CLR, is placed on the line 2534 already mentioned, and is also fed to pin 15 (the $\overline{C2}$ input) of U30B. The Q2 output from at pin 10 of U30B is the half-speed horizontal synchronization signal $\overline{SBLNK}/2$, which is placed on the line 2436 already mentioned, while the $\overline{Q2}$ output at pin 9 of U30B is of course the inverse half-speed horizontal synchronization signal, which is placed on the line 2542 already mentioned. The $\overline{ERC}$ signal from the video camera, appearing at line 11 of the J2 connector of the AIM-65 mother board, is fed via a resistor R212 to the mid-point of a voltage divider comprising two identical resistors R214 and R216 connected in series between the +5 V supply line and ground, and thence to pin 17 of U8C, a further part of the 74LS244 buffer/line driver integrated circuit U8 already mentioned. The corresponding output, at pin 3 of U8C, which is simply an amplified version of $\overline{ERC}$, is placed on the line 2548 already described. The output from pin 3 of U8A is also fed to pin 13 of U3F, a sixth inverter on the 74LS04 integrated circuit U3 already described. The corresponding inverse signal ERC, appearing at pin 12 of U3F, is placed on a line 2554; the use made of this signal will be described below.

The remainder of the circuitry in FIG. 48 is mainly concerned with multiplexing signals from the buffered computer data bus and from a camera data bus and supplying the multiplexed signals to the memories of the computer interface. Lines 0–7 of buffered data bus 2532 (from integrated circuit U10 shown in FIG. 45) are fed to pins 33–26 respectively of integrated circuit U33, which is an R6522 input/output port manufactured by Rockwell International Corporation. As previously mentioned, further details of this device may be obtained by reference to Document No. 2900D47 Revision 1, published in October 1978 by Rockwell International Corporation. U33 serves as a multiple latch to store various parameters sent from the computer and required by the video-computer interface, and also handles various communications with the video camera and the computer. U33 is provided with the conventional power connection at pins 20 and 1. Its pin 24 (the CS1 input) is held high, being connected via a resistor R218 to the +5 V supply line. Pin 23 (the $\overline{CS2}$ input) of U33 receives the $\overline{CSA}$ signal on line 2510 from pin 7 of U5 (as previously described with reference to FIG. 45). Pins 5, 4, 3 and 2 (outputs PA3–PA0 respectively) of U33 are connected to lines 3–0 respectively of bus 2540 which, as already described, serves to transmit the 4-bit value of the row skip function to U22 (FIG. 46). Similarly, pins 9–6 (outputs PA7–PA4) of U33 are connected to lines 3–0 respectively of bus 2550, which, as already described, serves to transmit the 4-bit value of the column skip function of U31 (FIG. 47).

Pin 21 of U33 serves to carry the $\overline{IRQ}$ output from the video computer interface to the computer and is connected to line D of the J1 connector of the mother board. Pins 19 and 16 (inputs CB2 and PB6 respectively of U33) receive the inverted vertical synchronization signal, $\overline{VSYNC}$ from pin 8 of U1C. Pins 18 and 17 (the CB1 and PB7 inputs respectively) of U33 receive the EOF signal from line 2538. As already described, this EOF signal is generated at pin 6 of U20 (see FIG. 46). Pins 35–38 (inputs RS3–RS0 respectively) of U33 are connected to pins 18, 16, 14 and 12 respectively of U8A (FIG. 45) and thus receive the four least significant bits from the computer address bus, appropriately buffered by U8A. Pin 34 of U33 receives a reset signal, $\overline{RES}$, from line 5 of the J1 connector of the mother board. Pin 22 of U33 receives the read/write signal R/$\overline{W}$ from line 2528 which, as already described, is connected to pin 9 of U8B (FIG. 45). Pin 25 of U33 receives the clock signal $\phi 2$ from line 2530 which, as already mentioned, is connected to pin 7 of U8C (FIG. 45).

Pin 15 (the PB5 output) of U33 is connected to pin 3 of U14C, which is a third inverter on the 74LS04 integrated circuit U14 already mentioned. The inverted signal from pin 4 of U14C is fed to line 1 of the J2 connector of the mother board, and serves as an automatic gain control signal for the video camera. Pin 14 (the PB4 output) of U33 is connected to line 23 of the J2 connector, while pin 13 the (the PB3 output) of U33 is fed to pin 11 of U14D (a fourth inverter on the 74LS04 integrated circuit A14 already mentioned) and the inverted output from pin 10 of U14D is fed to line 22 of the J2 connector. Lines 22 and 23 of the J2 connector furnish mode control signals to the video camera, the signal on line 22 being the I/$\overline{244}$ and that on line 23 being the N/$\overline{122}$ signal. The use which is made of these signals by the TN2500 video camera will be known to those familiar with this camera.

Pin 12 of U33 is not used. Pin 11 (the PB1 output) is connected to line 6 of the J2 connector, which serves to transmit the IIG signal to the camera. It will be seen from FIG. 48 that lines 9 and 21 of the J2 connector are not used and are simply grounded. Pin 10 (the PB0 output) of U33 provides the camera control signal, COM/$\overline{CAM}$, which, as already described, indicates when the camera is to furnish video data. This COM/$\overline{CAM}$ signal is placed on a line 2556 for purposes which will be described later.

The actual multiplexing of the computer data bus and camera data bus signals is effected by a pair of integrated circuits U34 and U35. Integrated circuit U34 is an octal bus transceiver of the commercially-available 74LS245 type, while integrated circuit U35 is an inverting buffer/line driver of the commercially-available 74LS244 type. U34 handles signals to and from the bus 2532, these being (as already described) signals from the computer data bus buffered by U10. U35 handles signals from the camera data bus 306. U34 and U35 are interconnected so that only one of them is enabled at any one time.

Pins 11–18 of U34 receive the signals from lines 7–0 respectively of bus 2532. U34 is provided with the conventional power connections at pins 20 and 10. Pin 1 (the direction pin) of U34 receives the read/write signal R/$\overline{W}$ from line 2528. To provide the enable input to pin 19 of U34, the COM/$\overline{CAM}$ signal on line 2556 is fed to pin 5 of U11B, a second NAND gate on the integrated circuit U11 previously mentioned. The second input to U11B, at pin 4 thereof, is the memory enable signal, $\overline{MI}$, from line 2512; as already mentioned, the $\overline{MI}$ signal is supplied from U7A (FIG. 45). The output at pin 6 of U11B is supplied to the enable input, pin 19, of U34. Pins 9–2 of U34 are connected to lines 7–0 respectively of a memory bus 2558.

Lines 7–0 of camera data bus 306 (appearing on lines 12, 10, 5, 7, 2, 3, 4 and 8 respectively of the J2 connector of the mother board) are fed to pins 8–1 respectively of a resistor assembly RA1. Assembly RA1 is an Allen-Bradley 316B resistor assembly and comprises eight parallel 100 ohm resistors. The outputs on pins 9–16 of RA1 (which correspond to the inputs on pins 8–1 respectively) are fed to pins 8, 6, 4, 11, 13, 15 and 17 respectively of U35 and are also fed to pins 2–9 respectively of a resistor assembly RA2, which is an Allen-Bradley 310 type 10-pin SIP assembly. As is well known to those skilled in the art, this assembly, which has pin 1 connected to the +5 V supply line and pin 10 grounded, comprises eight series pairs of 22 Kohm resistors connected in parallel, and the inputs on pins 2–9 are connected to the midpoint of the voltage dividers formed by these pairs of resistors, as shown in FIG. 48. Assemblies RA1 and RA2 are provided for impedance matching of the camera cable which terminates in bus 306.

U35 is provided with the conventional power connections to pins 20 and 10. Pins 1 and 19 (the two enable inputs) of U35 receive the COM/$\overline{CAM}$ signal from line 2556. Pins 12, 14, 16, 18, 9, 7, 5 and 3 of U35 are connected to lines 7–0 respectively of memory bus 2558.

It is believed that the mode of operation of U34 and U35 will be readily apparent to those skilled in the art. Obviously, when the COM/$\overline{CAM}$ signal goes low, U35 is enabled and signals from the camera data bus 306 will be sent to the memory bus 2558. The control of U34 is somewhat more complicated since U34 may be required to transmit data in both directions between the bus 2532 and the memory bus 2558. (The ability to transmit data from the computer to the interface memories is not strictly necessary in the present form of the interface. However, this facility may be useful for testing purposes and is also provided since it may be useful in further developments of the interface). U34 is only enabled when the input at pin 19 thereof goes low which, because of U11B, is only achieved when both the memory enable signal $\overline{MI}$ and COM/$\overline{CAM}$ go high; the gating of the high COM/$\overline{CAM}$ signal with by the signal $\overline{MI}$ effected by U11B is necessary to ensure that U34 is not enabled when the address appearing on the computer address bus is one of the reserved addresses which is intended for a function of the video computer interface other than writing into the memories. Once U34 has been enabled by a high COM/$\overline{CAM}$ and a high $\overline{MI}$, the direction of transmission therethrough depends upon the value of the signal R/$\overline{W}$ fed to pin 1 thereof; when R/$\overline{W}$ is high, data will be transmitted from the memory bus 2558 to the bus 2532, while when R/$\overline{W}$ goes low, data will be transmitted from the bus 2532 to the memory bus 2558.

Figure 49:
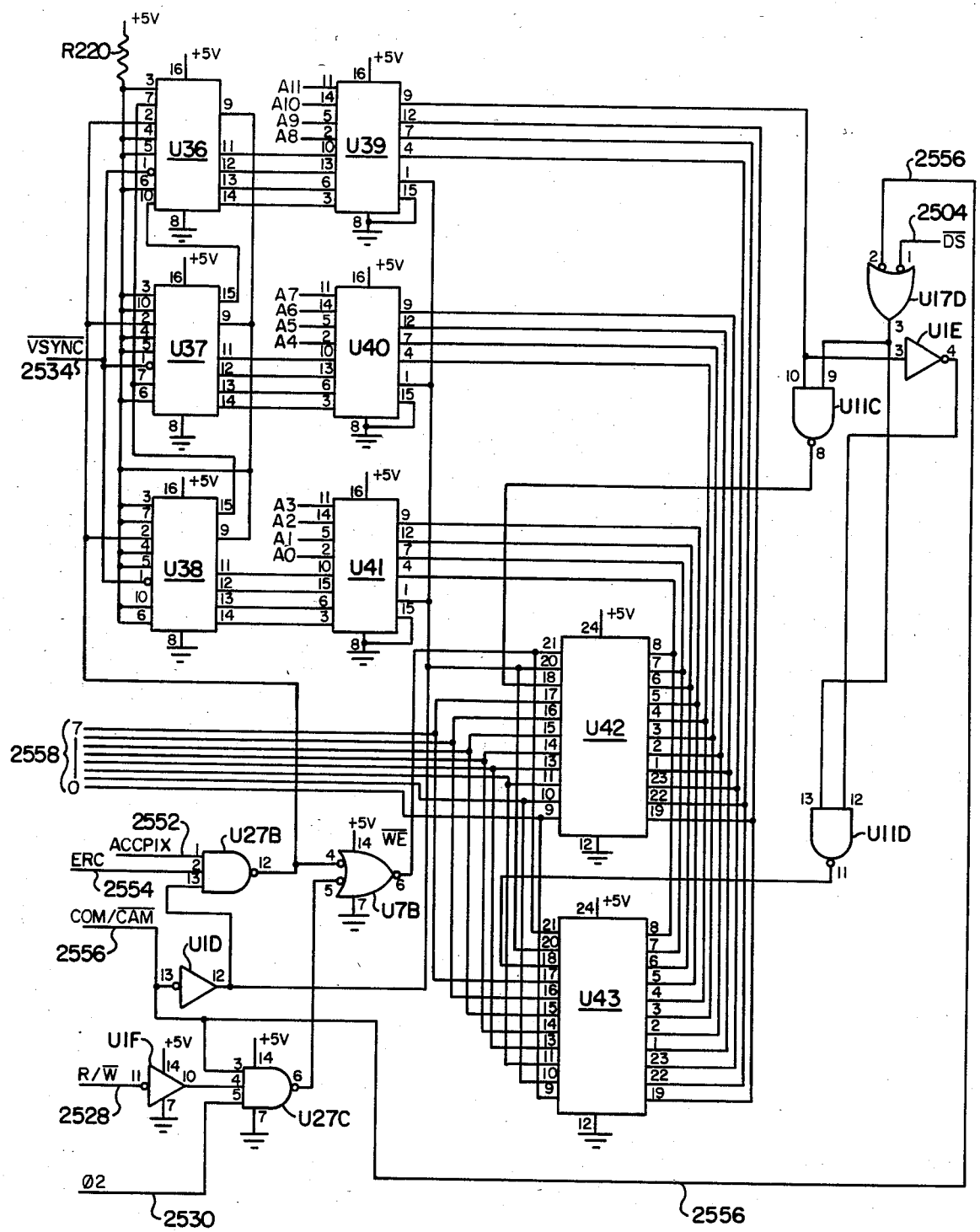

FIG. 49 shows the memories of the video computer interface, together with associated circuitry used for generating addresses in the memory and for various control functions. As will be apparent to those skilled in the art, as 8-bit numbers representing video data from accepted pixels are fed to the video-computer interface when the computer instructs the interface to acquire video data from the camera, it is necessary to generate addresses to advise the memory of the various locations in which the incoming video data should be stored. Generation of the necessary addresses is effected by three integrated circuits U36, U37 and U38, each of which is a synchronous 4-bit counter of the commercially-available 74LS161 type. U36, U37 and U38 are interconnected so as to generate the 12-bit addresses required by the 4K memory described below. Each of U36, U37 and U38 is provided with conventional power connections at pins 16 and 8. Pins 3, 4, 5 and 6 of each of U36, U37 and U38 (the four data inputs of each counter) are all held high, being connected to the +5 V supply line via a resistor R220. Pin 1 (the clear input) of each of U36, U37 and U38 receives the $\overline{VSYNC}$ signal from line 2534 in order to ensure that all three counters are zeroed at the beginning of each frame of video data. Pin 9 (the load input) of each of U36, U37 and U38 is held high, being connected to the +5 V supply line via the aforementioned resistor R220. To provide the clock input to U36, U37 and U38, the ERC signal on line 2554 (from pin 12 of U3F (FIG. 48) is fed to pin 2 of U27B, a second NAND gate on the 74LS10 integrated circuit U27 already mentioned. Pin 1 of U27B receives the ACCPIX signal on line 2552 from pin 6 of U17C (FIG. 47). The third input to U27B, at pin 13 thereof, is the inverse of COM/$\overline{CAM}$ signal generated by passing the COM/$\overline{CAM}$ signal on line 2556 to pin 13 of U1D (a fourth inverter on the 74LS04 integrated circuit U1 already mentioned) and passing the corresponding inverted output from pin 12 of U1D to pin 13 of U27B. The output from pin 12 of U27B is fed to pin 2 (the clock input) of each of U36, U37 and U38. As will be apparent to those skilled in the art, the provision of U27B ensures that the counters U36, U37 and U38 only actually count when the ERC and ACCPIX signals are high and the COM/$\overline{CAM}$ signal is low i.e. when the computer has set the interface to accept video data, the pixel from which video data is being received on the camera data bus 306 is one of those selected by the operator for retention of video data and $\overline{ERC}$ is alternately high and low indicating that the camera is transmitting video data from a pixel. Pins 7 and 10 of U38 (the two enable inputs) are held high, being connected to the +5 V supply line via the resistor R220. The carry output from pin 15 of U38 is fed to pin 7 (the enable P input) of each of U36 and U37. The carry output from pin 15 of U37 is fed to pin 10 (the enable T) input of U36. It will be apparent to those skilled in the art that the effect of the aforementioned interconnections is that U37 will only be enabled when a carry output is present at pin 15 of U35, and U36 will only be enabled when carry outputs are simultaneously present at pins 15 and 16 of U37 and U38. Furthermore, it will be apparent to those skilled in the art that, at the beginning of each frame of video data, U36, U37 and U38 are all reset by the $\overline{VSYNC}$ signal on line 2534 and that thereafter as successive pixels are accepted the 12-bit number represented by pins 11, 12, 13 and 14 on each of U36, U37 and U38 will be incremented each time a pixel is accepted, provided that the computer has set the COM/$\overline{\text{CAM}}$ signal low to order the interface to acquire video data.

The outputs from pins 11, 12, 13 and 14 of U36 (which represent the four most significant bits of the 12-bit address generated by U36, U37 and U38) are fed to pins 10, 13, 6 and 3 respectively of an integrated circuit U39. Similarly, the outputs from pins 11, 12, 13 and 14 of U37 are fed to pins 10, 13, 6 and 3 respectively of an integrated circuit U40 and the outputs from pins 11, 12, 13 and 14 of U38 are fed to pins 10, 13, 6 and 3 respectively of an integrated circuit U41. U39, U40 and U41 are each a Schottky quadruple 2-input 3-state multiplexer of the commercially-available 74LS257 type. U39, U40 and U41 are each provided with conventional power connections at pins 16 and 8 and in all three integrated circuits pin 15 (the output control) is grounded. Pin 1 (the select input) of each of U39, U40 and U41 is provided with the inverse COM/$\overline{\text{CAM}}$ signal from pin 12 of U1D. Thus, when COM/$\overline{\text{CAM}}$ goes low (i.e. when the interface is instructed to acquire video data from the camera) the outputs of U39, U40 and U41 will track the inputs at pins 10, 13, 6, 3 thereof.

Pins 11, 14, 5 and 2 of U39 receive the signals from lines A11–A8 respectively of the computer address bus. Similarly, pins 11, 14, 5 and 2 of U40 receive the signals from lines A7–A4 respectively of the computer address bus and pins 11, 14, 5, and 2 of U41 receive these signals from lines A3–A0 respectively of the computer address bus. Obviously, when COM/$\overline{\text{CAM}}$ goes high, the outputs from pins 9, 12, 7 and 4 of each of U39, U40 and U41 will be determined by the three least significant hexadecimal digits on the computer address bus, provided the most significant hexadecimal digit on the same bus has the pre-selected value.

The output from pin 9 of U39 (which, when video data is being acquired and thus the outputs from U39, U40 and U41 correspond to the inputs thereto from U36, U37 and U38 respectively, represents the most significant bit of the 12-bit address generated by U36, U37 and U38) is fed to pin 10 of U11C, which is a third NAND gate on the 74LS00 integrated circuit U11 previously mentioned. The COM/$\overline{\text{CAM}}$ signal on line 2556 is fed to pin 2 of AU17D, a fourth NAND gate on the 74LS00 integrated circit U17 previously mentioned. The second input to pin 1 of U17D is the signal $\overline{\text{DS}}$ on line 2504 from S101 (FIG. 45). The gating of COM/$\overline{\text{CAM}}$ by $\overline{\text{DS}}$ effected by U17D serves to prevent writing to memory when the address involved is one reserved for purposes other than writing to memory. The output from pin 3 of U17D is fed to pin 9, the second input, of U11C. The output at pin 8 of U11C is fed to pin 18 (the $\overline{\text{CS}}$ input) of an integrated circuit U42.

The output from pin 9 of U39 is also passed to pin 3 of U1E, a fifth inverter on the 74LS04 integrated circuit AU1 already mentioned. The inverted output at pin 4 of U1E is fed to pin 12 of U11D, a fourth NAND gate on the 74LS00 integrated circuit U11 already mentioned. Pin 13, the second input, of U11D is supplied with the output from pin 3 of U17D. The output from pin 11 of U11D is fed to pin 18 (the $\overline{\text{CS}}$ input) of an integrated circuit U43.

U42 and U43 are each a 2K random access memory of type HM6116P2 manufactured by Hitachi. Each of U42 and U43 is provided with conventional power connections at pins 24 and 12. It will be apparent to those skilled in the art that the effect of U17D, U11C, U1E and U11D is that when COM/$\overline{\text{CAM}}$ is low (i.e. when the computer is instructing the interface to acquire video data from the camera) one or other, but not both, of U42 and U43 can be enabled, depending upon the output from pin 9 at U39 i.e. depending upon whether the most significant bit of the 12-bit address generated by U36, U37 and U38 is a 1 or a 0.

In each of U42 and U43, pins 19, 22 and 23 receive the outputs from pins 12, 7 and 4 respectively of U39. Similarly, pins 1–4 of U42 and U43 receive the signals from lines 9, 12, 7 and 4 respectively of AU40 and pins 5–8 of U42 and U43 are supplied with the signals from pins 9, 12, 7 and 4 respectively of U41. Thus, when the interface is acquiring video data, each of U42 and U43 is supplied with the 11 least significant bits of the 12-bit address generated by U36, U37 and U38.

Pins 17, 16, 15, 14, 11, 10 and 9 of U42 and U43 are connected to lines 7–0 respectively of the memory bus 2558. Pin 20 of U42 and U43 supplied with the inverse COM/$\overline{\text{CAM}}$ signal from pin 12 of U1D.

The generation of the signal fed to pin 21 (the $\overline{\text{WE}}$ input) of U42 and U43 is somewhat complex and is accomplished by circuitry shown in the bottom left-hand part of FIG. 49. The R/$\overline{\text{W}}$ signal on line 2528 is fed to pin 11 of U1F, a sixth inverter on the 74LS04 integrated circit U1 previously mentioned. As shown on U1F, U1 is provided with the conventional power connections at pins 14 and 7. The inverted output from pin 10 of U1F is fed to pin 4 of U27C, a third NAND gate on the 74LS10 integrated circuit U27 previously mentioned. The second input to pin 5 of U27C is the clock signal $\phi 2$ from line 2530, while the third input to pin 3 of U27C is the COM/$\overline{\text{CAM}}$ signal from line 2556. As shown in FIG. 49, integrated circuit U27 is provided with the conventional power connections at pins 14 and 7. The output from pin 6 of U27C is fed to pin 5 of U7B, a second AND gate on the 74LS08 integrated circuit U7 previously described. The second input to pin 4 of U7B is the output from pin 12 of U27B. Integrated circuit U7 is provided with the conventional power connections at pins 14 and 7. The output from pin 6 of U7B is fed to pin 21 of U42 and U43. Although this circuitry associated with pins 21 of U42 and U43 is somewhat complex, it will be apparent to those skilled in the art that the circuitry just described ensures that U42 and U43 are only enabled when ACCPIX, ERC, COM/$\overline{\text{CAM}}$, R/$\overline{\text{W}}$ and $\phi 2$ all have the correct values for writing into memories U42 and U43. It will also be apparent from the foregoing description that, when the interface is gathering video data from the camera data bus 306, U42 and U43 make use of the addresses generated by U36, U37 and U38, whereas when the computer is receiving data from memories AU42 and U43, these memories use the addresses supplied to U39, U40 and U41 from lines A11–A0 of the computer address bus.

Figure 50:
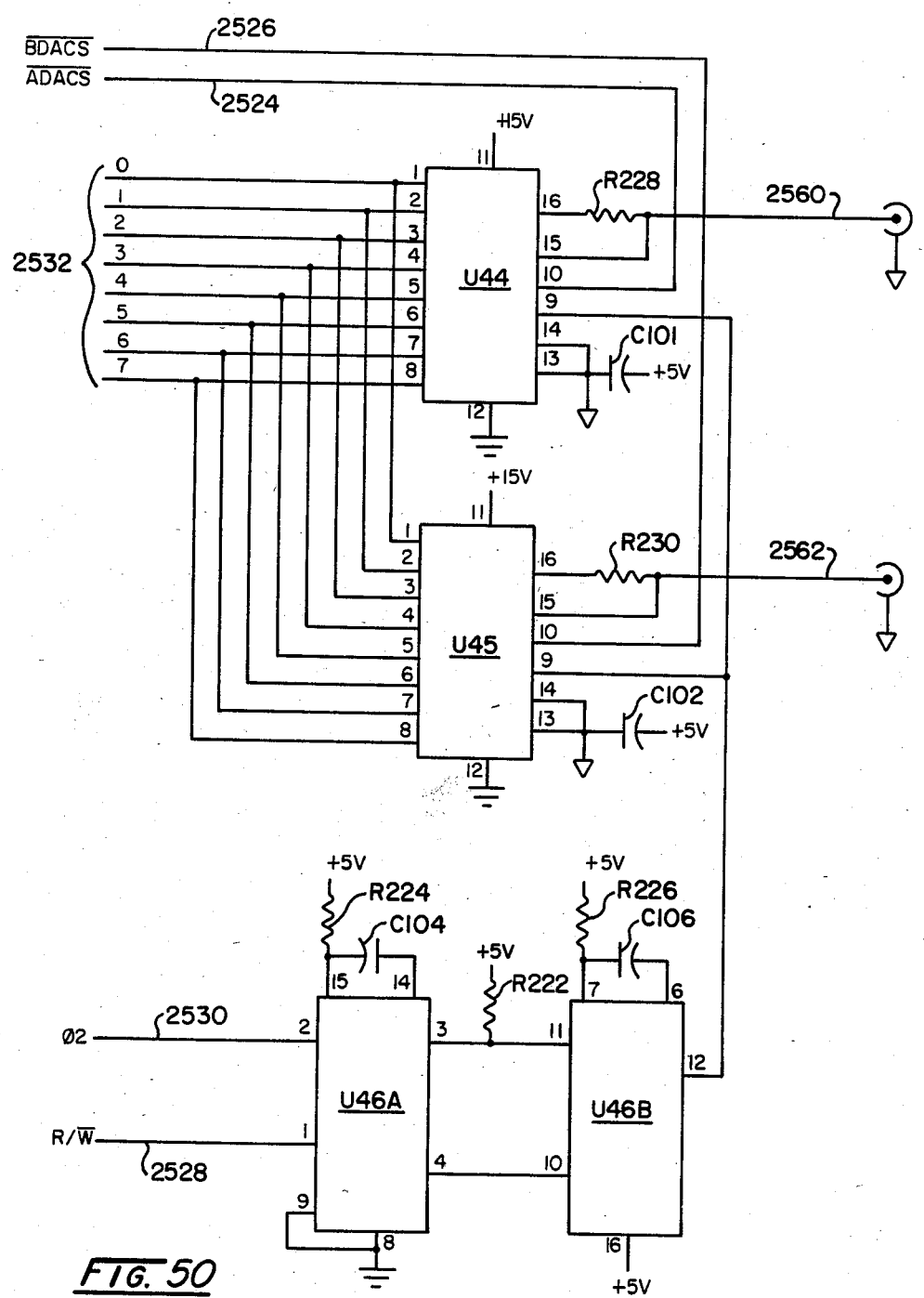

FIG. 50 shows the circuitry used to drive the oscilloscope 76 shown in FIG. 4, and corresponds in substance to portion 280B of the board 280 shown in FIG. 5. As shown in FIG. 50, lines 7–0 of buffered data bus 2532 (derived from the outputs of integrated circuit U10, as shown in FIG. 45) are supplied to pins 8–1 respectively of each of a pair of integrated circuits U44 and AU45. U44 and U45 are both digital analog converters of type AD558, manufactured by Analog Devices, and are each provided with conventional power connections at pins 11 and 12. In both U44 and U45, pins 13 and 14 are grounded, and are also connected to the +5 V supply line via a capacitor (C101 for AU44 and C102 for U45). Pin 10 of U44 receives the $\overline{\text{ADACS}}$ control signal from line 2524 (from U9, pin 12—see FIG. 45), while pin 10 of U45 receives the $\overline{\text{BDACSA}}$ control signal from line 2546 (from U9 pin 13).

As shown in the lower part of FIG. G, the R/$\overline{\text{W}}$ signal on line 2528 (derived from U8B, pin 9—see FIG. 45) is supplied to pin 1 (the $\overline{\text{A1}}$ input) of U46A. Integrated circuit U46 is a dual monostable multivibrator of the commercially-available 74LS221 type provided with the conventional power connections at pins 16 and 8. Pin (the $\overline{\text{B1}}$ input) of U46A receives the clock signal $\phi$2 from line 2530; as previously mentioned, this signal originates at pin 7 of U8C (FIG. 45). Pin 9 (the $\overline{\text{A2}}$ input) of U46A is grounded, pin 3 (the first clear input) is connected to the +5 V supply line via a resistor R222 and pin 15 is connected to the same supply via a resistor R224. Pins 14 and 15 of R46A are interconnected via a capacitor C104.

The $\overline{\text{Q1}}$ output from pin 4 of U46A is fed to pin 10 of U46B, the second monostable multivibrator on the aforementioned 74LS221 integrated circuit U46. Pin 11 (the second clear input) of U46B is connected to the +5 V supply line via the resistor R222, pin 7 of U46B is connected to the same supply line via a resistor R226 and pins 6 and 7 of U46B are interconnected via a capacitor C106. The $\overline{\text{Q2}}$ output from pin 12 of U46B is supplied to pin 9 (the clear input) of each of U44 and U45.

Integrated circuit U46 serves to broaden the pulses received on lines 2528 and 2530 in order to provide proper clear inputs to U44 and U45, since the duration of the pulses arriving on lines 2528 and 2530 may not be sufficient to provide proper operation of U44 and U45.

The output from pin 15 of U44 is fed directly to a line 2560, which provides the first input to the double-trace oscilloscope 76 (shown in FIG. 4). Pin 16 of U44 is connected to line 2560 via a resistor R228. Similarly, pin 15 of U45 is connected directly to a line 2562, which provides the second input to the oscilloscope 76 (FIG. 4) and pin 16 of U45 is connected to line 2562 via a resistor R230. As will be apparent to those skilled in the art, when the appropriate control signals are received on lines 2524 and 2526, U44 and U45 proceed to output to the oscilloscope 76 analog versions of the digital data arriving on the bus 2532.

Figure 51:
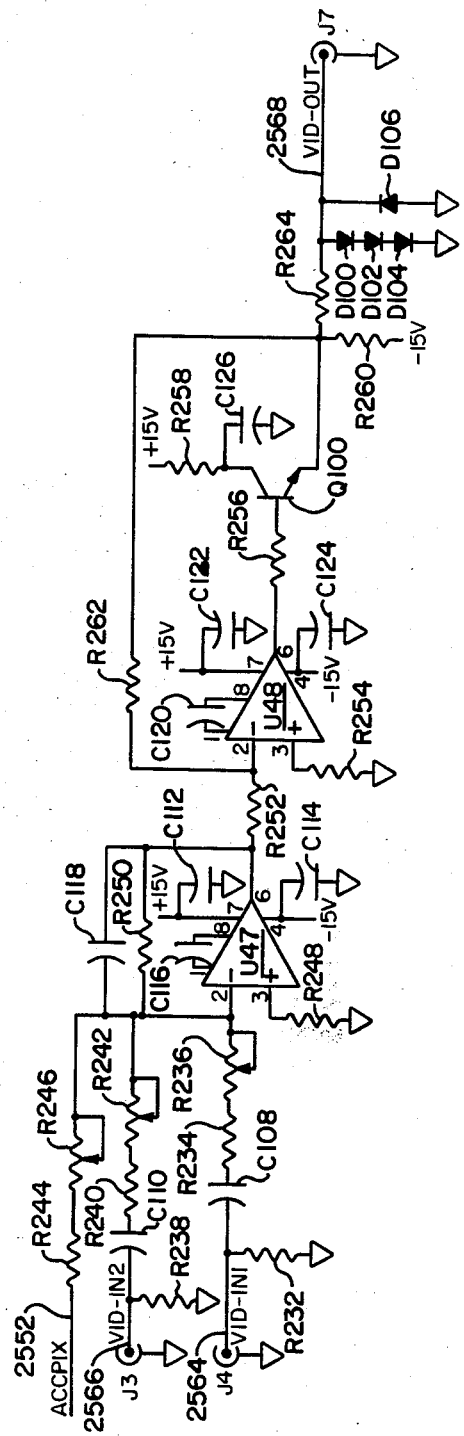

FIG. 51 shows the circuitry used to "highlight" the picture on the video monitor 72 (FIG. 4) i.e. to modify the image displayed on the monitor so as to advise the operator which pixels have been selected for acceptance of video data. The circuitry shown in FIG. 51 fulfills the same function as the Summer 280C of the first video-computer interface previously described, as shown in FIGS. 5 and 13B.

The first second and video inputs are fed to the AJ4 and J3 connectors respectively of the AIM-b 65 mother board and are then placed on lines 2564 and 2566 respectively. (The preferred TN2500 video camera produces only a single analog video output, which may be fed to either of the video inputs shown in FIG. 51. The second video input is provided so that, if desired, a second image can be superimposed upon the image of the weld pool area seen on the monitor 72. For example, when the video-computer interface is carrying out the weld pool width measuring software shown in FIGS. 15 and 17-17H, a graph of the light intensity along the cursor could be superimposed on the image of the weld pool area so that the operator may check that the local minima of light intensity detected by the software correspond to the visually-observable edges of the weld pool.) Line 2564 is connected to ground via a resistor R232 and is also connected via a capacitor C108, a fixed resistor R234 and a variable resistor R236 all connected in series to pin 2 (the negative input) of an integrated circuit U47, which is a type CA 3100E analog amplifier manufactured by RCA. Line 2566 is similarly connected to ground via a resistor on R338 and is also connected via a capacitor C110, a fixed resistor R240 and a variable resistor R242, all connected in series, to pin 2 of AU47. Also, as shown in FIG. 51, the ACCPIX signal on line 2552 (from pin 6 of U17C—see FIG. 47) is fed via a fixed resistor R244 and a variable resistor R246 connected in series to pin 2 of U47.

U47 receives the conventional power connections, +15 V to pin 7 and −15 V to pin 4. Pins 7 and 4 are also connected to ground via capacitors C112 and C114 respectively. Pins 1 and 8 of U47 are bridged by a capacitor C116 and pin 3 (the positive input) of U47 is grounded via a resistor R248. To provide feedback for amplifier U47, the output from pin 6 of U47 is fed via an RC circuit (comprising a capacitor C118 and resistor R250 connected in parallel) to pin 2 of U47. The output from pin 6 of U47 is also fed via a resistor R252 to pin 2 (the negative input) of U48, which is a second type CA 3100E analog amplifier. Pin 3 (the positive input) of U48 is grounded via a resistor R254, pins 1 and 8 of U48 are interconnected via a capacitor C120, pins 7 and 4 of U48 receive the conventional +15 V and −15 V respectively power inputs, pins 7 and 4 also being connected to ground via capacitors C122 and C124 respectively. The output from pin 6 of U48 is fed via resistor R256 to the base of an NPN transistor Q100, which is of the commercially-available LN2222 type. A resistor R258 and a capacitor C126 are connected in series between the +15 V supply line and ground, the resistor R258 being connected to the positive supply line, and the mid-point of the bridge formed by R258 and C126 is connected to the collector of Q100. The emitter of Q100 is connected to the −15 V supply line via a resistor R260, to pin 2 of U48 via a resistor R262 and to a video output line 2568 via a resistor R264. To limit the output potential which can be placed on the line 2568, line 2568 is connected to the anode of the first of a series of three Zener diodes, D100, D102 and D104 all connected in series, D104 being connected to ground. Also, line 2568 is connected to the cathode of a Zener diode D 106, the anode of which is grounded. Diodes D100, D102, D104 and D106 are all of the commercially-available In914 type. The video output line 2568 is connected to the J7 connector of the AIM-65 mother board and is then fed to the video input of the video monitor 72 (FIG. 4).

The reader may have noted that one of the AND gates of integrated circuit U7, two of the inverters of integrated circuit U14 and one of the inputs to integrated circuit U8 are not used in the above circuitry. In accordance with good circuit design practice, pins 1 and 2 of U7, pins 1 and 13 of U14 and pin 15 of U8 are all connected to the +5 V supply line via a 1K resistor.

The circuits used to supply the necessary +5 V supplies (connector J1, lines A, B, C, 1, 2 and 3) and the necessary grounds (connector J1, lines $\overline{\text{W}}$, $\overline{\text{X}}$, $\overline{\text{Y}}$, 41, 42 and 43) are of the conventional types which will be familiar to those skilled in the art and thus do not need to be described in detail.

It will be apparent to those skilled in the art that numerous changes and modifications can be made in the preferred apparatus and the methods of the invention described above without departing from the scope of the invention. Accordingly, all of the foregoing description is to be construed in an illustrative and not in a limitative manner, the scope of the invention being defined solely by the appended claims.

I claim:

1. A process for controlling an arc welding process comprising the steps of: beginning a weld by providing electrical current to form an arc between a welding electrode and a base metal to thereby form a weld pool of liquid metal on said base metal; measuring the natural frequency of oscillation of said weld pool; determining the position of a first edge of the pool by analyzing light reflected from the surface of said weld pool and the adjacent base metal in a direction parallel to but non-coincident with the axis of the welding electrode for a first local light intensity minimum; determining the position of a second edge of said pool by a similar method on the opposite side of said pool; determining the distance between said first and second edges of said pool to determine a width; adjusting the electrical current of said arc welding process in response to said frequency and width to maintain a constant pool mass and a constant width between said first and second pool edges.

2. The method according to claim 1 wherein said reflected light is used to form an image of said weld pool in which image said welding electrode appears a shadow obscurring said arc, and wherein the width of the pool between said edges is measured along a line extending through said edges and said shadow.

3. The method according to claim 1 including receiving a frame of said reflected light at a video camera; outputting analog data representing the light intensity level on a straight line taken across said frame, said line being taken across the image of the pool in said frame, from said camera to an analyzer; analyzing said data at the analyzer to determine the positions of said first and second edges relative to said line.

4. The method according to claim 3 further including digitizing said data prior to inputting the data to the analyzer which is a digital computer.

5. A method according to claim 1 further comprising the step of inducing an oscillation in said weld pool.

6. A method according to claim 5 wherein the step of inducing an oscillation in said pool includes adjusting the electrical current to a base level, pulsing said current to a substantially different current level and returning said current level to substantially said base level; measuring the frequency of oscillation of said liquid pool during a time interval when said current level is at said base level and following said current pulse.

7. The method according to claim 6 wherein the measurement of frequency of oscillation includes measuring the frequency of variation of the arc voltage of the arc of said welding process during said time interval.

8. A method of measuring the mass of a weld pool in an arc welding process in which an electrical current forms an arc from an electrode to said weld pool and an electrical voltage exists across the arc, comprising the steps of: adjusting the electrical current to a base level; pulsing said current to a substantially different level, returning said current to substantially its base level; measuring the natural frequency of oscillation of said weld pool after the current is returned to its base level, said frequency being related to the mass of said weld pool; and displaying in humanly perceptible form a value representative of the mass of said weld pool.

9. The method according to claim 8 wherein said measurement of frequency of oscillation is effected by measuring the frequency of variation of the arc voltage in a time interval after said return of said current to said base level.

10. A method of controlling the mass of a weld pool in an arc welding process in which an electrical current forms an arc from an electrode to said weld pool, comprising in order the steps of:
(a) inducing oscillations in said weld pool by applying a force to said weld pool;
(b) removing said force from said weld pool, while allowing said weld pool to continue to oscillate at substantially its natural frequency;
(c) measuring the frequency of said oscillations after the removal of said force;
(d) comparing said measured frequency with a predetermined parameter representing a desired value of said frequency;
(e) adjusting the electrical current of said arc so that said measured frequency will approach said desired value of said frequency.

11. A method according to claim 10 wherein said parameter is entered by an operator.

12. A method according to claim 10 wherein said parameter is determined by carrying out step (a) to (c) an an earlier time and fixing said parameter in accordance with the measured frequency of oscillation of said weld pool at said earlier time.

13. An apparatus for use in measuring the frequency of oscillation of the liquid pool in an arc welding process in which an electrical current forms an arc from an electrode to the pool, comprising:
means for inducing oscillations in said pool including means for applying and removing a force to said pool, the pool continuing to oscillate at substantially its natural frequency following said removal;
means for measuring the frequency of oscillation of said pool after the force is removed.

14. An apparatus for use in controlling the mass of a weld pool in an arc welding process in which an electrical current forms an arc from an electrode to the weld pool, comprising:
means for inducing oscillations in said weld pool including means for applying and removing a force to said weld pool, while allowing said weld pool to continue to oscillate at substantially its natural frequency following said removal;
means for measuring the frequency of oscillation of said weld pool after said force is removed;
means for adjusting the electrical current of said arc in response to the difference between the measured value of oscillation and a desired value of said frequency.

15. An apparatus according to claim 14 wherein said means for inducing oscillations include a linear welding current supply and means for pulsing the arc current.

* * * * *